United States Patent [19]

Nagasaki et al.

[11] Patent Number: 5,896,403
[45] Date of Patent: Apr. 20, 1999

[54] DOT CODE AND INFORMATION RECORDING/REPRODUCING SYSTEM FOR RECORDING/REPRODUCING THE SAME

[75] Inventors: Tatsuo Nagasaki, Yokohama; Hiroyoshi Fujimori, Hachiouji; Takeshi Mori, Machida; Shinzo Matsui, Sagamihara; Yoshikazu Akamine, Hachiouji; Seiichi Wakamatsu, Hachiouji; Kazuhiko Morita, Hachiouji, all of Japan

[73] Assignee: Olympus Optical Co., Ltd., Tokyo, Japan

[21] Appl. No.: 08/407,018

[22] PCT Filed: Sep. 28, 1993

[86] PCT No.: PCT/JP93/01377

§ 371 Date: Jun. 1, 1995

§ 102(e) Date: Jun. 1, 1995

[87] PCT Pub. No.: WO94/08314

PCT Pub. Date: Apr. 14, 1994

[30] Foreign Application Priority Data

Sep. 28, 1992 [JP] Japan ................................ 4-258262

[51] Int. Cl.⁶ ........................................................ G11B 13/00
[52] U.S. Cl. ............................ 371/37.1; 369/14; 369/112; 369/275.1
[58] Field of Search ............................ 371/37.1, 41, 42, 371/38.1, 37.9, 30; 369/13, 14, 32, 47, 54, 58, 112, 275.1, 275.2, 275.3, 275.4, 275.5, 15–18

[56] References Cited

U.S. PATENT DOCUMENTS

| | | |
|---|---|---|
| 4,337,375 | 6/1982 | Freeman . |
| 4,375,058 | 2/1983 | Bouma et al. . |
| 4,461,552 | 7/1984 | Levine . |
| 4,544,259 | 10/1985 | Kanaoka et al. . |
| 5,051,736 | 9/1991 | Bennett et al. . |
| 5,623,479 | 4/1997 | Takahashi ........................ 369/275.5 |
| 5,644,557 | 7/1997 | Akamine et al. ..................... 368/14 |

FOREIGN PATENT DOCUMENTS

| | | |
|---|---|---|
| 0203659 A1 | 12/1986 | European Pat. Off. . |
| 0388204 A2 | 9/1990 | European Pat. Off. . |
| 58-19712 | 2/1983 | Japan . |
| 2-105333 | 4/1990 | Japan . |
| 5-109068 | 4/1993 | Japan . |

OTHER PUBLICATIONS

Patent Abstracts of Japan, vol. 9, No. 126 (E–318), May 31, 1995 & JP 60 015914 A (Hitachi Seisakusho, KK) Jan. 26, 1985.
Patent Abstracts of Japan, vol. 3, No. 78 (E–121), Jul. 5, 1979 & JP 54 057820 A (Ricoh Co., Ltd), May 10, 1979.
Patent Abstracts of Japan, vol. 6, No. 70 (P–113), May 6, 1982 & JP 57 008880 A (Nippon Telegraph & Telephone Corp) <NTT>.
IBM Technical Disclosure Bulletin, vol. 18, No. 4, Sep. 1975, pp. 1142–1144, XP002025973.
IBM Technical Disclosure Bulletin, vol. 17, No. 11, Apr., 1975 pp. 3230–3231, XP002025974 "Security Shield".
IBM Technical Disclosure Bulletin, vol. 20, No. 7, Dec., 1977, pp. 2909–2911, XP002025972 "Use of Magnetic Printing for Word Processing and Audio Storage".

*Primary Examiner*—Reba I. Elmore
*Assistant Examiner*—Thomas E Brown
*Attorney, Agent, or Firm*—Frishauf, Holtz, Goodman, Langer & Chick

[57] ABSTRACT

A long time optical recording and repeated reproduction of multimedia information is possible. Using a printer system or printing process system, on a recording medium such as a sheet, the so-called multimedia information in the form of dot codes (36) together with images (32) and characters (34) is recorded. The multimedia information includes audio information such as voices, image information obtainable from a camera and others, and digitally coded data obtainable from a personal computer and other. A pen-like information reproducing device (40) is manually moved to scan the dot codes (36) and to take in the dot codes. The original sound is generated by a voice output device (42) such as an earphone, the original image information is outputted on a display such as a CRT, and the digitally coded original data to a page printer or the like.

43 Claims, 82 Drawing Sheets

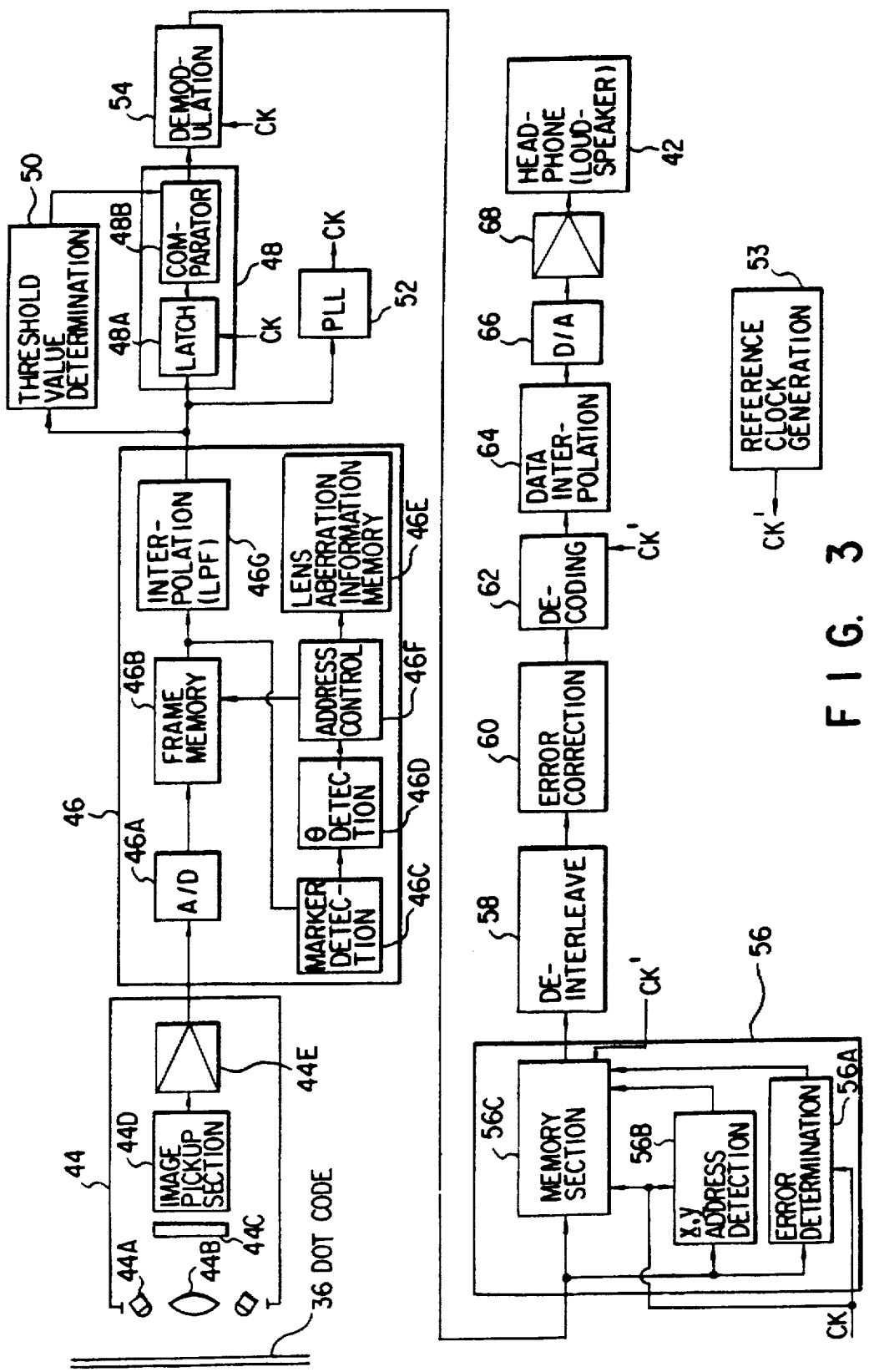
F I G. 3

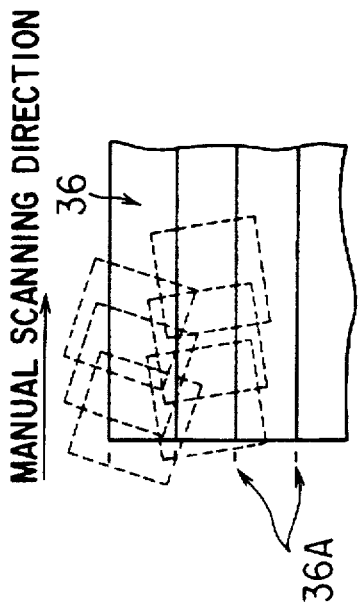
FIG. 4A
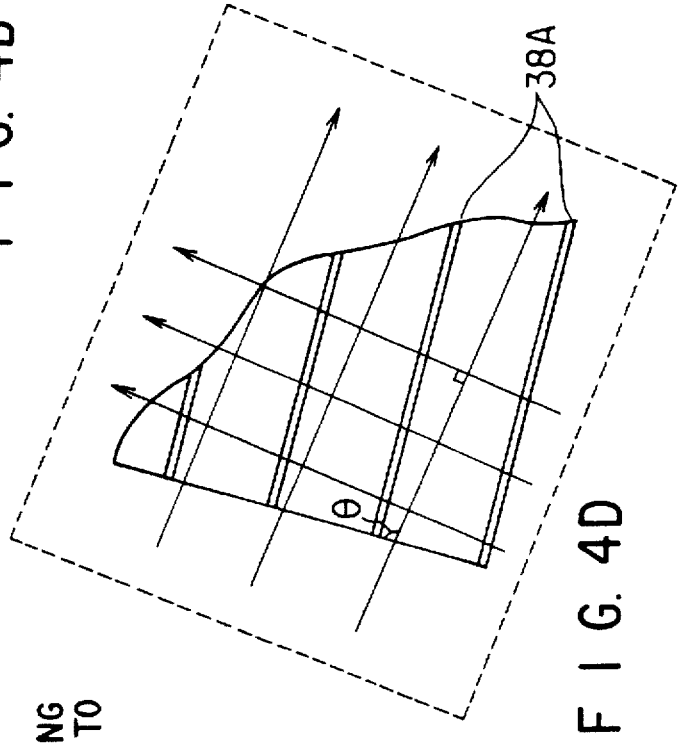
FIG. 4B
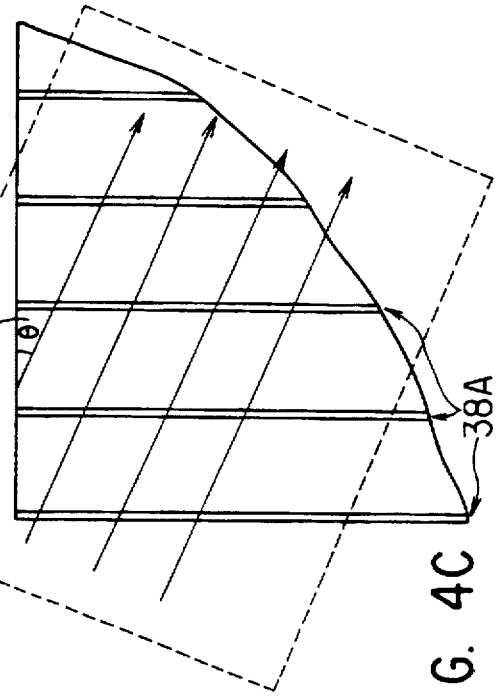
FIG. 4C
FIG. 4D

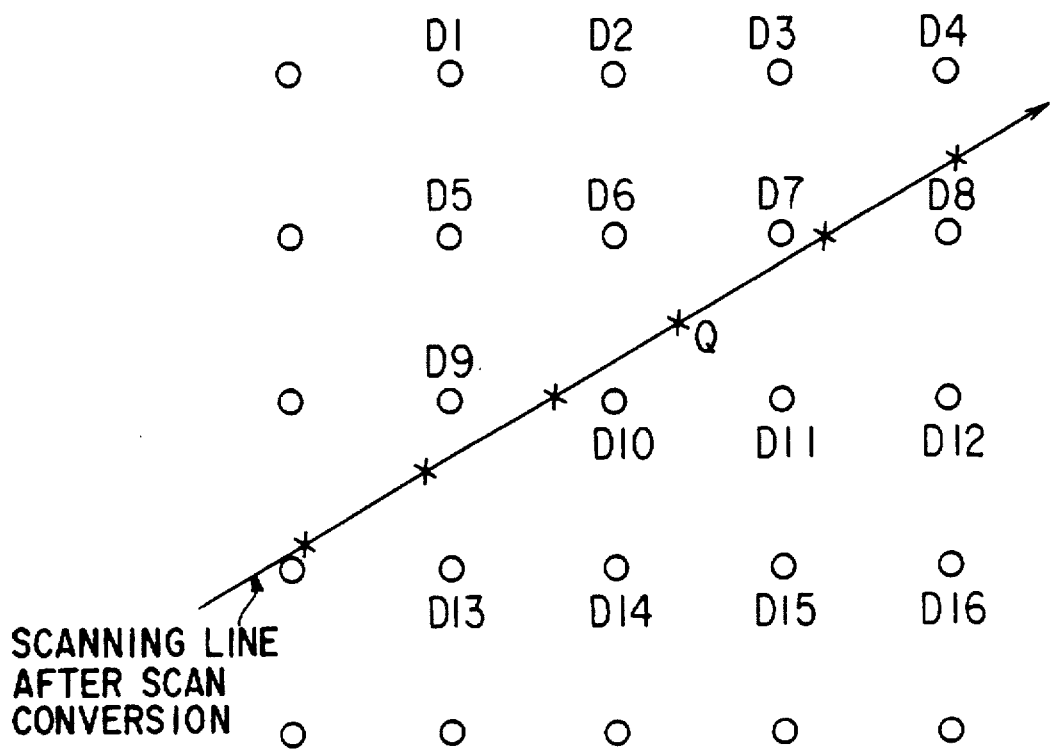
FIG. 5
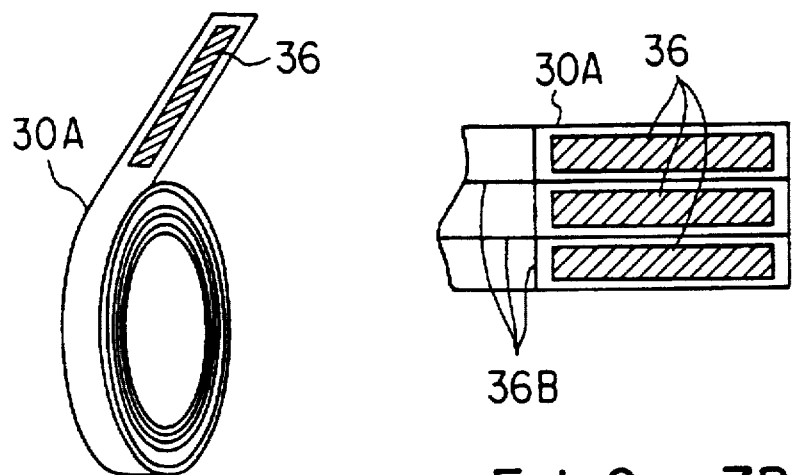
FIG. 7A
FIG. 7B

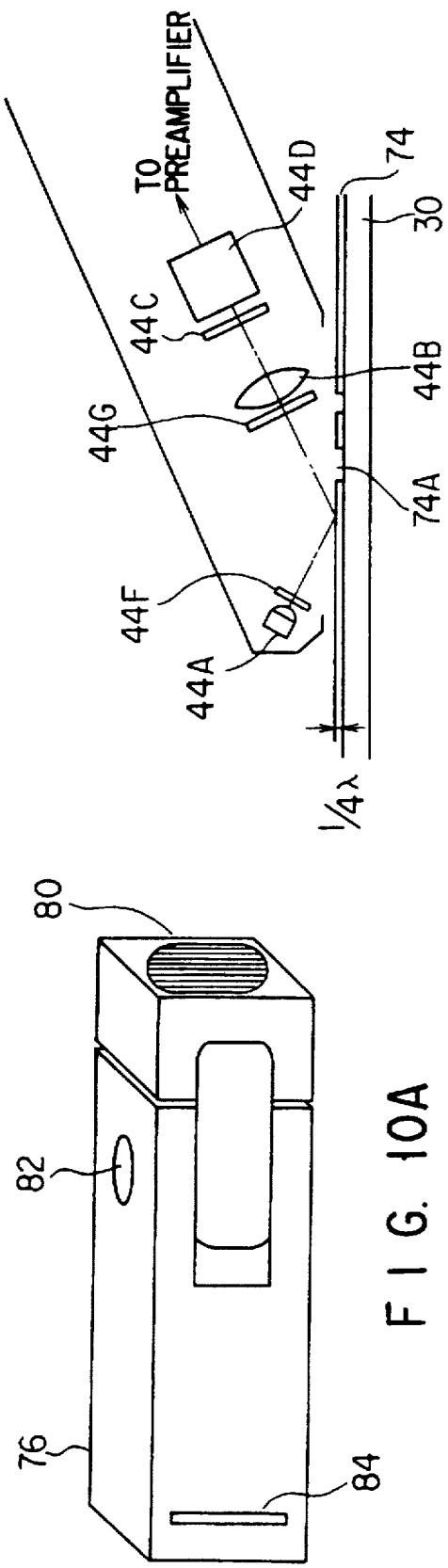
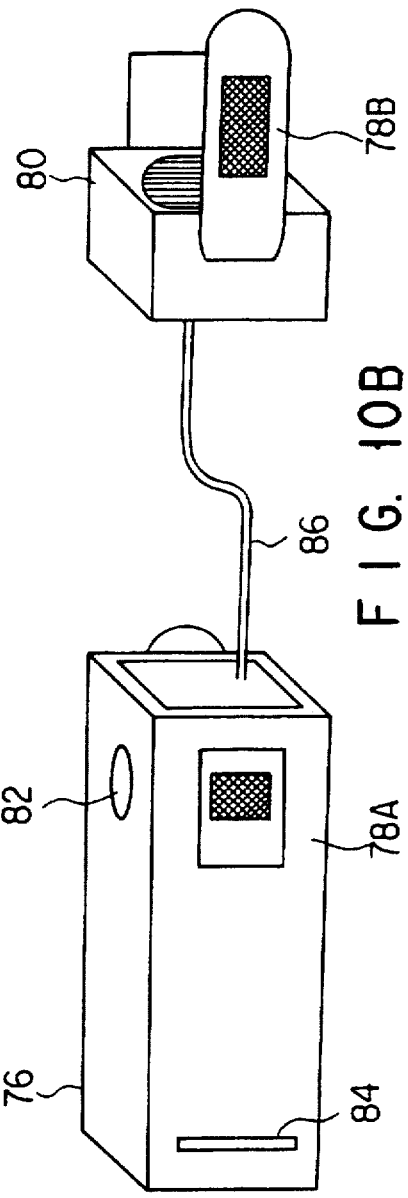

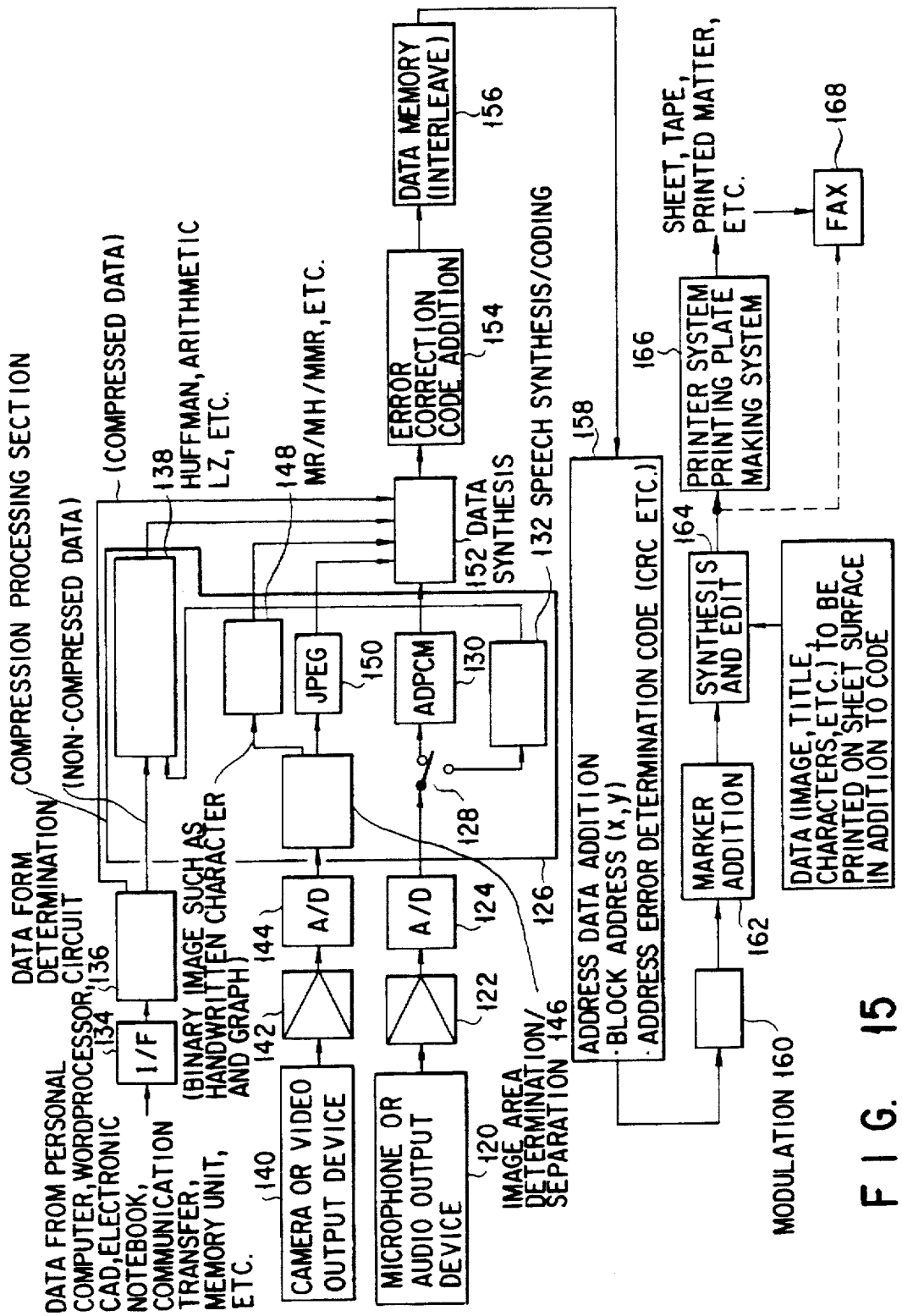
F I G. 15

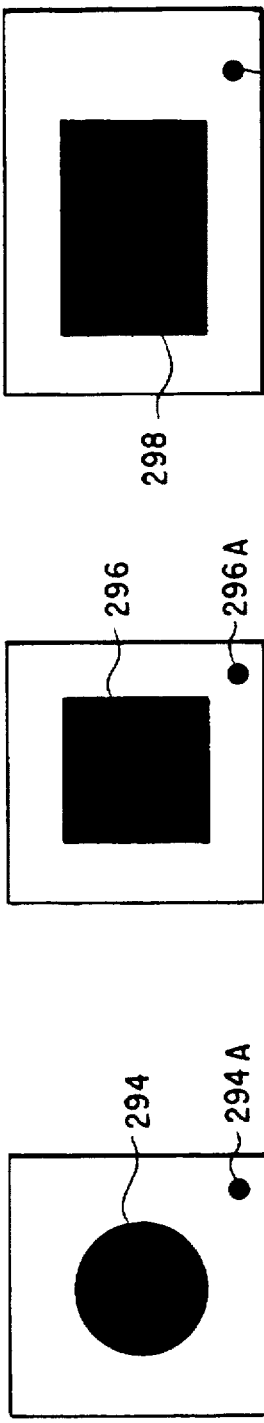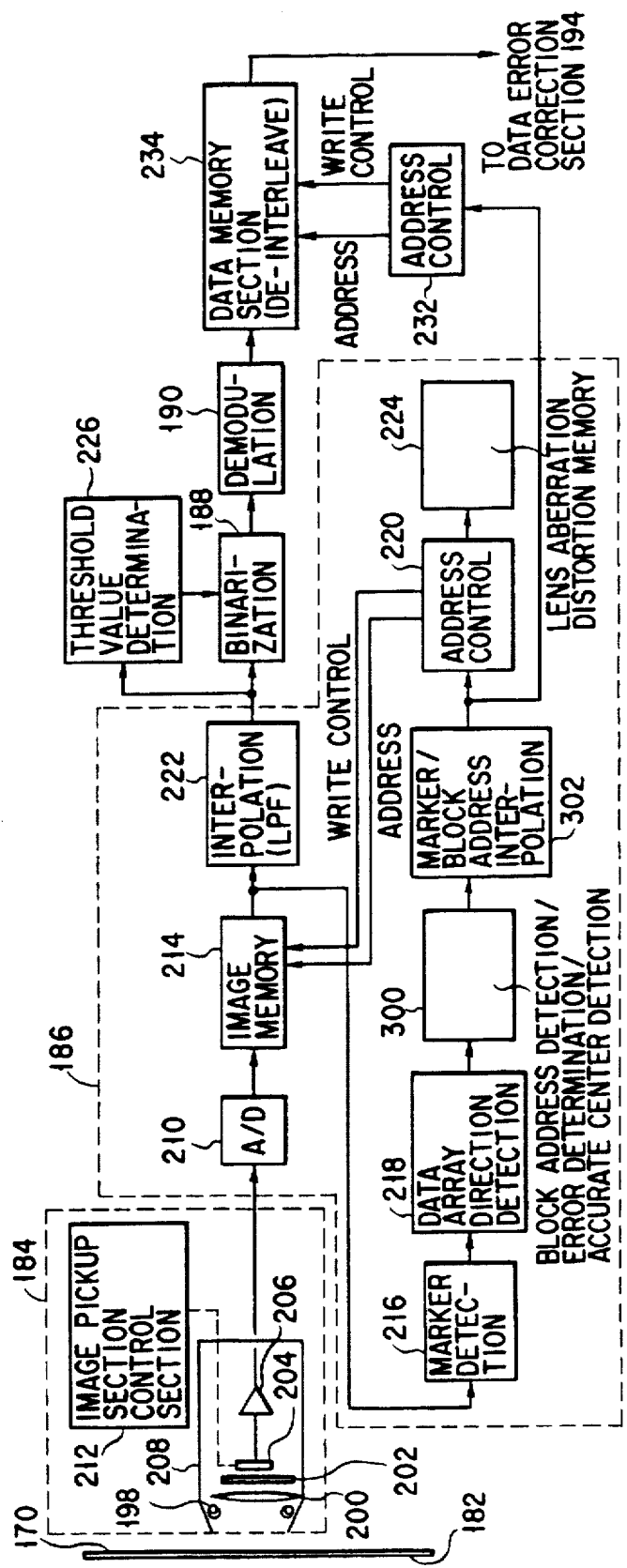

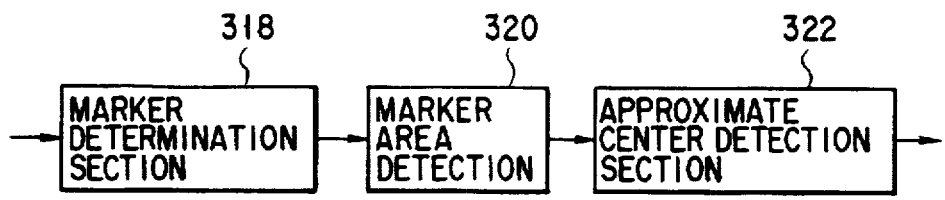
F I G. 25
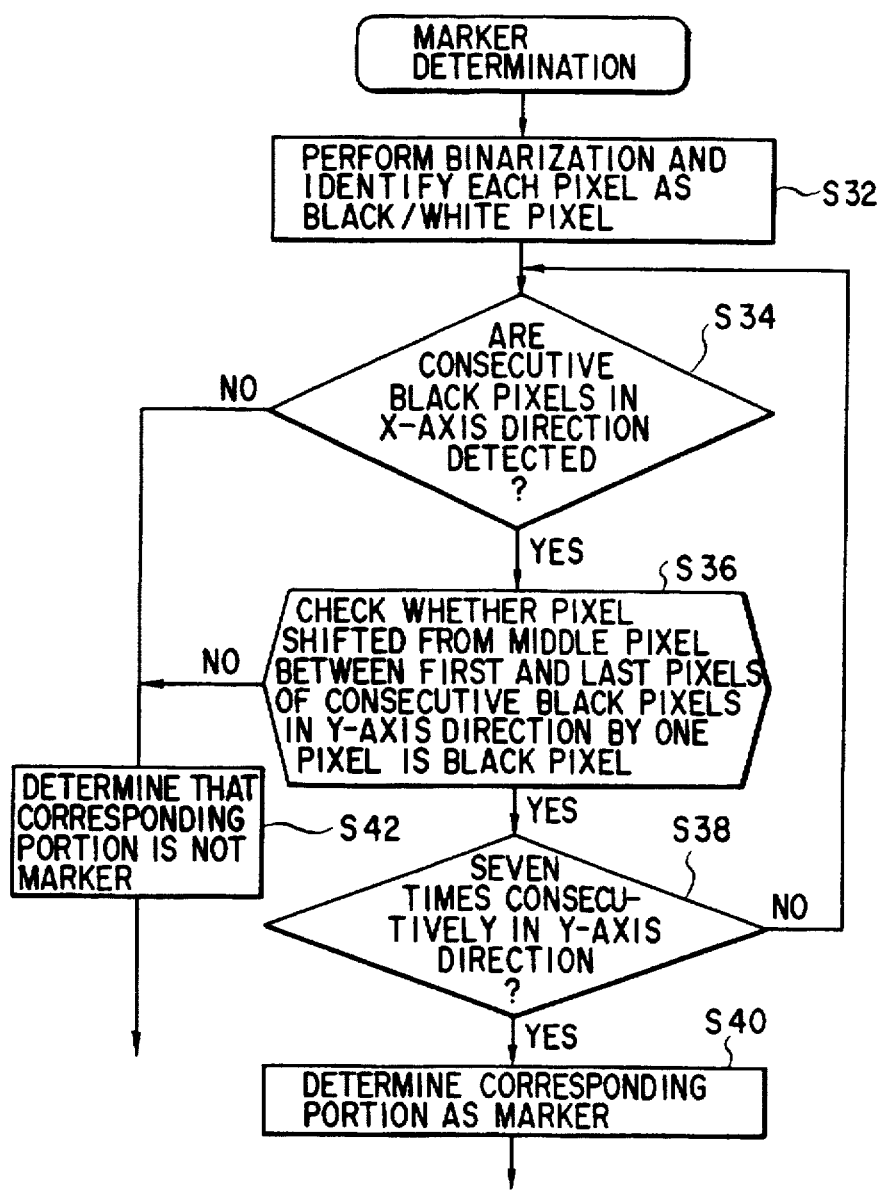
F I G. 26

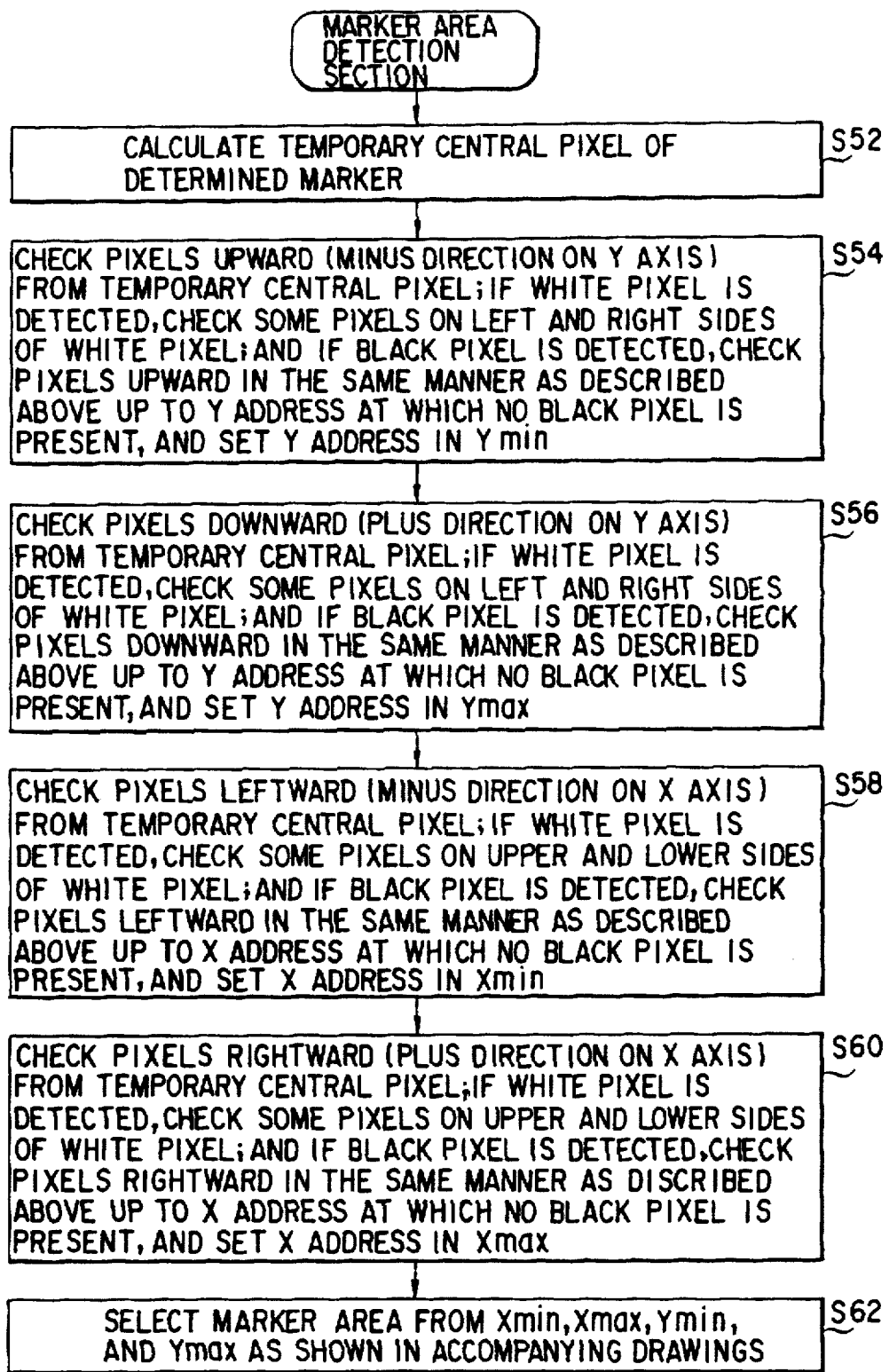
F I G. 27

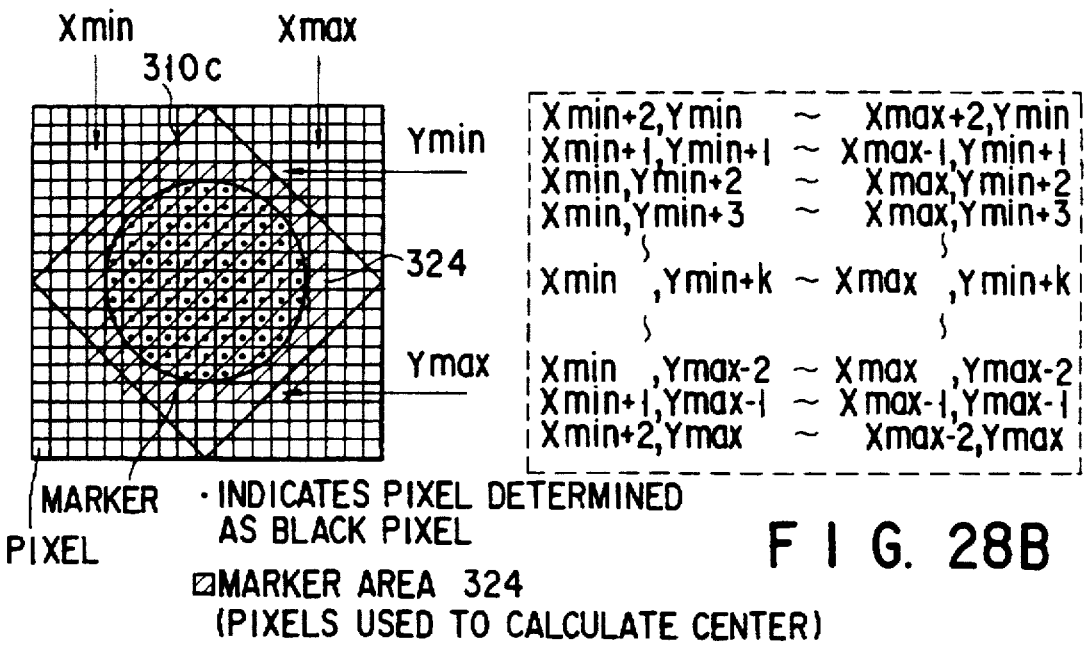
FIG. 28A
FIG. 28B
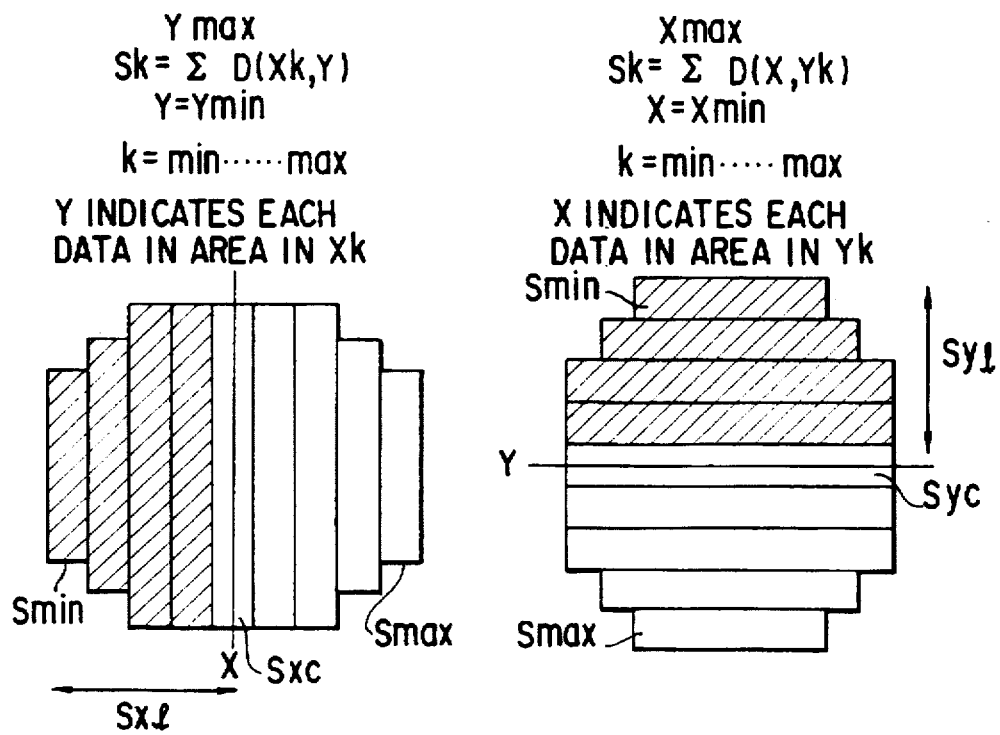
FIG. 28C
FIG. 28D

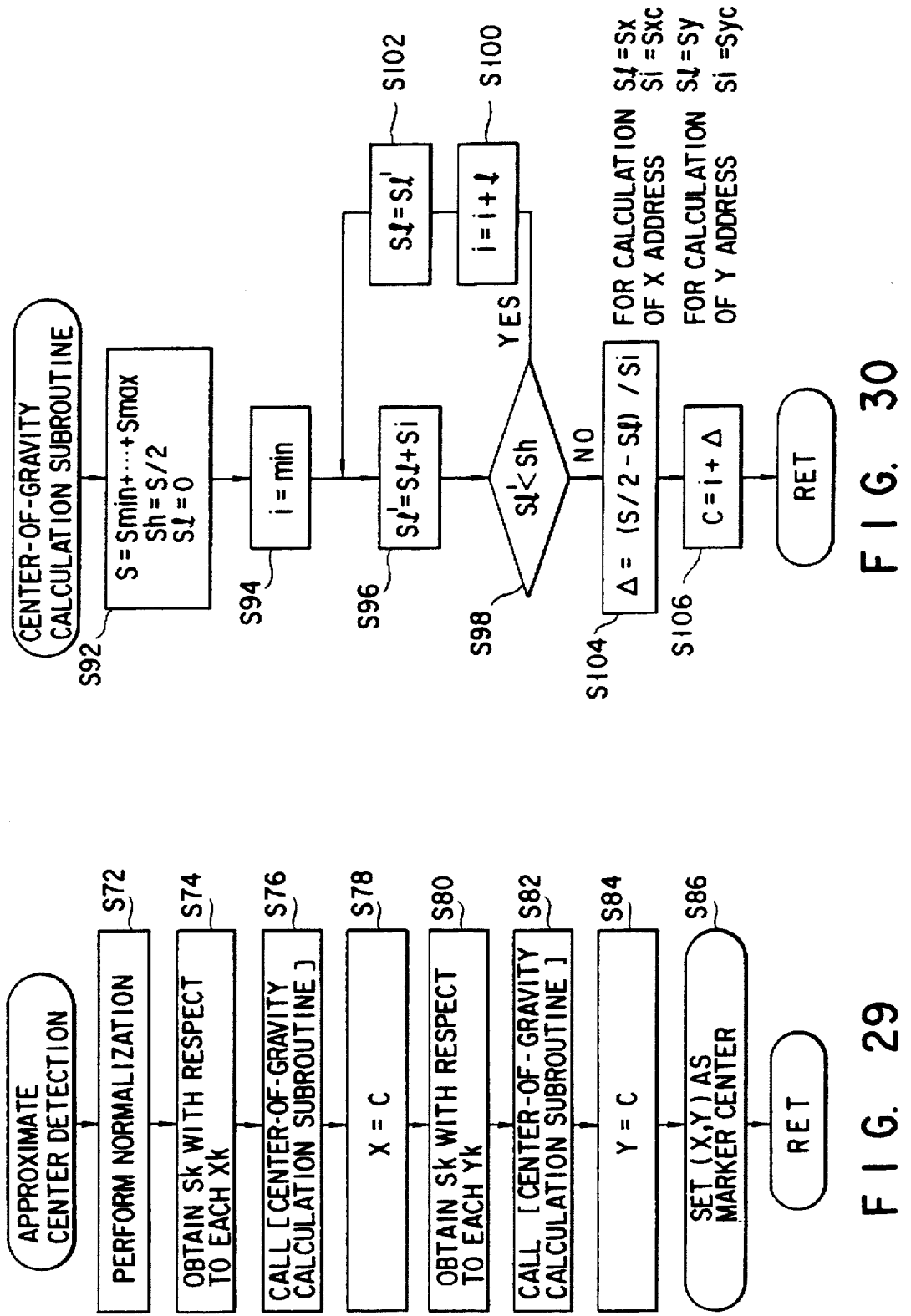

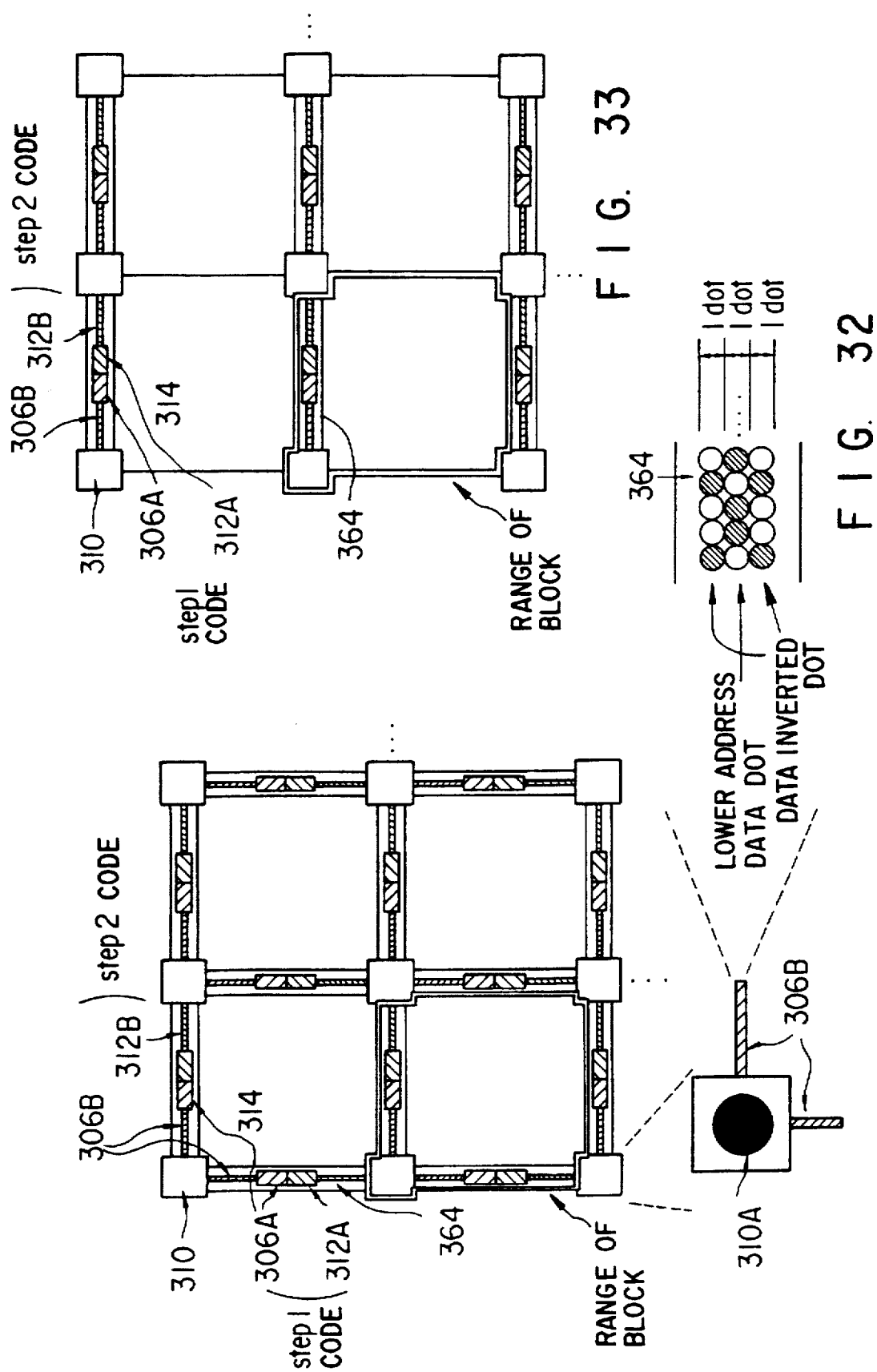

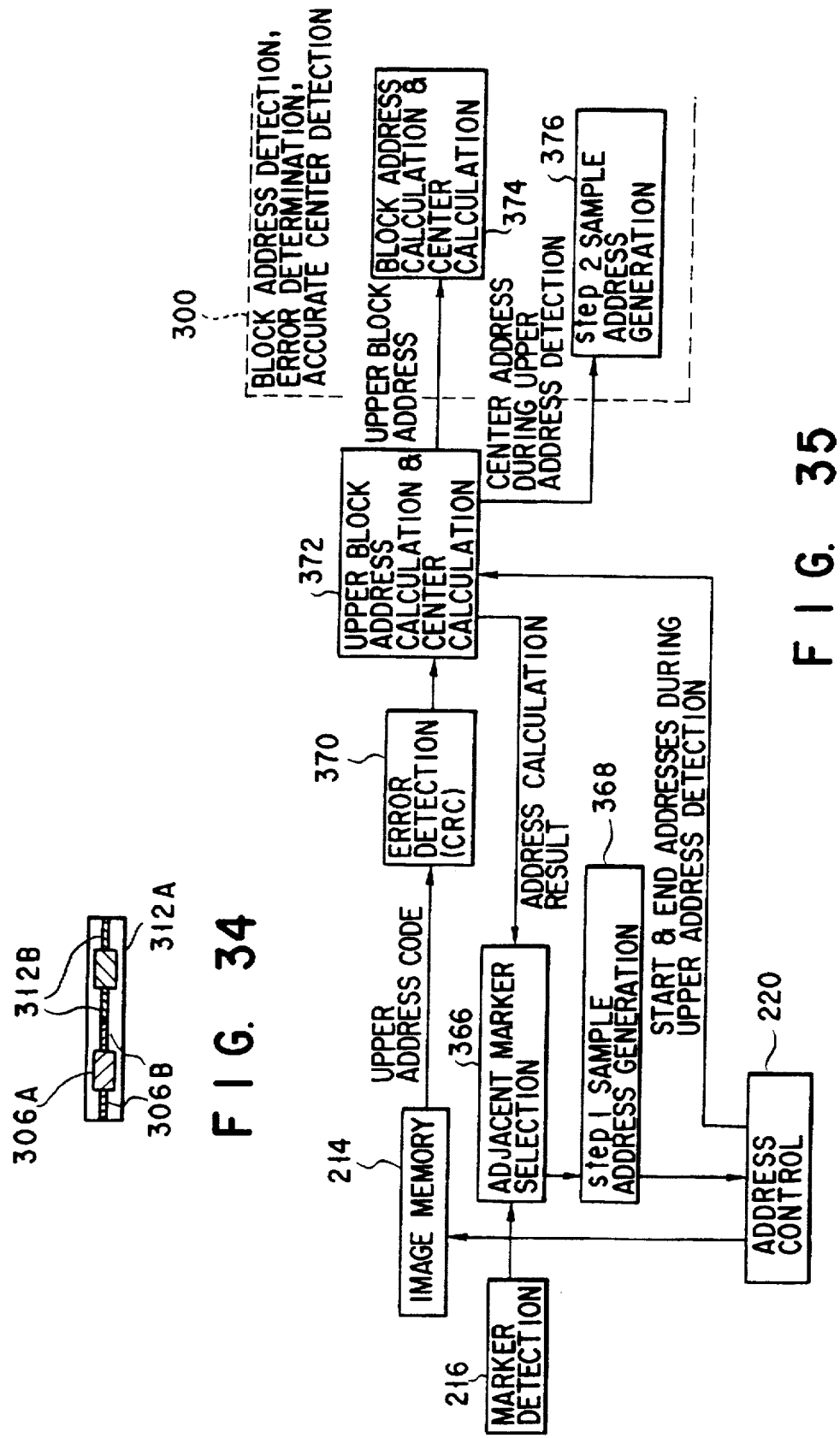

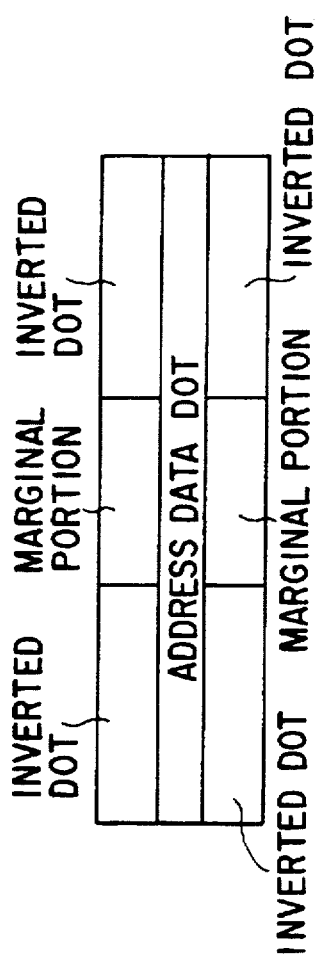
F I G. 41
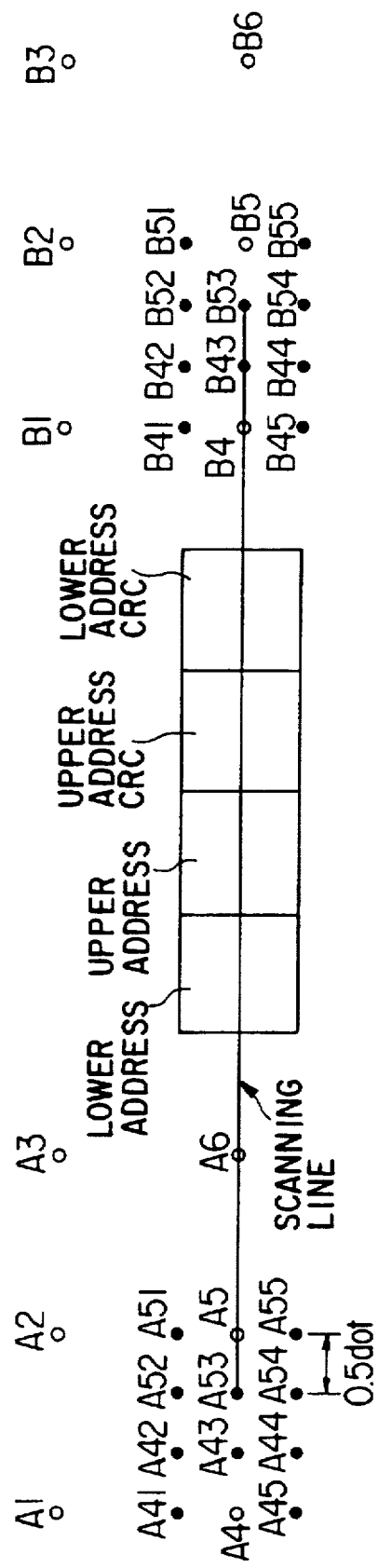
F I G. 42

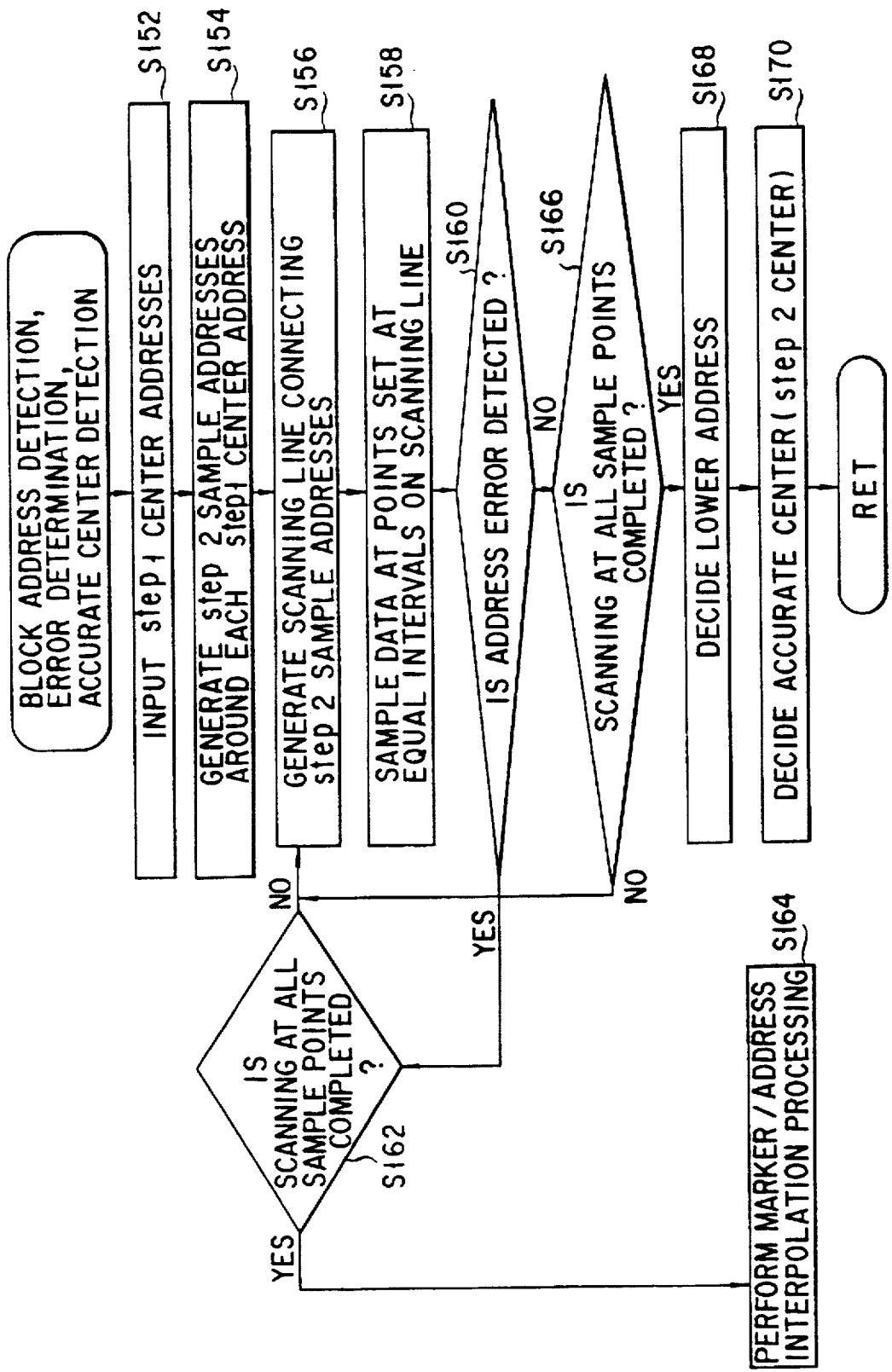
F I G. 44

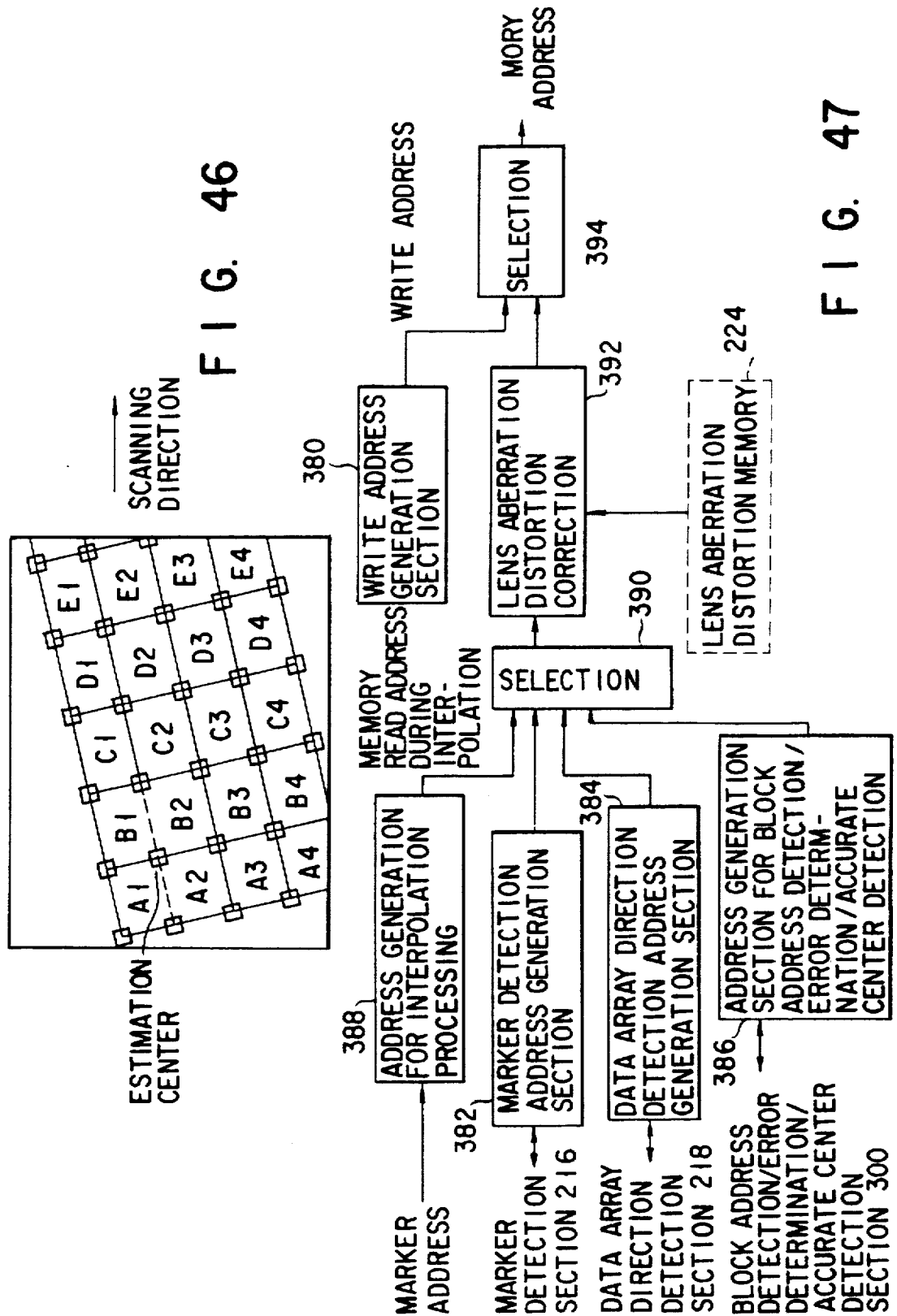

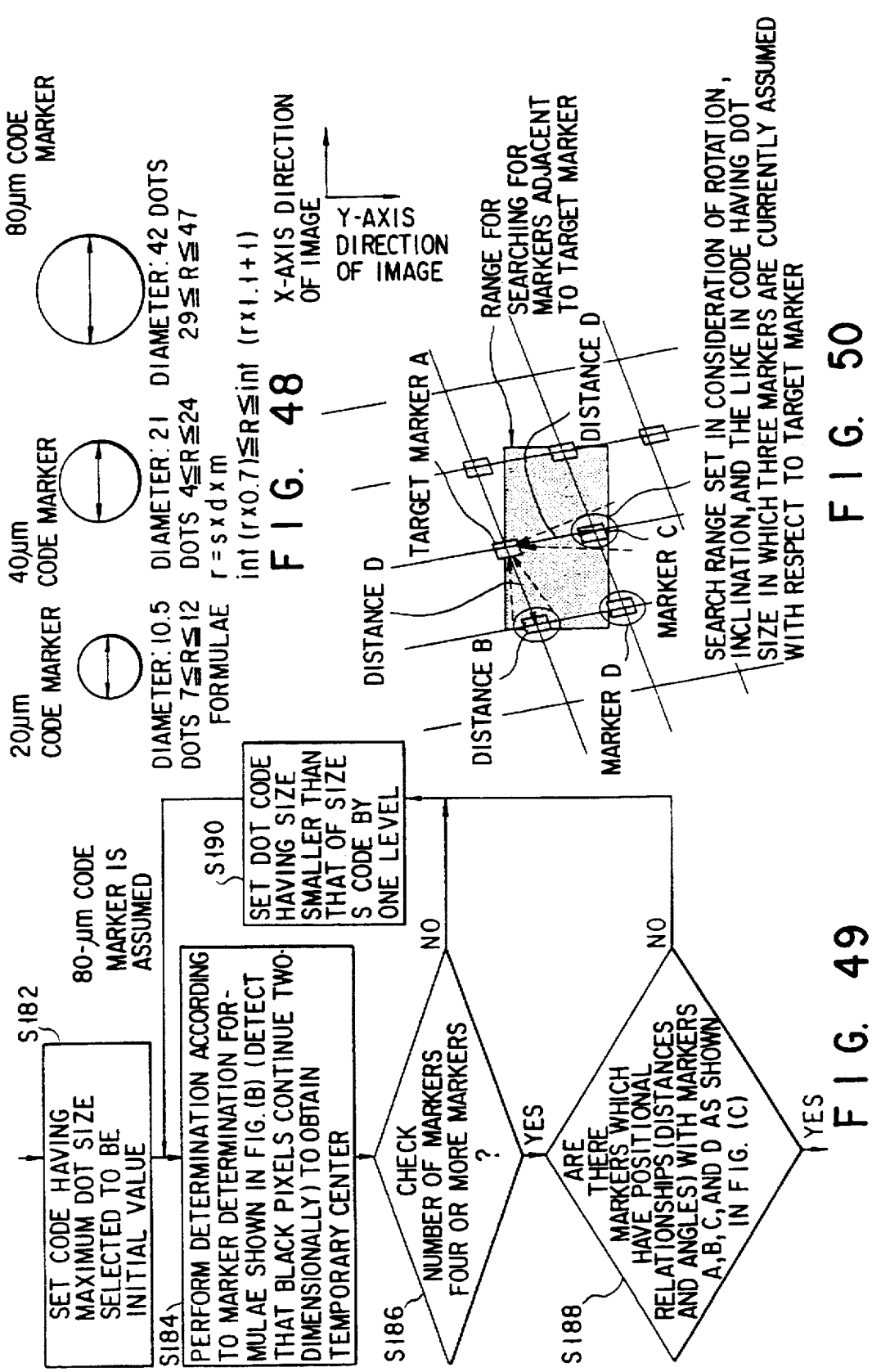

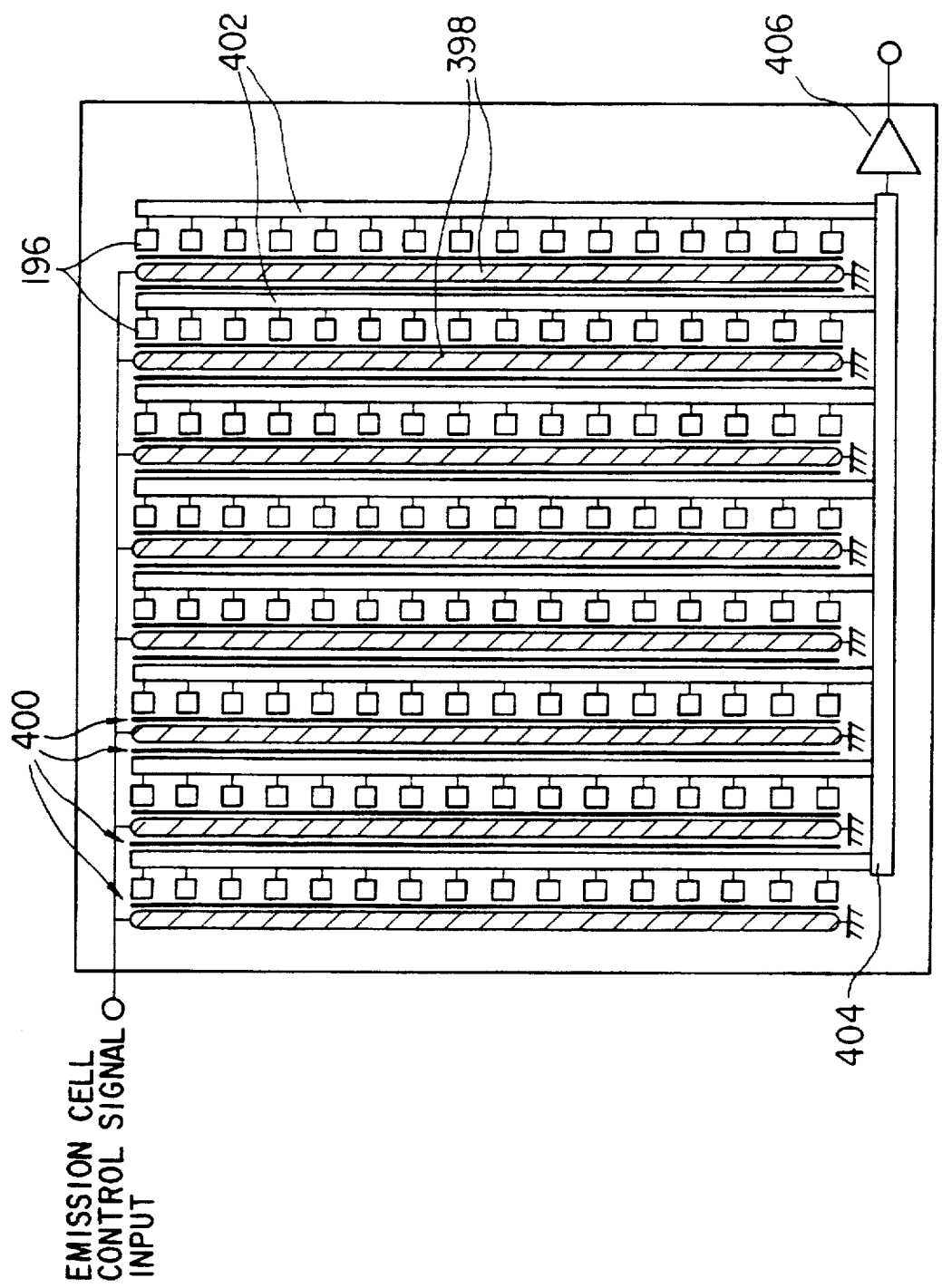

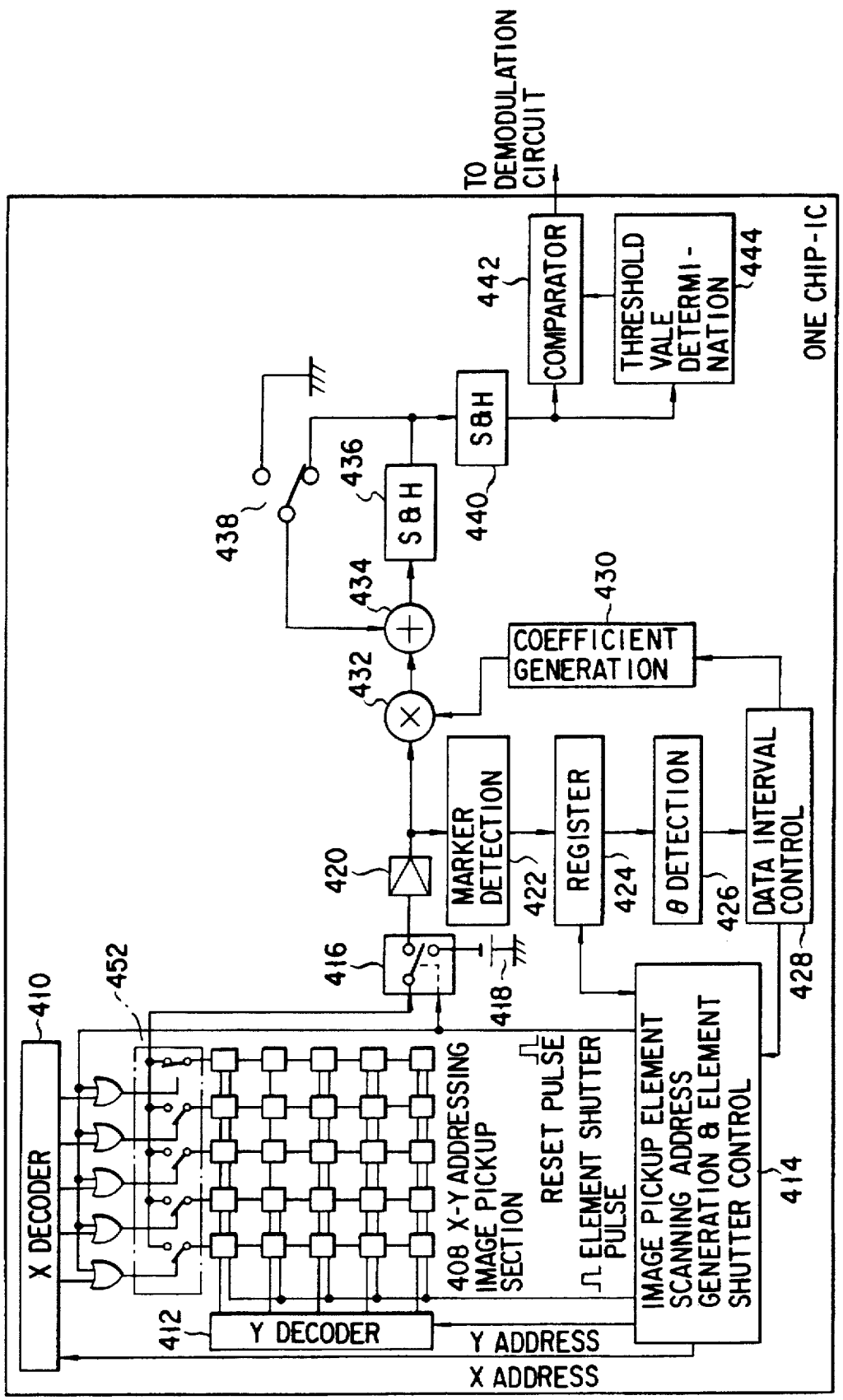
F I G. 52

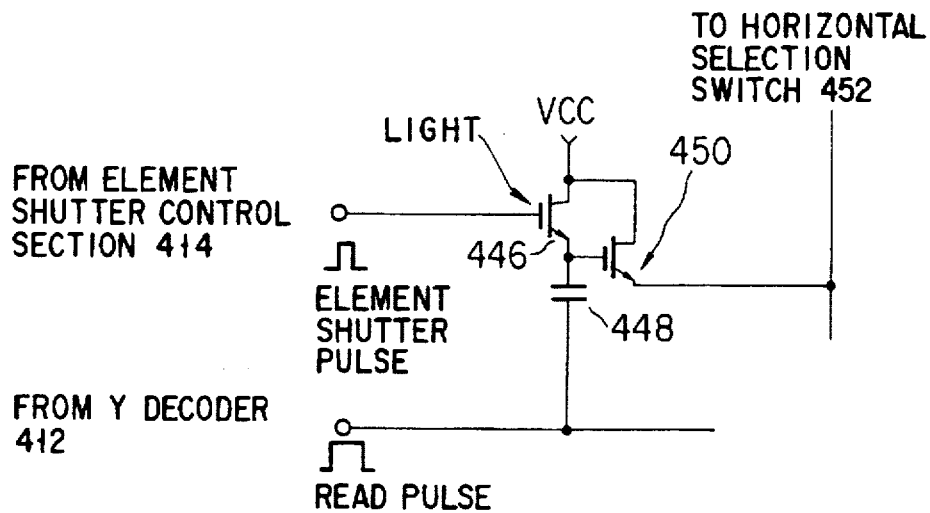
F I G. 53
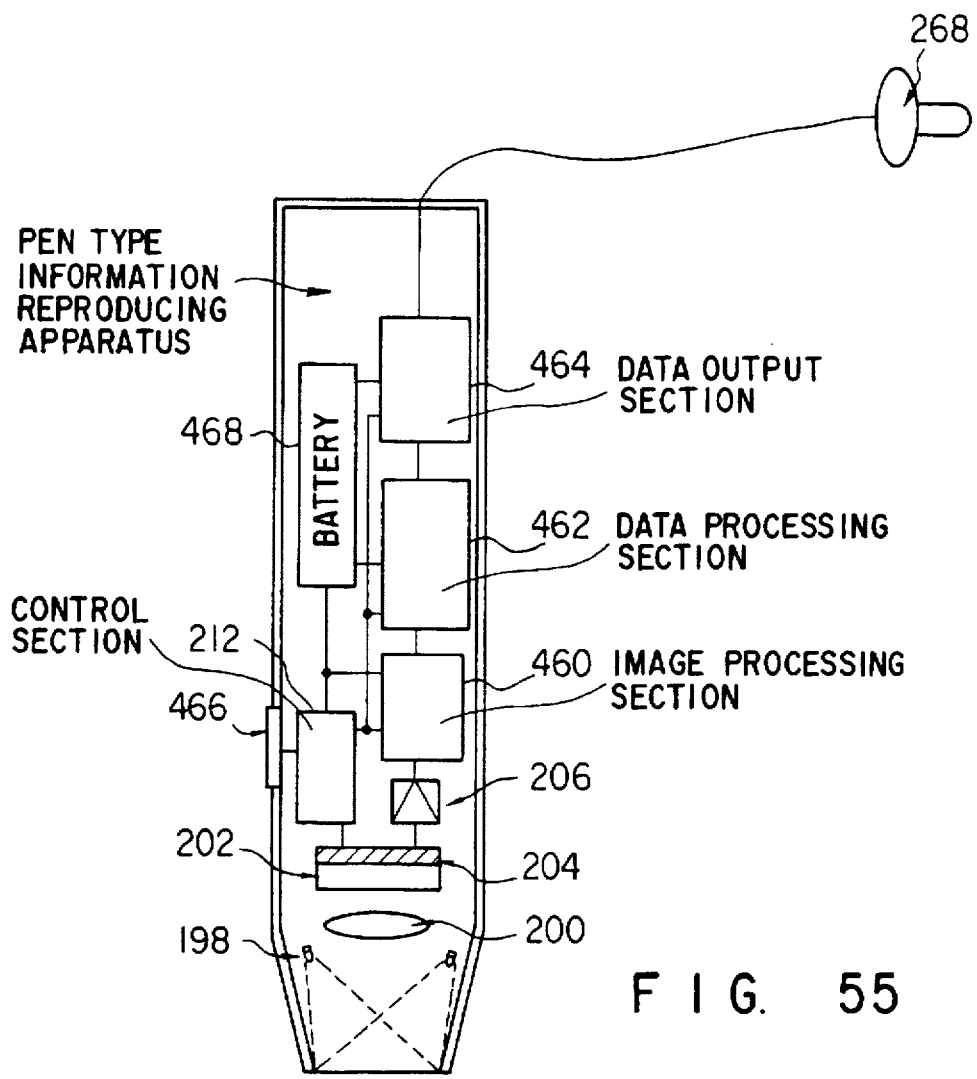
F I G. 55

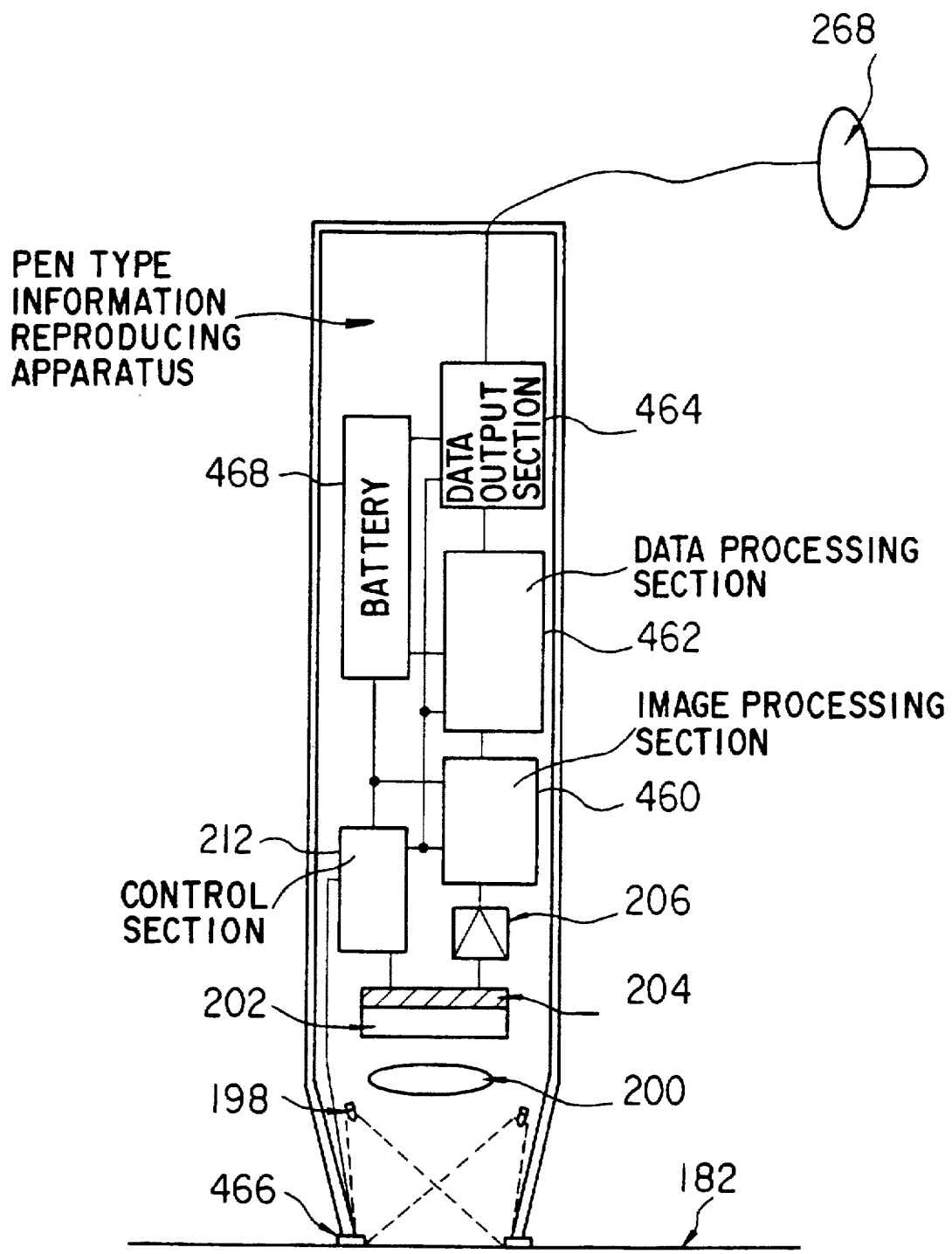
F I G. 56

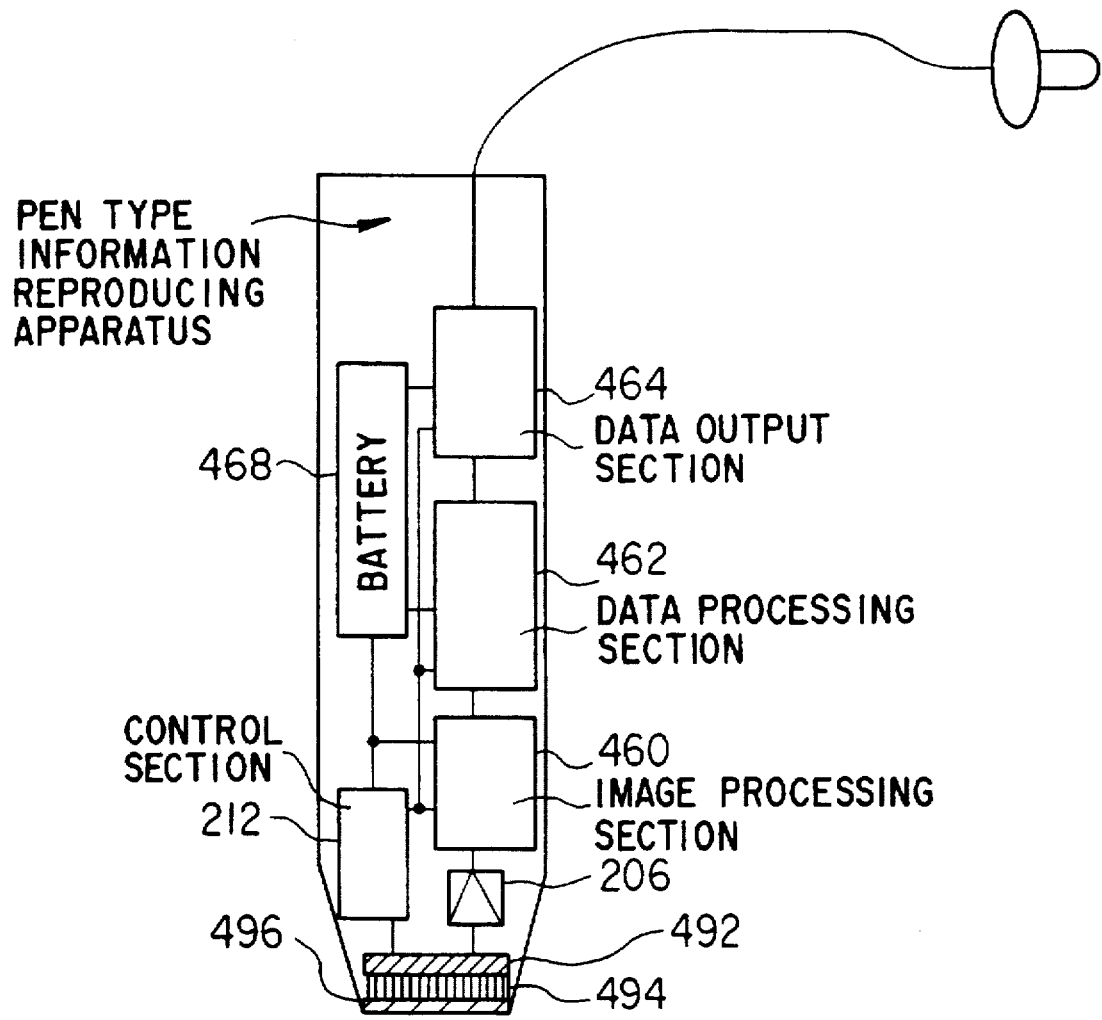
F I G. 61

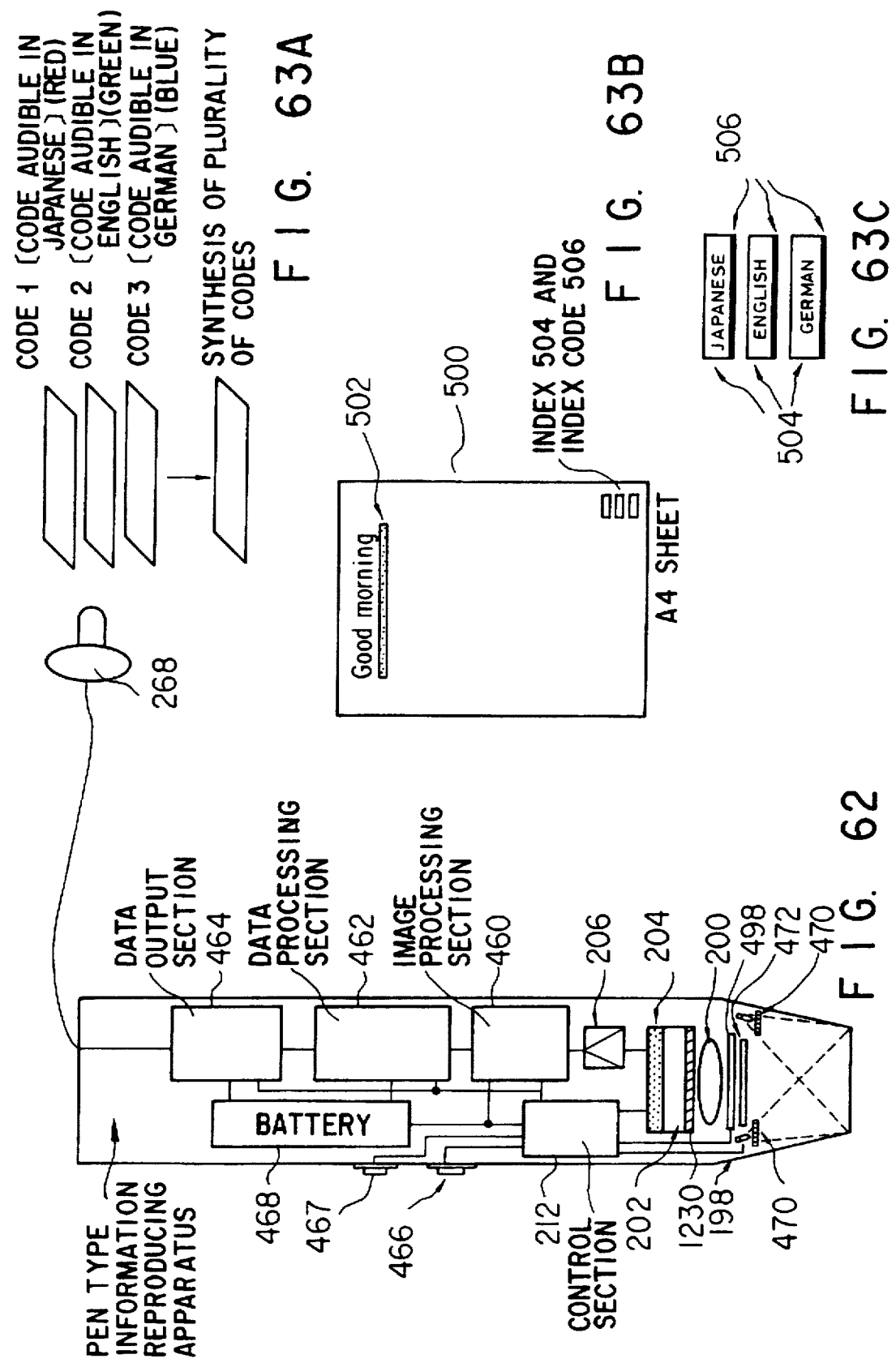

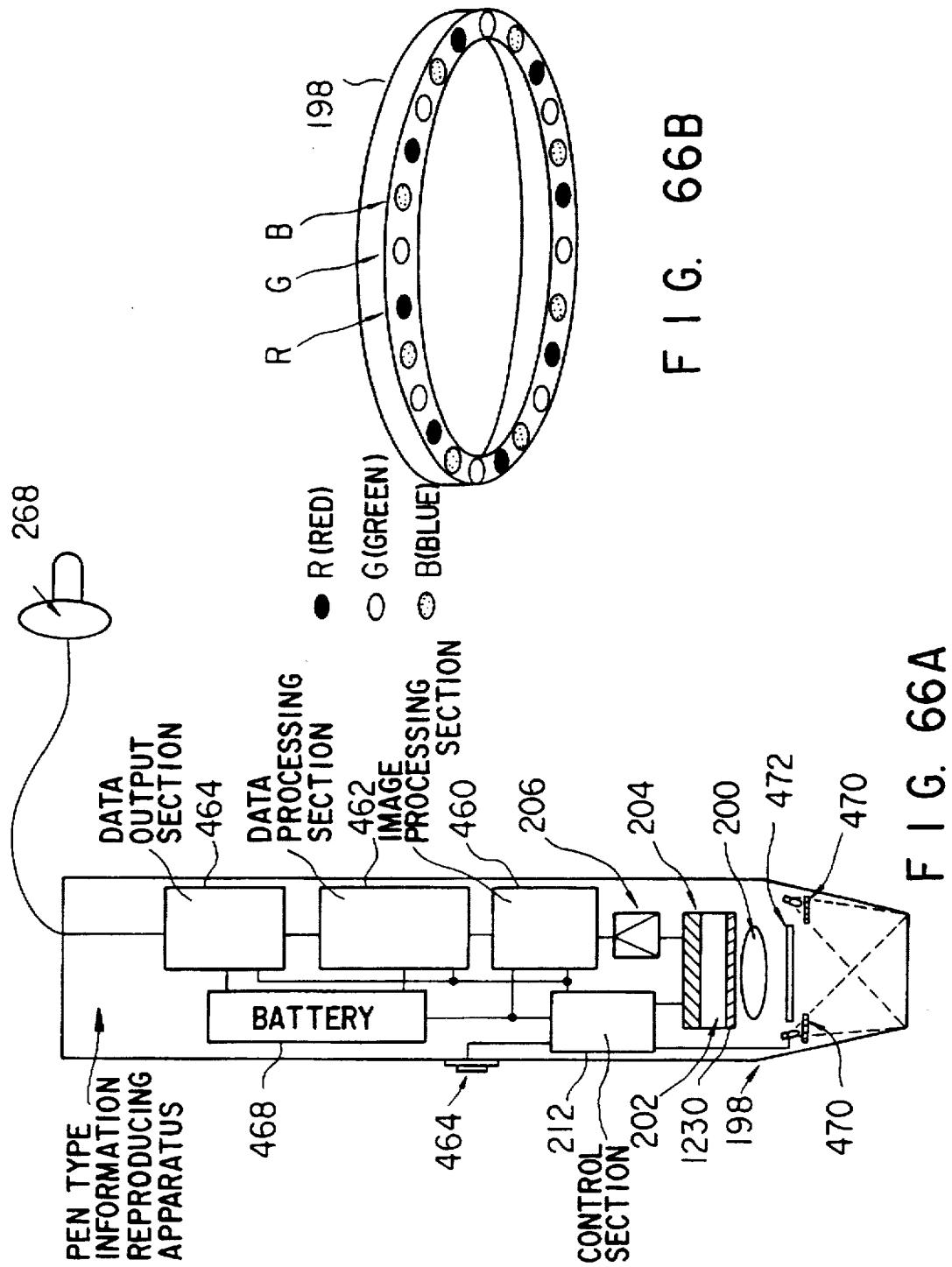

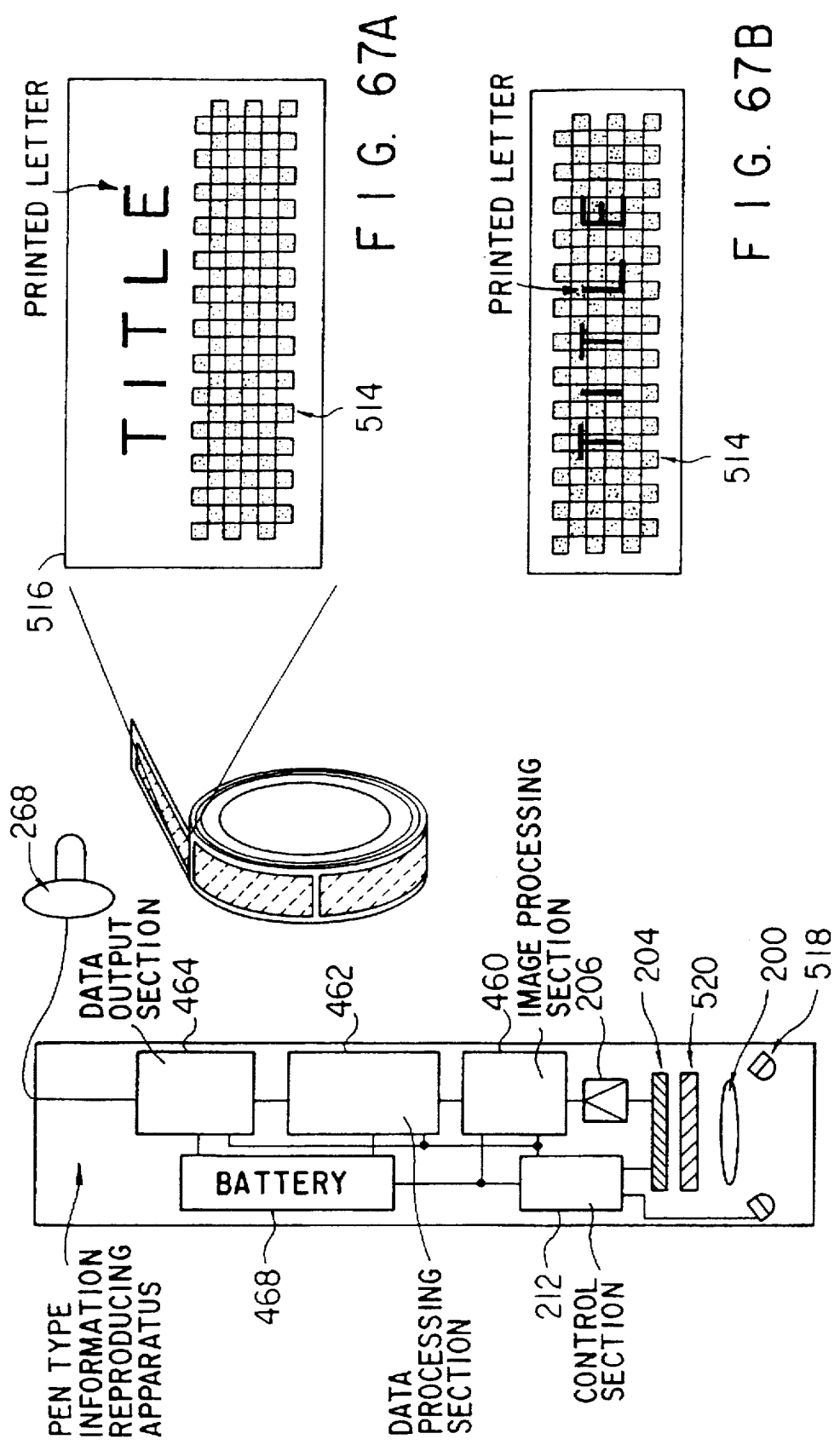

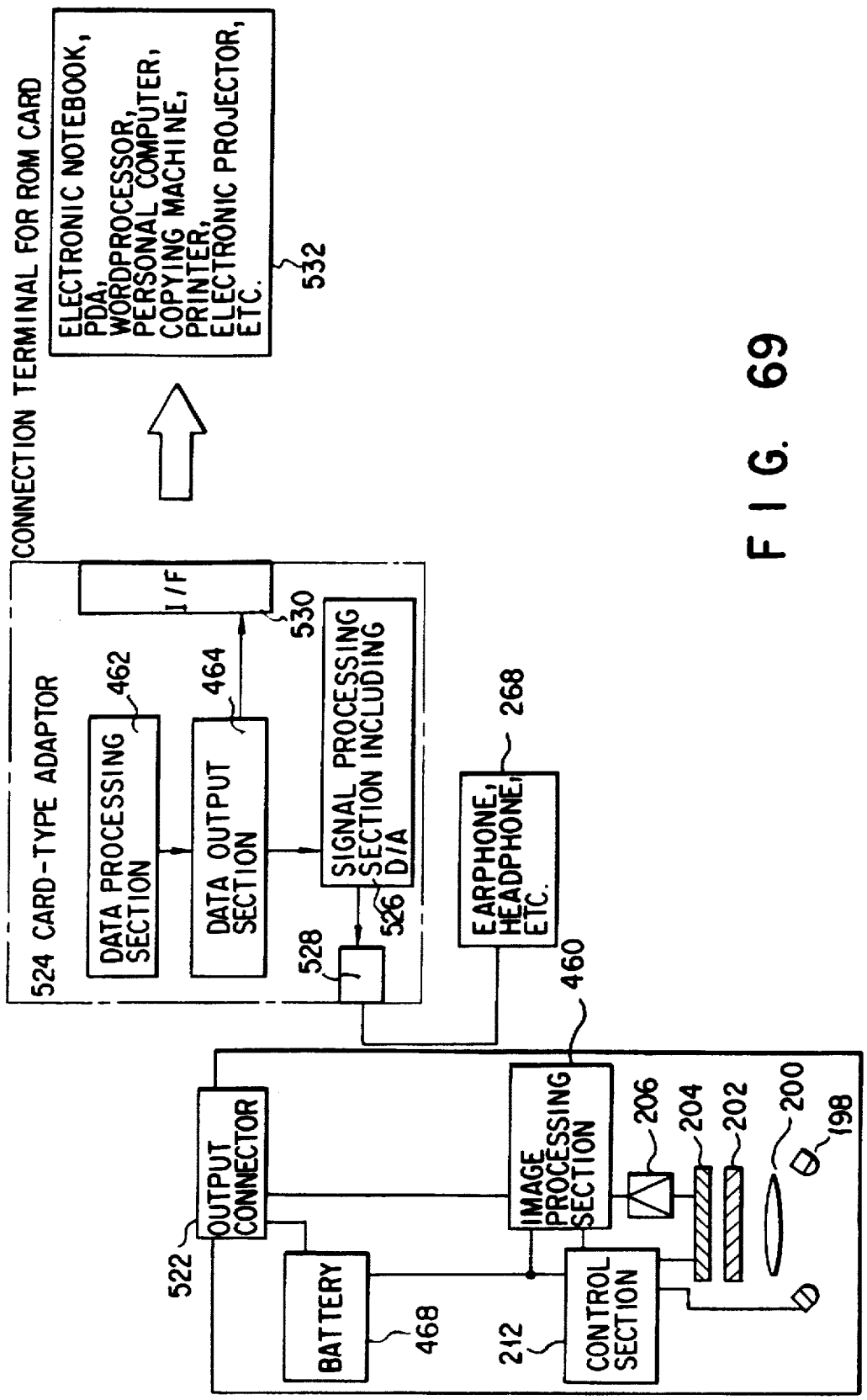
F I G. 69

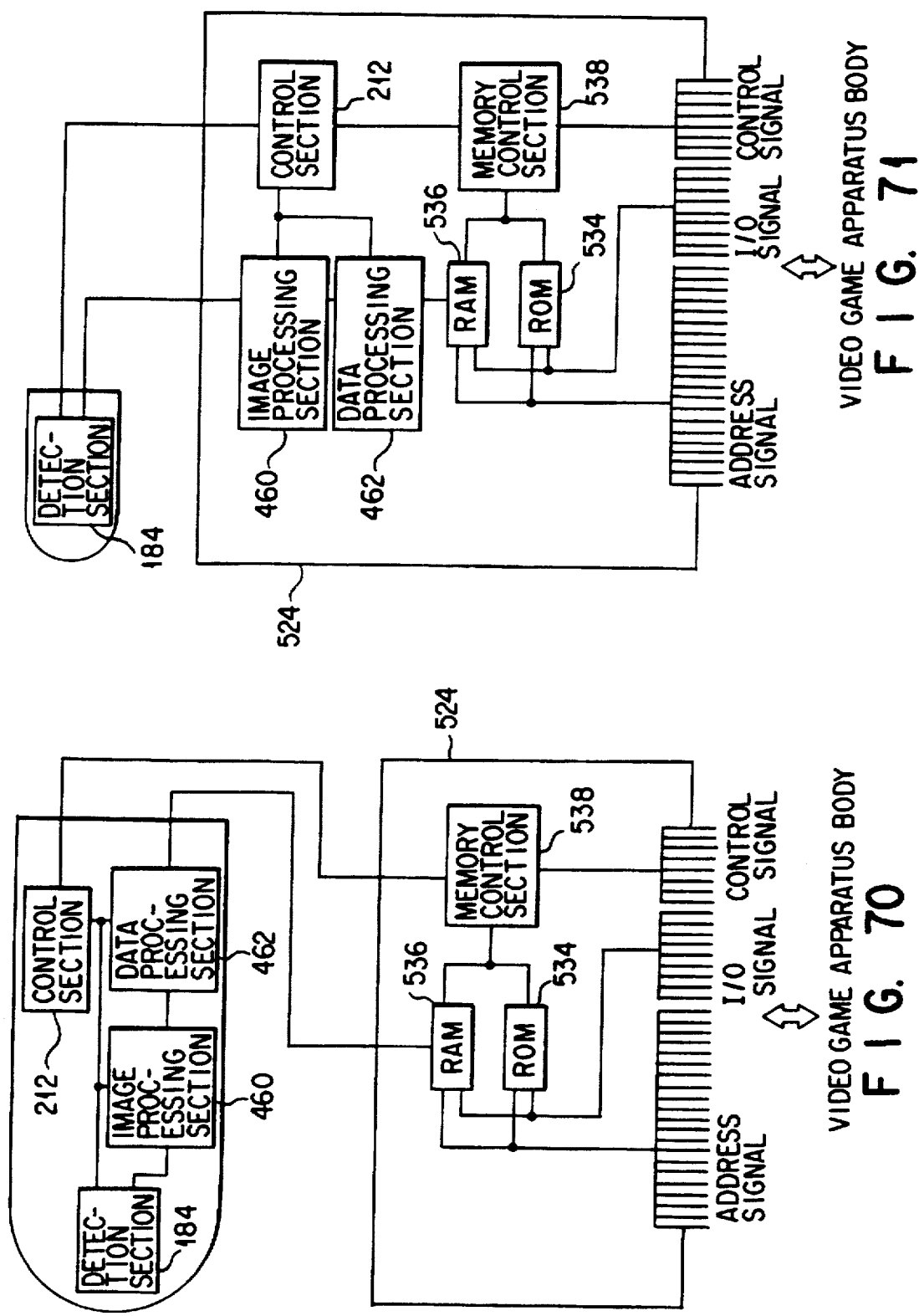

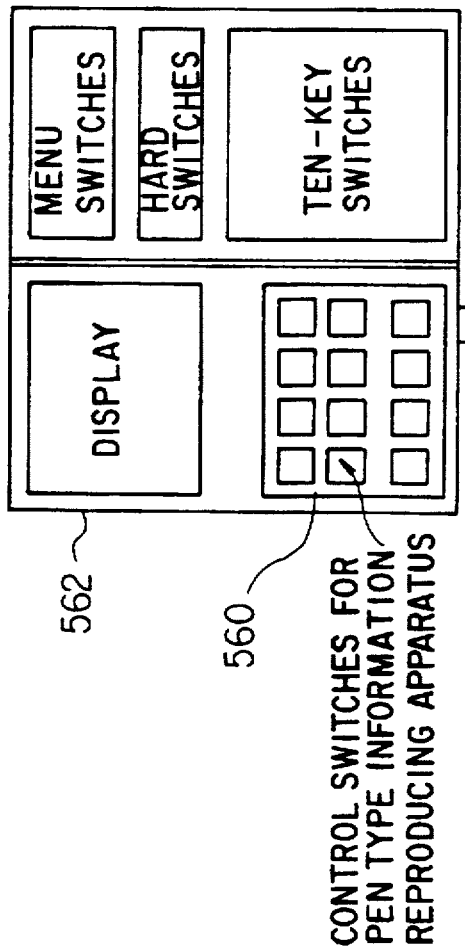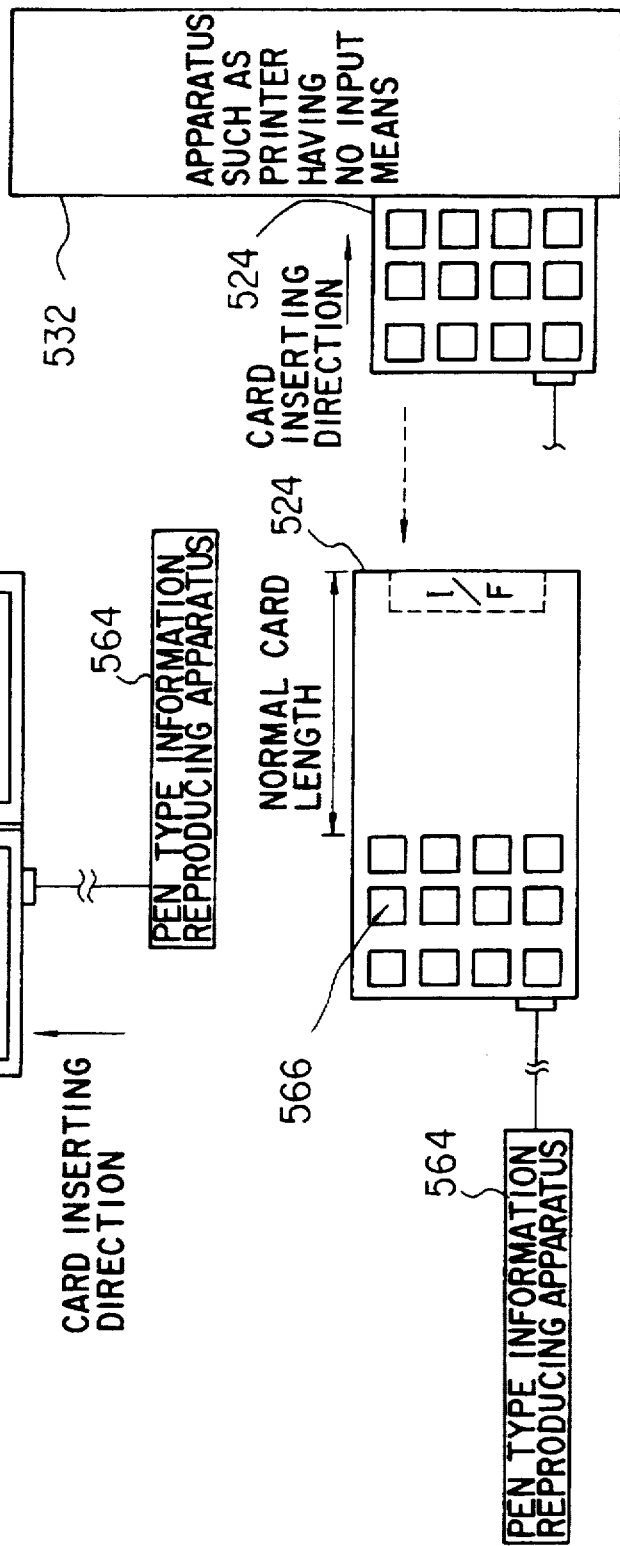

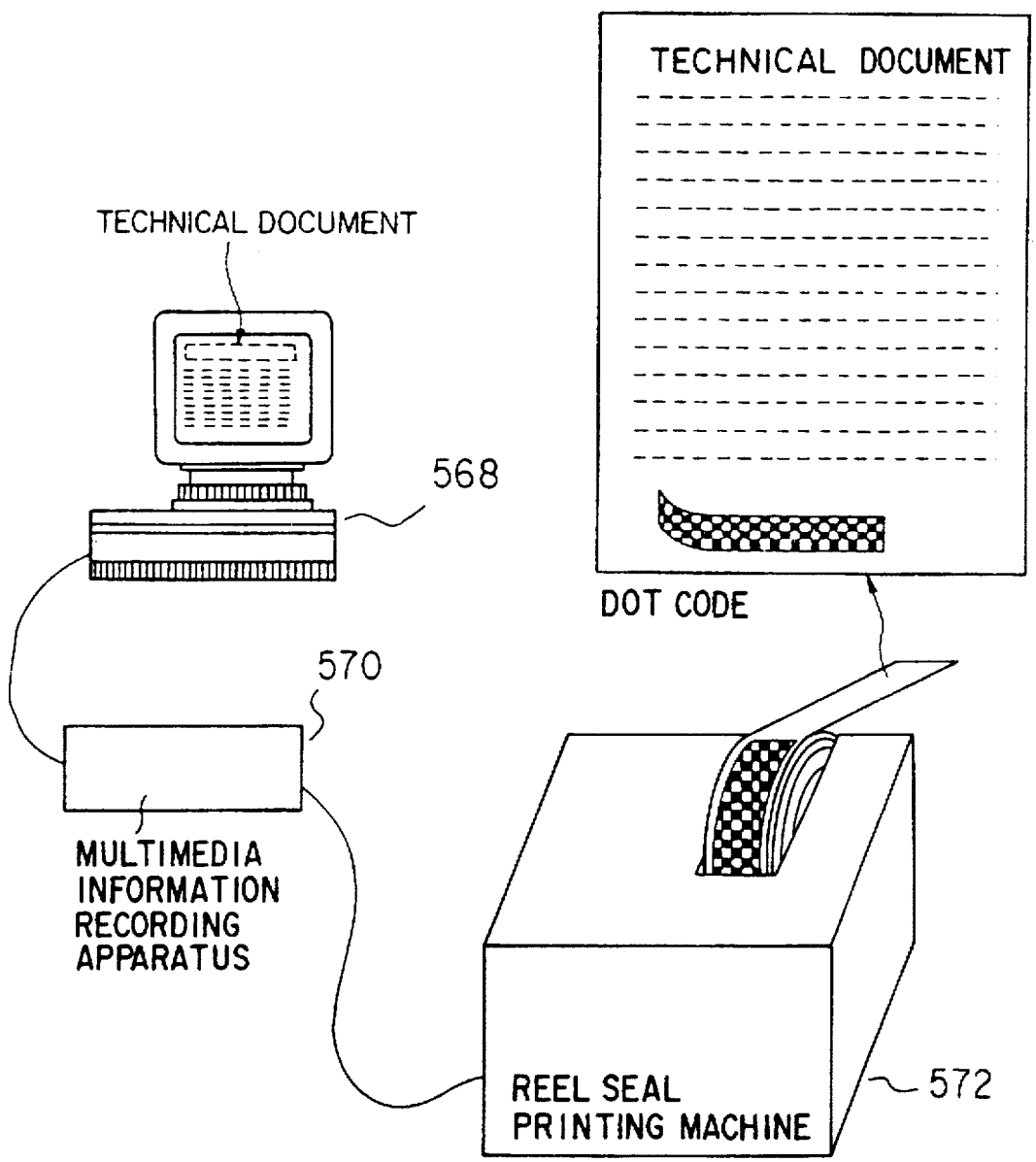
F I G. 74

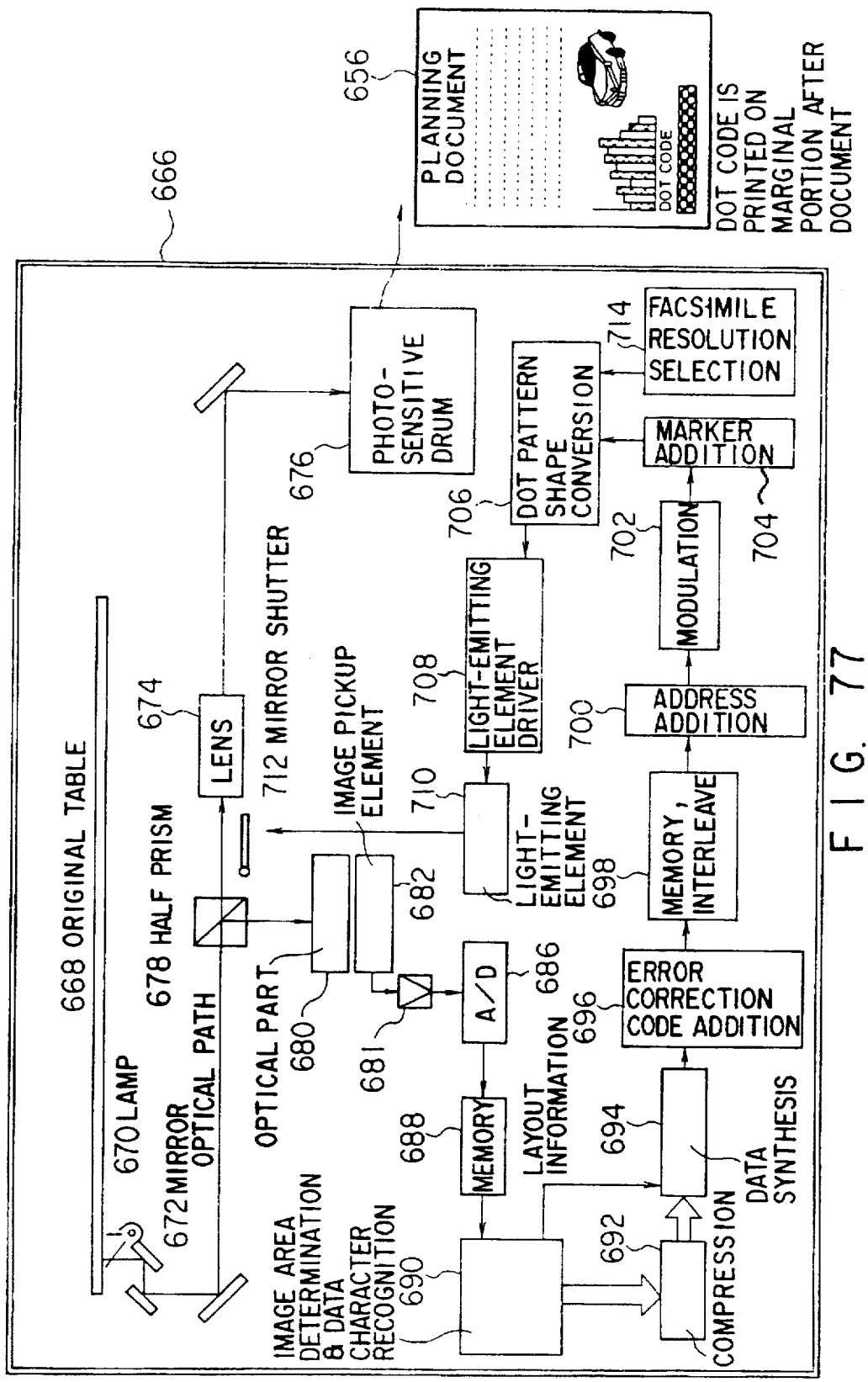
F I G. 77

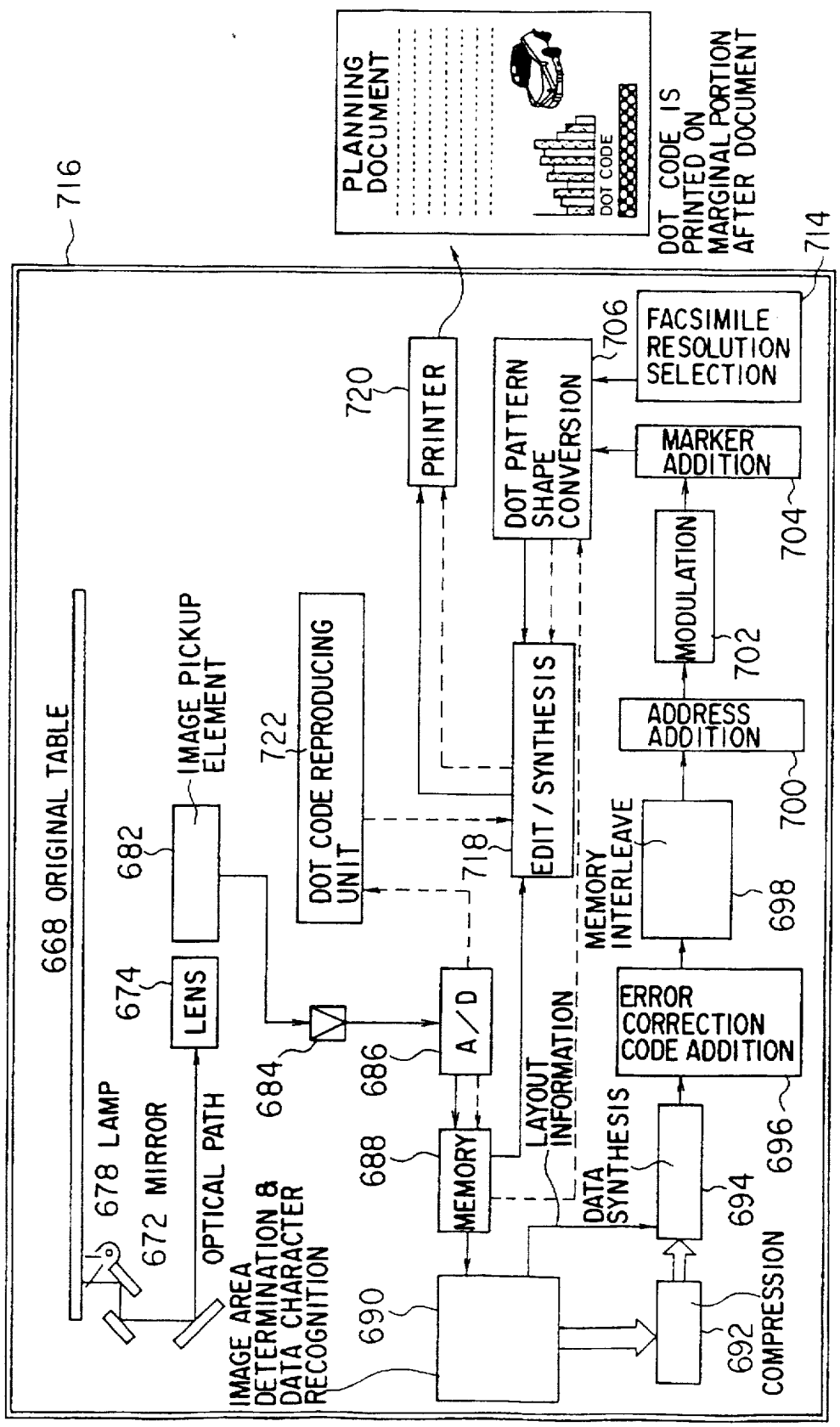
F I G. 78

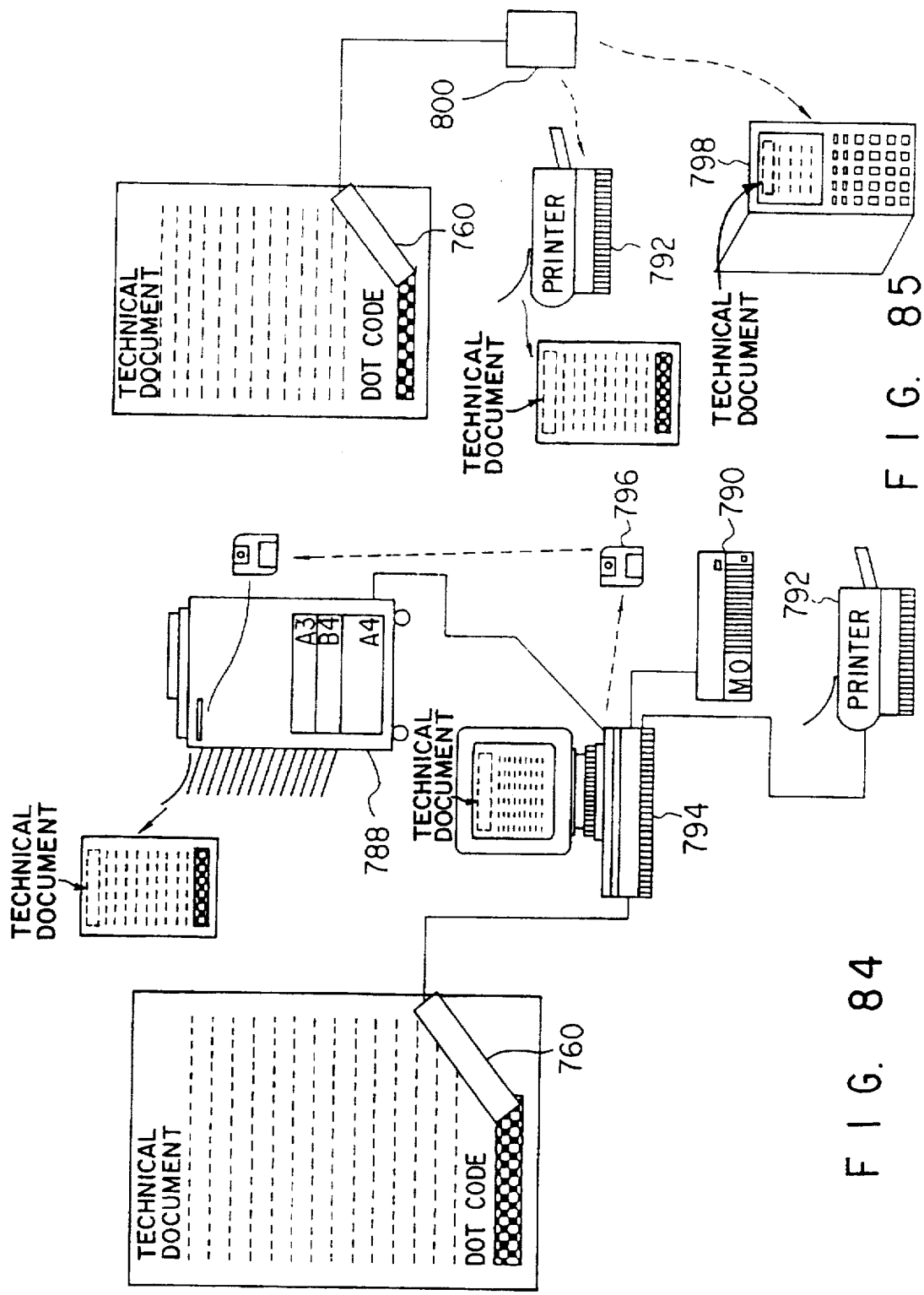

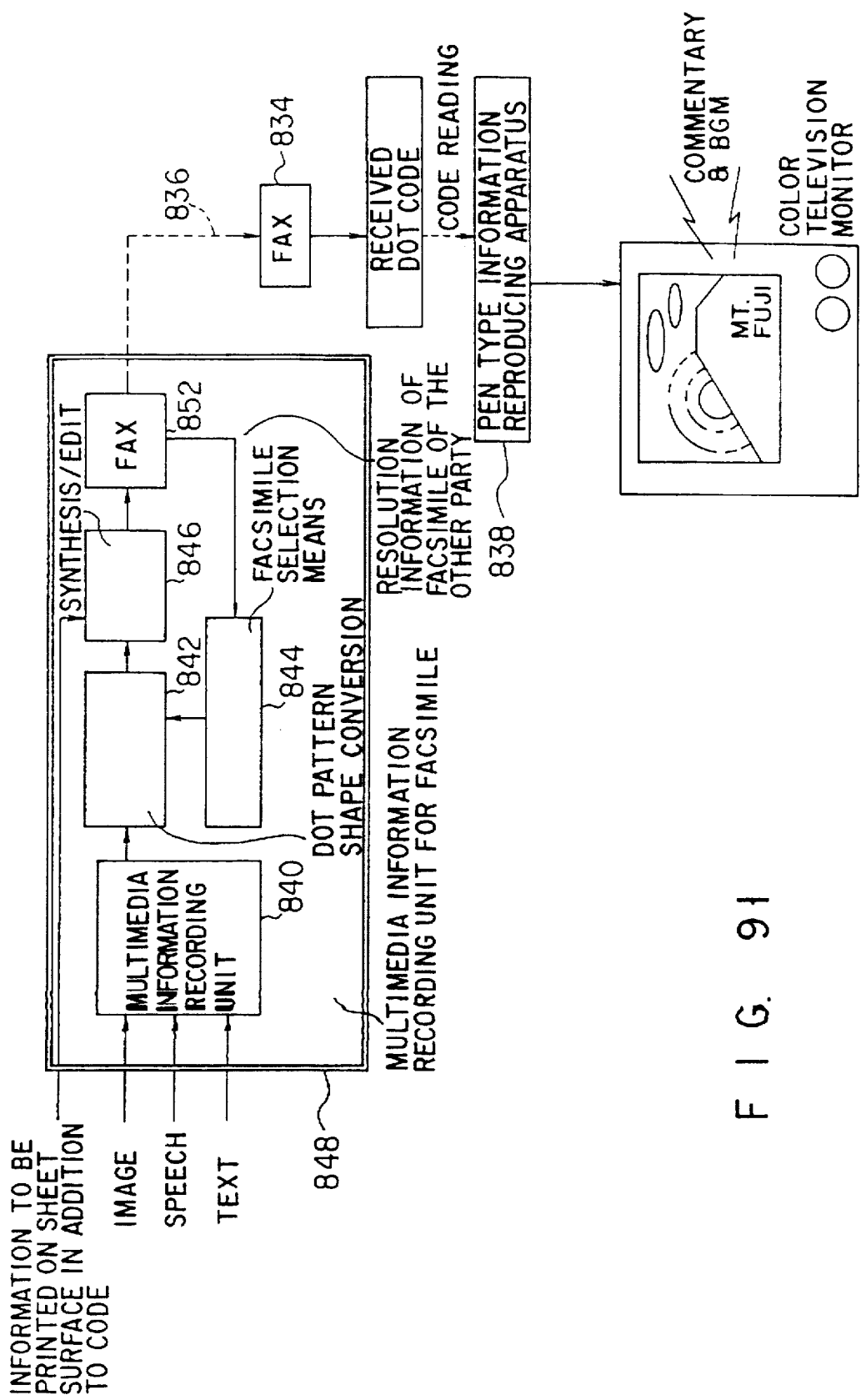
F I G. 91

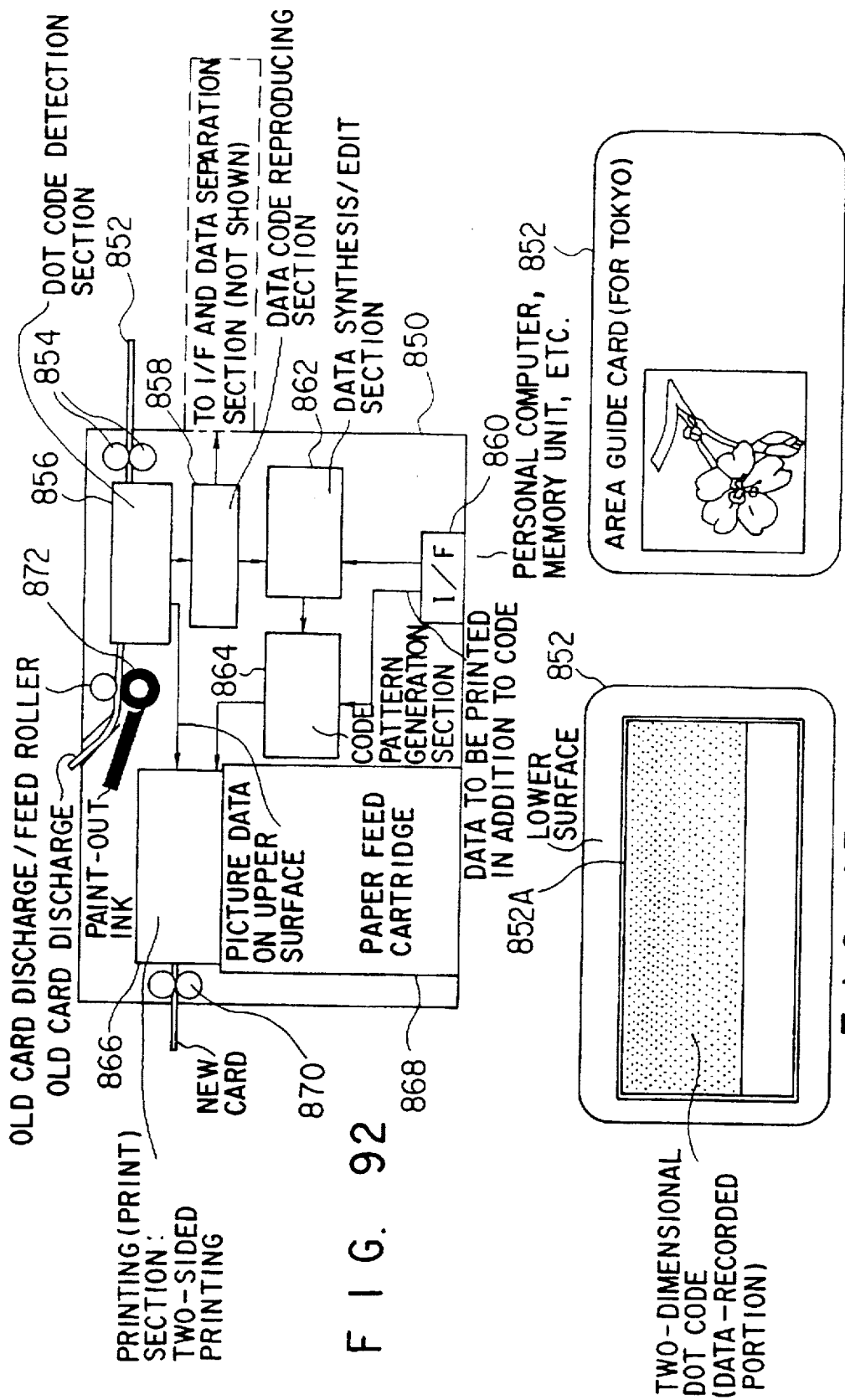

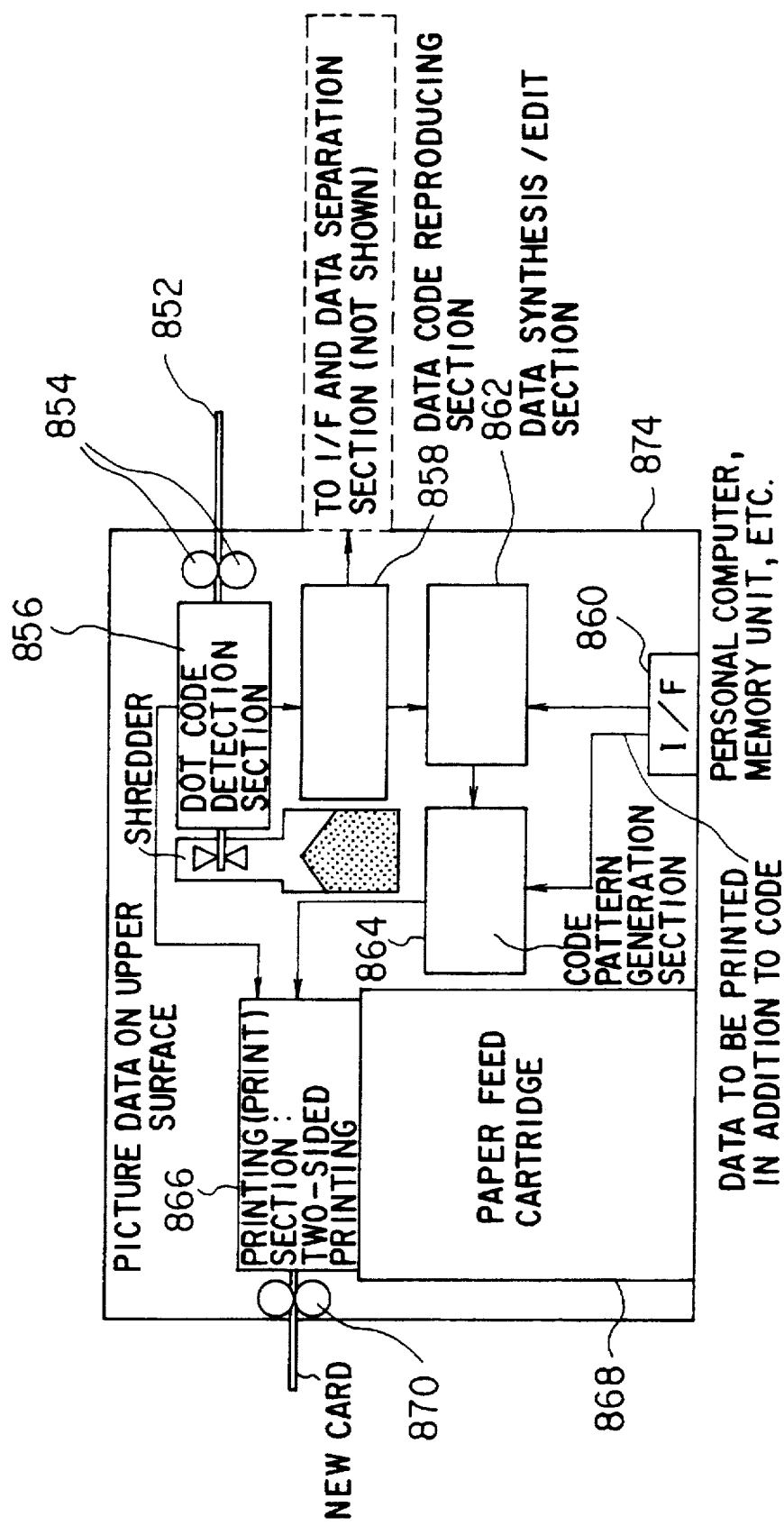
F I G. 94

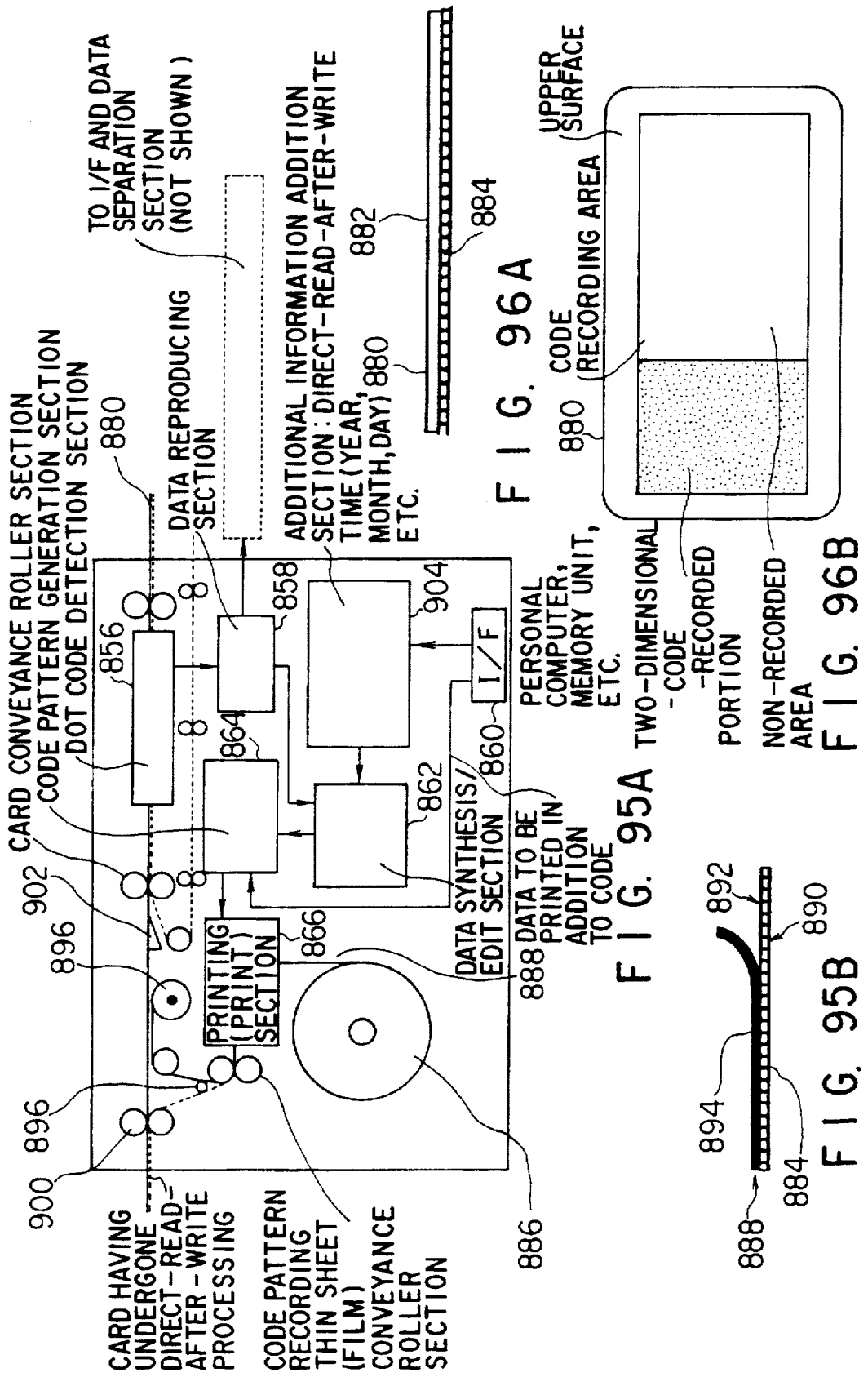

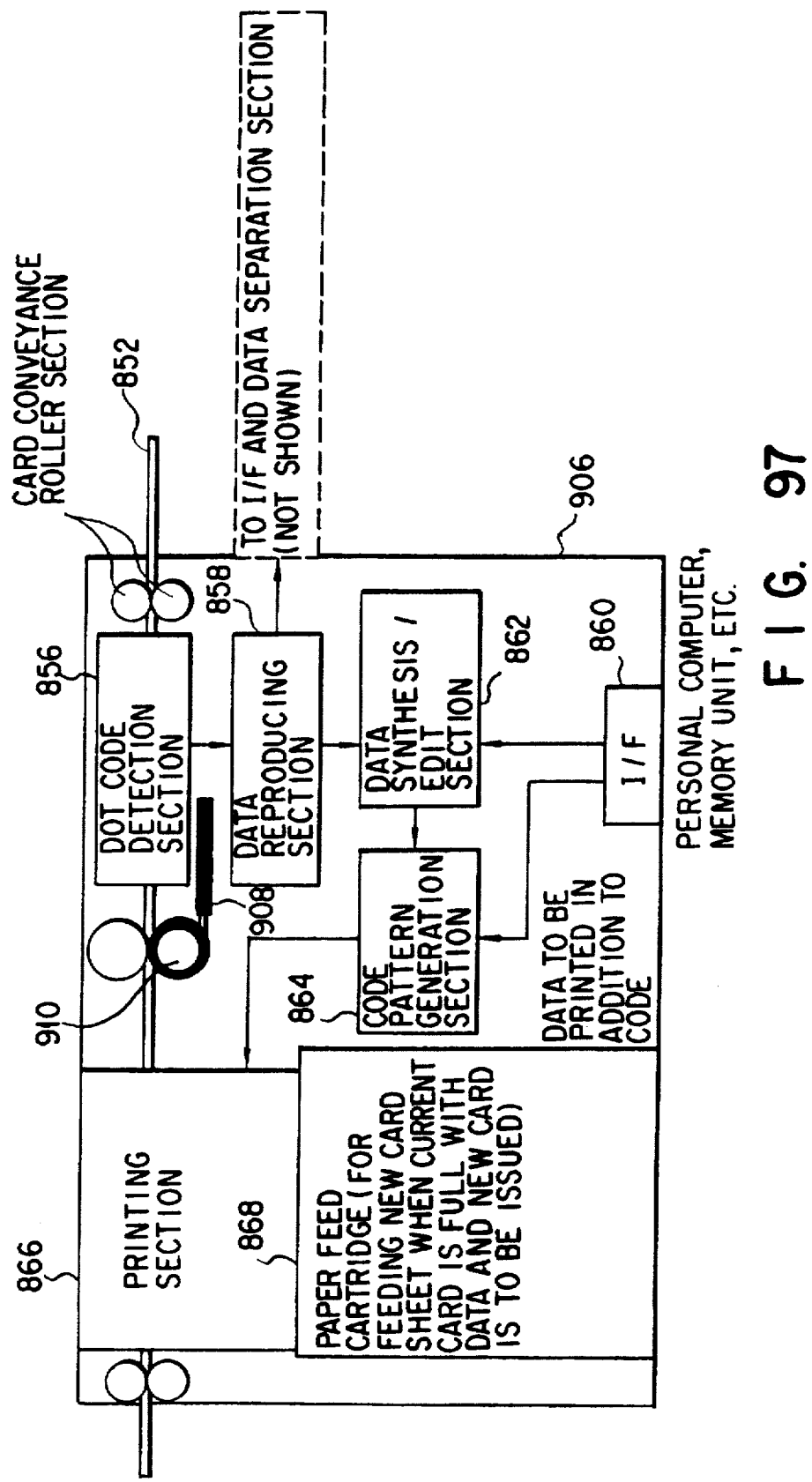

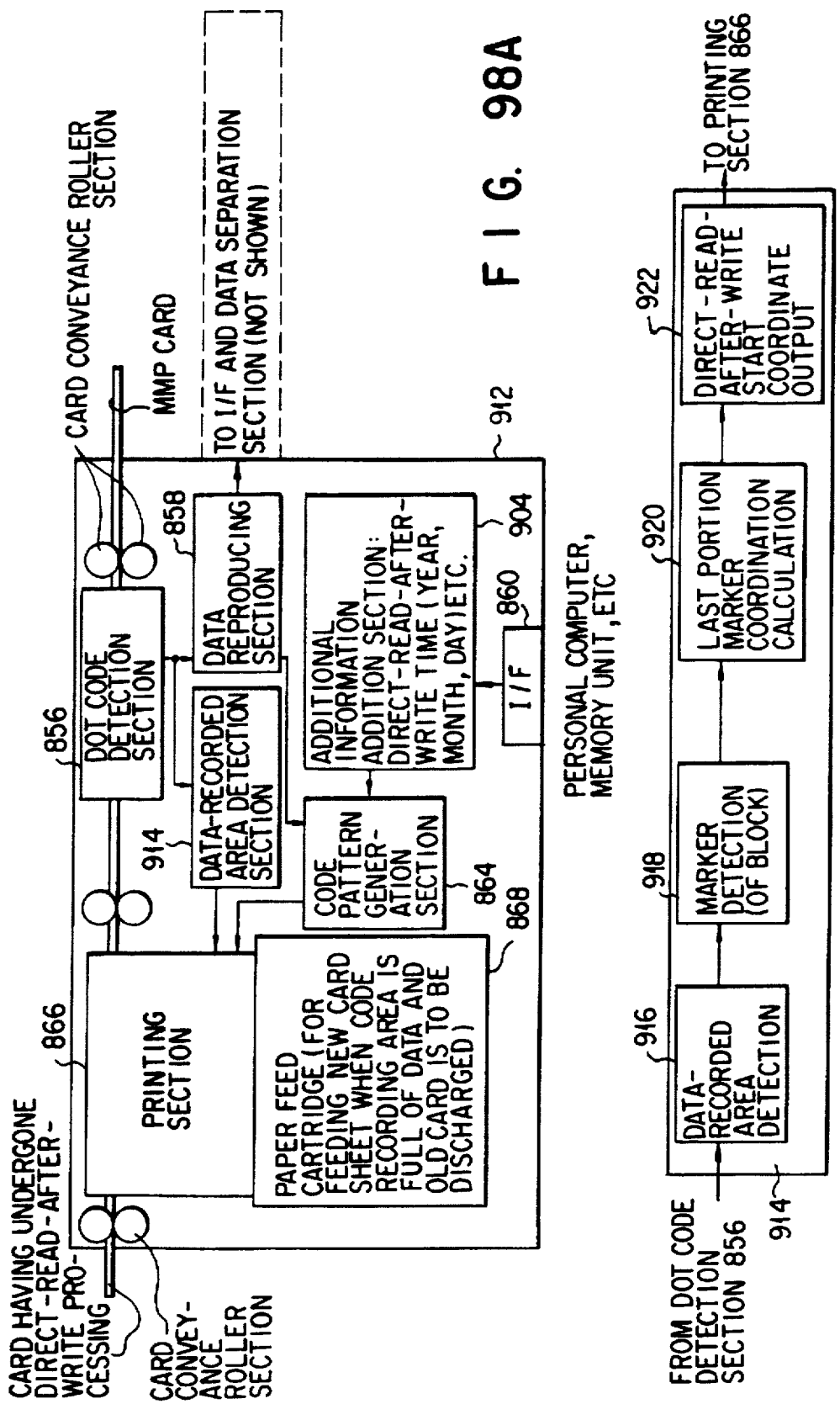

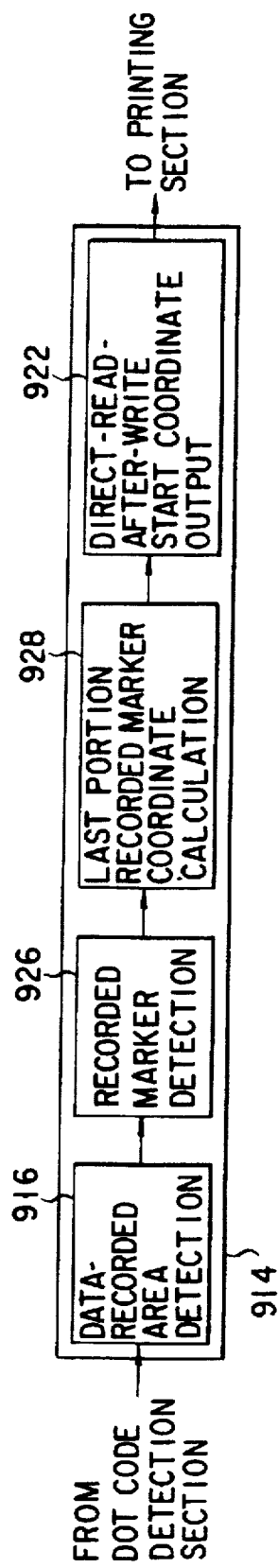
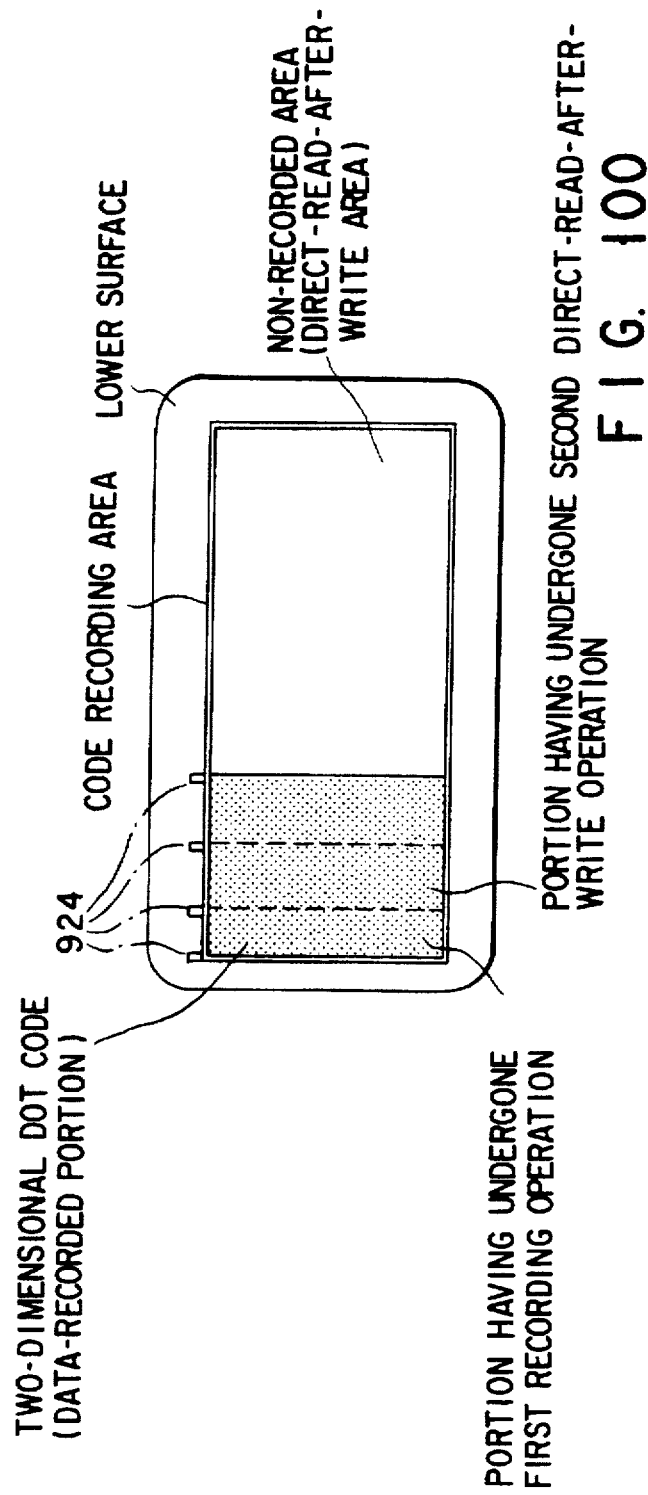

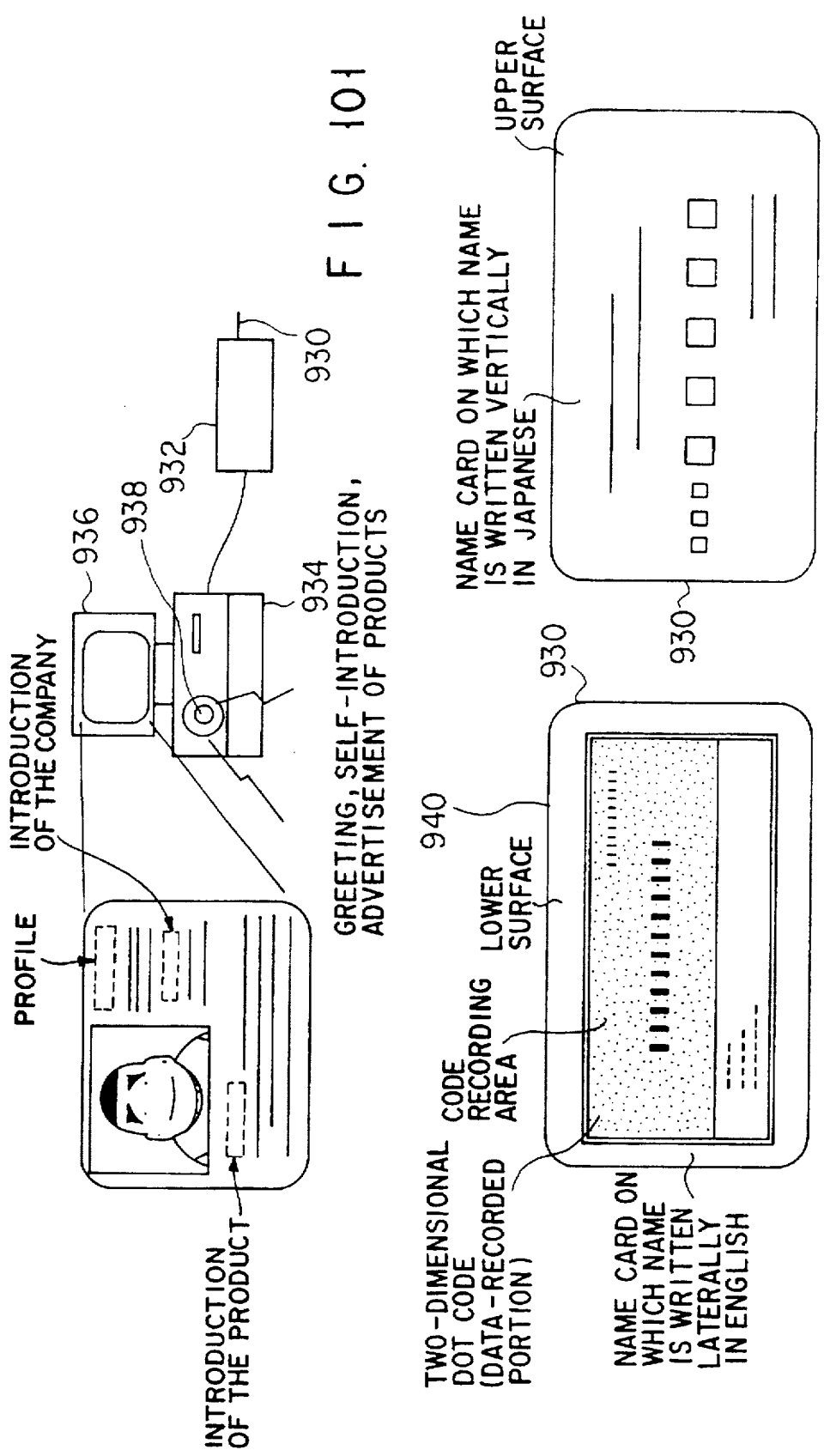

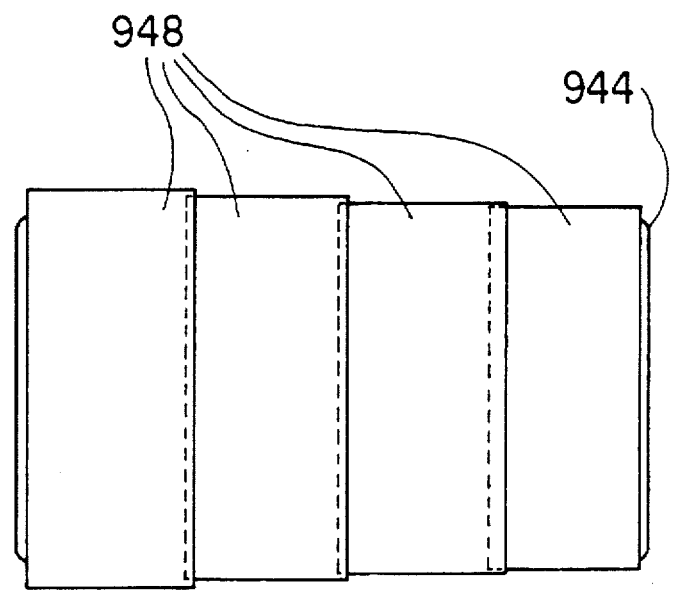
F I G. 103A
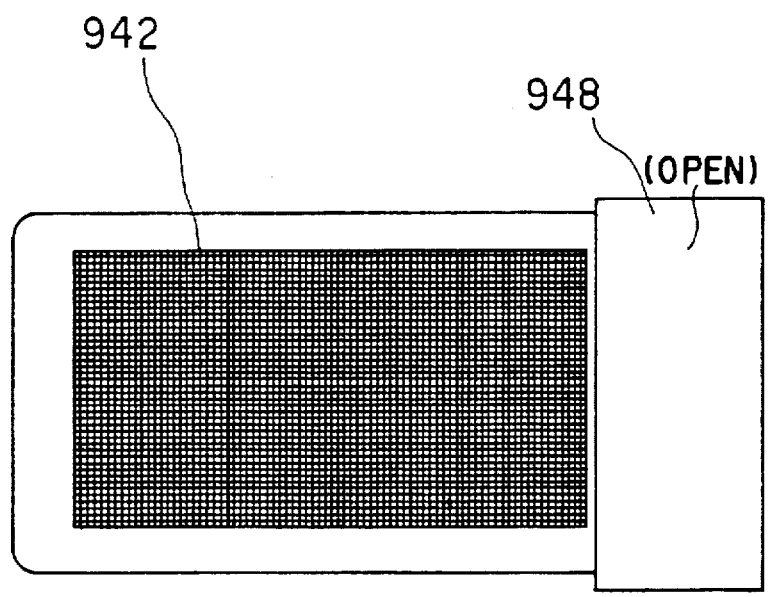
F I G. 103B

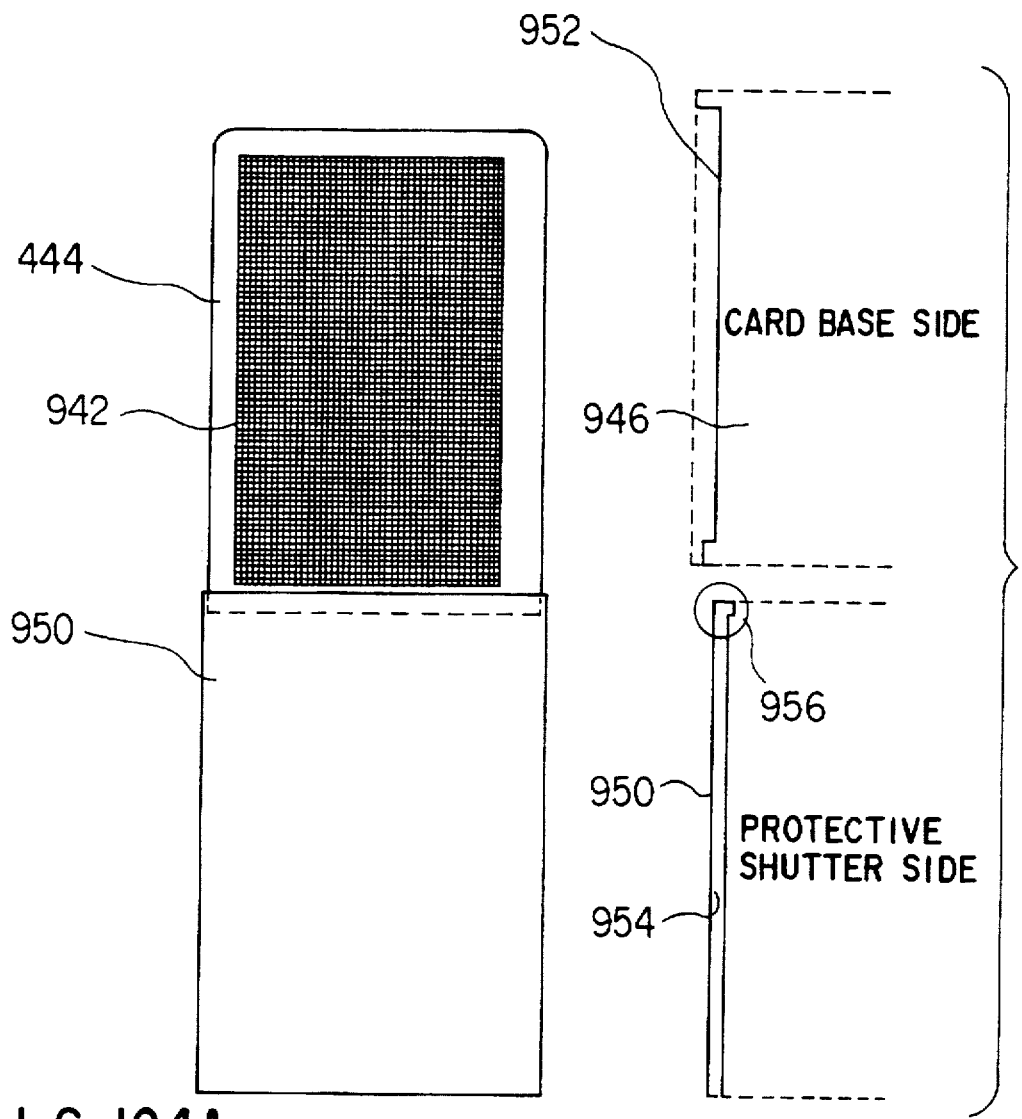
FIG. 104A
FIG. 104C
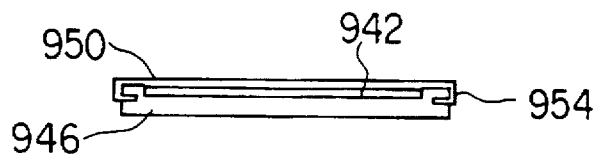
FIG. 104B

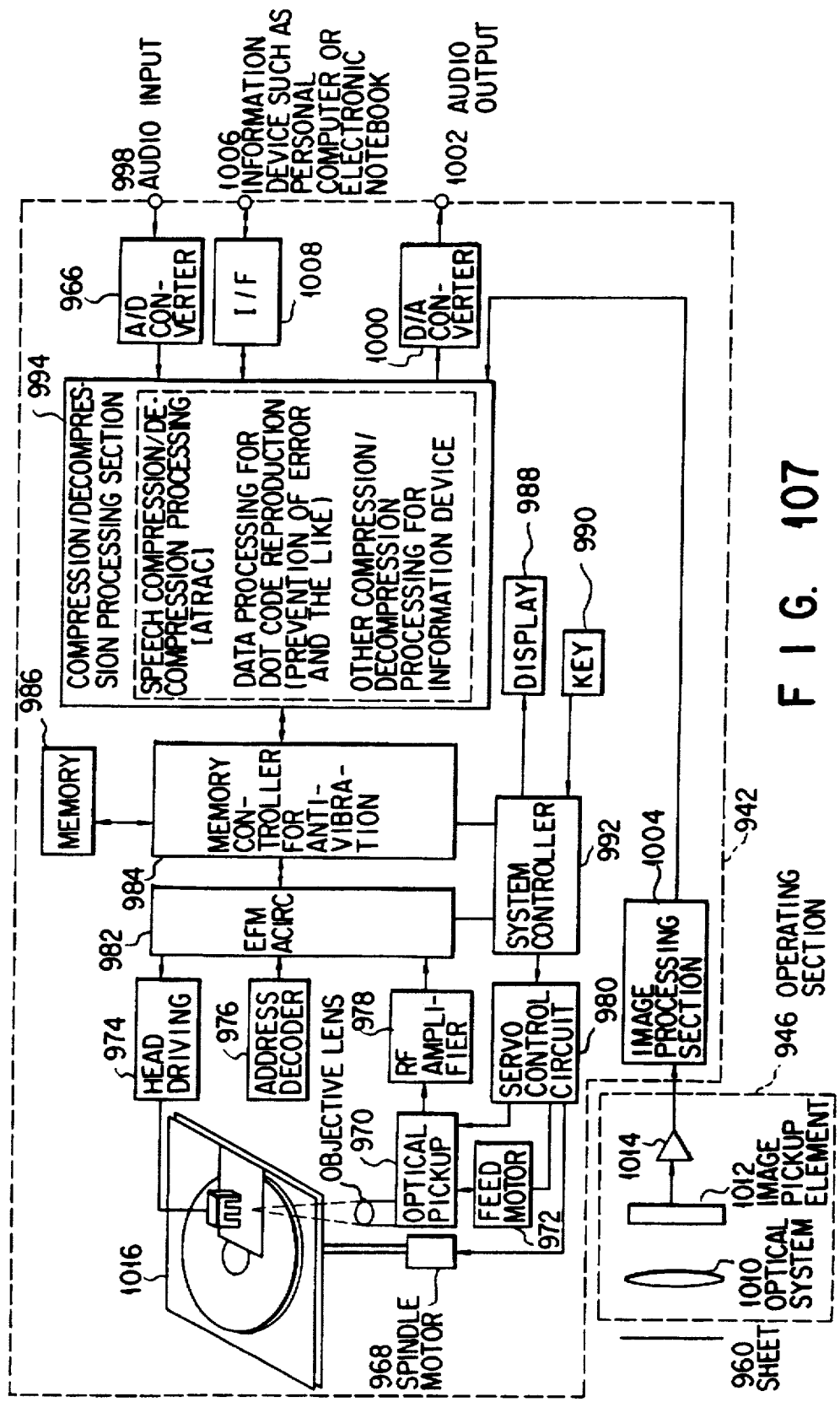
F I G. 107

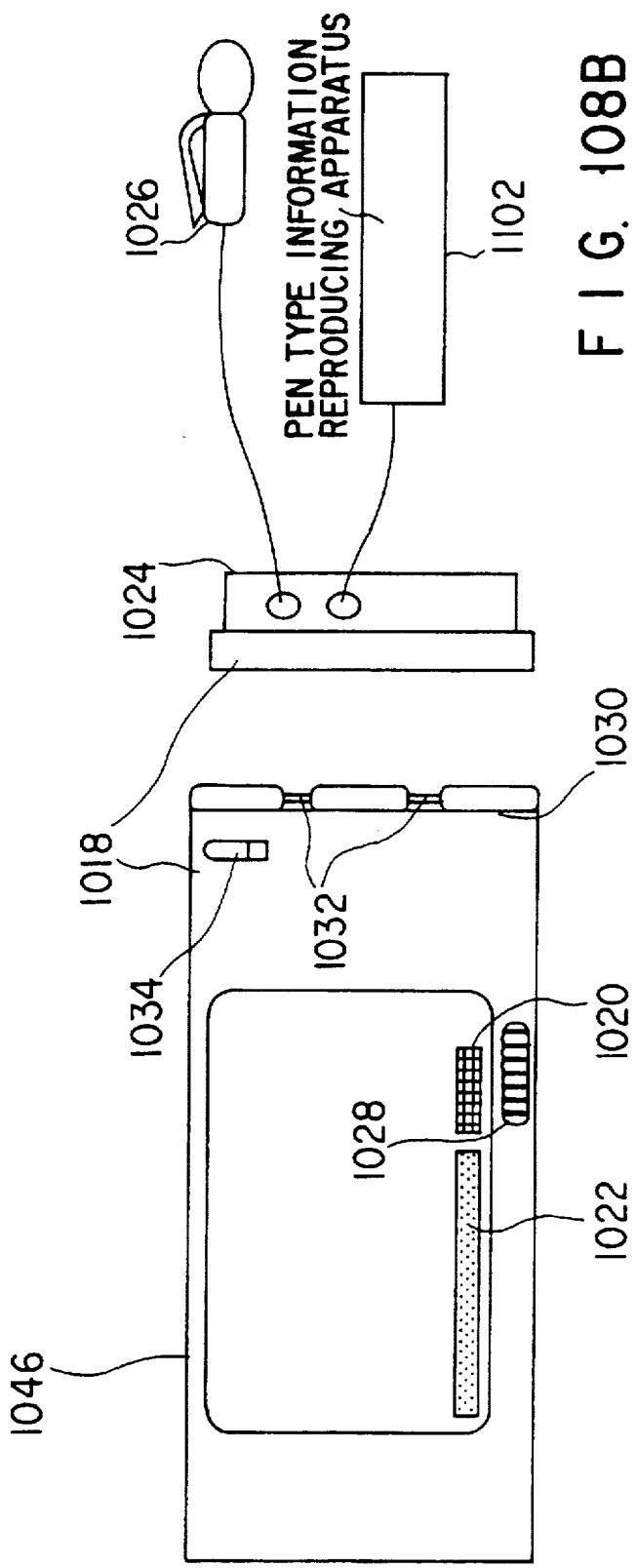
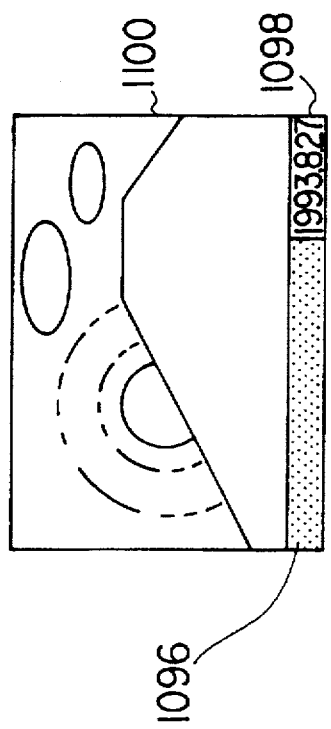

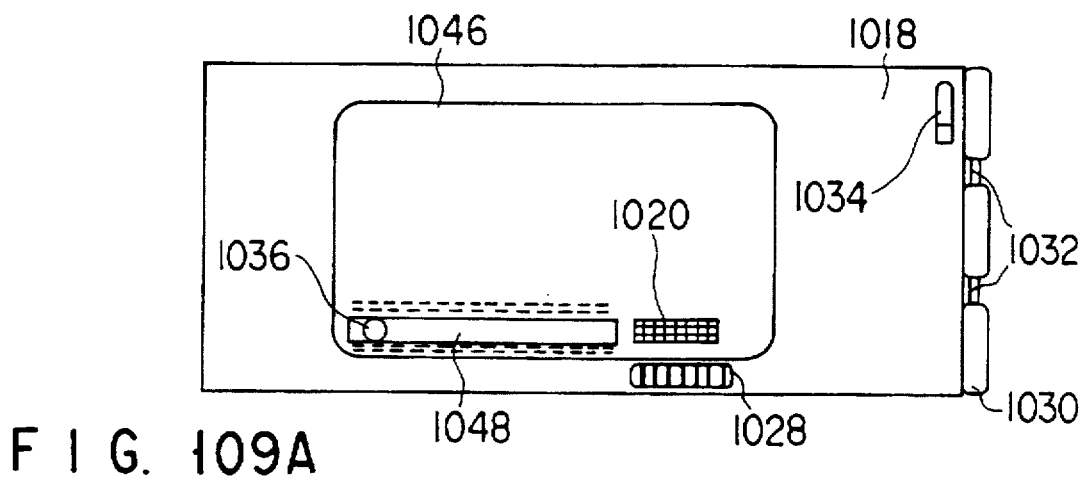
FIG. 109A
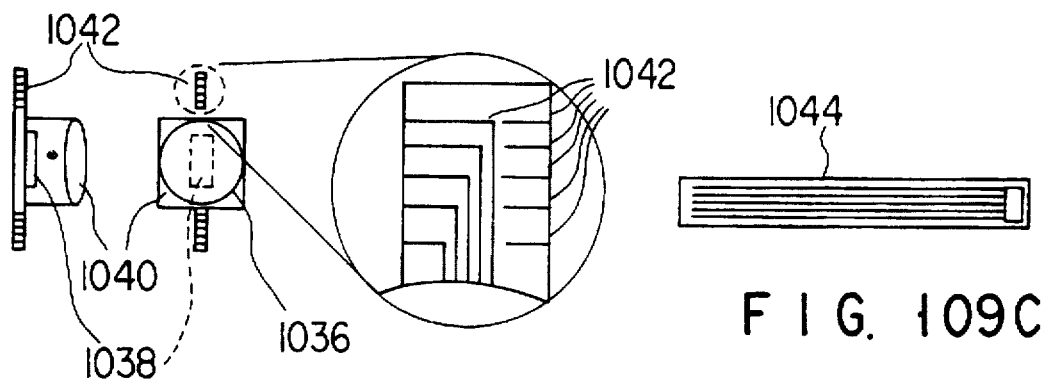
FIG. 109B
FIG. 109C
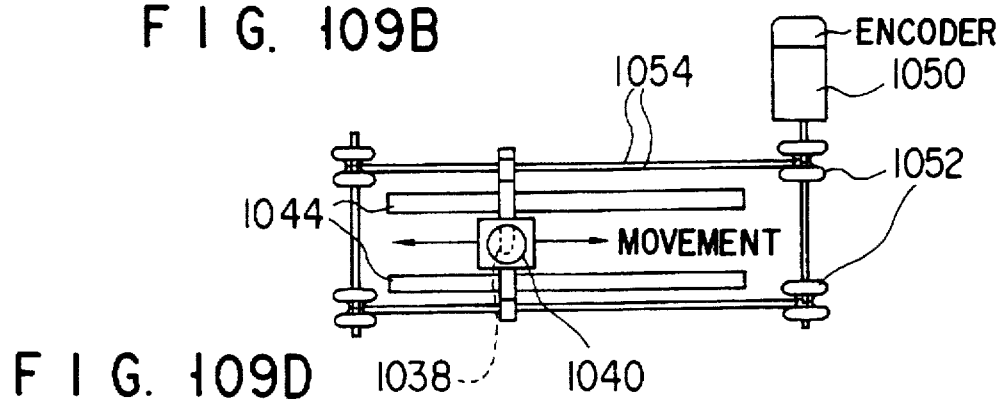
FIG. 109D
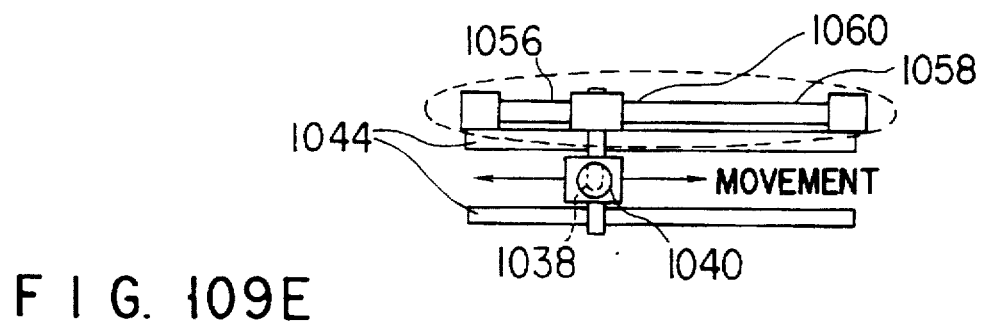
FIG. 109E

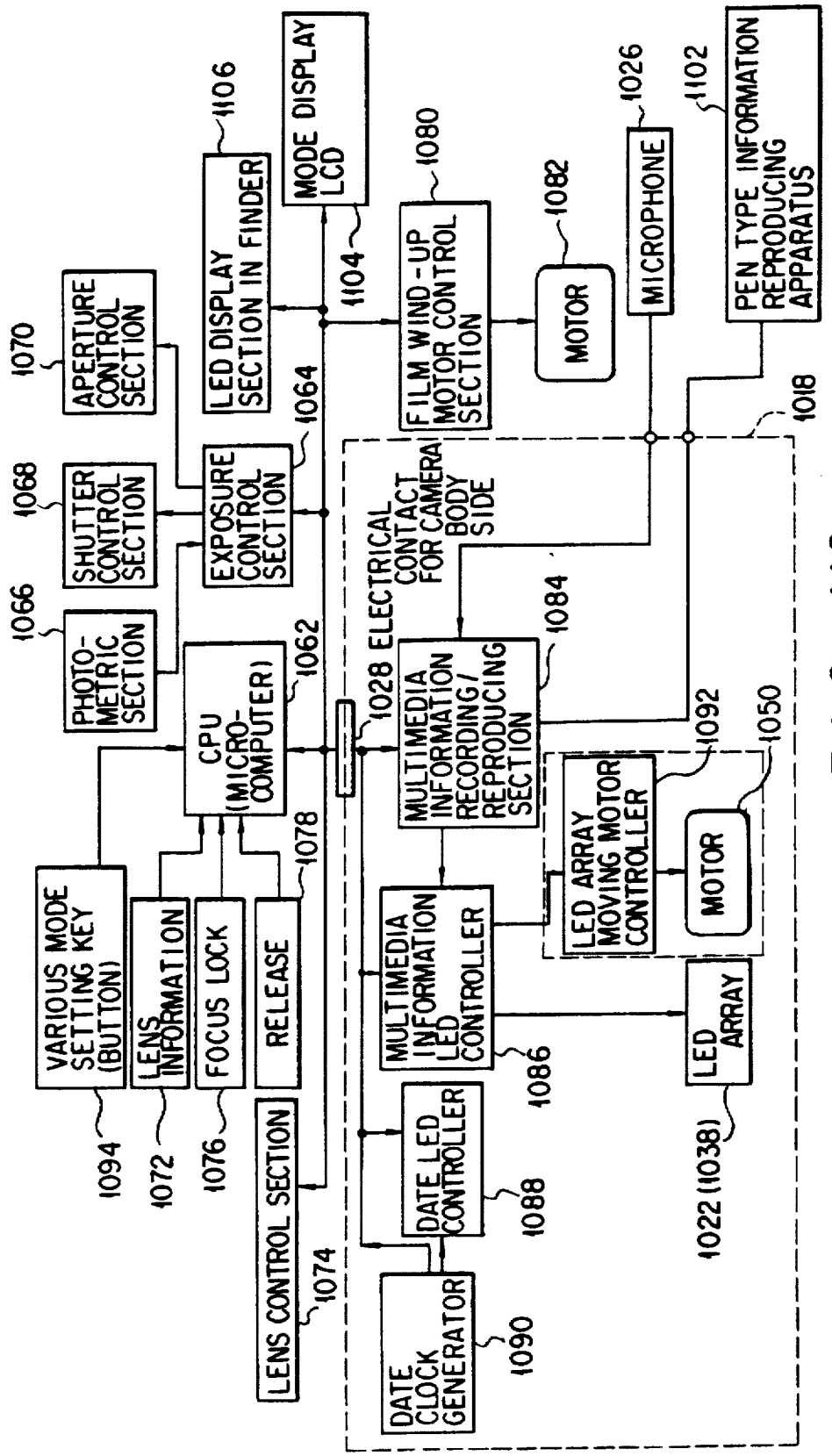
F I G. 110

DOT CODE AND INFORMATION RECORDING/REPRODUCING SYSTEM FOR RECORDING/REPRODUCING THE SAME

BACKGROUND OF THE INVENTION

The present invention relates to a dot code suitable for recording and/or reproducing so-called multimedia information including, e.g., audio information such as speech and music information, video information obtained by a camera, a video tape recorder, and the like, and digital code data obtained from a personal computer, a wordprocessor, and the like and an information recording/reproducing system for recording/reproducing the dot code and, more particularly, to recording and/or reproduction of the dot code, which can be optically read, on/from paper, various types of resin films, metal sheets, and the like.

As media for recording speech information, music information, and the like, a magnetic tape, an optical disk, and the like are known.

Even if, however, copies of these media are produced in large quantities, the unit cost of production is relatively high, and storage of such copies requires a large space.

In addition, when a medium on which speech information is recorded needs to be transferred to a person in a remote place, it takes much labor and time to mail or directly take the medium to the person.

Under the circumstances, attempts have been made to record speech information on a paper sheet in the form of image information which can be transmitted in facsimile and allows production of copies in large quantities. As disclosed in, for example, Jpn. Pat. Appln. KOKAI Publication No. 60-244145, an apparatus for converting speech information into image information by converting some speech information into an optical code, and allowing it to be transmitted in facsimile has been proposed.

In the apparatus disclosed in the above official gazette, a sensor for reading speech information recorded as information which can be optically read is arranged in a facsimile apparatus so that speech can be reproduced in accordance with an output from the sensor. Therefore, speech information transmitted in facsimile, which can be optically read, can only be heard at a place where the facsimile apparatus is installed. That is, it is not assumed that a facsimile output sheet is taken to another place to reproduce sounds.

For this reason, if the recording capacity for speech information is set to be large, facsimile transmission/reception of information other than speech information may be adversely affected. In addition, if the contents of speech information recorded are difficult to be understood, the first part of the speech may be forgotten in the process of reproducing speech information in large quantities. Furthermore, the above apparatus can only transmit speech of a duration of only a few seconds because the recording capacity is limited by the recording density and a compression method. Therefore, a magnetic tape, an optical disk, or the like is indispensable for transmitting a large amount of speech information.

Since the reproducing apparatus itself is incorporated in a facsimile apparatus, it is troublesome to perform repetitive reproduction of speech information even during a short duration. Moreover, an inexpensive, large-capacity recording/reproducing system for all the so-called multimedia information, which includes not only audio information but also, e.g., video information obtained by a camera, a video tape recorder, and the like, digital code data obtained from a personal computer, a wordprocessor, and the like, has not yet been realized.

SUMMARY OF THE INVENTION

The present invention has been made in consideration of the above point, and has as its object to provide a dot code allowing inexpensive, large-capacity recording and repetitive reproduction of multimedia information including audio information, video information, digital code data, and the like, and an information recording/reproducing system for recording/reproducing the dot code.

In order to achieve the above object, an information recording system according to the present invention is characterized by comprising input means for inputting multimedia information including at least one of audio information, video information, and digital code data, conversion means for converting multimedia information input by the input means into a dot code which can be optically read, and recording means for recording the dot code converted by the conversion means on a recording medium such that the dot code can be optically read.

A dot code according to the present invention is characterized by comprising a plurality of blocks, each of the blocks including a data dot pattern obtained by arranging a plurality of dots in accordance with contents of data, a marker having a pattern which cannot be identical to the data dot pattern and arranged to have a first predetermined positional relationship with respect to the data dot pattern, a block address pattern indicating an address of the block arranged to have a second predetermined positional relationship with respect to the marker, and an error detection code pattern arranged for the block address to have a third predetermined positional relationship with respect to the block address pattern.

An information reproducing system according to the present invention is characterized by comprising read means for optically reading a dot code from a recording medium having a portion on which multimedia information including at least one of audio information, video information, and digital code data is recorded as the dot code which can be optically read, restoring means for converting the dot code read by the read means into the original multimedia information, and output means for outputting the multimedia information restored by the restoring means.

In this case, the restoring means includes first memory means for storing the dot code read by the read means, marker detecting means for detecting a marker of each block from the dot code stored in the first memory means, data array direction detecting means for detecting a data array direction from the marker of each block which is detected by the marker detecting means, first address control means for causing the first memory means to output the stored dot code in accordance with the data array direction detected by the data array detecting means, demodulation means for demodulating the dot code output from the first memory means upon binarization, block address detecting means for detecting the block addresses from the demodulated output data from the demodulation means, second address control means for mapping the demodulated output data from the demodulation means in the second memory means in accordance with the block addresses detected by the block address detecting means, and data output means for outputting the demodulated output data mapped in the second memory means.

Alternatively, the restoring means includes first memory means for storing the dot code read by the read means, marker detecting means for detecting a marker of each block from the dot code stored in the first memory means, data array direction detecting means for detecting a data array direction from the marker of each block which is detected by the marker detecting means, block address detecting means for detecting the block addresses in accordance with the data array direction detected by the data array direction detecting means, demodulation means for demodulating the dot code output from the first memory means upon binarization, address control means for mapping the demodulated output data from the demodulation means in second memory means in accordance with the block addresses detected by the block address detecting means, and data output means for outputting the demodulated output data output from the demodulation means and mapped in the second memory means.

That is, according to the information recording system of the present invention, multimedia information including at least one of audio information, video information, and digital code data input through the input means is converted, by the conversion means, into a code which can be optically read, and the code is recorded on a recording medium by the recording means so as to be optically read.

In this case, the dot code is obtained by arranging the plurality of blocks, and each block includes the data dot pattern obtained by arranging the plurality of dots in accordance with the contents of data, the marker having the pattern which cannot be identical to the data dot pattern and arranged to have the first predetermined positional relationship with respect to the data dot pattern, the block address pattern indicating the address of the block arranged to have the second predetermined positional relationship with respect to the marker, and the error detection code pattern arranged for the block address to have the third predetermined positional relationship with respect to the block address pattern. Therefore, the array direction of the data, i.e., a rotation and an inclination, can be detected by connecting the markers of the respective blocks, and correction corresponding to the detection can be easily performed.

In addition, according to the information reproducing system of the present invention, the read means optically reads the dot code from the recording medium having the portion on which the multimedia information including at least one of audio information, video information, and digital code data is recorded as the dot code which can be optically read, the restoring means converts the read dot code into the original multimedia information, and the output means outputs the restored multimedia information.

In this case, the restoring means stores the dot code, read by the read means, in the first memory means, detects, by the marker detecting means, the marker of each block from the stored dot code, detects, by the data array direction detecting means, the data array direction from the detected marker of each block, and outputs, by the first address control means, the dot code stored in the first memory in accordance with the detected data array direction. The restoring means then demodulates, by the demodulation means, the dot code output from the first memory means upon binarization, detects, by the block address detecting means, the block addresses from the demodulated output data, and maps, by the second address control means, the demodulated output data from the demodulation means in the second memory means in accordance with the detected block addresses. Thereafter, the restoring means outputs, by the data output means, the demodulated output data mapped in the second memory means.

Alternatively, the restoring means stores the dot code, read by the read means, in the first memory means, detects, by the marker detecting means, the marker of each block from the stored dot code, and detects, by the data array direction detecting means, the data array direction from the detected marker of each block. The restoring means then detects, by the block address detecting means, the block addresses in accordance with the data array direction detected by the data array direction detecting means. Meanwhile, the restoring means demodulates, by the demodulation means, the dot code output from the first memory means upon binarization, and maps, by the address control means, the demodulated output data from the demodulation means in second memory means in accordance with the block addresses detected by the block address detecting means. Thereafter, the restoring means outputs, by the output means, the demodulated data output from the demodulation means and mapped in the second memory means.

BRIEF DESCRIPTION OF DRAWINGS

FIG. 3 is a block diagram showing the arrangement of the reproducing apparatus according to the first embodiment;

FIGS. 4A and 4B are views for explaining manual scanning operations, respectively, and FIGS. 4C and 4D are views for explaining scan conversion, respectively;

FIG. 5 is a view for explaining data interpolation accompanying scan conversion;

FIGS. 7A and 7B are views respectively showing recording media;

FIG. 9 is a view showing the arrangement of a reproducing apparatus according to the third embodiment;

FIGS. 10A and 10B are perspective views, each showing an outer appearance of a portable voice recorder;

FIG. 15 is a block diagram showing the arrangement of a multimedia information recording apparatus;

20C is a view for explaining a scanning method.

FIGS. 22A to 22C are views, each showing a marker having an array direction detection dot;

FIG. 23 is a view showing still another arrangement of the multimedia information reproducing apparatus;

FIG. 25 is a block diagram showing the arrangement of a marker detection section in the multimedia information reproducing apparatus;

FIG. 26 is a flow chart showing processing in a marker determination section in FIG. 25;

FIG. 27 is a flow chart showing processing in a marker area detection section in FIG. 25;

FIG. 28A is a view showing a marker area, FIG. 28B is a view showing the storage format of a table for storing a detected marker area, and FIGS. 28C and 28D are views, each showing a value obtained by accumulating the values of the respective pixels in FIG. 28A;

FIG. 29 is a flow chart showing processing in an approximate center detection section in FIG. 25;

FIG. 30 is a flow chart showing a center-of-gravity calculation subroutine in FIG. 29;

FIG. 32 is a view showing an actual arrangement of a data block of a dot code;

FIG. 33 is a view showing another actual arrangement of a data block of a dot code;

FIG. 34 is a view showing still another actual arrangement of a data block of a dot code;

FIG. 35 is a block diagram showing the arrangement of a data array direction detection section in the multimedia information reproducing apparatus;

FIG. 41 is a view for explaining another arrangement of a data reverse dot;

FIG. 42 is a view for explaining another method of direction detection;

FIG. 44 is a flow chart showing the operation of the block address detection/error determination/accurate center detection section;

FIG. 46 is a view for explaining the operation of a marker/address interpolation section in the multimedia information reproducing apparatus;

FIG. 47 is a block diagram showing the arrangement of an address control section in the multimedia information reproducing apparatus;

FIG. 48 is a view for explaining a marker determination formula;

FIG. 49 is a view for explaining another processing method of the marker determination section;

FIG. 50 is a view for explaining marker alignment detection;

FIG. 51 is a view showing the arrangement of a light-source-integrated image sensor;

FIG. 52 is a block diagram showing the arrangement of a one-chip IC using an X-Y addressing image pickup section;

FIG. 53 is a circuit diagram showing the arrangement of a pixel of the X-Y addressing image pickup section;

FIG. 55 is a view showing an arrangement of a pen type information reproducing apparatus having a switch for dot code load control;

FIG. 56 is a view showing another arrangement of the pen type information reproducing apparatus having a switch for dot code load control;

FIG. 61 is a view showing the arrangement of a pen type information reproducing apparatus using a light-source-integrated image sensor;

FIG. 62 is a view showing the arrangement of a pen type information reproducing apparatus adapted for color multiplexing;

FIG. 63A is a view for explaining a color multiplex code, FIG. 63B is a view showing an application of a color multiplex code, and FIG. 63C is a view showing an index code;

FIG. 66A is a view showing another arrangement of the pen type information reproducing apparatus adapted for color multiplexing, and FIG. 66B is a view showing the arrangement of a light source;

FIG. 67A is a view showing a dot data seal on which a stealth type dot code is recorded, and FIG. 67B is a view showing the arrangement of a pen type information reproducing apparatus adapted for a stealth type dot code;

FIG. 68 is a view showing a dot data seal on which a stealth type dot code is recorded in another form;

FIG. 69 is a view showing the arrangement of a card type adaptor having an audio output terminal;

FIGS. 70 and 71 are views, each showing the arrangement of a card type adaptor for a video game apparatus;

FIG. 72 is a view showing an application of a card type adaptor for an electronic notebook;

FIG. 73 is a view showing an outer appearance of a card type adaptor for an apparatus having no input means and an application of the adaptor;

FIG. 74 is a view for explaining how to use a reel seal printing machine for printing a dot code on a reel seal;

FIG. 77 is a view showing the arrangement of an optical copying machine incorporating the function of a multimedia information recording processing section in FIG. 76;

FIG. 78 is a view showing the arrangement of a digital copying machine incorporating the function of the multimedia information recording processing section in FIG. 76;

FIG. 84 is a view showing a case wherein data is output to a copying machine, a magnetooptical disk apparatus, and a printer instead of the projector;

FIG. 85 is a view showing a case wherein an output processing section is designed as a card type adaptor;

FIG. 91 is a view showing the arrangement of a multimedia information recording apparatus incorporated in a facsimile system;

FIG. 92 is a view showing an arrangement of an overwrite type MMP card recording/reproducing apparatus;

FIGS. 93A and 93B are view respectively showing the lower and upper surfaces of an MMP card;

FIG. 94 is a view showing another arrangement of the overwrite type MMP card recording/reproducing apparatus;

FIG. 95A is a view showing still another arrangement of the overwrite type MMP card recording/reproducing apparatus, and FIG. 95B is a view showing the arrangement of a code pattern recording sheet;

FIGS. 96A and 96B are views respectively showing the lower and upper surfaces of an MMP card;

FIG. 97 is a view showing still another arrangement of the overwrite type MMP card recording/reproducing apparatus;

FIG. 98A is a view showing the arrangement of a direct-read-after-write type MMP card recording/reproducing apparatus, and FIG. 98B is a block diagram showing the arrangement of a recorded area detection section in FIG. 98A;

FIG. 99 is a view showing another arrangement of the recorded area detection section;

FIG. 100 is a view showing an MMP card on which a recorded marker is written;

FIG. 101 is a view showing an MMP name card system;

FIGS. 102A and 102B are views respectively showing the upper and lower surfaces of an MMP name card;

FIGS. 103A and 103B are plan views showing an MMP card formed by a semiconductor wafer etching system, in which FIG. 103A shows a state wherein a protective cover is closed, and FIG. 103B shows a state wherein the protective cover is open;

FIGS. 104A and 104B are a plan view and a side view showing another MMP card formed by the semiconductor wafer etching system, and FIG. 104C is a view for explaining the arrangement of a pawl portion;

FIG. 107 is a block diagram showing the arrangement of the disk apparatus with the dot code decoding function;

FIGS. 108A and 108B are a view and a side view showing the arrangement of the rear cover of a camera adapted for recording a multimedia information data code;

FIG. 109A is a view showing another arrangement of the rear cover of the camera adapted for recording a multimedia information dot code, FIG. 109B is a view showing the arrangement of an LED unit, FIG. 109C is a view showing a data back-side signal electrode, and FIGS. 109D and 109E are views, each showing an LED unit moving mechanism;

FIG. 110 is a block diagram showing the arrangement of the camera adapted for recording a multimedia information dot code; and FIG. 111 is a view showing photographic printing paper on which a multimedia information dot code is recorded.

DETAILED DESCRIPTION

Embodiments of the present invention will be described below with reference to the accompanying drawings. An embodiment associated with audio information, e.g., speech and music information, of multimedia information will be described first.

Figure 1:
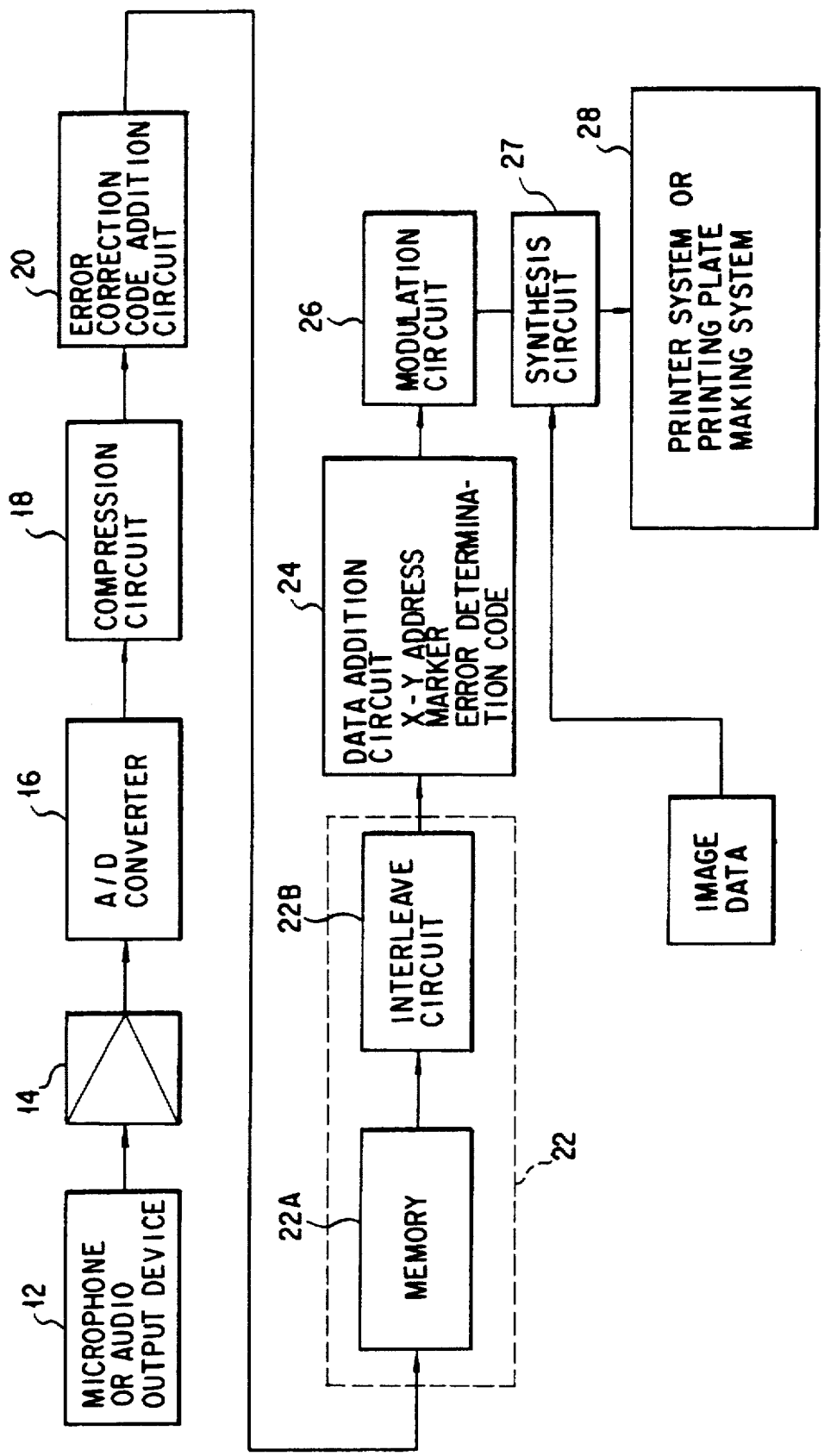
FIG. 1 is a block diagram showing the arrangement of a recording apparatus for audio information as a dot code in the first embodiment of the present invention.

FIG. 1 is a block diagram showing the arrangement of an audio information recording apparatus for recording audio information such as speech and music information as a digital signal which can be optically read according to the first embodiment of the present invention.

An audio signal input through a speech input device 12 such as a microphone or audio output device is amplified (AGC is performed if the signal is a speech signal from a microphone) by a preamplifier 14. Thereafter, the signal is converted into a digital signal by an A/D converter 16. This digital audio signal is subjected to data compression in a compression circuit 18. An error correction code is then added to the signal by an error correction code addition circuit 20.

After this operation, the resultant data is interleaved by a memory circuit 22. In this interleaving, a data array is two-dimensionally dispersed in advance in accordance with a certain rule. With this operation, when the data is restored to its original array by a reproducing apparatus, a burst-like stain and flaw on a paper sheet, i.e., an error itself is dispersed, thereby facilitating error correction and data interpolation. This interleave processing is performed by reading out data from a memory 22A through an interleave circuit 22B.

The output data from the memory circuit 22 is modulated by a modulation circuit 26 to be recorded after a marker, x and y addresses indicating the two-dimensional address of a block, and an error determination code are added to the data in units of blocks in accordance with a predetermined recording format (to be described in detail later) by a data addition circuit. Data such as image data to be recorded together with the output data of the above audio information is superposed by a synthesis circuit 27. The resultant data is then processed by a printer system or a printing plate making system 28 to be printed.

Figure 2:
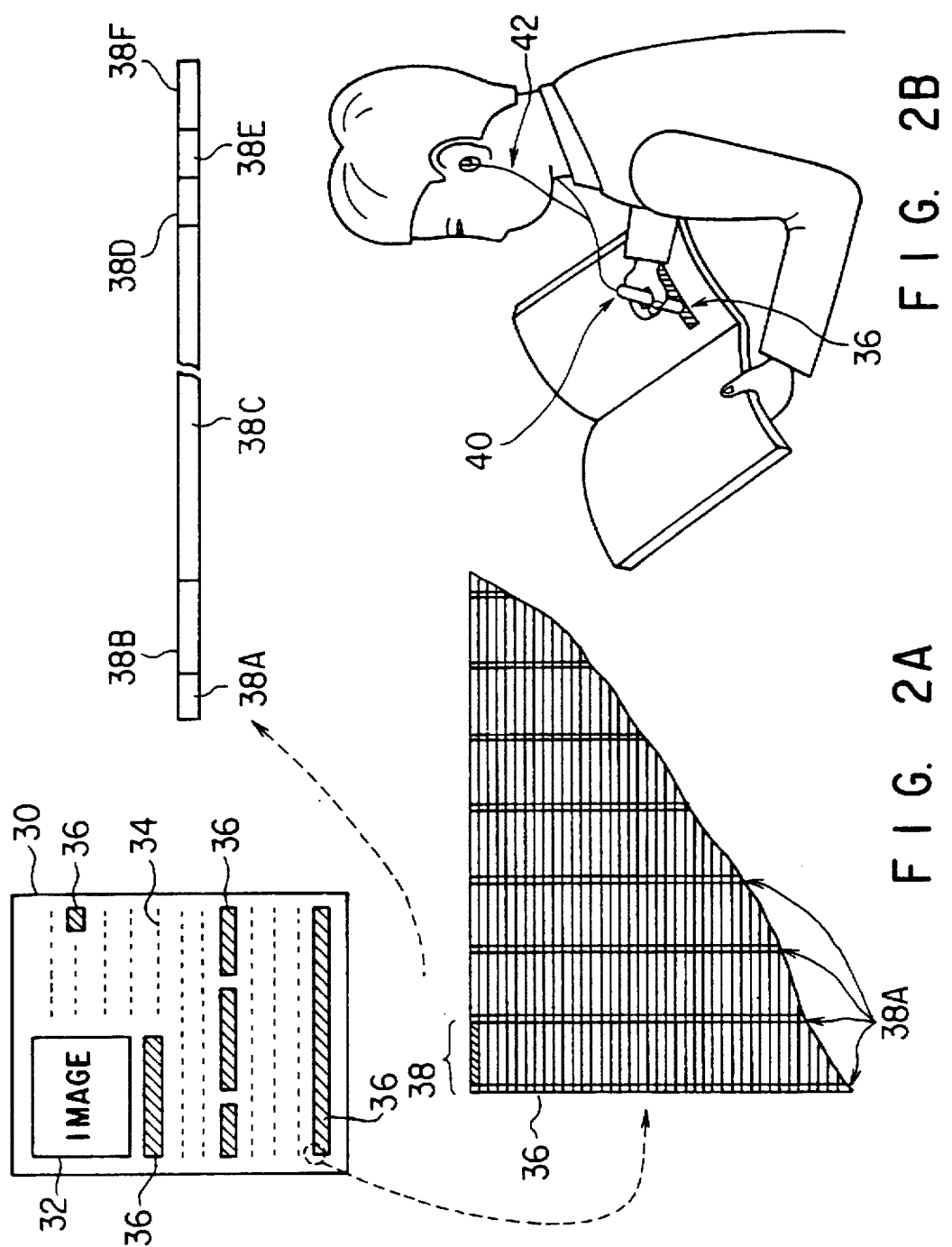
FIG. 2A is a view showing the recording format of a dot code.
FIG. 2B is a view showing an operated state of a reproducing apparatus according to the first embodiment.

With this operation, the data is recorded on a paper sheet 30 in the form shown in FIG. 2A. More specifically, the sound data as the digital signal is printed as recorded data 36 together with an image 32 and characters 34. In this case, the recorded data 36 is constituted by a plurality of blocks 38. Each block is constituted by a marker 38A, an error correction code 38B, audio data 38C, x address data 38D, y address data 38E, and an error determination code 38F.

Note that the marker 38A also serves as a sync signal. As the marker 38A, a pattern which does not generally appear in recording modulation is used as in a DAT technique. The error correction code 38B is used for error correction of the audio data 38C. The audio data 38C corresponds to an audio signal input through the speech input device 12 such as a microphone or audio output device. The x and y address data 38D and 38E are data representing the position of the block 38. The error determination code 38F is used for error determination of these x and y addresses.

The recorded data 36 having such a format is printed/recorded by the printer system or the printing plate making system 28 in such a manner that the presence and absence of a dot respectively represent data of "1" and data of "0", similar to, e.g., a bar code. Such recorded data will be referred to as a dot code hereinafter.

FIG. 2B shows a scene where sound data recorded on the paper sheet 30 shown in FIG. 2A is read by a pen type information reproducing apparatus 40. The user traces the dot code 36 with the pen type information reproducing apparatus 40 shown in FIG. 2B to detect the dot code 36. Upon conversion of the dot code into a sound, the user can hear the sound through a speech output device 42 such as an earphone.

FIG. 3 is a block diagram showing the arrangement of the information reproducing apparatus 40 according to the first embodiment of the present invention. The overall information reproducing apparatus of this embodiment is housed in a portable pen type housing (not shown) except for the speech output device 42 such as a headphone or earphone. As is apparent, a loudspeaker may be incorporated in the housing.

A detection section 44 basically has the same function as that of an image pickup section such as a television camera. More specifically, the dot code 36 on the surface of the paper sheet as a subject to be photographed is irradiated by a light source 44A, and reflected light is detected, as an image, by an image pickup section 44D constituted by a semiconductor area sensor and the like through an image formation system 44B such as a lens and a spatial filter 44C. The detected image is then amplified by a preamplifier 44E to be output.

In this case, the pixel pitch of the area sensor is set to be smaller than the dot pitch of the dot code 36 on the imaging plane owing to the sampling theorem. In addition, the spatial filter 44C set on the imaging plane is inserted on the basis of this theorem to prevent a moiré effect (aliasing) on the imaging plane. In consideration of a shake of the detection section 44 when it is manually scanned as shown in FIG. 4A, the number of pixels of the area sensor is set to be larger than a value corresponding to the vertical width of a predetermined dot code 36 prescribed as the amount of data which can be read by one read operation. That is, each of FIGS. 4A and 4B shows how the image pickup area moves at a given period when the detection section 44 is manually scanned in the direction indicated by the arrow. More specifically, FIG. 4A shows a state of manual scanning wherein the vertical width of the dot code 36 is set within the image pickup area (a shake of the image pickup area is taken into consideration). FIG. 4B shows a case wherein the vertical width of the dot code 36 cannot be set within the image pickup area in one scanning operation because the amount of the dot code 36 is large. In the latter case, a manual scanning marker 36A is printed at each manual scanning start position of the dot code 36 to indicate the start position. The dot code 36 in the large amount can be detected by performing manual scanning a plurality of number of times along the manual scanning markers 36A.

An image signal detected by the detection section 44 in the above manner is input to a scan conversion/lens distortion correction section 46. In the scan conversion/lens distortion correction section 46, first of all, the input image signal is converted into a digital signal by an A/D converter 46A and stored in a frame memory 46B. This frame memory 46B has 8-bit gradation.

A marker detection circuit 46C detects the markers 38A by scanning image information stored in the frame memory 46B in the manner shown in FIG. 4C. A θ detection circuit 46D detects a specific address value on the image pickup plane to which each marker 38A detected by the marker detection circuit 46C corresponds, and calculates an inclination θ of the image pickup plane with respect to the dot code array direction from each address value. Note that in scanning in only the direction shown in FIG. 4C, if imaging of the dot code 36 is performed while the dot code 36 is rotated through almost 90° from the state shown in FIG. 4C, the marker detection circuit 46C may not properly obtain the inclination θ. For this reason, since the inclination θ cannot be properly obtained by scanning in the widthwise direction, scanning is also performed in a direction perpendicular to the above direction, as shown in FIG. 4D. Of the results obtained by scanning in these two directions perpendicular to each other, a correct one is selected.

Aberration information about a lens used for the image formation system 44B of the detection section 44, which information is obtained in advance by measurement and used for lens distortion correction, is stored in a lens aberration information memory 46E. In reading out data from the frame memory 46B, an address control circuit 46F supplies the frame memory with a read address based on the inclination θ calculated by the θ detection circuit 46D and the lens aberration information stored in the lens aberration information memory 46E, and performs scan conversion in the data array direction while performing data interpolation in an interpolation circuit 46G.

FIG. 5 shows the principle of data interpolation performed by the interpolation circuit 46G. Basically, interpolated data is created by a convolution filter and an LPF using pixels around a position Q where data interpolation is performed. The pixel pitch and the scanning line pitch after this scan conversion are set to be smaller than the dot pitch of a dot code on the basis of the sampling theorem as in an imaging operation.

In simple data interpolation using four pixels around the interpolation position Q, interpolated data is created according to Q=(D6×F6)+(D7×F7)+(D10×F10)+(D11×F11). In data interpolation with a relatively high precision, which uses 16 pixels around the position Q, interpolated data is created according to Q=(D1×F1)+(D2×F2)+ . . . +(D16×F16). In these equations, Dn is the data amplitude value of a pixel n, and Fn is the coefficient of an interpolation convolution filter (LPF) which is determined in accordance with the distance to the pixel n.

The dot code 36 read out from the frame memory 46B, which has undergone scan conversion in the above manner, is binarized by a binarization circuit 48 constituted by a latch 48A and a comparator 48B. A threshold value for this binarization is determined by a threshold determination circuit 50 using a histogram value or the like for each frame or each block in a frame. That is, a threshold value is determined in accordance with a stain on the dot code 36, distortion of the paper sheet 30, the precision of a built-in clock, and the like. As this threshold determination circuit 50, a circuit using a neural network disclosed in, e.g., Japanese Patent Application No. 4-131051 filed by the present applicant is preferably used.

Meanwhile, the dot code 36 read out from the frame memory 46B is input to a PLL circuit 52 to generate a clock pulse CK synchronized with reproduction data. This clock pulse CK is used as a reference clock for binarization or demodulation after scan conversion, and an error detection circuit 56A, an x, y address detection circuit 56B, and a memory section 56C in a data string adjusting section 56 (to be described later).

The binarized data is demodulated by a demodulation circuit 54 and input to the error detection circuit 56A and the x, y address detection circuit 56B in the data string adjusting section 56. The error detection circuit 56A determines the presence/absence of errors in the x and v address data 38D and 38E by using the error determination code 38F in the block 38. If no errors are present, the data is recorded on the memory section 56C for audio data string adjustment in accordance with the address detected by the x, y address detection circuit 56A. If any error is present, the audio data 38C of the block 38 is not recorded in the memory section 56C for audio data string adjustment.

Figure 6:
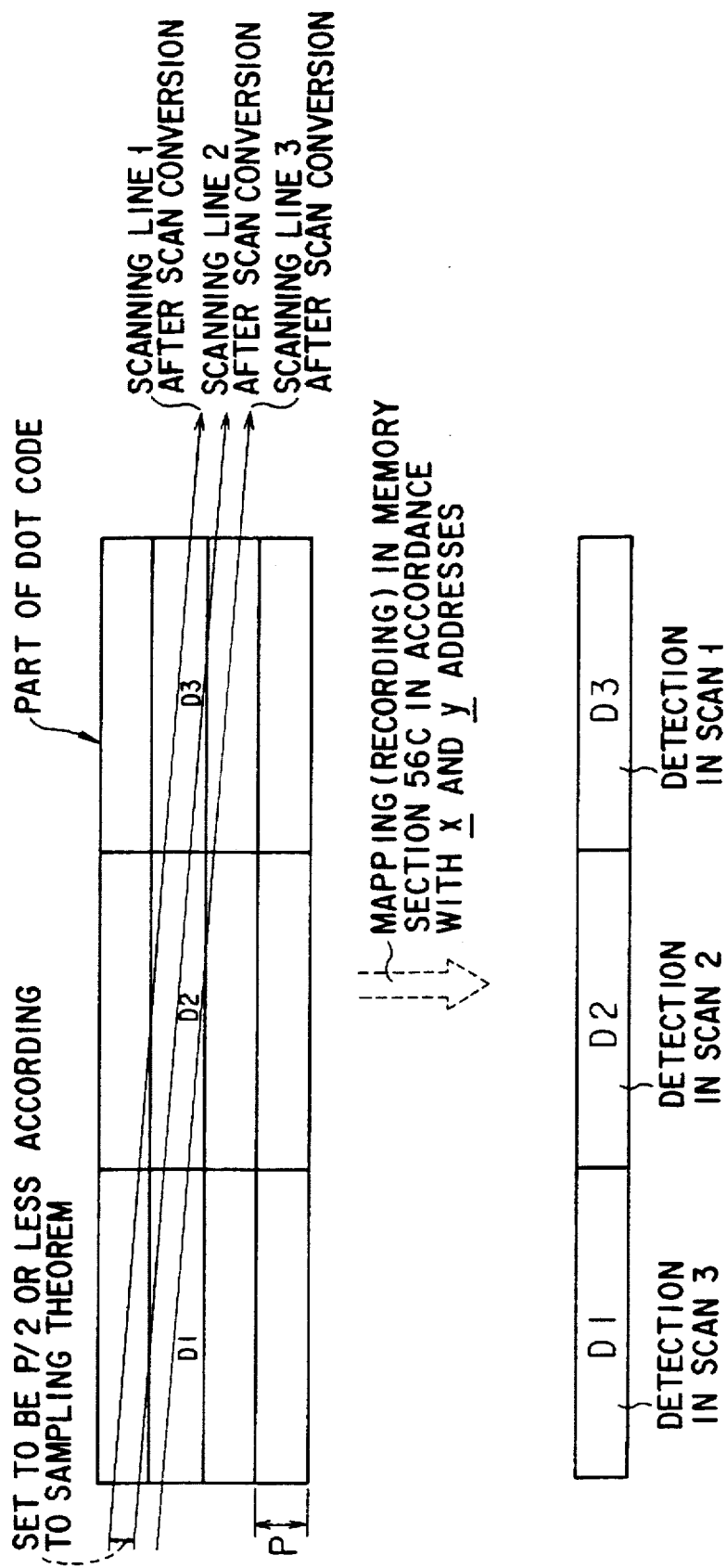
FIG. 6 is a view for explaining data array adjustment.

The purpose of this data string adjusting section 56 is to correct a small offset caused between the data array direction and the scanning direction after scan conversion owing to precision (influenced by the precision of a reference clock and the S/N ratio of an image pickup element) in the above scan conversion and scan conversion in the scan conversion/lens distortion correction section 46, distortion of a paper sheet, and the like. This operation will be described with reference to FIG. 6. Referring to FIG. 6, dot codes D1, D2, and D3 are data of the respective blocks. The pitch of scanning lines 1, 2, 3, . . . after scan conversion may be set to be smaller than the dot pitch of data on the basis of the sampling theorem, as described above. In the case shown in FIG. 6, however, the pitch of the scanning lines is set to be ½ the dot pitch to aim for perfection. As is apparent from FIG. 6, therefore, the dot code D1 can be detected by the scanning line 3 after scan conversion without any failure. The dot code D2 is detected by the scanning line 2 after scan conversion without any failure. Similarly, the dot code D3 is detected by the scanning line 1 after scan conversion without any failure.

The dot codes are stored in the memory section 56C for data string adjustment in accordance with the x and y addresses 38D and 38E in the respective blocks 38.

Subsequently, all the speech dot codes 36 on the paper sheet 30 can be stored in the memory section 56C for data string adjustment by manually scanning the detection section 44, as shown in FIGS. 4A and 4B.

The speech dot codes having undergone data string adjustment in the data string adjusting section 56 are read out from the memory section 56C for data string adjustment in accordance with a reference clock CK' generated by a reference clock generation circuit 53 different from the PLL circuit 52 described above. At this time, de-interleave processing of the data is performed by a de-interleave circuit 58 to convert the data into a formal data string. Error correction is then performed by an error correction circuit 60 using the error correction code 38B in each block 38. The compressed data is decoded by a decoding circuit 62. Furthermore, interpolation of audio data which cannot be corrected by error correction is performed by a data interpolation circuit 64. Thereafter, the data is converted into an analog audio signal by a D/A conversion circuit 66. The audio signal is amplified by an amplifier 68 and converted into a sound by the speech output device (e.g., an earphone, a headphone, or a loudspeaker) 42.

As described above, audio information such as speech or music information can be recorded on a paper sheet, and the reproducing apparatus is a compact, portable apparatus. Therefore, the user can repeatedly listen to data which is printed out, the printed data transmitted in facsimile, or data printed in the form of a book by a printing plate making technique at any places.

Note that the memory section 56C for data string adjustment in the data string adjusting section 56 is not limited a semiconductor memory, and a different storage medium such as a floppy disk, an optical disk, or a magnetooptical disk can be used.

Various applications of recording of audio information in the above manner can be expected. For example, as general applications, the following media can be expected: teaching materials for foreign languages, musical scores, various texts for correspondence courses, article specifications, repair manuals, language dictionaries, encyclopedias, books and magazines such as picture books, catalogs of merchandise, guide books for travelers, direct mails and invitation cards, newspapers, magazines, leaflets, albums, congratulatory telegrams, postcards, and the like. As applications in business operations, the following media can be expected: fax (voice & fax) operation instructions, proceedings, electronic blackboards, OHPs, identifications (voice prints), name cards, telephone memos, labels, fine paper rolls as supplies (expendable supplies), and the like. In this case, as shown in FIG. 7A, an expendable supply is designed such that a double-coated adhesive tape, a label, or the like which peals off easily is stuck on the lower surface of a roll of paper 30A, and the dot codes 36 are recorded on the upper surface of the paper 30A. Only a required portion of the paper 30A (to be referred to a reel seal hereinafter) can be cut and stuck on various things. Alternatively, as shown in FIG. 7B, the width of the paper 30A may be set to be large so that the dot codes 36 may be recorded in rows. In addition, manual scanning markers 36B as guide lines for manual scanning of the detection section 44 may be printed vertically and laterally. These markers 36B can also be used as criteria for the recording positions of the dot codes 36. That is, a sensor is arranged in a printer system 28 to read the marker 36B so as to detect the start position of a print-out position. With this operation, the dot code 36 can be printed within the area enclosed with this manual scanning marker 36B without fail. Therefore, by performing a manual scanning operation along the manual scanning marker 36B, the recorded audio information can be reliably reproduced. As is apparent, the manual scanning marker 36B may be printed at the same time when the dot code 36 is printed.

Consider the recording time of audio information. In general 200-dpi facsimile, when, for example, data is recorded in an area of 1 in.×7 in. (2.54 cm×17.78 cm) along one side of a paper sheet, the total amount of the data is 280 kbits. When a portion (30%) corresponding to a marker, an address signal, an error correction code, and an error determination code (in this case, the error determination code is set for not only the x and y addresses 38D and 38E but also the audio data 38C) is subtracted from the above data, the amount of the remaining data is 196 kbits. Therefore, when speech data is compressed at 7 kbits/s (the bit rate in mobile communication), the recording time of the data is 28 sec. When data is to be recorded on the entire lower surface of an A4-size two-side facsimile sheet, since an area of 7 in.×10 in. (17.78 cm×25.4 cm) can be ensured, speech data of a duration of 4.7 mins can be recorded.

In 400-dpi G4 facsimile, according to the same calculation as described above, speech data of a duration of 18.8 mins can be recorded in an area of 7 in.×10 in.

In 1,500-dpi high-quality printing, according to the same calculation as described above, speech data of a duration of 52.3 sec can be recorded in an area of 5 mm×30 mm. In a tape-like area of 10 mm×75 mm, speech data of 1 min can be recorded, according to calculation based on a speech signal of high sound quality (30 kbits/s upon compression) which allows recording of even music data.

Figure 8:
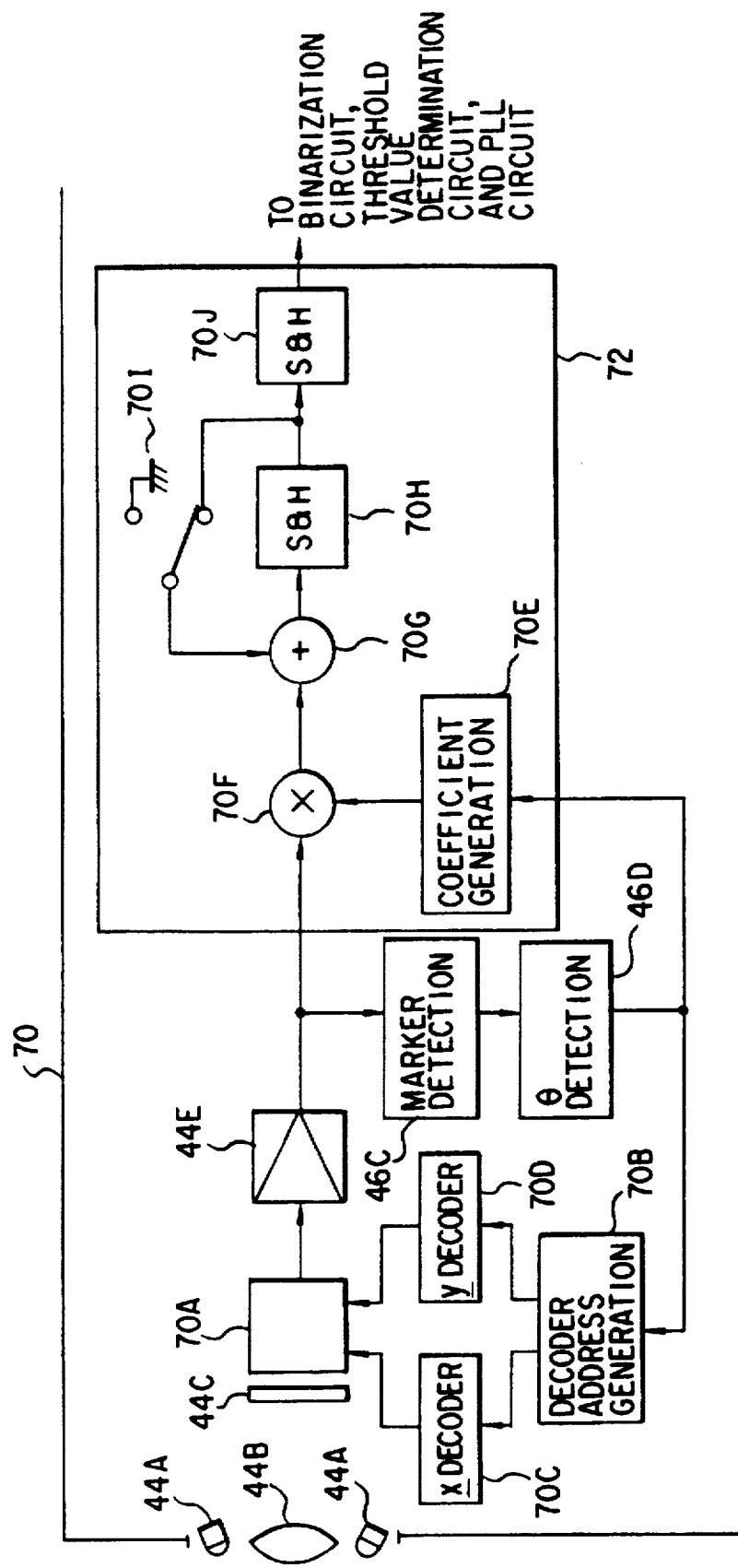
FIG. 8 is a view showing the arrangement of a reproducing apparatus according to the second embodiment.

FIG. 8 shows the arrangement of the second embodiment of the present invention. In the second embodiment, an x-y addressing image pickup section such as a CMD capable of memory and random access are used. The second embodiment is different from the first embodiment only in the detection section 44 and the scan conversion/lens distortion correction section 46 of the reproducing apparatus. More specifically, in a detection section/scan conversion section 70, image pickup data stored in an x-y addressing image pickup section 70A is subjected to marker detection in the same manner as in the first embodiment. In reading out the data, four data around an interpolation position are sequentially read out by an address generation section 70B and x and y decoders 70C and 70D, and input to an interpolation section 72. In the interpolation section 72, coefficients are sequentially read out from a coefficient generation circuit 70E and multiplied to the input data by a multiplier 70F. The products are accumulated/added by an analog accumulating/addition circuit constituted by an adder 70G, a sample and hold circuit 70H, and a switch 70I. The resultant data is then sampled/held by a sample and hold circuit 70J, and a dot code having undergone scan conversion is supplied to the binarization circuit 48, the threshold value determination circuit 50, and the PLL circuit 52 described above.

With this arrangement, the same function as that of the first embodiment can be realized, and the frame memory 46 can be omitted, thereby realizing a reduction in the cost and size of the apparatus. In addition, if the x-y addressing image pickup section 70A, the address generation section 70B, the decoders 70C and 70D, and the interpolation section 72 are formed on one substrate to be integrated into an IC, a further reduction in size can be realized.

FIG. 9 shows the arrangement of the third embodiment of the present invention. In this embodiment, a dot code 36 is recorded on a paper sheet 30, on which pictures and characters are printed, by using a transparent paint (ink) 74 which easily causes specular reflection (total internal reflection). Polarizing filters 44F and 44G are arranged between a light source 44A and an image forming system 44B in a detection section 44. The polarizing surfaces of the polarizing filters 44F and 44G are adjusted such that reflected light from the inside (the upper surface of the paper sheet 30) and reflected light from holes 74A formed in the transparent paint 74 according to a code are polarized in various directions and cut by the polarizing filter 44G by ½ the total amount of light. In addition, since the different in light amount between normal reflected light and totally reflected light is large, the contrast of the dot code recorded with the transparent paint 74 is emphasized and imaged.

Furthermore, the surface of the paper sheet 30 may be subjected to surface treatment such as mirror finishing to allow easy specular reflection, and the transparent paint 74 may consist of a material having a higher refractive index than the surface having undergone the above surface treatment and a film thickness corresponding to about $\lambda/4$ (corresponding to an optical path length of ¼ in the transparent paint in consideration of a change in optical path length because of an incident angle). With this arrangement, owing to the effect of the reflection amplifying coat, light which is obliquely incident on the surface of the paper sheet 30 is further amplified and reflected (specular reflection) more easily.

In this case, for example, a dot code is formed by fine chemical etching or the like, and hole portions corresponding to dots are roughened to reduce their reflectances.

If the dot code 36 is recorded in the transparent paint 74 in this manner, dot codes can be recorded even on pictures and characters. When, therefore, dot codes are to be recorded together with characters and pictures, the recording capacity can be increased as compared with the first embodiment.

Instead of the transparent paint, a transparent fluorescent paint may be used. Alternatively, dot codes may be recorded in color to realize multiplex recording. In recording dot codes in color, a general color ink or a color ink obtained by mixing a coloring material with a transparent ink may be used.

In this case, for example, an ink consisting of a volatile liquid and a binder (e.g., phenolic resin varnish, linseed oil varnish, or alkyd resin) can be used as a transparent ink, and a coloring material can be used as a pigment.

A portable voice recorder to which an audio information recording apparatus is applied will be described next. FIGS. 10A and 10B show an outer appearance of the portable voice recorder. This portable voice recorder is constituted by a main body 76 and a speech input section 80 which is detachably mounted on the main body 76 through main body-side and speech input section-side detachable members (a surface fastener, a magic tape, and the like) 78A and 78B. A recording start button 82 and a discharging section 84 for printed sheets are arranged on surfaces of the main body 76. Note that the main body 76 and the speech input section 80 are connected to each other via a cable 86. As a matter of course, signals may be transmitted from the speech input section 80 to the main body 76 by radio or infrared radiation.

Figure 11:
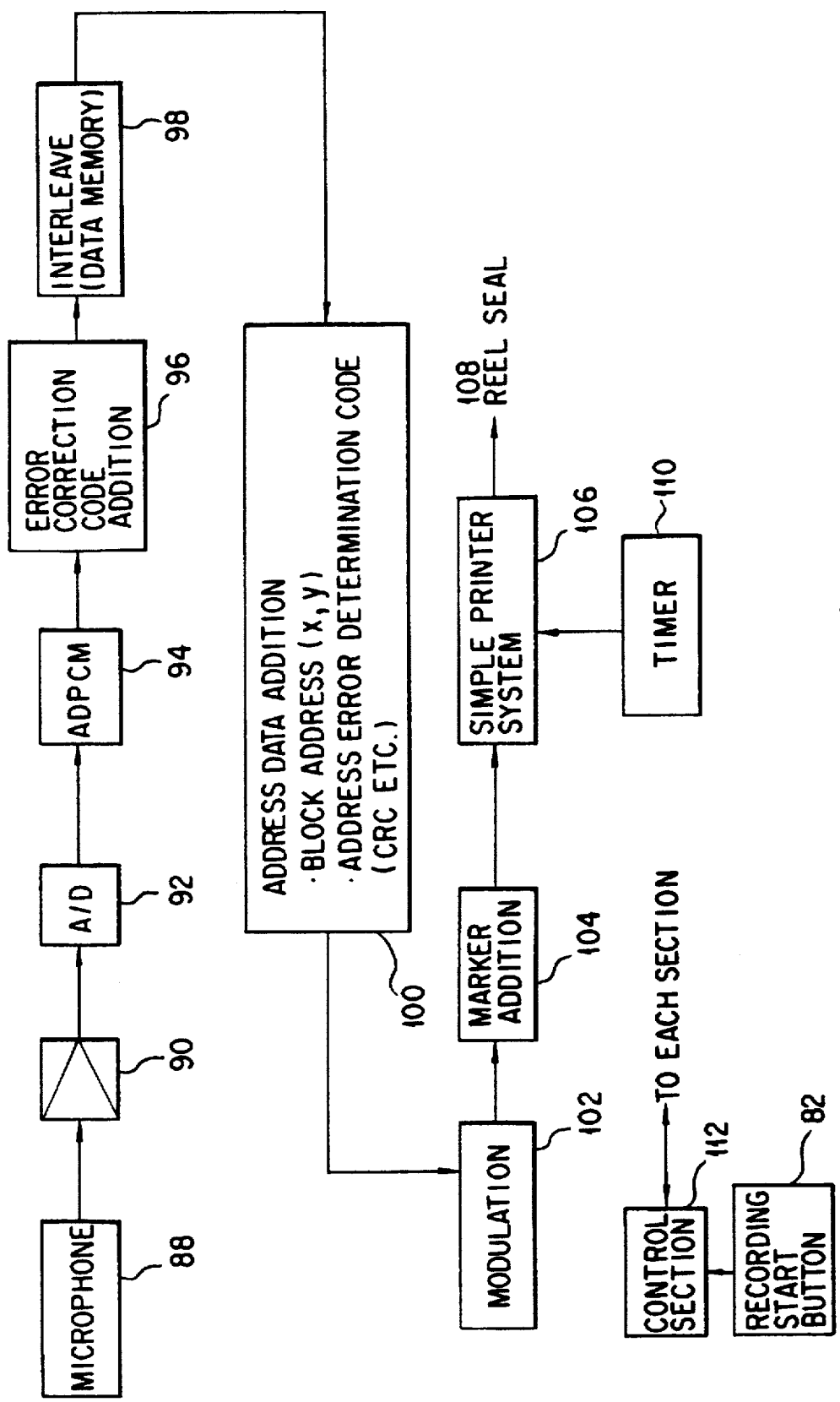
FIG. 11 is a view showing the circuit arrangement of the portable voice recorder.

FIG. 11 is a block diagram showing the arrangement of this portable voice recorder. Speech input through a microphone 88 is amplified by a preamplifier 90 and converted into digital data by an A/D converter 92. The data is then supplied to a compression processing section (ADPCM) 94. An error correction code is added by an error correction code addition section 96 to the data having undergone compression processing. The resultant data is supplied to an interleave section 98, and the respective data are stored. Thereafter, interleave processing is performed. In addition, addresses of blocks and address error determination codes (CRC or the like) are added by an address data addition section 100 to the data interleaved in this manner. The resultant data is input to a modulation circuit 102. The modulation circuit 102 performs, for example, 8–10 modulation, i.e., conversion from 8-bit data into 10-bit data, thus converting the data into data having a different bit count. After this operation, a marker addition section 104 generates markers by using a data string different from 256 data strings correlated in the modulation circuit 102, and adds the markers to the data.

Figure 12A:
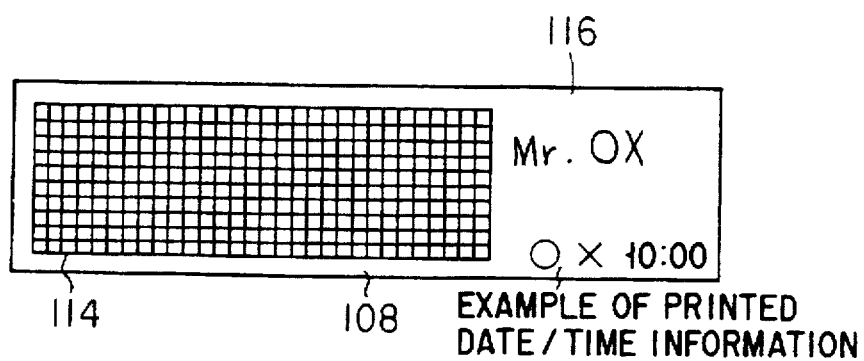
FIGS. 12A and 12B are views, each showing an example of information printed on a recording medium.
Figure 12B:
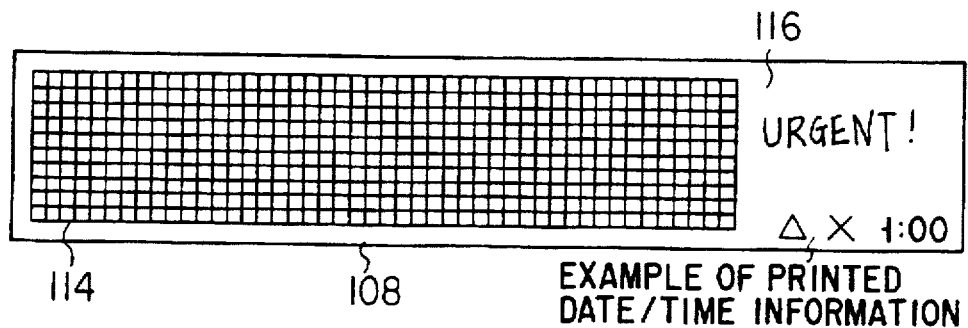

The data to which the markers are added in this manner is supplied to a simple printer system 106. As a result, as shown in FIGS. 12A and 12B, a reel seal 108 is printed and discharged from the printed sheet discharging section 84. In this case, the simple printer system 106 prints date/time data obtained by a timer 110 on the reel seal 108.

Note that each component described above is controlled by a control section 112 in accordance with the operation of the recording start button 82. Of the above components, the microphone 88 and other components to be arranged in the speech input section 80 are not specifically limited. In this case, for example, the microphone 88, the preamplifier 90, and the A/D converter 92 are incorporated in the speech input section 80.

Figure 13:
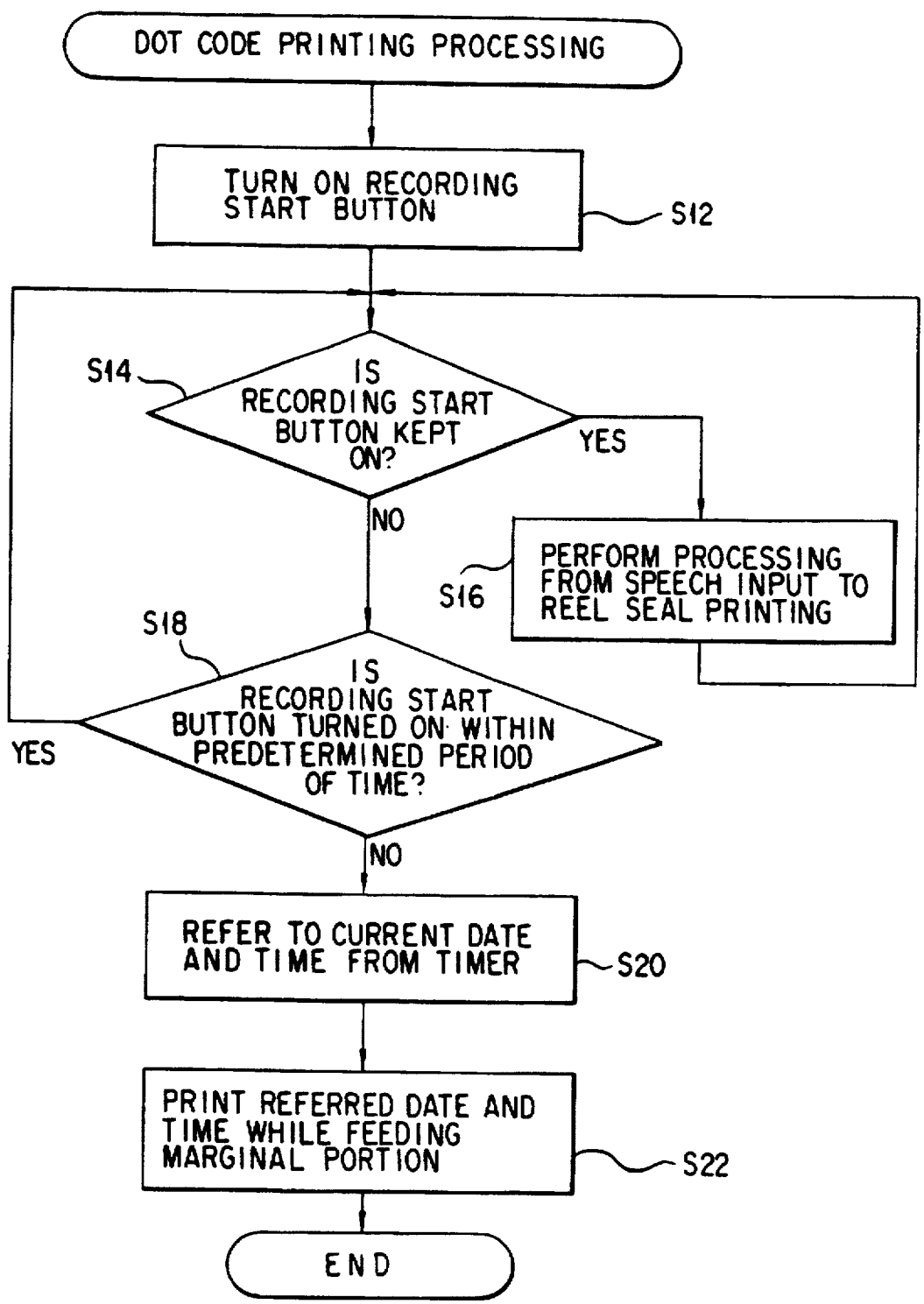
FIG. 13 is a flow chart showing dot code printing processing in the voice recorder in FIG. 11.

FIG. 13 is a flow chart showing the operation of the portable voice recorder having the above arrangement. When the recording start button 82 arranged on the main body 76 is depressed (step S12), processing from speech input to printing of a dot code 114 on the reel seal 108 is performed (step S16) while the recording start button 82 is depressed (step S14). When the recording start button 82 is released, it is decided whether the recording start button 82 is depressed again within a predetermined period of time (step S18). If it is decided that the recording start button 82 is depressed again, the flow returns to step S14 to repeat the above processing. If it is determined that the recording start button 82 is not depressed within the predetermined period of time, the current data and time are referred to through the timer 110 (step S20), and the referred date and time are printed while a margin portion 116 of the reel seal 108 is fed.

In this portable voice recorder, as shown in FIG. 10A, while the main body 76 is connected to the speech input section 80, the user holds the main body 76 with his/her hand and records speech, as the dot code 114, on the reel seal 108 with the speech input section 80 being brought near to his/her mouth. Alternatively, as shown in FIG. 10B, the main body 76 and the speech input section 80 are separated from each other, and the speech input section 80 is attached to the receiver side of the handset of a telephone set by using the detachable member 78B. With this arrangement, the user can directly record speech from a person on the other end of a telephone line, as the dot code 114, on the reel seal 108 instead of writing the contents of the speech on a memo. In this case, as shown in FIGS. 12A and 12B, the name of the receiver or a comment indicating an addressee or the like can be written, in addition to date/time data printed on the reel seal 108, because the margin portion 116 is formed.

Figure 14A:
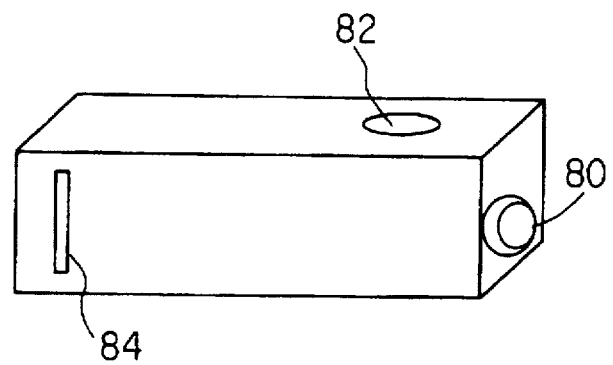
FIGS. 14A and 14B perspective views, each showing an outer appearance of another portable voice recorder.
Figure 14B:
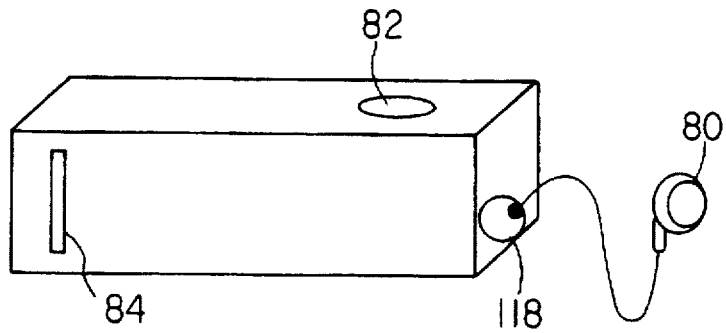

As the speech input section 80, various forms can be considered, as well as the above arrangement allowing the speech input section 80 to be detachably mounted on the main body via the detachable members. For example, as shown in FIGS. 14A and 14B, an earphone type may be used. If such an earphone type speech input section 80 is employed, the speech input section 80 is pulled out from a speech input section housing section 118 of the main body 76 and inserted in an ear of the user. With this arrangement, the user can record speech from a person on the other end of a telephone line while listening to the speech through the receiver side of the handset of the telephone.

In the above description, dot code printing is performed only while the recording start button 82 is depressed. However, a recording end button may be arranged on the main body 76 so that dot code printing may be performed in the interval between the instant at which the recording start button 82 is depressed once and the instant at which the recording end button is depressed.

A reproducing function like the one shown in FIG. 3 may be incorporated in the recording apparatus to form a recording/reproducing apparatus. In this case, the earphone type speech input section 80 may have the function of an earphone.

In the above embodiment, audio information such as speech and music information is presented as information to be recorded. However, an embodiment designed to handle so-called multimedia information including not only audio information but also video information obtained by a camera, a video tape recorder, and the like and digital code data obtained from a personal computer, a wordprocessor, and the like will be described below.

FIG. 15 is a block diagram showing the arrangement of a multimedia information recording apparatus for recording such multimedia information.

Of multimedia information, audio information is input through a microphone or audio output device 120 and amplified by a preamplifier 122, and the amplified information is converted into digital data by an A/D converter 124 and supplied to a compression processing section 126, as in the case shown in FIG. 1.

In the compression processing section 126, the input digital audio signal is selectively supplied to a speech compressing circuit 130 such as an ADPCM circuit and a speech synthesis/coding circuit 132 by a switch 128. The speech compressing circuit 130 performs adaptive type differential PCM of the input digital audio information to perform data compression. The speech synthesis/coding circuit 132 recognizes one speech input from the input digital audio information and converts it into a code. With this operation, the digital audio information is temporarily converted into a different synthetic code to relatively reduce the data amount, as against a case wherein the above ADPCM circuit codes the audio information in the form of speech information to reduce the data amount, i.e., processes the audio information as raw information. For example, the switch 128 is manually operated by the user in accordance with a purpose. Alternatively, for example, information may be categorized in advance such that information with high sound quality such as information from the audio output device is supplied to the speech compressing circuit 130, and voices and comments from the microphone are supplied to the speech synthesis/coding circuit 132. With this arrangement, input audio information can be automatically switched after the information is recognized as information belonging to a specific category.

Various data input through a personal computer, a wordprocessor, a CAD, an electronic notebook, communication, and the like, which have already been formed as digital code data, are input to a data form determination circuit 136 first via an interface (to be referred to as an I/F hereinafter) 134. The data form determination circuit 136 basically serves to determine whether data compression can be performed by the compression processing section 126 on the subsequent stage. Information which has already undergone some compression processing and from which no effect can be expected in the compression processing section 126 on the subsequent stage is made to bypass the compression processing section 126 to be directly supplied to the subsequent stage of the compression processing section 126. If input data is non-compressed data, the data is supplied to the compression processing section 126.

Data which is determined as no-compressed code data by the data form determination circuit 136 is input to the compression processing section 126, in which compression processing of optimally compressing the code data is performed by a compressing circuit 138 using Huffman codes, arithmetic codes, Lempel-Ziv (LZ) codes, or the like. Note that the compressing circuit 138 also performs compression processing of an output from the above speech synthesis/coding circuit 132.

Note that the speech synthesis/coding circuit 132 may recognize character information, as well as speech information, and convert it into a speech synthetic code.

Image information from a camera or video output device 140 is supplied to the compression processing section 126 after being amplified by a preamplifier 142 and A/D-converted by an A/D converter 144.

In the compression processing section 126, an image area determination/separation circuit 146 determines whether input image information is a binary image such as a hand-written character or a graph or a multi-value image such as a natural image. This image area determination/separation circuit 146 separates binary image data from multi-value image data by using a determined image area separation technique using a neural network as disclosed in Japanese Patent Application No. 5-163635 filed by the present applicant. Binary image data is compressed by a binary compression processing circuit 148 such as a general MR/MH/MMR according to JBIG or the like as binary compression. Multi-value image data is compressed by a multi-value compression processing circuit 150 using a still image compressing function such as DPCM or JPEG.

The data which have undergone compression processing in the above manner are synthesized by a data synthesis processing section 152 as needed.

Note that all the respective information input and compression processing systems need not be arranged in parallel, but one or a combination of a plurality of systems may be arranged as needed. Therefore, the data synthesis processing section 152 is not always required. If only one data system is present, this section may be omitted so that data can be directly input to an error correction code addition section 154 on the subsequent stage.

The error correction code addition section 154 adds an error correction code to the data and inputs the resultant data to a data memory section 156. In the data memory section 156, the respective data are stored, and undergo interleave processing afterward. In this operation, a continuous data string is dispersed to positions properly separated from each other to improve the correction performance by minimizing errors, e.g., block errors caused by noise and the like, when input data is actually recorded as dot codes, and the dot codes are reproduced. That is, the possibility of an error is reduced from that of a burst error to that of a bit error.

Furthermore, an address data addition section 158 adds addresses of blocks and address error determination code (CRC or the like) to the data interleaved in this manner, and inputs the resultant data to a modulation circuit 160. For example, the modulation circuit 160 performs 8–10 modulation.

In the above embodiment, as is apparent, codes for error correction may be added to data after interleave processing.

After this operation, a marker addition section 162 generates markers using a data string different from 256 data strings correlated in the modulation circuit 160, and adds the markers to the data. Addition of markers after modulation prevents the markers from being modulated and rendered difficult to be recognized as markers.

The data to which the markers are added in this manner is sent to a synthesis/edit processing section 164 and recorded on a recording paper sheet other than the created data. For example, the data is synthesized with an image, a title, characters, or the like, or subjected to edit processing such as layout processing. Alternatively, the data is converted into a form to be output to a printer or a data format suitable for a printing plate and is supplied to a printer system or a printing plate making system 166 on the next stage. Finally, in the printer system or the printing plate making system, the data is printed on a sheet, a tape, printed matter, or the like.

Note that edit processing in the synthesis/edit processing section 164 includes edit operations such as layout processing of information on a paper sheet and dot codes, matching of the dot size of codes with the resolving power of a printing machine, a printer, or the like, and delimiting a code length in units of words, in accordance with contents, or the like, to perform a line feed operation, i.e., a line feed operation of feeding a given line to the next line.

The printed matter obtained in this manner is transmitted by, e.g., a FAX 168. As a matter of course, data created by the synthesis/edit processing section may be directly transmitted in facsimile instead of being printed.

The concept of a dot code 170 in this embodiment will be described below with reference to FIG. 16. According to the data format of the dot code 170 in the embodiment, one block 172 is constituted by a marker 174, a block address 176, address error detection/error correction data 178, and a data area 180 in which actual data is set. That is, in this embodiment, one block is developed two-dimensionally unlike the embodiment described with reference to FIG. 2A, in which one block is arranged one-dimensionally in the line direction. Such blocks 172 are two-dimensionally arranged in the vertical and horizontal directions to form the dot code 170 as a whole.

The arrangement of a reproducing apparatus for multimedia information will be described next with reference to FIG. 17. This information reproducing apparatus comprises a detection section 184 for reading a dot code from a sheet 182 on which the dot code 170 is printed, a scan conversion section 186 for recognizing image data supplied from the detection section 184 as a dot code and normalizing it, a binarization processing section 188 for converting multivalue data into binary data, a demodulating section 190, an adjusting section 192 for adjusting a data string, a data error correction section 194 for correcting a read error in a reproducing operation and a data error, a data separation section 196 for separating data in accordance with their attributes, an decompression processing section for performing processing against data compression processing in accordance with the attributes of data, and a display section, a reproducing section, or another input device.

In the detection section 184, the dot code 170 on the sheet 182 is illuminated with a light source 198; reflected light is detected as an image signal by an image pickup section 204 such as a CCD or a CMD, designed to convert optical information into an electrical signal, via an image formation optical system 200 such as a lens and a spatial filter 202 for removing moiré and the like; and the image signal is amplified by a preamplifier 206 to be output. The light source 198, the image formation optical system 200, the spatial filter 202, the image pickup section 204, and the preamplifier 206 are arranged in an external light shielding section 208 for preventing disturbance caused by external light. The image signal amplified by the preamplifier 206 is converted into digital information by an A/D conversion section 210 and supplied to the scan conversion section 186 on the next stage.

Figure 18:
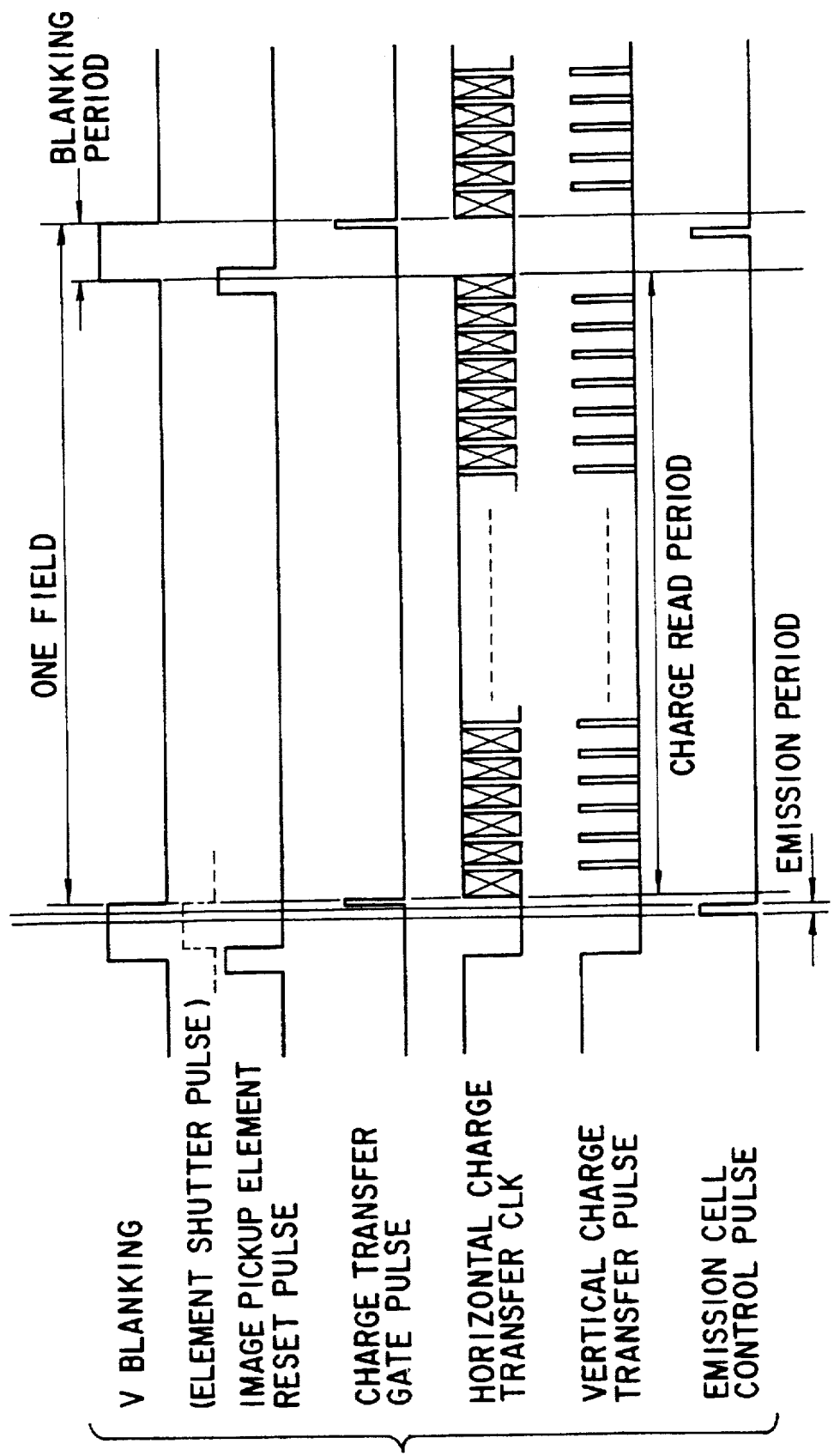
FIG. 18 is a timing chart of light source emission in the multimedia information reproducing apparatus in FIG. 17.

Note that the image pickup section 204 is controlled by an image pickup section control section 212. Assume that a CCD of an interline transfer scheme is to be used as the image pickup section 204. In this case, the image pickup section control section 212 outputs the following control signals to the image pickup section 204: a vertical blanking signal for vertical synchronization; an image pickup element reset pulse for resetting information charges; a charge transfer gate pulse signal for transferring charges stored in a two-dimensionally arrayed charge transfer/storage section to a plurality of vertical shift registers; a horizontal charge transfer CLK signal as a transfer clock signal for a horizontal shift register for transferring charges in the horizontal direction and externally outputting them; a vertical charge transfer pulse signal for transferring the charges from the vertical shift registers in the vertical direction and supplying them to the horizontal shift register, and the like. FIG. 18 shows the timings of these signals.

The image pickup section control section 212 supplies an emission cell control pulse to the light source 198 to adjust the emission timing of the light source 198 in accordance with the above timings.

The timing chart in FIG. 18 basically corresponds to one field. Image data is read out in the time interval between one blanking timing and the other blanking timing of one field. Instead of continuously lighting the light source 198, a pulse lighting operation is performed, and subsequent pulse lighting operations are performed while synchronization is established in units of fields. In this case, the exposure timing is controlled to perform exposure during a vertical blanking period, i.e., a period during which no image charges are output, in order to prevent clock noise caused by a pulse lighting operation from mixing with a signal output. That is, an emission cell control pulse is a very fine digital clock pulse which is generated instantaneously and serves to supply large power to the light source. For this reason, some measure must be taken to prevent noise from mixing with an analog image signal. For this reason, pulse lighting of the light source is performed during a vertical blanking period. With this operation, the S/N ratio can be increased. In addition, to perform pulse lighting is to shorten the emission time. Therefore, the influences of a shake caused by a manual operation and blurring caused by movement of the apparatus can be eliminated. This allows a high-speed scanning operation.

In addition, assume that the reproducing apparatus tilts, and disturbance such as external light enters in spite of the external light shielding section 208. Even in this case, in order to minimize a decrease in S/N ratio, an image pickup element reset pulse is output to reset an image signal once before the light source 198 is caused to emit light during a vertical blanking period, and emission of light is performed immediately after resetting of this image signal. A data read operation is performed immediately after this operation.

The scan conversion section 186 will be described below with reference to FIG. 17. The scan conversion section 186 is a section for recognizing image data supplied from the detection section 184 as a dot code, and normalizing it. As a technique for this operation, the image data from the detection section 184 is stored in an image memory 214, read out therefrom temporarily, and supplied to a marker detection section 216. The marker detection section 216 detects a marker of each block. A data array direction detection section 218 detects the rotation or inclination and the array direction of the data by using the markers. An address control section 220 reads out image data from the image memory 214 and supplies the data to an interpolation circuit 222 so as to correct it in accordance with the detection result. At this time, lens aberration information is read out from a memory 224 for correcting the distortion of the aberration of the lens of the image formation optical system 200 of the detection section 184, thereby performing lens correction as well. The interpolation circuit 222 performs interpolation processing of the image data to convert it into an original pattern, i.e., a dot code.

An output from the interpolation circuit 222 is supplied to the binarization processing section 188. As is apparent from FIG. 16 as well, the dot code 170 is basically a black and white pattern, i.e., binary information. Therefore, the data is converted into binary data by the binarization processing section 188. At this time, binarization is adaptively performed while threshold value determination is performed by a threshold value determination circuit 226 in consideration of the influences of disturbance, signal amplitude, and the like.

Since modulation like the one described with reference to FIG. 15 has been performed, the demodulating section 190 demodulates the data, and inputs the resultant data to the data string adjusting section 192.

In the data string adjusting section 192, the block addresses of the above two-dimensional blocks are detected by a block address detection section 228 first, and error detection and correction of the block addresses are then performed by a block address error detection/correction section 230. Thereafter, an address control section 232 stores the resultant data in a data memory section 234 in units of blocks. By storing the data in units of block addresses in this manner, the data can be efficiently stored even if an intermediate data portion is omitted or data is inserted in the process of storing the data.

After this operation, error correction of the data read out from the data memory section 234 is performed by the data error correction section 194. An output from the data error correction section 194 is branched to two ways. One output is supplied, as digital data, to a personal computer, a wordprocessor, an electronic notebook, or the like. The other output is supplied to the data separation section 196 to be separated into image data, handwritten character or graph data, character or line drawing data, and sound data (including two types, i.e., sound data without any processing and data having undergone speech synthesis).

Image data corresponds to natural image data, which is multi-value image data. An decompression processing section 238 performs decompression processing of this data, which corresponds to JPEG in data compression. In a data interpolation circuit 240, data for which error correction cannot be performed is interpolated.

For binary image information as of a handwritten character or a graph, an decompression processing section 242 performs decompression processing corresponding to MR/MH/MMR in data compression. In a data interpolation circuit 244, data for which error correction cannot be performed is interpolated.

Character or line drawing data is converted into a different pattern for display by a PDL (Page-Description Language) processing section 246. Note that even line drawing or character information which has been coded and undergone compression processing for a code is subjected to corresponding decompression (Huffman coding, Lempel-Ziv coding, or the like) processing in an decompression processing section 248, and is supplied to the PDL processing section 246.

Outputs from the data interpolation circuits 240 and 244 and the PDL processing section 246 are synthesized or selected by a synthesizing/switching circuit 250. The resultant data is converted into an analog signal by a D/A conversion section 252. Thereafter, the corresponding information is displayed on a display section 254 such as a CRT (TV monitor) or an FMD (face mounted display). Note that the FMD is a glasses-type monitor (handy monitor) to be mounted on the face of the user, and can be effectively used for, e.g., a virtual reality operation or looking at an image on a large frame in a narrow place.

Speech information is subjected to decompression processing in an decompression processing section 256, which corresponds to ADPCM. Furthermore, in a data interpolation circuit 258, data for which error correction cannot be performed is interpolated. In performing speech synthesis, a speech synthesis section 260 receives a code for speech synthesis, actually synthesizes speech from the code, and outputs it. In this case, if the code itself is compressed, speech synthesis is performed after decompression processing such as Huffman coding or Lempel-Ziv coding processing is performed in an decompression processing section 262, as in the case of the above character or line drawing information.

Figure 19:
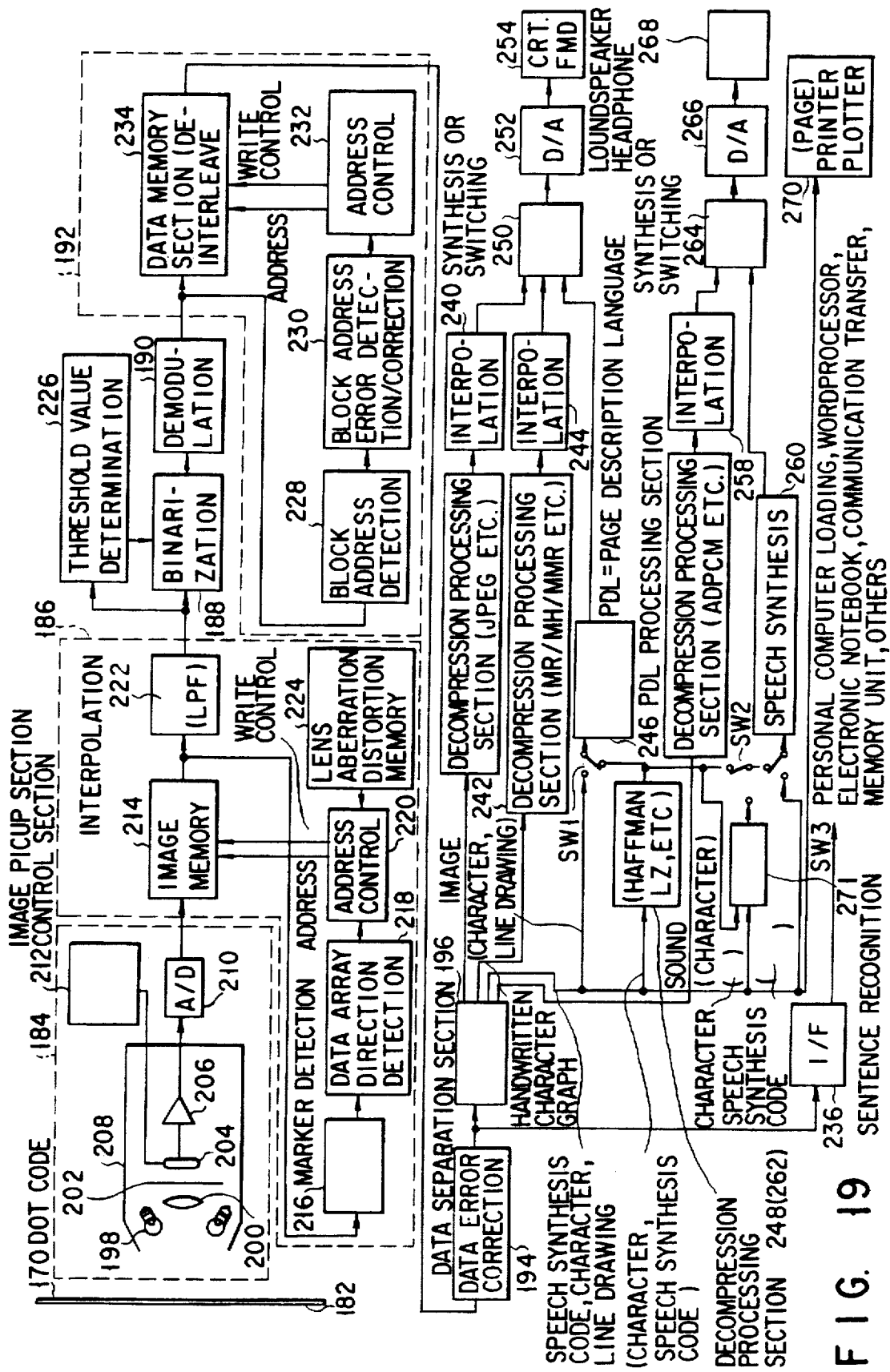
FIG. 19 is a view showing another arrangement of the multimedia information reproducing apparatus.

Furthermore, as shown in FIG. 19, character information may be output, as speech information, from the speech synthesis section 260 after sentence recognition is performed by a sentence recognition section 271.

The decompression processing section 262 may also serve as the decompression processing section 248. In this case, data is properly switched by switches SW1, SW2, and SW3 in accordance with the attribute of the data subjected to decompression processing so as to be input to the PDL processing section 246 or the speech synthesis section 260.

Outputs from the data interpolation circuit 258 and the speech synthesis section 260 are synthesized or selected by a synthesizing/switching circuit 264. The resultant data is then converted into an analog signal by a D/A conversion section 266. The signal is output to a loudspeaker, a headphone or a speech output device 268 equivalent thereto.

Character or line drawing information is directly output from the data separation section 196 to a page printer or plotter 270. As a result, the character information can be printed, as wordprocessor characters, on a paper sheet, or the line drawing information can be output, as a drawing, from a plotter.

As is apparent, image information can also be printed by a video printer as well as being displayed on a CRT or an FMD, or the image can be photographed.

Figure 20A:
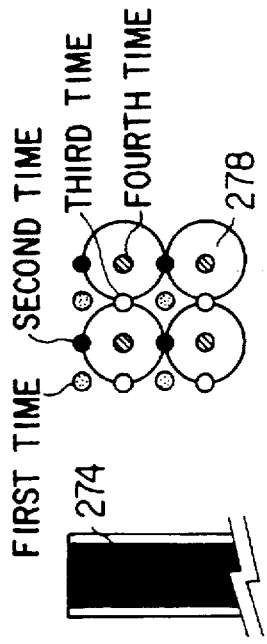
FIG. 20A is a view showing a dot code, which is also applied to the reproducing apparatus in FIG. 3, to explain a data array adjusting section in the multimedia information reproducing apparatus in FIG. 17.
Figures 20B, 20D:
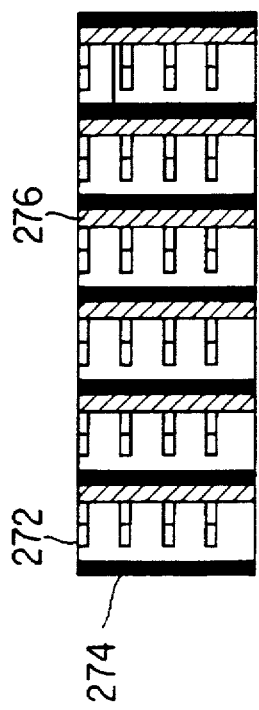
FIG. 20B is a view showing a linear marker of the dot code in FIG. 20A, FIG.
FIG. 20D is a view for explaining the scan pitch of an image pickup element.

The data string adjusting section 192 will be described next. In this case, in order to apply this embodiment to the audio information reproducing apparatus (see FIG. 3) described above, it is assumed that blocks, in each of which a block address 272A and an error correction data 272B, each denoted by reference numeral 272, are arranged on the first line, are two-dimensionally arrayed, as shown in FIG. 20A, while linear markers 274 shown in FIG. 20B are arranged in the vertical direction, and a line address 276A and an error detection data 276B, each denoted by reference numeral 276, are arranged for each line of each block.

Figure 20C:
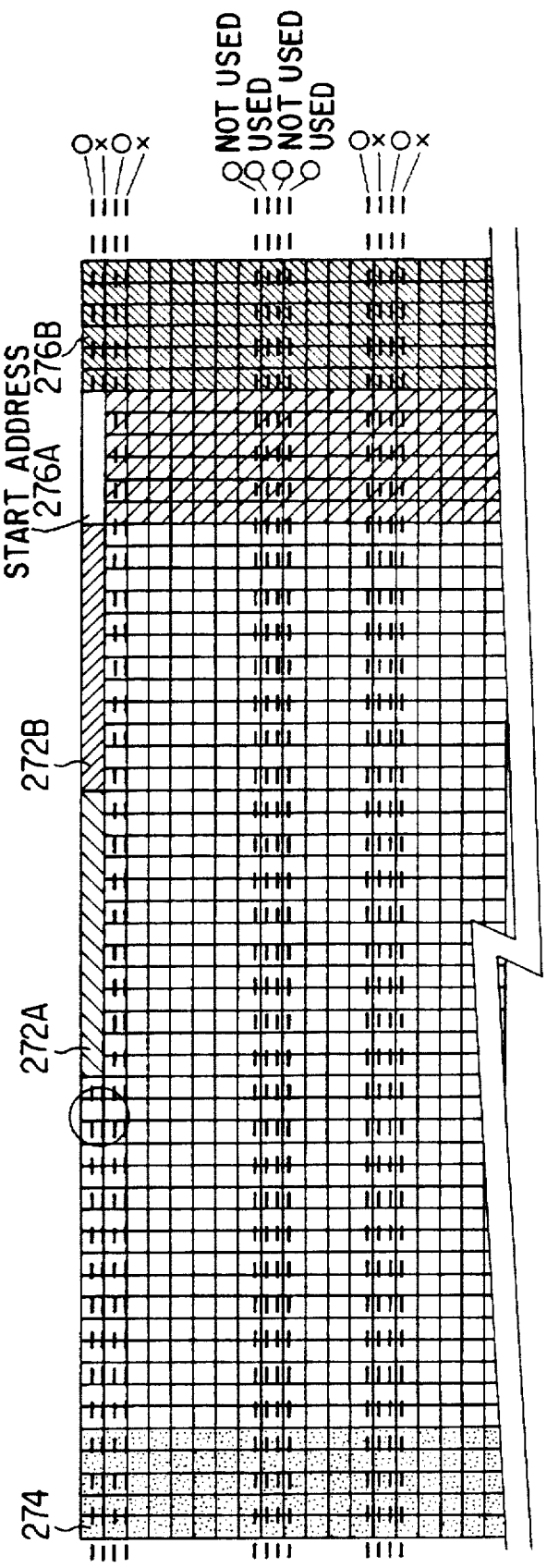

In this embodiment, as shown in FIG. 20C, the pitch is reduced twice for each line as compared with the scanning method described with reference to FIG. 6. After the center of each marker is detected, a portion between the central lines of the respective adjacent markers are divided into equal portions equal to the number twice the number of dots. That is, as shown in FIG. 20D, in the first scanning operation, ½ the data of dots 278 are read in the vertical and horizontal directions, i.e., a total of ¼ the data is read. In this case, the scanning pitch is equal to the pitch of the dots 278. Therefore, data is read for every other dot. In this manner, data is read up to the CRC error detection data 276B. If, for example, one block consists of 64 dots, 64 dots are read for every other dot.

Whether a line address is actually read is checked by using the line address 276A located at a rear portion and the CRC error detection data 276B for the corresponding line address. If this line address is properly read, it is determined that the data dots themselves before the line address are properly read. If it is determined that the line address is not properly read, the scanning position is shifted by one dot, for example, to the right, and the second scanning operation is performed (indicated by the black circles in FIG. 20D). After data is read up to the 64 dots, it is checked in the same manner as described above whether a line address is actually read. If it is determined that a line address is not properly read, the scanning position at the first dot is shifted by one dot downward, and the third scanning operation is performed. If it is also determined after this operation that a line address is not properly read, the scanning position is shifted by one dot to the right, and the fourth scanning operation is performed.

If scanning of one line is repeated four times in this manner, it is expected that a line address can be properly read at least once. If it is determined that a line address is properly read, the data is written in the data memory section 234.

In this case, the line address of the read line is "0" (start address), i.e., it is determined that the line is the first line, the preceding data is determined as the block address 272A and the error correction data 272B. Note that a block address error detection code, e.g., a CRC, may be added to the error correction data 272B, or an error correction code may also be added thereto depending on a purpose, thereby using the error correction data 272B as an error correction code for a block address as a Reed-Solomon code. When the first address line "0" is recognized, the block address 272A is read first, and the ordinal number of the corresponding block is determined from this address data. From the subsequent lines, actual data appear. Therefore, these data are read and written in blocks, of the data memory section 234, corresponding to the read blocks.

In the above description, if the absence of an error is determined while one line is scanned, the next line is scanned. However, scanning may be repeated four times per line. In this case, the absence of an error is determined a plurality of number of times. However, no problem is posed because the same data is written at the same address. When the processing is to be simplified, scanning is repeated four times. In addition, when priority is to be given to speed, the former scanning method is employed.

Figure 21:
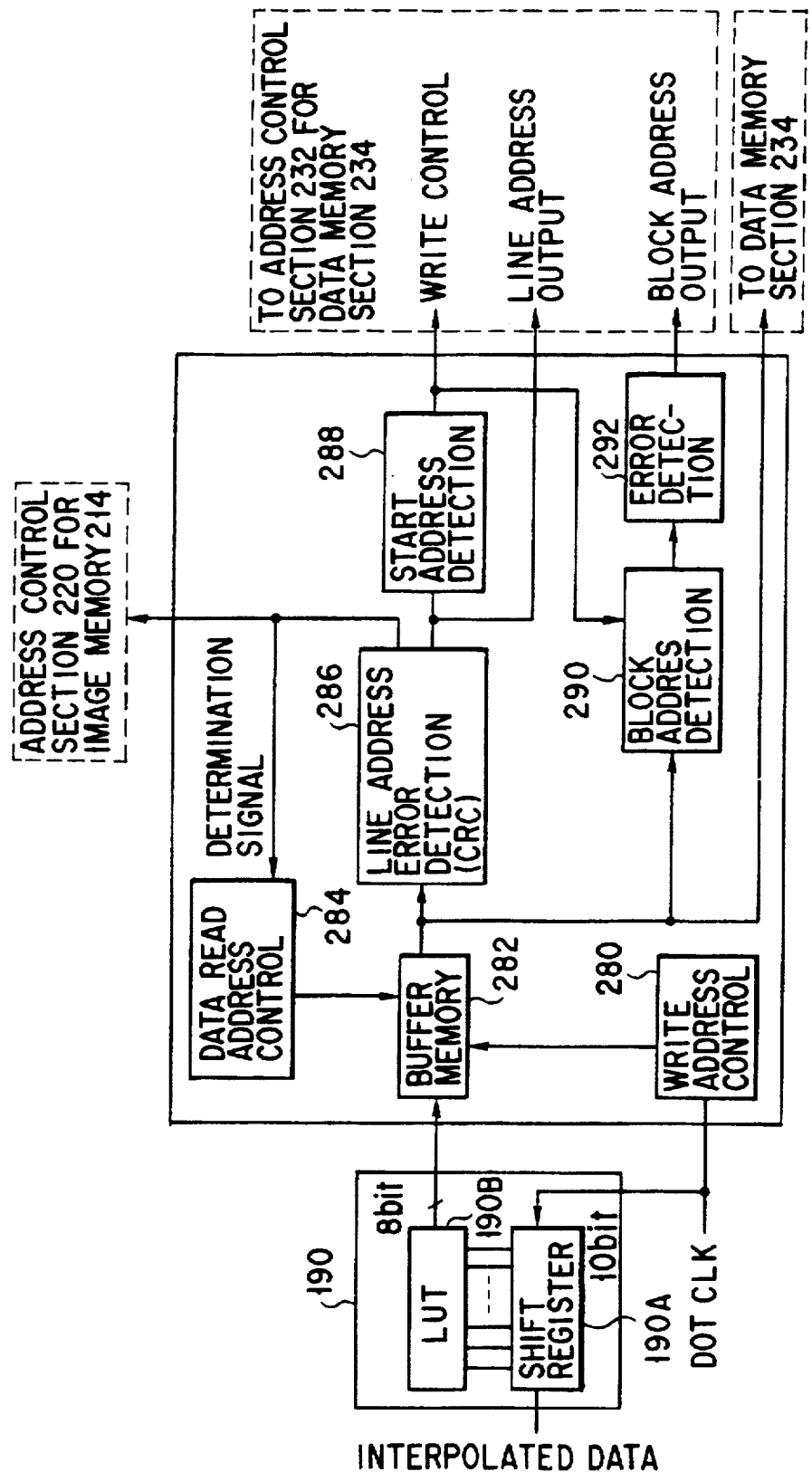
FIG. 21 is a view showing the actual arrangement of the data array adjusting section.

The actual arrangements of the block address detection section 228 and the block address error detection/correction section 230 for realizing the operation of the above adjusting section 192 will be described with reference to FIG. 21.

Upon receiving 10 bits of binary interpolated data on a shift register 190A, the demodulating section 190 converts the data into 8-bit data by using a look-up table (LUT) 190B.

In the data string adjusting section 192, this demodulated data is temporarily stored in a buffer memory (all data corresponding to 64 dots are input) 282 under the control of a write address control section 280. Of the stored data, only line address information and CRC information for an address are read out by a data read address control section 284, and error detection is performed by a line address error detection circuit 286. If a determination signal representing this error detection result becomes true, i.e., the absence of an error is determined, the data read address control section 284 reads out information before the line address information, i.e., actual data information, from the buffer memory 282.

Meanwhile, a start address detection circuit 288 checks whether the line address which has undergone error detection in the line address error detection circuit 286 is a start address. If a start address is detected, the start address detection circuit 288 informs a block address detection circuit 290 that the corresponding line is a line having a block address. In response to this information, the block address detection circuit 290 detects a block address from the data read out from the buffer memory 282. An error detection circuit 292 then performs error detection and correction. The resultant data is latched, as a block address, in the address control section 232 for the data memory section 234.

Note that only error detection is added to a line address to obtain an accurate read position. However, an error correction code is added to a block address because it is used as address information.

Since the subsequent lines are sequential data lines, read data are written, as data, in the data memory section 234. At this time, line addresses are output together depending on processing, as needed. If a counter is incorporated in this arrangement, a method of automatically counting up line addresses in the arrangement may be employed.

The next block is recognized when the next start address "0" is detected, and the same operation as described above is repeatedly performed with respect to all blocks.

A determination signal output from the line address error detection circuit 286 is supplied to the address control section 220 for the image memory 214. This signal is required to shift the scanning position to the next line, when data becomes true, so as to shorten the time in performing a scanning operation four times per line.

In the above case, the line address error detection circuit 286 performs address detection with respect to interpolated data by using the same address information for four scanning operations until the data becomes true. When the data becomes true, an address corresponding to a data line of dots next to a new line is temporarily set to form interpolated data. Thereafter, the data is read out for every four points at a time. In order to perform such control, a determination signal is supplied to the address control section 220 for the image memory 214. With this operation, the same address is generated four times to perform interpolation, or a read operation is performed while the order of interpolation is changed. Alternatively, the address is rewritten to an address corresponding to the next line, and data on the corresponding line is read out and interpolated to be read out four times.

Although not shown, the address control section 232 for the data memory section 234 performs mapping in the data memory section 234. In addition, in a read operation, the address control section 232 performs control for de-interleave processing. This operation is also performed by using a look-up table and the like. When, for example, addresses are generated in units of dots, the corresponding data is converted into a memory data string actually output from a look-up table by using a ROM or the like on the basis of data obtained by combining the corresponding block, line, and dot address. This operation is de-interleave processing (de-shuffling). Only when this processing is performed, data is read out as a data string. As a matter of course, this de-interleave processing may be performed while data is read out from the data memory section 234. Alternatively, in a write operation, after such conversion may be temporarily performed to disperse the data in such an order, the data is sequentially written (mapped).

In this case, each marker 274 has a linear shape. However, each marker may have a circular or rectangular shape, as shown in FIG. 16. Once a marker is detected, a read operation is performed along the lines in the block. Therefore, a marker need not be linear. For example, as shown in FIGS. 22A to 22C, circular, square, and rectangular markers 294, 296, and 298 are conceivable.

If a printed code is free from partial blur and an offset and almost accurate, since (approximate center=accurate center), accurate center detection (to be described later) may be omitted, and marker detection may be performed by only approximate center detection processing (to be described later). In this case, however, in order to detect an array direction, dots 294A, 296A, and 298A for array direction detection are arranged near the marker portions, respectively.

FIG. 23 shows another form of the multimedia information reproducing apparatus. In this apparatus, the A/D conversion section 210 in the detection section 184 is moved to the scan conversion section 186, and the functions of the block address detection section 228 and the block address error detection/correction section 230 in the data string adjusting section 192 are realized in the scan conversion section 186. Since the arrangements of the data error correction section 194 and the subsequent components are the same as those in FIG. 17, a description thereof will be omitted.

Figure 17:
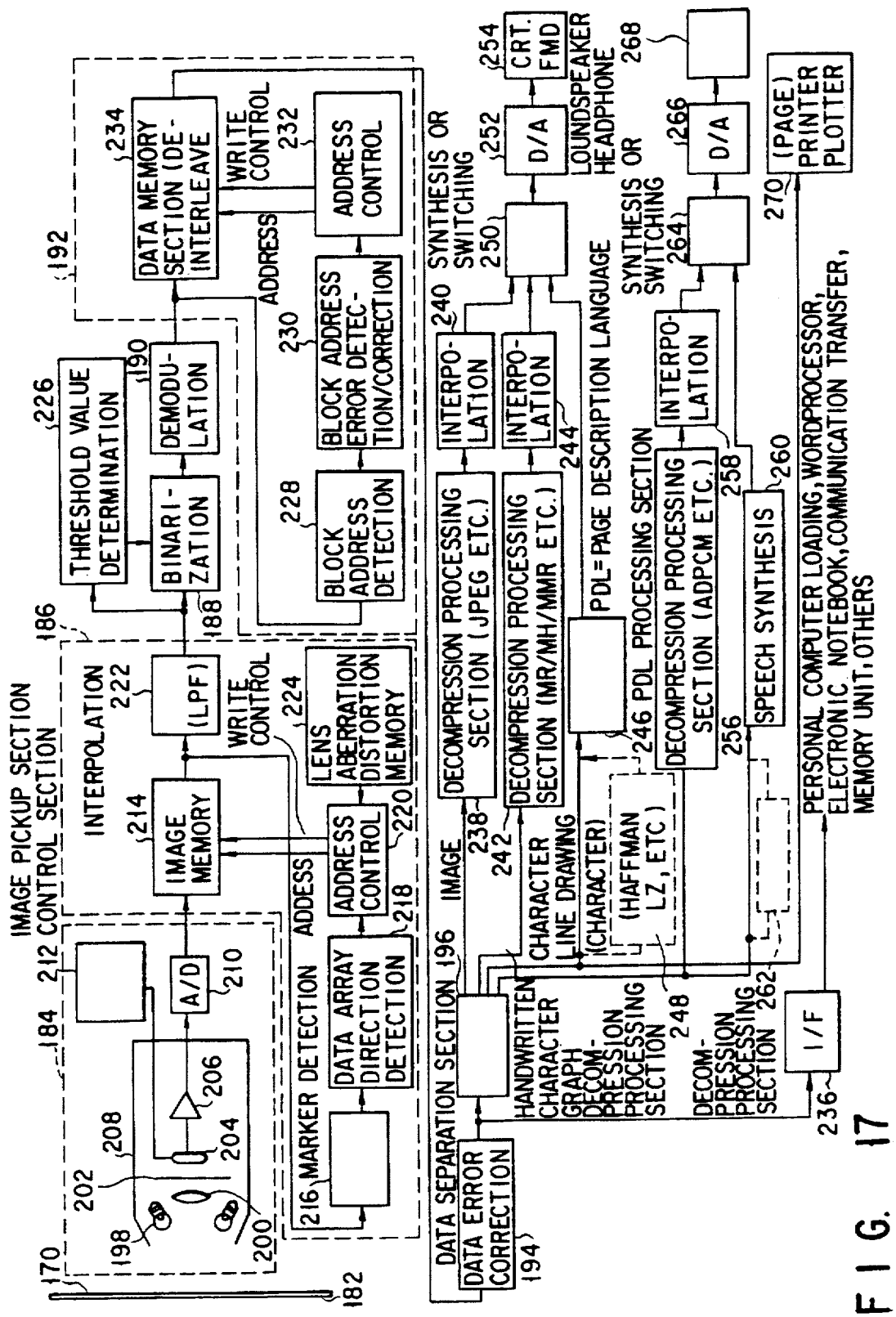
FIG. 17 is a block diagram showing an arrangement of a multimedia information reproducing apparatus.

That is, the greatest difference between the arrangement shown in FIG. 23 and that shown in FIG. 17 is in the scan conversion section 186 and the data string adjusting section 192. In this embodiment, the function of the data string adjusting section 192 is realized by simultaneously performing the operations of components, in the scan conversion section 186, ranging from the marker detection section 216 to the address control section 220. That is, a marker is detected by the marker detection section 216, and a data array direction, i.e., an inclination, a rotation, and a direction, is detected by the data array direction detection section 218. In a block address detection/error determination/accurate center detection section 300, a block address is detected, error detection therefor is performed, and a correct center, i.e., a true center, is detected depending on whether the block address is wrong. In this case, the block address is detected in detecting the true center. For this reason, after the marker and the block address are interpolated by a marker/block address interpolation section 302, the information on the block address is also supplied to the address control section 232 for the data memory section 234.

As in the arrangement shown in FIG. 17, address control is performed by the address control section 220 on the basis of the data obtained interpolating the block address, thereby performing address, write, and output control with respect to the image memory 214.

Other arrangements are functionally the same as those shown in FIG. 17.

Referring to FIGS. 17 and 23, in the detection section 184, data is converted into, e.g., 8-bit multi-value digital data by the A/D conversion section 210, and processing is performed afterward. However, the binarization processing section (comparator) 188 and the threshold value determination circuit 226 may be arranged in place of the A/D conversion section 210 to perform all the subsequent processing by using binary data.

In this case, the interpolation circuit 222 can use pixel data nearest (adjacent) to an interpolated address coordinates as data instead of performing so-called interpolation processing for interpolation of 4 or 16 points by using pixel data around the interpolated address coordinates obtained by the address control section 220, as shown in FIG. 5.

By performing processing upon binarization instead of A/D conversion, the number of signal lines and the data amount are reduced to ⅛ as compared with the case of, e.g., eight bits. Therefore, the memory capacity is reduced to ⅛, the circuit size, the processing amount can be greatly reduced, and the processing time can be greatly shortened. This contributes to a reduction in the size and cost of the apparatus, and the processing speed can be increased.

In the cases shown in FIGS. 17 and 23, an address output from the address control section 220 becomes pixel addresses of four points around an interpolated address coordinates when image data is output to the interpolation circuit 222, and becomes distance information with respect to the interpolation circuit 222 which is used to calculate a weighting coefficient for each pixel address through a signal line (not shown). Alternatively, each pixel address and interpolated address coordinate data may be sent to the interpolation circuit 222 to obtain the distance to each pixel address so as to obtain a weighting coefficient.

When processing using binary data is performed in the above manner, the address control section 220 outputs a pixel address near the interpolated address coordinates. In this case, therefore, the data output from the image memory 214 is input to the demodulating section 190.

A practical example of the dot code shown in FIG. 16 will be described below with reference to FIGS. 24A to 24D.

Figure 16:
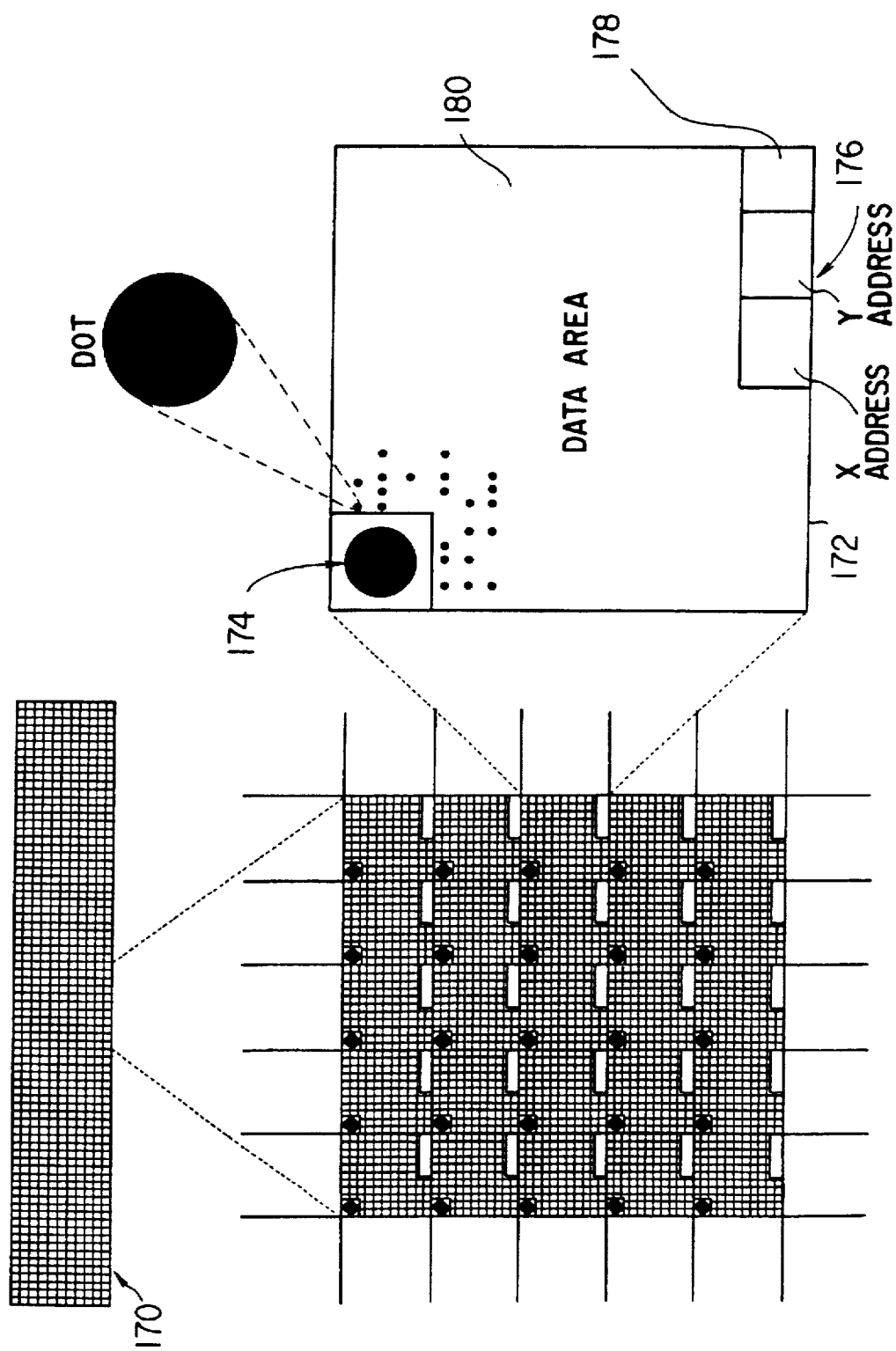
FIG. 16 is a view showing the concept of a dot code.
Figure 24A:
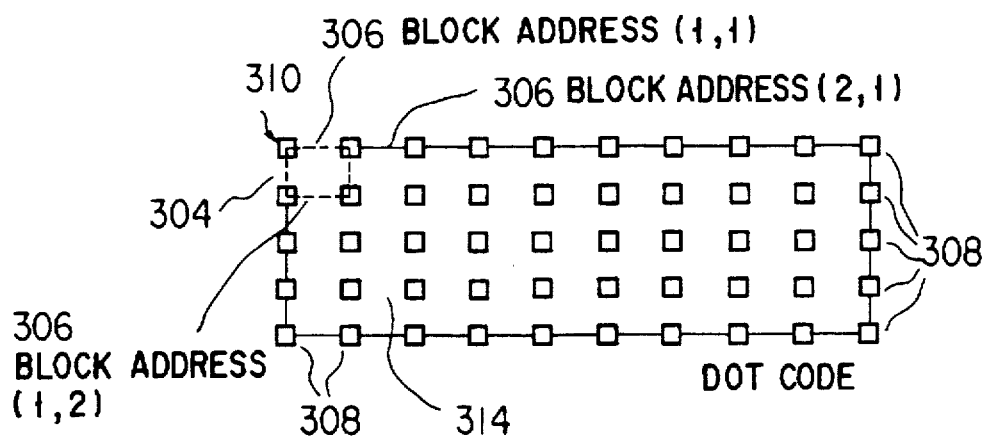
FIG. 24A is a view for explaining block addresses.

As is apparent from FIG. 16 as well, blocks 304 are two-dimensionally arranged, and block addresses 306 are respectively added to the blocks 304. An address corresponding to X and Y addresses is added to each block address 306. Assume, for example, that the block address of the block at the upper leftmost position in FIG. 24A is represented by (X address,Y address)=(1,1). The block address of the block located on the right side of the above block is (2,1). Similarly, the block addresses 306 are respectively added to all the blocks 304 with the X address being incremented rightward and the Y address being incremented downward.

Assume that the lowermost and rightmost markers are dummy markers 308. That is, the block 304 corresponding to a given marker 310 is lower right data enclosed with four markers 310 including the given marker, and the lowermost and rightmost markers are auxiliary markers, i.e., the dummy markers 308, arranged to define blocks corresponding to the second markers from the bottom and rightmost side.

Figure 24B:
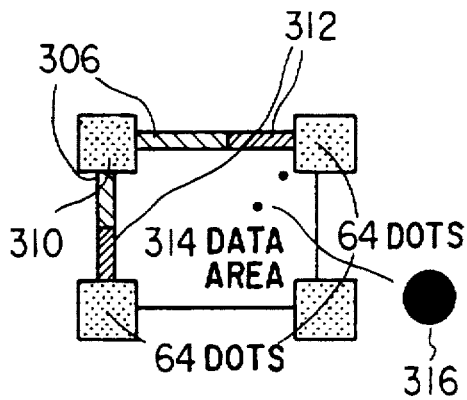
FIG. 24B is a view showing the arrangement of a block.

The contents of the block 304 will be described next. As shown in FIG. 24B, the block address 306 and an error detection code 312 are added to the marker 310 of the block 304 at a position between the marker 310 and the marker located therebelow. Similarly, the block address 306 and the error detection code 312 are added to the marker 310 at a position between the marker 310 and the marker located on the right side thereof. Referring to FIG. 16, a marker is located at an upper left position in a block, and a block address is located at a lower right position in the block. In this embodiment, the block addresses 306 are located on the left and upper sides of a block, and the marker 310 is located at the upper left corner of the block. Although the block addresses 306 are recorded at two positions in one block in this case, these addresses may be recorded at one position. However, block addresses are preferably recorded at two positions because even if an error is caused by noise in one block address, an address can be reliably detected by detecting the other address.

The positions of block data relative to markers, the position of the corresponding block addresses, the positions of dummy markers on codes which are determined by the positions of the block addresses, and the like are not limited to those described above.

Figure 24C:
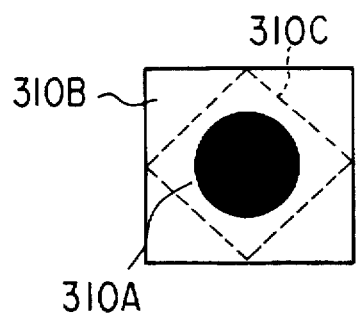
FIG. 24C is a view showing a marker pattern.
Figure 24D:
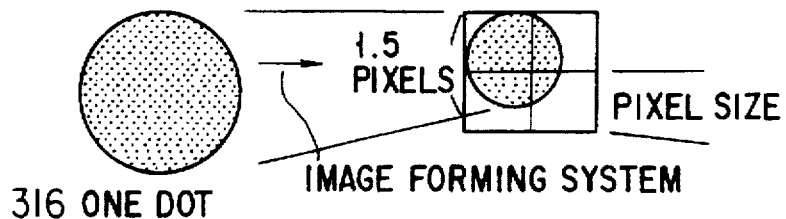
FIG. 24D is a view for explaining the magnification of an image formation system.

A pattern of the marker 310 will be described next. As shown in FIG. 24C, in this embodiment, a pattern 310A of a black circle having a diameter corresponding to seven dots is used as the marker 310. A white portion 310B is arranged around the black circle 310A to facilitate discrimination of the black portion of the marker. Reference numeral 310C in FIG. 24C denotes an auxiliary line used to explain the marker.

The range of the white portion 310B is preferably minimized to increase the recording density, but is preferably maximized to easily and quickly perform marker detection processing. For this reason, the range 310C for allowing the pattern 310A to be sufficiently discriminated when the rotational angle is 45° is set within the portion 310B.

The magnification of the image formation optical system 200 in FIGS. 17 and 23 is set such that the size of a data dot 316 in a data area 314 becomes a value corresponding to 1.5 pixels under the condition to be described later. In this case, a pixel means one pixel of the image pickup element of the image pickup section 204. That is, one dot, e.g., a dot having a dot size of 30 to 40 μm, recorded on the sheet 182 is focused into a dot having a dot size corresponding to 1.5 pixels, on the image pickup element, each of which generally has a size of 7 or 10 μm, through an image formation system lens. According to the sampling theorem, the pixel pitch may be set to be smaller than the dot pitch. In this case, for a reliable operation, the pixel pitch will be set to be 1.5 pixels. Note that in the above case wherein binarization is employed instead of A/D conversion, the pixel pitch is set to be two pixels for the sake of a more reliable operation.

By employing the above two-dimensional block division scheme, the following advantages can be obtained:

If the dot pitch of dots is below the resolution of an image pickup element, a code (a set of unit data blocks) can be read even with a change in data dot size;

Even if the image pickup section 204 is inclined with respect to a code, the code can be read;

Even if a sheet locally decompresses/contracts, a reproducing operation can be performed. Even if a sheet is rotated, a read operation can be performed;

Unit blocks can be two-dimensionally arranged freely in accordance with a total data amount. As a result, the code size can be freely changed;

Since a block address is added to each block, a reproducing operation can be performed even if a read operation is started from an intermediate portion of a code;

The shape of a code can be arbitrarily arranged in units of blocks in accordance with, e.g., characters, pictures, and graphs. FIG. 24A shows a rectangular dot code. However, a dot code may have a hook-like shape or slightly deformed; and Neither a predetermined start code nor a predetermined stop code as in a bar code is required, and no clock code is required.

Owing to these characteristic features, a reproducing operation can be performed regardless of a shake of a hand of the user. Therefore, the present invention can be easily applied to a handy reproducing apparatus.

Although a detailed description is omitted, four adjacent markers are detected on the reproducing apparatus side to divide the portion between the markers into equal parts equal in number to the number of dots. Therefore, the apparatus is capable of effectively standing enlargement, reduction, deformation, and the like and is resistant to a shake of a hand of the user.

With regard to the data dot 316 in the data area 314, one dot has a size of several tens μm. This size can be reduced to a level of several μm depending on an application or use. In general, however, the size is 40, 20, or 80 μm. The data area 314 has a size of, e.g., 64×64 dots. These sizes can be increased or decreased within a range in which an error due to the above equal division scheme can be absorbed. In addition, the above marker 310 has not only the function of a sync signal but also the function of a position index. This marker has a size different from that of modulated data. In this example, for example, the marker has a circular shape and a size of seven dots or more, each identical to a dot in the data area 314, or the circular black marker 310A having a diameter corresponding to about 7×7 dots is used.

An inclination, a rotation, and the like in a reproducing operation will be described below.

The inclination of the image pickup section 204 indicates a state wherein the user holds the reproducing apparatus obliquely, which should be held to be perpendicular to the sheet 182 on which a dot code is printed, and the apparatus is held obliquely with respect to the sheet 182. The rotation of the image pickup section 204 indicates a state wherein the imaging area (see FIG. 4A) is not parallel to the dot code written on the sheet 182.

When the above inclination occurs, an image obtained by the image pickup section 204 is smaller in size than an image obtained when the image pickup section 204 is perpendicular to the sheet. If, for example, the image pickup section 204 is inclined at 30°, an apparent projected image is reduced to 86.5%. That is, if, for example, the image pickup section 204 is inclined at 30° in the horizontal direction with respect to the vertical direction when a block is square, a block image is 0.865 times that obtained without any inclination in the horizontal direction even though the size in the vertical direction remains the same. The resultant block image is rectangular. With such an inclination, if the apparatus has a clock for internal synchronization, since the respective components are operated by equal-interval clocks, the resultant data may not coincide with intrinsic data.

If a rotation is considered only in terms of horizontal and vertical directions, true data is obliquely shifted upward or downward. As a result, true information cannot be obtained. In addition, if a complex state of inclination and rotation occurs, an image of a square block becomes a rhombus as an imaging result. Therefore, the condition that horizontal and vertical data arrays are perpendicular cannot be satisfied.

The marker detection section 216 for solving these problems will be described below. As shown in FIG. 25, the marker detection section 216 is constituted by a marker determination section 318 for extracting a marker from a code and determining it, a marker area detection section 320 for detecting an area in which the marker is present, and an approximate center detection section 322 for detecting an approximate center of the marker.

The marker determination section 318 searches for 7 or more and 13 or less consecutive black pixels. If such consecutive black pixels continue for seven lines, the marker determination section 318 recognizes the pixels as the circular black marker 310A. As shown in FIG. 26, first of all, the marker determination section 318 binarizes image data read out from the image memory 214, and identifies each pixel as a black or white pixel (step S32). The marker determination section 318 detects consecutive black pixels in the X-axis direction in the image memory 214 (step S34). That is, the marker determination section 318 detects 7 or more and 13 or less consecutive black pixels. The marker determination section 318 then checks whether a pixel shifted from the middle pixel between the first and last black pixels of the consecutive pixels in the Y-axis direction by one pixel is a black pixel (step S36). If this continues seven times in the Y-axis direction (step S38), the marker determination section 318 determines that the corresponding pixels are the circular black marker 310A (step S40). If no consecutive black pixels are detected in step S34 or it is determined in step S36 that the pixel is not a black pixel, the marker determination section 318 does not determine the corresponding pixels as a marker (step S42).

Assume that the marker determination section 318 checked markers in the image memory and found a line having seven consecutive black pixels. In this case, the marker determination section 318 checks whether a point shifted from the middle point between the first and last black pixels of the consecutive black pixels in the Y-axis direction by one pixel is a black pixel. If it is a black pixel, the marker determination section 318 checks whether 7 to 13 consecutive black pixels on the left and right side of the black pixel are black pixels. The marker determination section 318 performs a similar operation while shifting the point pixel by pixel in the Y-axis direction. If this operation is repeated seven times in the Y-axis direction finally, the corresponding portion is determined as the circular black marker 310A.

Note that "7" as the minimum value for checking consecutive black pixels in the X- and Y-axis directions is a value for discriminating/determining the black portion (circular black marker 310A) of the marker 310 from modulated data. More specifically, this value is the lower limit value set to discriminate the data area 314 from the circular black marker 310A regardless of contraction or inclination of the paper sheet. "13" as the maximum value is the upper limit value set in consideration of decompression of the paper sheet, an ink blur, and the like. This value serves to prevent noise such as dust or a flaw larger than a marker from being erroneously detected as a marker.

In addition, since a marker pattern 30A is circular, no consideration need be given to a rotation. Therefore, the difference between the lower and upper limit values can be minimized, thereby reducing the frequency of erroneous detection of markers.

The range of the circular black marker 310A determined by the marker determination section 318 is slightly decompressed/contracted or deformed because of an inclination, a change in image magnification, and the like. Therefore, the marker area detection section 320 serves to detect a specific area in which the black range is located.

As shown in FIG. 27, first of all, the marker area detection section 320 detects a temporary central pixel of the circular black marker 310A determined by the marker determination section 318 (step S52). That is, one pixel near the center of the range determined by the marker determination section 318 is detected as a temporary central pixel.

The marker area detection section 320 checks the presence of a black pixel upward (the minus direction on the Y axis) from the temporary central pixel. If a white pixel is detected, the marker area detection section 320 checks a few pixels on the left and right sides of the white pixel. If a black pixel is detected, the marker area detection section 320 checks pixels upward in the same manner as described above up to a Y address at which no black pixel is present. Then, if a black pixel is not detected, the marker area detection section 320 sets the Y address in a Ymin register (see FIG. 28A) (step S54). Similarly, the marker area detection section 320 checks the presence of a black pixel downward (in the plus direction on the Y axis) from the temporary central pixel. If a white pixel is detected, the marker area detection section 320 checks a few pixels on the left and right sides of the white pixel. If a black pixel is detected, the marker area detection section 320 checks pixels downward in the same manner as described above up to a Y address at which no black pixel is present. Then, if a black pixel is not detected, the marker area detection section 320 sets the Y address in a Ymax register (step S56).

Subsequently, the marker area detection section 320 checks the presence of a black pixel leftward (in the minus direction on the X axis) from the temporary central pixel. If a white pixel is detected, the marker area detection section 320 checks whether a few pixels on the upper and lower sides of the white pixel are black pixels. If they are black pixels, the marker area detection section 320 checks pixels leftward in the same manner as described above up to an X address at which no black pixel is present. Then, if a black pixel is not detected, the marker area detection section 320 sets the X address in an Xmin register (step S58). Similarly, the marker area detection section 320 checks the presence of a black pixel rightward (the plus direction on the X axis) from the temporary central pixel. If a white pixel is detected, the marker area detection section 320 checks a few pixels on the upper and lower sides of the white pixel. If a black pixel is detected, the marker area detection section 320 checks pixels rightward in the same manner as described above up to an X address at which no black pixel is present. Then, if a black pixel is not detected, the marker area detection section 320 sets the X address in an Xmax register (step S60).

A marker area 324 is selected by using the values of the Xmin, Xmax, Ymin, and Ymax registers which are obtained in the above manner, as indicated by the table shown in FIG. 28B (step S62). That is, instead of the square range including the circular black marker 310A, the hatched area in FIG. 28A, obtained by omitting the corner portions of the range, is selected as the marker area 324. The marker area 324 may be rectangular. In practice, however, data is present around the white portion 310B of the marker 310. This data may be influenced by a spatial filter, and information or the like of the black data portion may enter the white portion 310B to enter the marker area 324 for calculating an approximate center. In order to prevent this, it is preferable that the marker area 324 be a minimum necessary range. In this case, an area which has the same shape as that of the circular black marker 310A, i.e., a circular shape, and is larger than the circular black marker 310A may be set. In this embodiment, however, since the circular black marker 310A is a small circle having a diameter corresponding to seven dots, the marker area 324 has a shape like the one shown in FIG. 28A.

The approximate center detection section 322 serves to find the approximate center of a marker in a marker area detected by the marker area detection section 320 in this manner. In printing or the like, a dot is generally decompressed to have a size larger than an intended size (this phenomenon is called dot gain) because of decompression of the ink or contracted to have a size smaller than the intended size (this phenomenon is called dot reduction). In addition, the ink may spread or soak in one side. As countermeasures against such dot gain, dot reduction, and soaking of an ink, the approximate center detection section 322 obtains the center, i.e., the center of gravity, of an image of the circular black marker 310A, and sets it as an approximate center. In this case, this processing is performed to obtain the above center with a precision corresponding to a value smaller than one pixel pitch.

First of all, the marker area 324 on the image is divided into two portions in the X- and Y-axis directions in the image memory 214, and the central lines of the respective portions on the X and Y axes are detected, thereby obtaining a final center, i.e., an approximate center. FIGS. 28C and 28D respectively show the cumulative values of the respective pixels in FIG. 28A in the vertical and horizontal directions. The center of gravity corresponds to a position of ½ the total cumulative value, i.e., a portion where the vertical and horizontal cumulative values become equal to each other.

Referring to FIG. 28C, assume that a result Sxl obtained by adding the respective cumulative values of the hatched portion in FIG. 28C is less than ½ a total area S, and a value obtained by adding a next portion Sxc to the result Sxl exceeds ½ the total area. In this case, it can be determined that a central line X including an approximate center is included in the array Sxc. That is, with regard to the X address of the approximate center, when a value obtained by accumulating the cumulative values of the respective arrays (Xk) from the left side (in the Xmin direction) to the (X'+1)th array exceeds ½ the total cumulative value, the approximate center is present between the X'th array and the (X'+1)th array. If the (X'+1)th array is divided into left and right portions such that a value obtained by adding the left or right portion to the cumulative value of X' arrays becomes ½ the total area, the division line includes the approximate center.

The ratio of a portion obtained by subtracting the cumulative value of the X arrays from ½ the total area, i.e., (½)S−Sxl to the cumulative value Sxc of the middle array is represented by Δx (approximate center=X'+Δx).

This operation will be described below with reference to the flow chart in FIG. 29.

First of all, normalization is performed (step S72). More specifically, data in the image memory 214 is normalized as data having gradation of multi-value data by setting a white data portion to be "0", and black data, for example, "1", so as not to influence accumulation even if peripheral portions are added with respect to the respective data of the marker area 324. Since the peripheral portions are blurred by a spatial filter and the like, this operation is performed to accurately recognize such a state so as to accurately detect the center of gravity. Subsequently, a cumulative value Sk of each array Xk (K=min, min+1, . . . , max) is obtained (step S74), and a center-of-gravity calculation subroutine is called (step S76).

In the center-of-gravity calculation subroutine, as shown in FIG. 30, the total area S is obtained, ½ the total area is represented by Sh, and Sl is set to be 0 (step S92). A value is set from the leftmost array, i.e., i=min (step S94), and Sl'=Sl=Si is calculated (step S96). Since Sl=0 at first, Sl=Si, and Sl'=Smin. Subsequently, Sl' is compared with Sh, i.e., ½ the total area (step S98). If Sl' does not exceed Sh, i is incremented (step S100), and Sl' is set to Sl (step S102). The processing is repeated from step S96 described above, thereby accumulating the next array. When the accumulation result exceeds ½ the total area, Sl is subtracted from S/2, and the resultant value is divided by Si, thereby obtaining Δx (step S104). A value obtained by adding Δx to i, i.e., X' is represented by C (step S106), and the flow returns to the main routine.

In the main routine, the value of C is set as the X-coordinate of the approximate center (step S78).

Similar processing is performed in each row direction in steps S80 to S84 to obtain the Y-coordinate, and X and Y are set as values indicating the approximate center of the marker (step S86).

Figure 31:
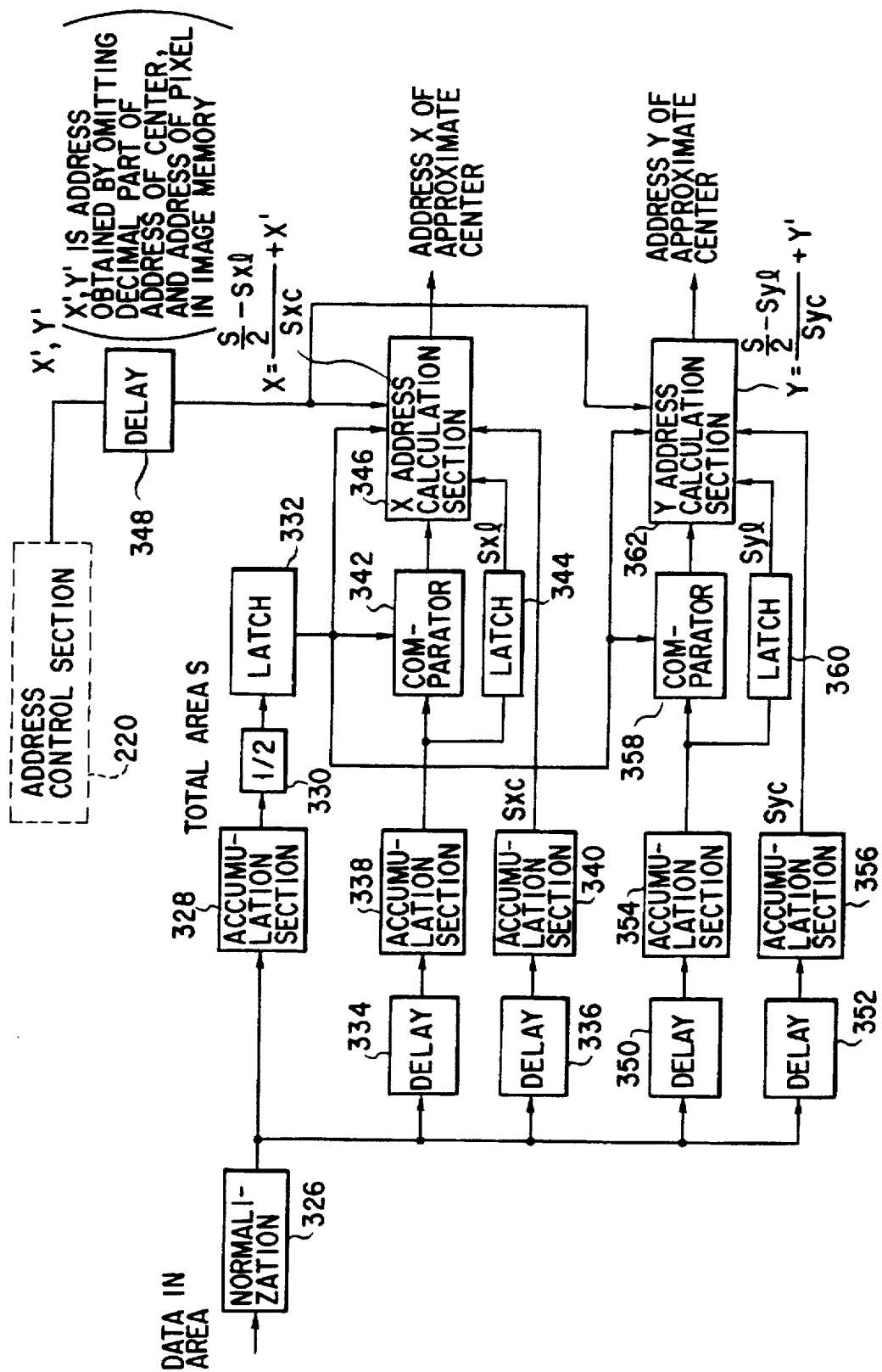
FIG. 31 is a block diagram showing the arrangement of the approximate center detection section.

FIG. 31 shows an arrangement for realizing such processing.

A normalization circuit 326 performs normalization while setting white data as "0"; and black data, "1". Outputs from the normalization circuit 326 are accumulated by an accumulation section 328 to calculate the total area S. The cumulative value is multiplied by ½ by a ½ multiplying section 330 and latched in a latch circuit 332.

Meanwhile, the outputs from the normalization circuit 326 which correspond to blocks in the X-axis direction are delayed by delay circuits 334 and 336, and the respective arrays are sequentially accumulated from the left side by an accumulation section 338, and accumulation is performed in units of arrays by an accumulation section 340. When the result is to be output, a portion of a central array Sxc is output.

A comparator 342 compares the ½ area latched in the latch circuit 332 with the cumulative value of the respective arrays accumulated by the accumulation section 338. A latch 344 serves to store a determination timing and the accumulation of preceding arrays. When the comparator 342 determines that the cumulative value exceeds the ½ area, an X address calculation section 346 calculates the X address of the final approximate center of the marker from the ½ area latched in the latch circuit 332, Sxl latched in the latch 344, a cumulative value Sxc from the accumulation section 340, an address corresponding to the above value X' supplied from the address control section 220 through a delay circuit 348.

Similarly, the Y address of the approximate center of the marker is calculated by using delay circuits 350 and 352, accumulation sections 354 and 356, a comparator 358, a latch 360, and a Y address calculation section 362. Note that in this case, the delay circuits 350 and 352 are constituted by line memories.

In this case, the delay circuits 334, 336, 350, and 352 are circuits for adjusting the output timings of S/2, Sxl, Sxc, Syl, and Syc to the required timings of the X and Y address calculation sections 346 and 362.

The data array direction detection section 218 will be described next. For the sake of descriptive convenience, the arrangement of the respective blocks 304 of the dot code will be described in detail first. The blocks 304 of the dot code are arranged as shown in FIG. 24B. FIG. 32 shows the arrangement in more detail. That is, the block address 306 can be divided into an upper address code 306A and a lower address code 306B. The error detection code 312 can also be divided into an upper address CRC code 312A and a lower address CRC code 312B. The lower address code 306B is arranged on a side of the marker 310, and the upper address code 306A larger than the lower address code 306B is arranged on its side. The upper address CRC code 312A having the same size as that of the upper address code 306A is added thereto. Furthermore, the lower address CRC code 312B having the same size as that of the lower address code 306B is added to the upper address CRC code 312A.

A block address and error detection data are also arranged under the marker 310 toward the lower marker in the order described above.

In this case, a combination of the upper address code 306A and the upper address CRC code 312A will be referred to as a step 1 code; and a combination of the lower address code 306B and the lower address CRC code 312B, a step 2 code.

In addition, the lower address code 306B can be decomposed as follows. On the right side of the marker 310, codes inverted with respect to the data of each of dots representing lower address data are written on the upper and lower sides of the data (on the left and right sides of the data of the code under the marker 310). In addition, data marginal portions 364 are arranged to discriminate the code from the upper and lower data areas 314. Note that these data marginal portions 364 may be omitted. Inverted codes are added to not only a lower address code but also an upper address code. In this case, for easy understanding of data, each dot is indicated by a circle. In practice, however, a white circle indicates the absence of a dot to be printed. That is, no white circle can be printed. Each white circle in the subsequent drawings indicates the same.

In this case, upper and lower addresses are set such that when, for example, the entire address consists of 12 bits, the first 4 bits are assigned to the upper address, and the next 8 bits are assigned to the lower address. The data lengths of such addresses can be changed in accordance with an apparatus, as needed. An entire block address is basically designed such that the first bit to a specific bit are assigned to an upper address, and the subsequent bit to the last bit are assigned to a lower address.

As described above, address codes are arranged in the horizontal and vertical directions. With this arrangement, even if address code detection in one direction fails, the other address code can be detected.

The arrangement of another dot code will be described with reference to FIG. 33. FIG. 33 shows a dot code from which the address codes in the vertical direction in FIG. 32 are omitted. Since address codes are arranged only in one direction, an increase in data area and processing speed can be realized. Since address codes are arranged only in one direction, if an address code cannot be detected, the address of the corresponding block cannot be detected. However, the address can be obtained with address interpolation processing to be described later.

Referring to FIG. 33, block address codes are arranged only between markers in the horizontal direction. However, dot codes may have block addresses arranged only in the vertical direction.

Alternatively, as shown in FIG. 34, an upper address code 306A may be arranged between lower address codes 306B, and an upper address CRC code 312A may be arranged between lower address CRC codes 312B.

Processing will be described below with reference to the dot code shown in FIG. 32. Only processing unique to the dot code shown in FIG. 33 will be additionally described.

Figure 36:
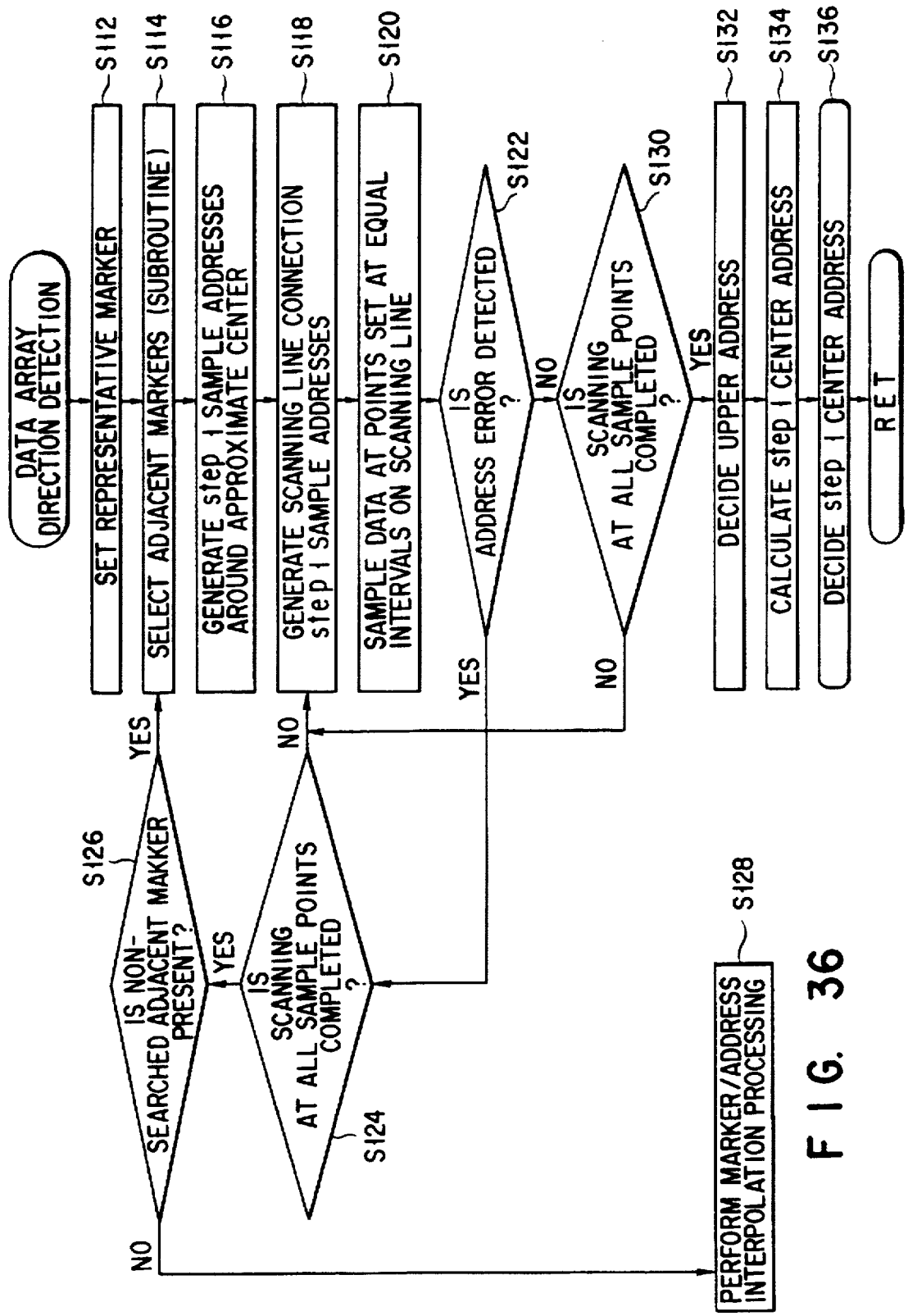
FIG. 36 is a flow chart showing the operation of the data array direction detection section.

FIGS. 35 and 36 are a block diagram showing the arrangement of the data array direction detection section 218 in FIG. 23 and a flow chart showing its operation.

The data array direction detection section 218 receives the data of the approximate center of a marker from the approximate center detection section 322 in the marker detection section 216, and selects an adjacent marker in an adjacent marker selection section 366. That is, the addresses of the centers of the respective markers have been mapped on a screen by the processing performed by the approximate center detection section 322. A representative marker to be currently processed, i.e., a target marker, is selected from these markers (step S112), and adjacent marker selection is performed to detect a marker whose approximate center is nearest to the representative marker (step S114).

Figure 37:
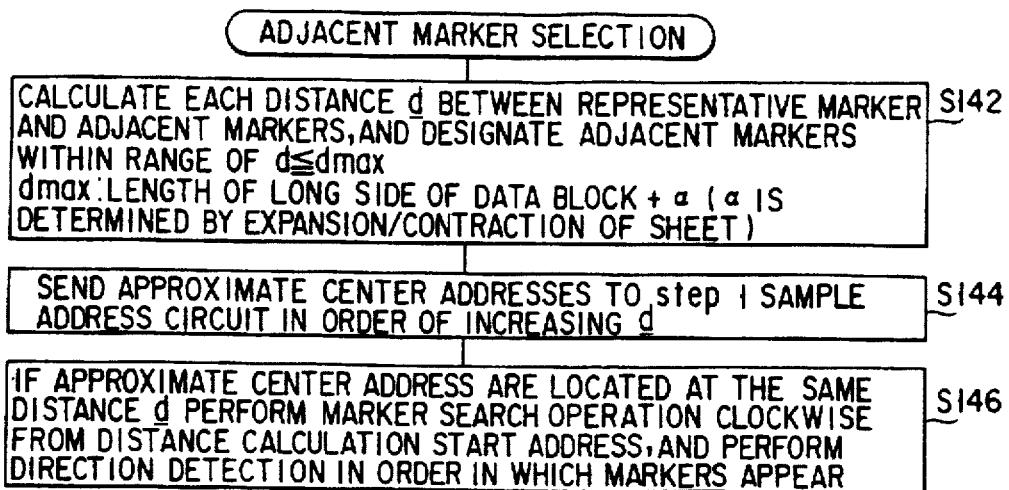
FIG. 37 is a flow chart showing an adjacent marker selection subroutine in FIG. 36.
Figures 38A, 38B:
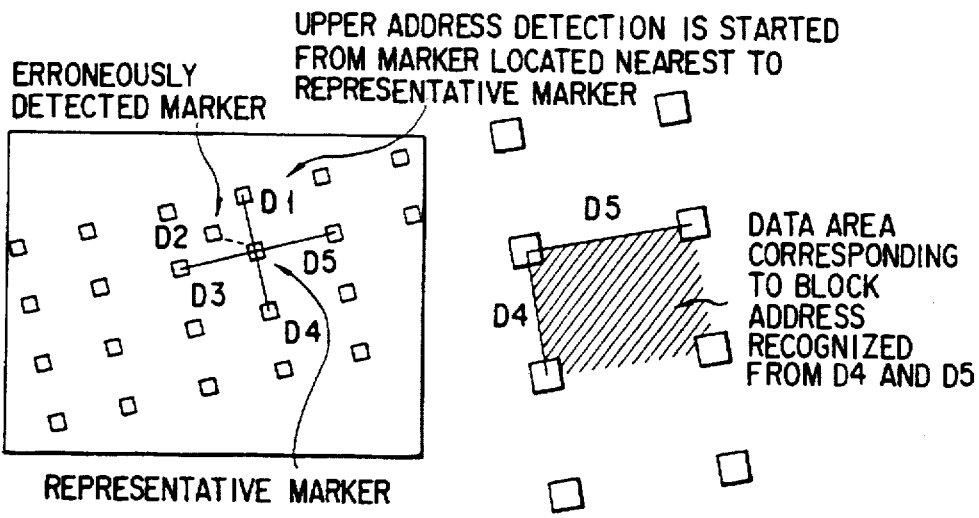
FIGS. 38A and 38B are views for explaining adjacent marker selection.

As shown in FIG. 37, in adjacent marker selection processing, each distance d between the representative-marker and the adjacent markers is calculated, and adjacent markers within the range of $d \leq dmax$ are designated (step S142). In this case, dmax represents the length of a longer side of a data block+$\alpha$ ($\alpha$ is determined by decompression/contraction of a paper sheet). Thereafter, the approximate center addresses of the designated adjacent markers are supplied to a step 1 sample address generation circuit 368 in an order from shorter distances d (step S144). Referring to FIG. 38A, for example, an approximate center address at a distance D2 from the representative marker is nearest thereto, and approximate center addresses at distances D1 and D4 are next nearest to the representative marker, and approximate center addresses at distances D3 and D5 come next. Therefore, the approximate center address at the nearest distance D2 is supplied first. If approximate center addresses are located at the same distance d, a marker search operation is performed clockwise from a distance calculation start address, and direction detection is performed in the order in which markers appear (step S146). That is, the approximate center addresses at the distances D1, D4, D3, and D5 are sequentially supplied to the step 1 sample address generation circuit 368 to perform direction detection to be described later.

More specifically, the step 1 sample address generation circuit 368 generates step 1 sample addresses on the basis of the representative marker and the approximate center of the selected adjacent marker (step S116), and generates scanning lines connecting these step 1 sample addresses (step S118). The step 1 sample address generation circuit 368 then generates read addresses to sample data in the image memory 214 at points set at equal intervals on the scanning lines (step S120). The address control section 220 supplies the addresses at these sample points as read addresses to the image memory 214, thereby reading out data.

According to the above description, data at a sample point is approximated and output (from the image memory). However, as shown in FIG. 5, if it is determined that a sample point is present between data in the image memory, data may be obtained from the data of four pixels around the sample point by interpolation.

After the data read out by this operation, i.e., the upper address code, is subjected to error detection in an error detection circuit 370, the resultant data is supplied to an upper block address calculation and center calculation circuit 372. If the error detection result obtained by the error detection circuit 370 indicates the presence of an error, the upper block address calculation and center calculation circuit 372 supplies the address calculation result to the adjacent marker selection section 366 to cause it to perform the next adjacent marker selection processing. If markers in two directions are detected, the upper block address calculation and center calculation circuit 372 also supplies the address calculation result to the adjacent marker selection section 366 to cause it to finish adjacent marker selection processing because any adjacent markers need not be detected any more.

If the dot code shown in FIG. 33 is used, marker selection processing is finished when the upper address codes in one direction are detected.

If the presence of an address error is indicated by this address calculation result (step S122), it is determined whether scanning all the sample points is completed (step S124). If scanning is not completed, the flow advances to step S118. If scanning is completed, the presence/absence of a non-detected adjacent marker is checked (step S126). If a non-detected adjacent marker is present, the flow advances to step S114 described above. If no such marker is present, all the markers are processed in the same manner. After processing for all the markers is completed, the flow advances to marker/address interpolation processing (step S128).

Note that the error detection circuit 370 may use a general error detection scheme such as an error detection scheme based on cyclic codes, which is disclosed in, e.g., "Introduction to Coding Theory", the Journal of Television Institution, Vol. 44, No. 11, PP. 1549–1555.

If it is determined in step S122 that no address error is present, it is determined whether scanning at all the sample points is completed (step S130). If scanning is not completed, the flow advances to step S118 described above. If scanning at all the sample points is completed, an upper address is decided (step S132), and a step 1 center address is calculated (step S134) and decided (step S136).

A direction detection is begun with a marker at the shortest distance from the representative marker (in FIG. 38A, the approximate center address is at the distance D2). According to a detection method, specific directions in which peripheral markers are present are determined depending on whether addresses recorded on dot codes (step 1 codes) for direction detection, which is larger than a data dot are recognized or not. An upper block address and its CRC code are recorded in a step 1 code. If no error is detected in scanning the code, it is regarded that the code is recognized.

When the direction is detected, the inclination of the data block can be estimated. A step 1 code has directivity, and a block address is properly recognized only when scanning is performed from a representative marker toward a peripheral marker. If, therefore, no recognition error occurs, block address codes in two directions are always detected. Processing is performed until block address codes in two directions are detected. A data array can be estimated from the positional relationship between the two directions (see FIG. 38B).

Figure 39:
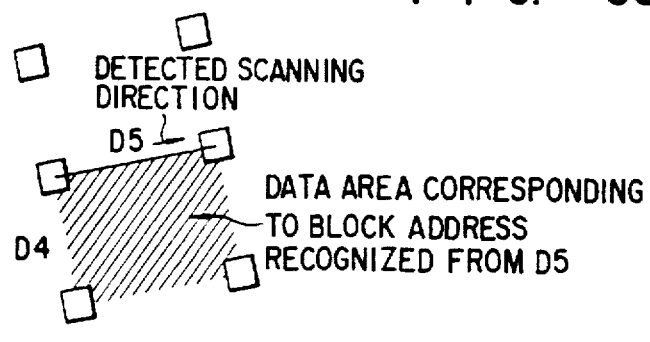
FIG. 39 is a view for explaining adjacent marker selection.

When the dot code shown in FIG. 33 is to be used, address codes are detected in only one direction. In this case, a data area can be recognized from a detected line and a scanning direction (FIG. 39).

In an actual operation, direction detection is started from the distance D2 as the shortest distance from the representative marker. If no address is recognized, a search operation is performed clockwise. Therefore, a similar operation is repeated at the next shortest distance D1. When detection is to be performed clockwise, detection is repeated at the distances D4, D3, and D5. Processing is performed until two directions are detected.

In the case shown in FIG. 33, processing is performed until one direction is detected.

If one direction can be detected, the other direction may be estimated. Assume that D4 and D5 are in the forward direction, D2 is not present, and a search is started from D4. In this case, if an address is recognized at D4, it can be estimated that an address can be recognized at either D3 or D5.

The above direction detection processing will be described in more detail below with reference to FIG. 40A.

Figure 40:
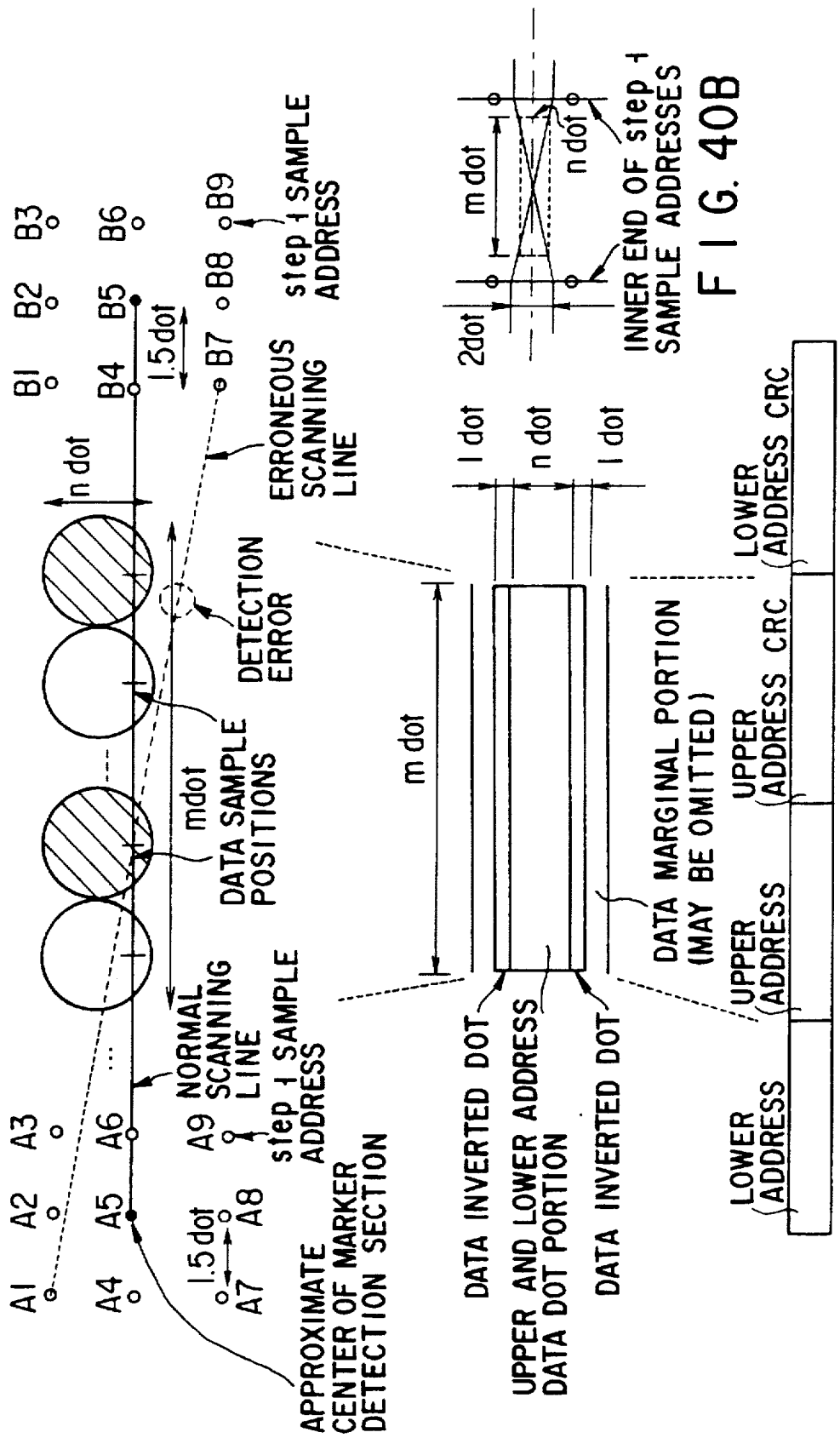
FIG. 40A is a view for explaining direction detection.
FIG. 40B is a view for explaining the relationship between m and n in FIG. 40A.

The approximate center of the representative marker, which is detected by the approximate center detection section 322 in the marker detection section 216, is defined as a dot A5 on the upper left side in FIG. 40A, and the step 1 sample address generation circuit 368 generates eight sample points A1 to A4 and A6 to A9, each separated from the dot A5 by 1.5 dots (this value can be changed depending on processing, as needed). Similarly, sample addresses are generated around the approximate center (a dot B5 on the upper right side in FIG. 40A) of a marker, e.g., the marker at the distance D2, from which direction detection is to be performed.

The reason why dots are arranged at 1.5-dot intervals will be described below.

In the above description, when processing for obtaining an approximate marker center is to be performed, a difference from the center is within one dot. In this case, however, it is assumed that any inconvenience such as an ink blur does not occur. The detection range is set to be q1.5 dots in consideration of an ink blur and the like.

The address control section 220 draws predetermined lines between the addresses of two markers. A scanning line is drawn between dots A1 and B1 at first. A sample clock is set to allow sampling of an upper address, thereby sampling data in the image memory 214.

As shown in FIG. 32, the upper address CRC code 312A is added to the upper address code 306A. For this reason, when data is properly read by the data sampling operation, an error detection result obtained by the error detection circuit 370 with respect to the upper address indicates that no problem is posed. When data is not properly read, the presence of an error is determined.

Similarly, scanning lines are sequentially drawn between the dot A1 and a dot B2, the dot A1 and a dot B3, and the dot A1 and a dot B4 to determine for each scanning line whether error detection is proper. Since there are nine positions on the representative marker side, and nine positions on the detection marker side, a total of 81 processes are performed.

If errors are detected in all the 81 processes, it is determined that no direction code is present in the corresponding direction, i.e., the detection-side marker is marker other than an array (erroneously detected marker).

Assume that data is sampled at each sample point on a scanning line (indicated by the dotted line) drawn between the dot A1 and a dot B7 in FIG. 40A. In this case, since a sample point indicated by the broken circle in FIG. 40A is located outside data, a detection error occurs. Especially, as described above, since inverted codes are arranged on the upper and lower sides of each data dot, an error always occurs.

If a line is drawn between dots A5 and B5, since data is properly detected, no detection error occurs. Therefore, it is recognized that a code is present in the corresponding direction.

Although inverted codes are arranged on the upper and lower sides of each data dot to facilitate error detection, these codes need not always be arranged on the upper and lower sides. For example, white codes may be written on the upper and lower sides of each address data dot, and address data dots may be written such that black data continues by a few dots in the latter half of the address data dot portion. With this form, an end portion on the detection marker side is always black data, and white marginal portions are set outside the data. Therefore, a data error can be properly detected. In addition, inverted codes need not be set throughout the entire inverted code portions but may be partly set on the both sides (FIG. 41).

The size of a dot will be described below. As shown in FIG. 40B, assume that the size of each dot of the upper address code 306A is represented by n dots, and the width of a step 1 code is represented by m dots. In this case, m and n have the following relationship. Widths, each corresponding to two dots with respect to the center, are set on the inner ends of the step 1 sample address, and diagonal lines are drawn. The height of a rectangle having a width m, which is determined depending on how long the upper address code 306A is set, as a long side, and diagonal lines coinciding with the above diagonal lines is represented by n. That is, when m is determined, n is inevitably determined. Even if the entire portion between the inner ends of the step 1 sample address is this address code, since the width corresponds to only two dots, n dots correspond to a width of two dots. Although the width of a dot is not determined, a width allowing easy recognition of data is preferable.

Note that the above two bits are defined to obtain a range in which a hit can be gained on a scanning line connecting, e.g., the dots A5 and B5, but no hit can be gained on a line connecting a dot A6 and the dot B4 and a line connecting dots A2 and B8. Assume that a larger value is defined as the number of dots. In this case, if, for example, a hit is gained on a line connecting the dots A5 and B5, a hit is also gained on a line connecting the dots A2 and B8. As a result, the detection range of a center is widened. This value can also be changed in accordance with an apparatus.

In the case shown in FIG. 40A, a hit is gained on a line connecting the dots A5 and B5. If, however, a hit is also gained on a line connecting a dot A4 and the dot B5, the center between the dots A4 and A5 is set as a start point in the stage of the step 2 of center detection, and a search operation is performed on the basis of the center in the same manner as described above.

Another method is also conceivable. This method will be described with reference to FIG. 42. In this case, if hits are gained on not only a line connecting dots A4 and A5 but also a line connecting dots B4 and B5 on one side, sample addresses (A41 to A45, A51 to A55, B41 to B45, and B51 to B55) shown in FIG. 42 may be used as sample addresses in the next step 2. In this case, since the number of sample address points of the step 2 increases from 9 to 10, the number of processes also increases from 81 to 100 (scanning lines). However, since the processing of obtaining the middle point between the dots A4 and A5 and predetermined sample points are used, the processing of generating slope pull addresses of the step 2 at nine points around a middle point need not be performed. It seems that the processing is reduced as a whole.

Assume that the accurate center of the step 2 is present between the dots A4 and A5, and address detection processing is performed on scanning lines connecting the dots A42 to A44, the dots A52 to A54, the dots B42 to B44, and the dots B52 to B54. In this case, the number of processes can be decreased from 81 to 36 (6×6).

In the above processing, a rough center in step 1 is obtained.

As described above, by detecting a CRC, whether data blocks are regularly arranged in the corresponding direction is detected. Referring to FIG. 38A, as is apparent, since the marker at the distance D2 is a marker erroneously detected, if a search for data is performed in that direction, no upper address code is present. Therefore, errors occur in the direction in all 81 detecting operations. As a result, the absence of a direction is determined.

If the absence of D2 is determined in this manner, D1 and D4 are the next shortest distances. In this case, since detection is performed clockwise with respect to the current marker of interest, processing with respect to the distance D1 is performed next. As described above, since determination can only be performed rightward or downward, processing is performed from the representative marker to the marker at the distance D1 in this case. That is, codes are read in the reverse direction, i.e., from the CRC code to the address code. As is apparent, therefore, an error is determined. Consequently, the absence of a direction is determined with respect to the distance D1.

Determination with respect to the distance D4 is performed next. Since an address code and a CRC code are read in the order named when a read operation is performed from the representative marker toward the distance D4, the presence of directivity is determined with respect to D4. That is, no error occurs.

Determination is to be performed next with respect to the distances D3 and D5 which are equal distances. Since processing is performed clockwise, processing is performed first with respect to the distance D3. With regard to D3 as well, since a CRC code is read first, it is detected that there is no directivity. The distance D5 is eventually read, and it is determined that there is directivity with respect to this distance.

As a result, since the distances D4 and D5 are read, it can be recognized that data corresponding to block addresses written at portions corresponding to the distance D4 and D5 are written in the portion indicated by hatching in FIG. 38B. If two directions are detected finally with respect to one representative marker, the direction of the block can be detected. Therefore, processing is performed until two directions are detected.

In the case of the dot code shown in FIG. 33, only one direction is detected. Processing is performed until one direction is detected (D5 in FIG. 39).

Note that if errors are detected upon processing in all the five directions described above, the above direction detection processing is performed with respect to markers in the diagonal directions. In this case, in order to prevent an increase in the number of processes, no processing is performed with respect to markers located outside a given range. Necessary information such as address information, which could not be obtained, is obtained by marker/block address interpolation processing.

As described above, a block address is not modulated. If, however, a block address is modulated, demodulation is required after a block address code is recognized, as is apparent.

In the above description, the presence/absence of directivity is determined by using error detection of an upper address. However, for example, a pattern having directivity like "11100001" may be used instead of an upper address CRC code so that when "11100001" is detected by a pattern matching operation or the like, the presence of a marker in the corresponding direction can be recognized.

In the above direction detection, adjacent markers need not be detected clockwise with respect to all markers. In the next block, an operation of recognizing an upper address code may be performed in that direction. This operation allows a decrease in the number of processes. Furthermore, even if abnormality occurs in detection of an upper address, the presence of a code in a direction obtained by peripheral direction detections may be recognized.

Figure 43:
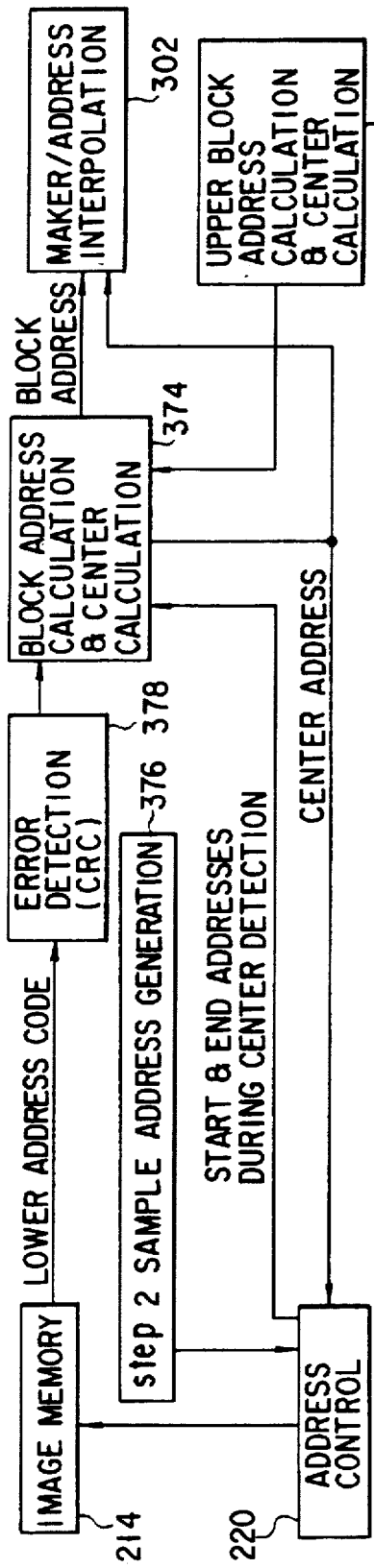
FIG. 43 is a block diagram showing the arrangement of a block address detection/error determination/accurate center detection section in the multimedia information reproducing apparatus.

The block address detecting/error determining/accurate center detection section 300 will be described next with reference to the block diagram in FIG. 43 and the flow chart in FIG. 44.

Upon detecting an upper address, the upper block address calculation and center calculation circuit 372 in the data array direction detection section 218 sends the upper block address to a block address calculation and center calculation circuit 374 in the block address detecting/error determining/ accurate center detection section 300. In addition, since rough centers in upper address detection are known, these center addresses are supplied to a step 2 sample address generation circuit 376 (step S152).

Figure 45:
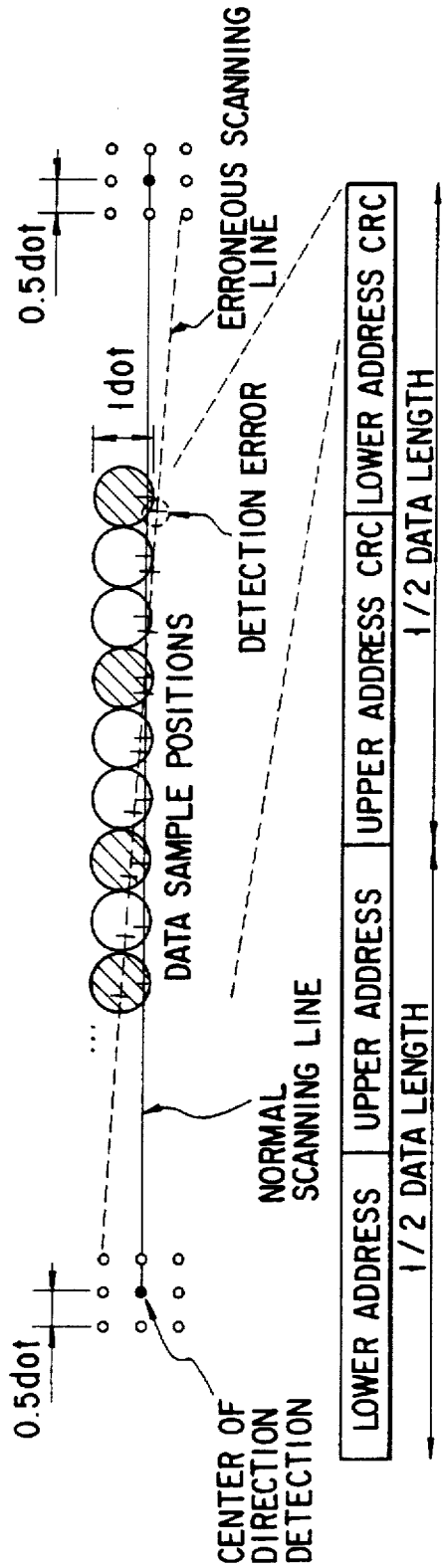
FIG. 45 is a view for explaining the operation of the block address detection/error determination/accurate center detection section.

The step 2 sample address generation circuit 376 generates the sample addresses of this rough centers (step S154). More specifically, as shown in FIG. 45, eight sample addresses are set outside with respect to the previously obtained rough center (the center in direction detection) in the same manner as described above. Subsequently, eight sample addresses are set outside with respect to a marker whose directivity is found, and scanning lines are drawn in the same manner as described above (step S156), thereby performing processing to determine whether a lower address can be detected. In this embodiment, the data interval for the generation of sample addresses is defined as 0.5 dots. This value, however, can be changed depending on the specifications of an apparatus, as needed.

The address control section 220 reads out data from the image memory 214 in accordance with the generated sample addresses, and supplies the data corresponding to these sample points to an error detection circuit 378 (step S158). Similar to direction detection (as shown in FIG. 5), when a sample point is present between data in the image memory, the corresponding data may be obtained by interpolation using peripheral data instead of the scheme using one representative data in a memory. If an error is detected in error determination (step S160), it is determined whether scanning at all the sample points is completed (step S162). If scanning is not completed, the flow advances to step S156 described above. If scanning at the all the sample points is completed, the flow advances to marker/block address interpolation processing (step S164) after addresses in all the blocks are detected.

If it is determined in step S160 that there is no address error, it is determined whether scanning at all the sample points is completed (step S166). If scanning is not completed, the flow advances to step S156 described above. If scanning at all the sample points is completed, a lower address is confirmed (step S168), and an accurate center (step 2 center) is decided (step S170).

That is, error detection is performed by the error detection circuit 378, and the flow advances to the next processing if an error is determined by error determination. The block address calculation and center calculation circuit 374 has received start and end addresses in center detection, i.e., a signal indicating specific points which are currently connected, from the address control section 220. The block address calculation and center calculation circuit 374 determines whether error detection can be performed at the corresponding points. If no error is detected, the block address calculation and center calculation circuit 374 combines the obtained lower address with the upper address sent from the upper block address calculation and center calculation circuit 372 and supplies the resultant address as a block address to the marker/address interpolation section 302. Similarly, the block address calculation and center calculation circuit 374 supplies the center address to the marker/address interpolation section 302.

Referring to FIG. 45, the data interval is set to be 0.5 dots for the following reason. By detecting sample points within the range of 0.5 dots, the difference between the center (center in direction detection) finally obtained by this processing and the true center falls within the range of ¼ dots. If the difference falls within the range of ¼ dots, data can be accurately reproduced in a data area by setting sample points formed by the above processing.

Since the minimum dot size of a step 2 code corresponds to one dot, a data arrangement smaller than this dot size has no meaning as data. Therefore, it is constituted by one dot.

Similar to the step 1 code, inverted codes may be arranged on the upper and lower sides of each address data dot, or black data may be set for a few dots at the end portion, while a marginal portion may be set around the black data. With regard to the data marginal portion 364 for discriminating an address code from a data code, even if an area for discrimination from the data area 314 is black and superposed on the data area, the probability that the area is mistaken for a marker is very low. Therefore, this data marginal portion 364 need not be formed, and the data area 314 may be directly continuous with the inverted layer.

As shown in FIG. 45, as a result, address data has a data length ½ the total data length in the form of lower and upper addresses, and is added a CRC code having the same length. This data length is set to allow detection of a burst error even in a state wherein noise is superposed or an ink is attached to an entire portion corresponding to this address length. This data length ratio can be changed, as needed.

An accurate center for sampling data in the data area 314 and a block address are recognized by the above tree search processing, i.e., the detecting method of obtaining a rough center at first and obtaining a more accurate center. That is, by performing tree search processing, the processing can be greatly reduced and the processing amount and time can be reduced as compared with a case wherein sampling is performed at a fine pitch from the beginning. In addition, the degree of redundancy of a total data amount can be reduced by using block addresses for detection of a direction and an accurate center.

The marker/address interpolation section 302 will be described next with reference to FIG. 46. Referring to FIG. 46, assume that a marker of a block B2 is not detected or an address of the block B2 is not detected, but black marker portions around the undetected marker of the block B2 are detected.

In this case, a line connecting the obtained centers of the markers of blocks B1 and B3 is drawn, and a line connecting the obtained centers of the markers of blocks A2 and C2 is also drawn. The intersection of these lines is set as an estimation center. From this estimation center point, address detection and processing can be performed toward the markers of the blocks C2 and B3. Even if address detection is not performed, since an arrangement is known, the address of the block B2 can be set in accordance with addresses therearound when the block B2 is present below the block B1. Therefore, estimation can be performed without detection. That is, the address and marker center of a block of interest, which could not be estimated, can be detected from processing around the block.

The marker/address interpolation section 302 supplies properly read address data, an address interpolated with a center position, and information about the estimation center to the address control section altogether.

If the data is loaded into the image memory 214 as shown in FIG. 46 and the scanning direction is the direction indicated by the arrow, a marker located approximately at an upper left position is set as the first representative marker, and processing is started therefrom. Center detection is sequentially performed in the vertical direction, and a first detecting operation in the vertical direction is performed to obtain eight centers (the markers of blocks A1 to A4 and the markers of blocks B1 to B4). In center detection in the next vertical array, since the centers of the markers of the blocks B1 to B4 have already been known, no processing for them is performed, but rough centers of the markers of blocks C1 to C4, the centers of step 1, and the centers of step 2 are obtained on the basis of the known centers. Therefore, the above 81 scanning lines are not required. Once a center is obtained, sampling may be performed at subsequent nine points. For this reason, a center can be obtained by nine processes and nine finer processes, i.e., a total of 18 processes. As described above, although the amount of processing is large only at first, the amount of subsequent processing can be advantageously reduced.

In the case of the dot code shown in FIG. 33, direction detection processing is performed first with respect to the blocks A1, B1, and C1, i.e., in the lateral direction, with the block A1 at the upper left position being considered as a representative marker. When the marker centers of the blocks A1 and B1 are obtained, center detection processing for the block C1 can be performed by nine processes. In order to determine that the block below the block A1 is the block A2, the following processing is performed because no address code is available.

That is, the size of the block may be determined on the basis of the lengths of the A1 and B1 markers, and detection may be started from a marker at a proper position on the basis of the estimated size of the block. Alternatively, processing may be performed while the marker immediately below the block A1 is regarded as a representative marker. With this operation, a block having a block address in the later direction which coincides with the detected block address may be determined as the block A2. When direction detection on two stages (the stages of A1 and A2 in FIG. 46)

is completed, a direction can be estimated in processing in the vertical direction (processing of selecting the marker of the block A3). Therefore, detection processing may be performed with respect to only the markers in this direction. Even if there is an erroneously detected marker, processing can be performed without using the marker.

The address control section 220 in FIG. 23 will be described next with reference to the block diagram in FIG. 47.

In the address control section 220, first of all, data from the A/D conversion section 210 is stored in the image memory 214 by an address generated by a write address generation section 380 for generating an address when data from the A/D conversion section 210 is to be written in the image memory 214.

As described above, addresses need to be respectively generated in the marker detection section 216, the data array direction detection section 218, the block address detection/error determination/ accurate center detection section 300, and the marker/address interpolation section 302. Address generation sections 382 to 388 are arranged for this purpose. In this case, the marker detection address generation section 382, the data array direction detection address generation section 384, and the address generation section 386 for block address detection/error determination/accurate center detection generate addresses by exchanging information with the marker detection section 216 (the marker determination section 318, the marker area detection section 320, and the approximate center detection section 322 in the marker detection section 216), the data array direction detection section 218, and the block address detection/error determination/accurate center detection section 300, respectively. The interpolation address generation section 388 generates interpolated address coordinate data and memory read addresses for pixel data around there, the interpolated address coordinate data being obtained by dividing a block having four markers therearound into equal portions in accordance with addresses (to be referred to as marker addresses hereinafter) to which the accurate centers of the respective markers are caused to correspond in the image memory, and a data count.

A selection circuit 390 selects these address generation sections 382 to 388 at the respective timings to supply corresponding data to a lens aberration distortion correction circuit 392. The lens aberration distortion correction circuit 392 receives lens aberration distortion information from the memory 224, converts (corrects) a selectively supplied address, and supplies the resultant data, as a read address, to the image memory 214 via a selection circuit 394.

Another embodiment of the marker determination section 318 in the marker detection section 216 will be described next with reference to FIGS. 48 to 50.

In the above embodiment, when the size of a dot code is determined, the dot code is imaged by the image formation optical system 200 such that one dot of the code corresponds to 1.5 pixels as image pickup elements of the image pickup section 204. In the marker determination section 318, two-dimensional consecutive black pixels are found and determined as a marker. In contrast to this, in this embodiment, when codes having different dot sizes, e.g., a 20-μm code, a 40-μm code, and a 80-μm code, are present, the respective codes can be reproduced without changing the image magnification of the image formation optical system 200.

In various applications, different paper qualities, different sheet characteristics, different inks, and different printing levels are set. For this reason, codes having dot sizes corresponding to the respective applications are used. If, for example, a very high recording density can be realized, a 20-μm code is used. In an application using a rough, low-cost sheet with poor quality, a 80-μm code is used. It is an object of this embodiment to decide the size of a code and reproduce the code properly in such a state.

Assume that there are circular markers having dot sizes of 20 μm, 40 μm, and 80 μm as shown in FIG. 48, and a reproducing apparatus to which this embodiment is applied is an apparatus for efficiently reproducing a 20-μm code, i.e., an apparatus in which the magnification of an image formation system is set to decode a larger amount of information with one imaging operation. It is an object of the embodiment to reproduce 40-μm and 80-μm codes without changing the image magnification of the image formation system in the apparatus for imaging this 20-μm dot at an image magnification of×1.5. Note that the size of each marker shown in FIG. 48 has a diameter seven times a corresponding dot size.

As shown in FIG. 49, first of all, a code having the maximum dot size to be selected is set to be an initial value (step S182). If, for example, 80-μm, 40-μm, and 20-μm codes are present, and all the codes are to be reproduced, the 80-μm code having the maximum size is set to be an initial value. This code may be set by a key input operation performed by the user. If three types of codes, i.e., 80-μm, 40-μm, and 20-μm codes, are set, and the apparatus can perform proper processing only with respect to these sizes, the apparatus may set by itself a code having the maximum size, i.e., a 80-μm code.

Determination is performed according to a marker determination formulae shown in FIG. 48 to obtain a temporary center (step S184).

Assume that a code is formed by using 7-dot portion of each dot size as a marker. At this time, since the image formation system has an image magnification of×1.5, an image of a 20-μm code has a diameter corresponding to 10.5 dots; an image of a 40-μm code, a diameter corresponding to 21 dots; and an image of an 80-μm code, a diameter corresponding to 42 dots. For this reason, if 7 or more and 12 or less two-dimensionally consecutive black pixels are detected, the corresponding portion is determined as a 20-μm code marker. If 14 or more and 24 or less two dimensionally consecutive black pixels are detected, the corresponding portion is determined as a 40-μm code marker. If 29 or more and 47 or less two-dimensionally consecutive black pixels are detected, the corresponding portion is determined as a 80-μm code marker.

This pixel value is calculated according to the following formulae:

$$r = s \times d \times m$$
$$\text{int}(r \times 0.7) \leq R \leq \text{int}(r \times 1.1 + 1)$$

r: the number of pixels (=7) corresponding to the diameter of a marker s: the dot size (20 μm, 40 μm, or 80 μm)

m: the image magnification (=1.5) of the image formation system d: the number of dots corresponding to the diameter of the marker R: the number of pixels corresponding to the diameter of the marker as a binary image 0.7: the reduction ratio based on the inclination, dot rejection, and the like 1.1: the magnifying power based on dot gain Since an 80-μm code marker is initially set in step S182, it is checked in step S184 according to the above marker determination formulae whether a marker is an 80-μm code marker, and a temporary center of each marker of the corresponding size (a marker constituted by a 80-μm dot) is obtained.

Subsequently, it is checked whether the number of such markers is four or more (step S186). Since one block is surrounded by four markers, this operation is performed to determine whether one or more blocks are present.

It is then checked whether the markers have predetermined positional relationships with adjacent markers like those shown in FIG. 50, i.e., whether the markers are properly arranged (step S188). That is, a marker B located near a target marker A, a marker C located near a position separated from the target marker A by a distance D in a direction perpendicular to a line connecting the markers A and B, and a marker D located near a position separated from the marker B by the distance D in the same direction as that from the marker A to the marker C are detected. If these markers are present, an 80-μm code is determined in this case.

If it is determined in step S186 that the number of 80-μm code markers is less than four, or it is determined in step S188 that the markers are not properly arranged, it is determined that the corresponding portion is not an 80-μm code. In this case, a code having a size smaller than that of the previously set code by one level, i.e., a 40-μm code in this case, is set (step S190), and the flow returns to step S184 to perform marker determination again.

If determination cannot be performed with the smallest code size, the corresponding portion is not a code or a code which cannot be reproduced. Therefore, the processing is terminated. In this case, the flow preferably advances to processing of generating a warning such as an alarm.

Another embodiment of the marker determination section 318 will be described next. A method of determining a marker pattern and modulated data by dilation as general image processing. In this case, dilation processing is processing of converting a black pixel near a white pixel into a white pixel. More specifically, if, for example, three pixels around a target pixel (in an area of 7×7 pixels around the target pixel) are checked (black/white determination), if at least one of them is a white pixel, the target pixel is converted into a white pixel. This processing is performed with respect to all the pixels on an image.

First of all, binarization processing of data in an image memory is performed.

Subsequently, only the data portion of the code image is converted into white pixels by the above dilation processing, and a marker pattern portion is converted into an image smaller than the original size by an amount corresponding to the number of pixels having undergone dilation.

The number of consecutive black pixels is counted from addresses of points where the white pixels on the image are changed into black pixels in the image memory and the corresponding pixels. The information about each marker is classified for each marker in accordance with the above information. The above temporary center address and the range in which the markers are present are detected. Thereafter, approximate center detection processing is performed.

With this operation, marker determination and detection of the range in which the markers are present can be performed at high speed.

Furthermore, in a code in which markers have undergone uniform deformation with respect to the marker center, e.g., the above-described dot gain or dot reduction, the temporary center address obtained by the above marker determination may be directly set as an approximate center.

The processing in step S184 in FIG. 49 may be used as the above processing.

When the operation of the above A/D conversion section is performed by binarization using a comparator, binarization processing in the marker determination processing can be omitted.

A light-source-integrated image sensor which can be applied to the detection section 184 of the reproducing apparatus shown in FIG. 17 or 23 will be described next. FIG. 51 shows the arrangement of the image sensor. For example, light-emitting cells 398 are formed beside light-receiving cells 396 by an on-chip process using compound semiconductor elements such as LEDs or electroluminescence elements. Grooves are formed between the light-receiving cells 396 and the light-emitting cells 398 by actually cutting the wafer with a cutter, and non-transparent portions, e.g., isolation (light-shielding) portions 400 obtained by embedding a metal, are formed in the grooves. The isolation portions 400 serve to eliminate the inconvenience that light emitted from the light-emitting cells 398 is directly incident on the light-receiving cells 396.

In this arrangement, emission of each light-emitting cell 398 is controlled by a light-emitting cell control pulse signal like the one shown in the timing chart in FIG. 18. Each light-receiving cell 396 supplies stored charges to an adjacent vertical charge transfer register 402 upon application of a charge transfer gate pulse signal to a charge transfer gate (not shown). Each vertical charge transfer register 402 transfers stored charges to a horizontal charge transfer register 404 in units of lines in response to a vertical charge transfer pulse. The horizontal charge transfer register 404 outputs stored charges in units of pixels via a buffer amplifier 406 in response to a horizontal transfer clock signal.

An embodiment wherein a portion, of the circuit of the above-described reproducing apparatus, located before the demodulation circuit is realized by an analog circuit and formed into one chip will be described next with reference to FIG. 52. In this embodiment, as an image pickup section, an X-Y addressing image pickup section 408 represented by a CMD like the one disclosed in Jpn. Pat. Appln. KOKAI Publication No. 61-4376 is used. With the use of this section, no memory is required, and only a small circuit system is required. Therefore, the circuit can be formed on one chip. X and Y decoders 410 and 412 are prepared for address scanning of this X-Y addressing image pickup section 408.

In a general X-Y addressing image pickup section, after one line is read, this line is reset and the next line is read, unlike a CCD. That is, this image pickup section generally uses a read method in which while a given line is read, an exposure period for another line is started. According to such a read method, however, when external light is incident during an image pickup period, an unnecessary portion is exposed. Owing to such a demerit, in this embodiment, in addition to the X-Y address scheme, an element shutter is used in such a manner that exposure is performed only when external light is incident, i.e., exposure is to be performed, but no exposure is performed otherwise.

An image pickup element scanning address generation and element shutter control section 414 generates an element shutter pulse for an operation equivalent to an element shutter according to the X-Y addressing scheme, and a reset pulse for setting all the pixels.

The X and Y decoders 410 and 412 are circuits for turning one of the elements in accordance with X and Y addresses from the image pickup element scanning address generation and element shutter control section 414. These circuits are generally constituted by shift registers and the like. In this embodiment, however, the circuits constitute a selector capable of turning one of the elements in accordance with signals from the image pickup element scanning address generation and element shutter control section 414.

The reset pulse in this embodiment is equivalent to the image pickup element reset pulse in the timing chart in FIG. 18. This reset pulse serves to reset each image pickup element before exposure. By setting the reset pulse at Hi during this reset period, a switch 416 is switched to supply all the charges to a negative power supply 418.

As indicated by the waveform indicated by the broken line in FIG. 18, the element shutter pulse is generated to have a waveform which allows a gate operation in the time interval between the trailing edge of a reset pulse and the end of exposure.

In a read operation, similar to a normal pulse, the elements are sequentially turned on, and signal charges are supplied to a marker detection section 422 via the switch 416 for a reset period after the charges are amplified by a current/voltage conversion amplifier 420. The marker detection section 422 is the same as that described above, and data having undergone marker detection is stored in a register 424. A θ detection section 426 obtains an inclination on the basis of the contents of the register 424 in the same manner as the above-described direction detection section. For example, in the circuit shown in FIG. 23, the θ detection section 426 corresponds to the data array direction detection section 218, and a data interval control section 428 and the image pickup element scanning address generation and element shutter control section 414 correspond to the address control section 220.

Coefficients for interpolation, which are generated by a coefficient generation section 430 under the control of the data interval control section 428, are multiplied by the read charges by a multiplying circuit 432, and all the products are added by an addition circuit 434. That is, an output from the addition circuit 434 is sampled/held by a sample and hold (S & H) circuit 436, and is returned to the addition circuit 434 via a switch 438. This operation is performed to perform data interpolation like the one shown in FIG. 5 when data is sampled after a direction and a scanning line are confirmed. Referring to FIG. 5, in order to obtain data at Q, interpolation is performed by multiplying coefficients and D6, D7, D10, and D11. The value interpolated in this manner is further sampled/held by an S & H circuit 440, and binarization of the sampled/held value is performed by a comparator 442 and a threshold value determination circuit 444.

Each image pickup element (pixel) of the X-Y addressing image pickup section 408 will be described in more detail. Each pixel is constituted by two CMD elements, as shown in FIG. 53. An element shutter pulse is input to a first CMD element 446 to store charges in a capacitor 448 for an element shutter. Thereafter, a second CMD element 450 is driven by a read pulse from the Y decoder 412 to select a line so as to read out charges in units of pixels via a horizontal selection switch 452.

In an exposure operation, the CMD element 446 is caused to perform an element shutter operation by an element shutter pulse to store charges in the element shutter capacitor 448. When charges are stored in this manner, light is shielded, and a read pulse from the Y decoder 412 is applied, thereby selecting a line. The CMD element 450 is then turned on by the horizontal selection switch 452 to read out charges in units of pixels.

When charges are to be reset, all horizontal selection switches 454 are turned on by a read pulse output from the image pickup element scanning address generation and element shutter control section 414, and the switch 416 for a reset period is set on the negative power supply 418 side. Since the source of the CMD element 450 is set at a negative voltage, the charges stored in the capacitor 448 and the gate of the CMD element 446 are moved to the negative power supply so as to be reset.

Charges can also be reset by simultaneously applying voltages slightly higher than those in the above operation as the voltages of an element shutter pulse and a read pulse.

Note that a dark current poses a problem in a general image pickup element. In this embodiment, however, since exposure is performed only during a period in which the element shutter pulse shown in FIG. 18 is at high level, and charges are immediately read out, the time during which a dark current is stored is very short in practice. Therefore, this image pickup element is advantageous over other image pickup elements in terms of S/N ratio. In an exposure operation, since a sufficient amount of light is provided even during this short exposure period, the S/N level is low with respect to a dark current while the signal level remains the same. Therefore, with the application of this embodiment, the gain of the degree of output of the current/voltage conversion amplifier 420 on the subsequent stage can be set to be a considerably large value.

In this embodiment, a pixel arrangement is designed to perform the above element shutter operation. However, a CMD element capable of an element shutter operation as disclosed in Jpn. Pat. Appln. KOKAI Publication No. 61-4376 may be used.

Figure 54:
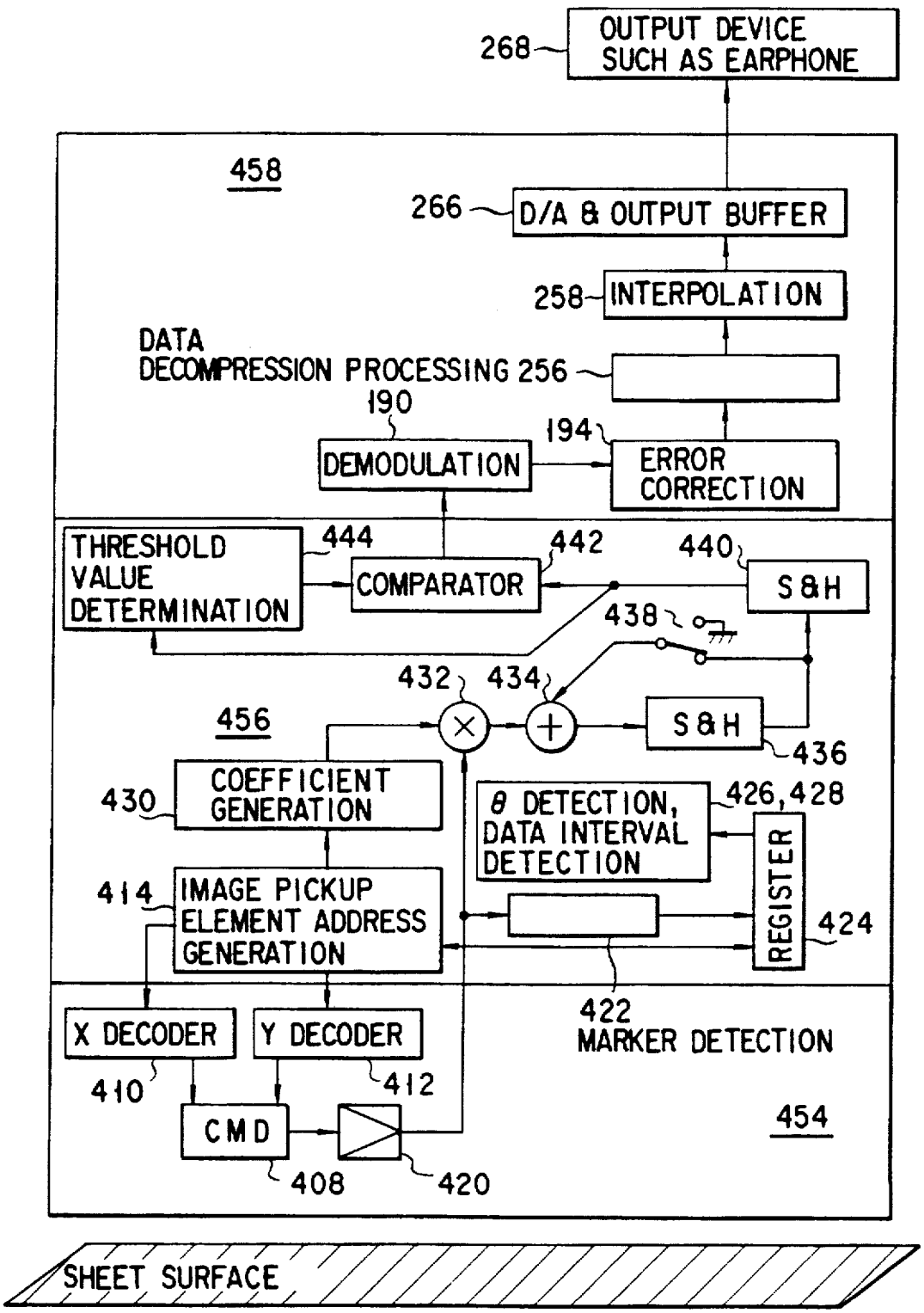
FIG. 54 is a block diagram showing the arrangement of a three-dimensional IC using the X-Y addressing image pickup section.

An embodiment in which the circuit using the above X-Y addressing image pickup section 408 is formed as a three-dimensional IC will be described next with reference to FIG. 54. Note that this embodiment is associated with an audio information reproducing apparatus.

This embodiment is constituted by an image pickup section layer 454 opposing the paper surface of a sheet 182 and including a X-Y addressing image pickup section 408, an X decoder 410, and a Y decoder 412, a detection section layer 456 stacked/formed on the image pickup section layer 454 and designed to detect data, and an output processing layer 458 stacked/formed on the detection section layer 456. The output processing layer 458 includes a demodulating section 190, an error correction section 194, an decompression processing section 256, a data interpolation circuit 258, a D/A conversion section/output buffer 266, and the like. The output processing layer 458 reproduces decoded audio information as a sound through a speech output device 268 such as an earphone.

It is apparent, as described above, that the output processing layer 458 can be designed to reproduce multimedia information including image information.

By forming the above circuit into a three-dimension IC, processing can be performed up to a sound output operation. Therefore, the circuit size can be greatly reduced, leading to a reduction in cost.

Examples of the arrangement of a pen type information reproducing apparatus will be described next.

For example, a switch for designating a timing of a dot code loading operation can be arranged in a pen type information reproducing apparatus.

FIG. 55 shows an example of the apparatus. The detection section 184 including the light source 198, the image formation optical system 200, the spatial filter 202, the image pickup section 204, the preamplifier 206, and the image pickup section control section 212 in the reproducing apparatus shown in FIG. 17 or 23 is arranged in a distal end portion of this pen type information reproducing apparatus.

The scan conversion section 186, the binarization processing section 188, the demodulating section 190, the error correction section 194, the decompression processing section 256, the data interpolation circuit 258, and the like are incorporated, as an image processing section 460, a data processing section 462, and a data output section 464, in the apparatus. The apparatus includes an earphone as the speech output device 268. FIG. 55 shows only an audio information output unit. As is apparent, however, if the apparatus incorporates a processing section for images, characters, line drawings, and the like, the apparatus can be connected to a corresponding output unit (the same applies to the following description of the pen type information reproducing apparatus).

A touch sensor 466 is arranged on a side surface of this pen type information reproducing apparatus. As this touch sensor 466, for example, a piezoelectric switch, a microswitch, or piezoelectric rubber can be used, and a compact switch having a thickness of 0.6 mm or less is known. The control section as the image pickup section control section 212 starts to load a dot code like the one described above in response to depression of the touch sensor 466 by a finger of the user. When the finger is released from the touch sensor 466, the loading operation is terminated. That is, the start and end of a dot code loading operation are controlled by using this touch sensor 466.

Note that reference numeral 468 in FIG. 55 denotes a battery as an operating power supply for each portion in the pen type information reproducing apparatus.

In addition, the touch sensor 466 may be attached to the distal end portion of a pen type information reproducing apparatus as shown in FIG. 56 instead of being depressed by a finger of the user. With this arrangement as well, the same function as described above can be realized.

When the user puts this pen type information reproducing apparatus on a sheet 182 to manually scan a dot code printed on the sheet 182, the touch sensor 466 is turned on. The image pickup section control section 212 recognizes it and starts to read the dot code.

In this case, since the distal end portion of the pen type information reproducing apparatus is moved in contact with a sheet surface in a scanning operation, the distal end portion of the touch sensor 466, i.e., the surface which is brought into contact with a sheet surface, is preferably coated with a smooth resin material or the like to allow smooth movement in manual scanning (movement).

In addition, the detection section of the pen type information reproducing apparatus may further include a mechanism for preventing specular reflection.

Figure 57:
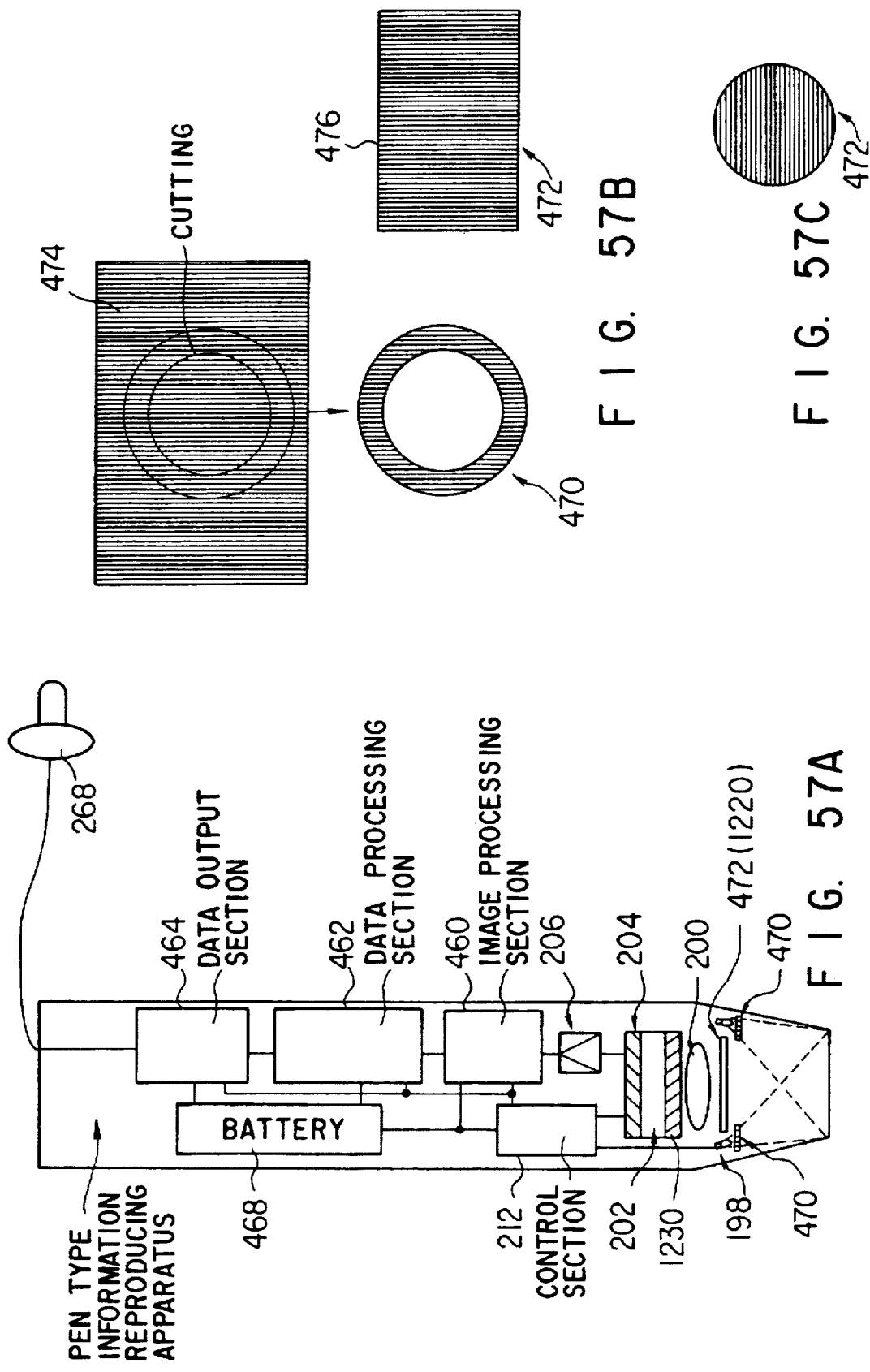
FIG. 57A is a view showing the arrangement of a pen type information reproducing apparatus adapted for removal of specular reflection.
FIG. 57B is a view for explaining arrangements of first and second polarizing filters.
FIG. 57C is a view showing another arrangement of the second polarizing filter.

FIG. 57A shows the arrangement of the mechanism, in which a first polarizing filter 470 is arranged in front of the light source (LEDs or the like) 198, i.e., on the side where light is radiated, and a second polarizing filter 472 is arranged in front of the image formation optical system (lens) 200.

For example, as shown in FIG. 57B, the first polarizing filter 470 is formed by cutting a polarizing filter film 474 in the form of a doughnut. The second polarizing filter 472 may be formed by using a different polarizing filter film 476, or the inner portion which is cut from the polarizing filter film 474 when the first polarizing filter 470 is formed, as shown in FIG. 57C.

The first and second polarizing filters 470 and 472 formed in this manner are arranged such that the pattern surface (polarizing surface) of the second polarizing filter 472 is perpendicular to the pattern surface (polarizing direction) of the first polarizing filter 470.

As a result, the plane of polarization of random light emitted from the light source 198 is limited by the first polarizing filter 470 to radiate, for example, P-polarized light. A specularly reflected light component returns, as P-polarized light, from the sheet surface with its plane of polarization being maintained. However, since the plane of polarization of the second polarizing filter 472 is perpendicular to that of the first polarizing filter 470, this specularly reflected light component is cut by the second polarizing filter 472. On the other hand, light output from the first polarizing filter 470 is incident on actual dots, i.e., the sheet surface and returns as luminance information on the sheet surface. The plane of polarization of such light becomes random. Therefore, a signal which is incident on a sheet surface and returns as monochrome information or color information has both P- and S-polarized light components. Of these light components, the P-polarized light component is cut by the second polarizing filter 472, but the S-polarized light component perpendicular to the P-polarized light component passes through the second polarizing filter 472 and is actually focused on the image pickup section 204 via the lens 200. That is, the reflected light from which the specularly reflected light component is removed is guided to the image pickup section 204.

In this case, a λ/4 plate 1230 is arranged in front of the spatial filter 202 so that image light incident as linearly polarized light is converted into circularly polarized light and input to the spatial filter 202. Such an arrangement is employed because the spatial filter generally uses the birefringence of quartz and hence cannot exhibit its effect with linearly polarized light. In this case, the λ/4 plate 1230 is arranged in front of the spatial filter 202. However, the present invention is not limited to this. The λ/4 plate 1230 may be arranged in an arbitrary place between the second polarizing filter 472 and the spatial filter 202, where the λ/4 plate 1230 can be easily arranged.

Figure 58:
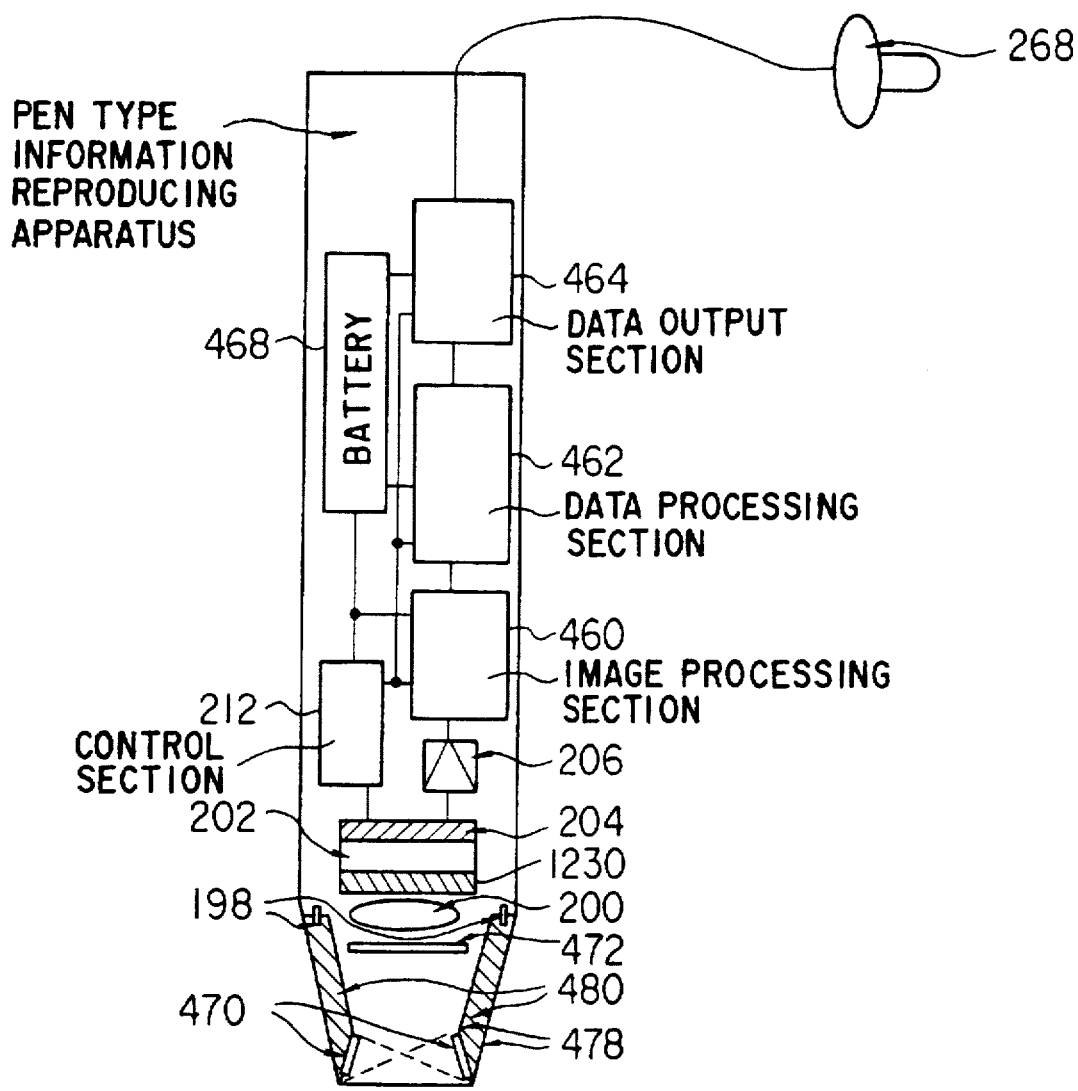
FIG. 58 is a view showing another arrangement of the pen type information reproducing apparatus adapted for removable of specular reflection.

As an arrangement for removing a specularly reflected light component in this manner, an arrangement like the one shown in FIG. 58 is also conceivable. In this arrangement, instead of disposing the first polarizing filter 470 near the light source 198, the filter is disposed at the exit portion of an optical waveguide member 480 consisting of a transparent resin and having a surface mirror coat 478. The optical waveguide member 480 is used to guide light from the light source 198 to a state very close to a sheet surface to irradiate the sheet (dot code) with the light. In this case, the first polarizing filter 470 is arranged such that light perpendicular to the second polarizing filter 472 is transmitted therethrough.

With the use of the optical waveguide member 480, the following merits can be obtained. The light source 198 and outer shape can be greatly narrowed. Since the incident angle is decreased, the specularly reflected light component can be reduced.

Note that since some specularly reflected light component is left because of swelling of an ink, swelling of a sheet surface, or the like, a polarizing filter is arranged to further efficiently remove the light component.

Figure 59:
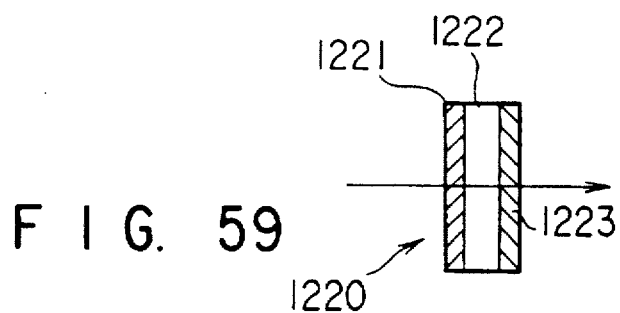
FIG. 59 is a view showing the arrangement of an electrooptical element shutter.

In addition, instead of the second polarizing filter 472, an electrooptical element shutter 1220 such as a liquid crystal shutter or a PLZT shutter may be arranged. As shown in FIG. 59, this electrooptical element shutter 1220 is constituted by a polarizer 1221 as a polarizing filter, an electrooptical element 1222 such as a liquid crystal or PLZT, and an analyzer 1223 as a polarizing filter. In this case, a specular reflection preventing effect can be obtained by disposing the shutter 1220 such that the aligning direction of the polarizer (polarizing filter) 1221 of the electrooptical element shutter 1220 coincides with that of the second polarizing filter 472.

With the shutter function, a frame read operation can be performed by an image sensor capable of a field read operation, e.g., an IT-CCD, or simultaneous exposure of all pixels can be realized by using an X-Y addressing image sensor such as a CMD.

An attempt to make the light source 198 portion efficient so as to slim down the apparatus will be described next.

Figure 60:
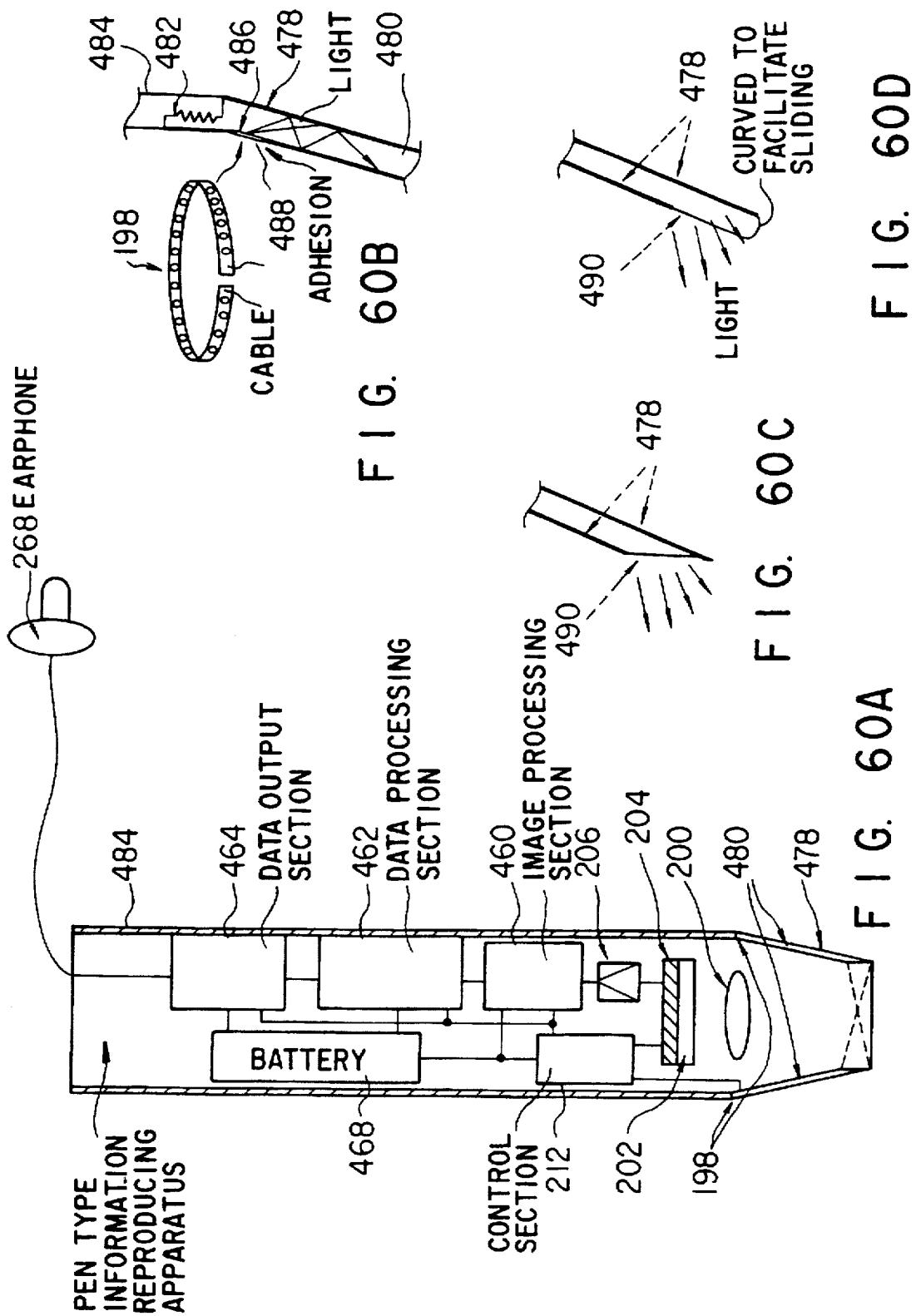
FIG. 60A is a view showing the arrangement of a pen type information apparatus using a transparent resin optical waveguide member for a light source.
FIG. 60B is an enlarged view of a connecting portion between the optical waveguide member and a reproducing apparatus housing.
FIGS. 60C and 60D are views, each showing the arrangement of the distal end portion of the optical waveguide member.

FIG. 60A shows the arrangement for this attempt. Similar to the case shown in FIG. 58, this arrangement includes a transparent acrylic resin optical waveguide member 480 having a mirror coat 478 on its surface. As shown in FIG. 60B, the transparent acrylic resin optical waveguide member 480 is formed into a truncated cone and has a threaded portion 482 on its upper portion (decompressing end portion). The transparent acrylic resin optical waveguide member 480 is threadably engaged with a housing 484 of the pen type information reproducing apparatus. The surface mirror coat 478 is not formed on an inner portion near the threaded portion 482, and the light source 198 is arranged on a portion 486. That is, the light source 198 is provided as a ring-like LED array obtained by mounting LEDs on a narrow flexible board 488. This LED array is bonded to the portion 486 on which the above surface mirror coat is not formed. As shown in FIG. 60C, the lower portion (distal end portion) of the transparent acrylic resin optical waveguide member 480 is cut to form a portion 490 on which the surface mirror coat 478 is not formed. Therefore, light from the light source 198 enters the transparent acrylic resin optical waveguide member 480 via the above non-mirror-coat portion 486. The light is then reflected by the surface mirror coat 478, emerges from the non-mirror-coat portion 490 of the distal end portion via the transparent acrylic resin optical waveguide member 480, and is irradiated on a dot code on a sheet.

Note that the distal end portion of the transparent acrylic resin optical waveguide member 480 may not be bent, and the surface mirror coat 478 may be formed only an outer portion, as shown in FIG. 60D, thereby realizing a shape which facilitates the manufacture of the member. In this case, it is more preferable that the distal end be rounded to slide easily.

An example of the pen type information reproducing apparatus using the light-source-integrated image sensor will be described next (see FIG. 61).

In this embodiment, a light-source-integrated image sensor 492 like the one described with reference to FIG. 51 is used, a rod lens (e.g., a SELFOC lens or a convex lens) 494 as an image formation system and a thin glass plate 496 are arranged on the exposure surface of the sensor. In this case, the thin glass plate 496 serves as a protective glass for an actual contact surface, and also serves to ensure a certain distance to make illumination as flat as possible.

By using the light-source-integrated image sensor 492 in this manner, the pen type information reproducing apparatus can be made compact and reduced in the longitudinal direction as well.

A pen type information reproducing apparatus capable of processing a dot code as color multiplex data will be described next.

FIG. 62 shows the arrangement of this apparatus, which has a touch sensor 466 like the one shown in FIG. 55 and first and second polarizing filters 470 and 472 like those shown in FIG. 57A. Furthermore, the pen type information reproducing apparatus of this embodiment includes a color liquid crystal 498 controlled by a control section 212 and arranged on the pupil plane of the lens 200 so as to read a color multiplex dot code obtained by synthesizing a plurality of dot codes consisting of different colors, as shown in FIG. 63A.

An application of a color multiplex dot code will be described first to explain how the control section 212 controls the color liquid crystal 498.

Consider, for example, as shown in FIG. 63B, an A4 sheet 500 on which a color multiplex dot code 502 is arranged, a phrase "Good Morning" is written in correspondence therewith, and indexes 504 and index codes 506 are arranged at a predetermined position, e.g., a lower right position. When the color multiplex dot code 502 is to be reproduced by this pen type information reproducing apparatus, one of the index codes 506 arranged in correspondence with the indexes 504, as shown in FIG. 63C, is scanned and recognized to select one of the following choices indicated by the indexes 504: causing the apparatus to output audibly "ohayou gozaimasu" in Japanese; causing the apparatus to output audibly "Good Morning" in English; and causing the apparatus to output audibly "Guten Morgen" in German. When the color multiplex dot code 502 is scanned after, for example, the choice "Japanese" is selected, "ohayou gozaimasu" is output audibly. The above operation is the object of this embodiment. The following description is associated with this object.

First of all, as shown in FIG. 63A, a dot code audible in Japanese is generated and is assigned, as code 1, to red (R). Similarly, a dot code audible in English is generated and assigned, as code 2, to green (G). A dot code audible in German is generated and assigned, as code 3, to blue (B). The color multiplex dot code 502 is then recorded on the sheet 500 such that the color of a portion where the respective pieces of information are superposed is a color obtained by an additive color process. In this case, a portion where colors are not superposed on each other is recorded as a black dot. That is, although a dot code is constituted by markers and data dots, as described above, the markers are recorded in black and the data dots are recorded in a different color by the additive color process. To perform a recording operation with the color multiplex dot code 502 is to increase the recording density.

Note that the colors of information are not limited to the above three colors, i.e., R, G, and B, but different pieces of information may be assigned to colors of wavelengths in different narrow bands. Therefore, more types of information, e.g., four or five types of information, can be multiplexed by using colors of wavelengths in different narrow bands. In this case, as color inks, inks mixed with coloring agent (inks reflecting only light components having narrow band wavelengths) are conceivable as well as conventional inks such as cyan, yellow, and magenta inks.

The index codes 506 are arranged on the underline portions of the indexes 504 indicated by characters or pictures to be recognized and selected by the user. The index codes are recorded in black to be read regardless of a selected color.

The color liquid crystal 498 is formed by bonding R, G, and B light-transmitting mosaic filters in correspondence with liquid crystal pixels. The color liquid crystal 498 serves to separate pieces of information of the respective colors of the color multiplex dot code 502. That is, the color liquid crystal 498 is controlled by the control section 212 to transmit only pixels corresponding to the color of information selected by scanning one of the index codes 506. In addition, the liquid crystal may be designed to surface-divide an optical path, instead of being arranged in a mosaic state. In this case, the divided surface area ratio of each color is preferably set in inverse proportion to the sensitivity of a pixel so as to make the sensitivities of the respective colors uniform. That is, when a sensitivity for B is low, the corresponding area is set larger than those of other colors. In addition, the color liquid crystal may be arranged on the light source side.

Figure 64:
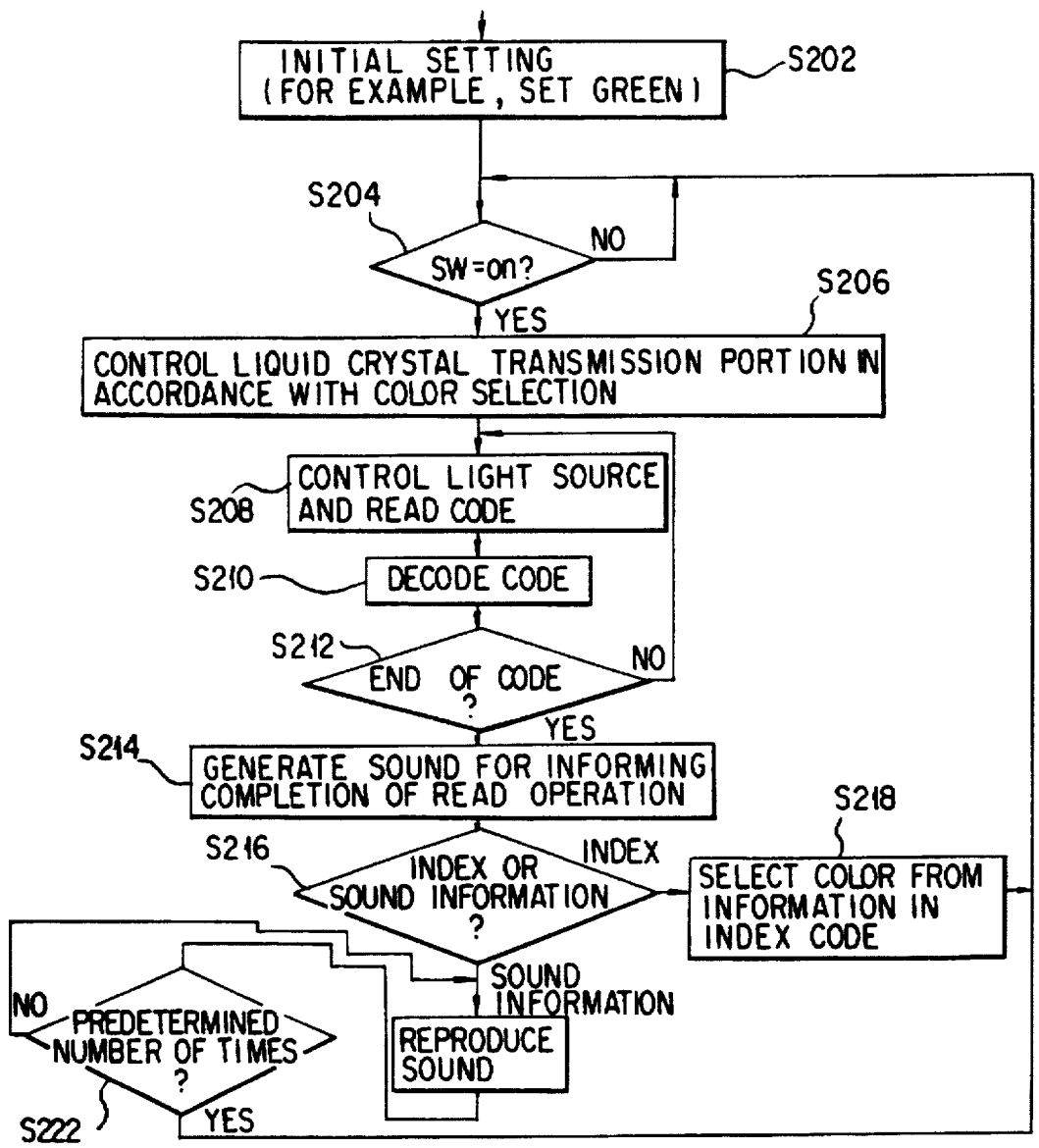
FIG. 64 is a flow chart showing the operation of a pen type information reproducing apparatus adapted for color multiplexing.

An operation of reading one of the index codes 506 and selecting a color to produce an output in a desired language will be described next with reference to the flow chart in FIG. 64.

When, for example, green is selected by initialization (step S202), and the touch sensor 466 is depressed (step S204), the control section 212 controls the liquid crystal transmission portion of the color liquid crystal 498 in accordance with the color selection (step S206). For example, in an initialized state, since green is selected, only the dots having green filters are made transmissive. Subsequently, the light source 198 is controlled by the control section 212, and a dot code is read by the image processing section 460 (step S208). The code is decoded by the data processing section 462 (step S210), and it is checked whether the entire code is processed, i.e., the entire code is read (step S212). If the entire code is read, a sound for informing it is generated (step S214). The control section 212 then determines from the decoding result whether the read code is one of the index codes 506 or the sound information (color multiplex dot code 502) (step S216). If the index code 506 is determined, the color indicated by the index code 506 is selected (step S218), and the flow returns to step S204 described above. If the code is the sound information, the data output section 464 causes the speech output device 268 to reproduce the sound (step S220).

After sound reproduction in step S220 described above, it is further determined whether the sound is repeatedly generated a predetermined number of times (step S222). If the number of times is preset by a repeat switch 467, the sound is repeatedly reproduced the predetermined number of times.

As is apparent, the number of times of repetition may be one and may be arbitrarily set by various switches or the like. Alternatively, the predetermined number of times may be recorded on the index codes 506 or the dot code 502 in advance.

A repetitive reproducing operation in this case can be performed by repeatedly reading out information from the data memory section 234 in FIG. 17 or 23.

Note that the image pickup section 204 includes a monochrome image pickup element and a color image pickup element generally obtained by mounting a color mosaic filter on an image pickup element section. In the above case, a monochrome image pickup section is used. However, reproduction can be performed in different colors by separating colors in the image processing section 460 using a color image pickup element. In this case, the color liquid crystal 498 can be omitted.

Figure 65:
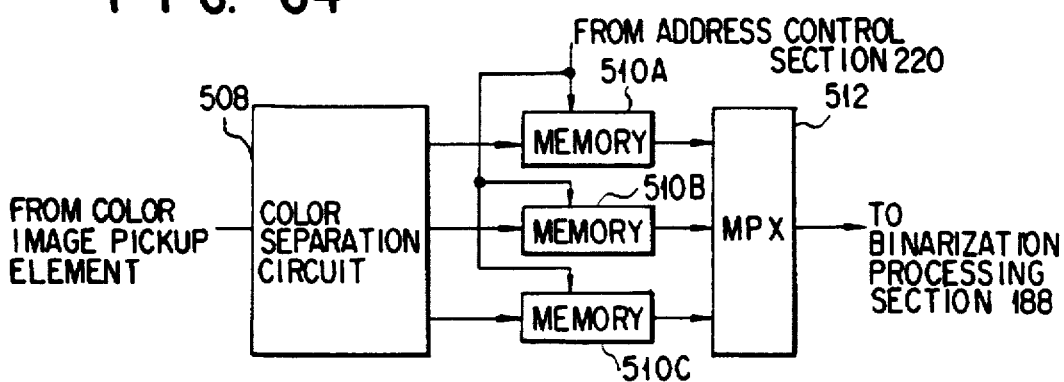
FIG. 65 is a view showing the arrangement of an image memory section in a case wherein a color image pickup element is used.

FIG. 65 shows the arrangement of the image memory section of an image processing section 460 in a case wherein a color image pickup element is used. More specifically, a signal input from the color image pickup element is separated into data of the respective colors by a color separation circuit 508, and the data are respectively stored in memories 510A, 510B, and 510C. The data is then selected by a multiplexer (MPX) 512, and subsequent processing is performed.

Consider a second polarizing filter 472 of first and second polarizing filters 470 and 472 for preventing specular reflection. Since the same polarizing filter as the second polarizing filter 472 is used for the polarizer portion of a color liquid crystal 498, the polarizer portion can also serve as the second polarizing filter 472. Therefore, combining the first polarizing filter with the polarizing filter of the color liquid crystal 498, the second polarizing filter 472 can be omitted. In this case, however, the angle of this color liquid crystal on the horizontal plane must be rotated to cut components having the same arrangement as a direction corresponding to the second polarizing filter 472, i.e., components in the same direction as that thereof.

As shown in FIG. 66A, even if the color liquid crystal 498 is omitted, and R, G, and B light sources constituted by LEDs like those shown in FIG. 66B are used as a light source 198 instead of a white light source, the color multiplex dot code 502 can be read. More specifically, when the above code 1 corresponding to red is to be used, only the LEDs corresponding to red, of the RGB light source 198, are turned on. When code 2 is to be read, only the LEDs corresponding to green are turned on. When code 3 is to be read, only the LEDs corresponding to blue are turned on. With this operation, a reproducing operation is performed.

In addition, instead of using R, G, and B LEDs, a white light source having color filters added to the respective portions may be used as a light source for the respective colors.

The same effects as those obtained by the arrangement shown in FIG. 62 can be obtained by using R, G, and B light sources as the light source 198, and controlling the ON/OFF operations of light sources of a color selected by the index code 506. In addition, if the apparatus includes light sources for emitting light having wavelengths in a plurality of narrow bands, a color liquid crystal and its control circuit need not be used, and the apparatus can be reduced in cost and size. Especially, some LEDs emit light having wavelengths in narrow bands, e.g., wavelengths of about ±27 nm. If such LEDs are used, reproduction with narrower bands can be realized.

A pen type information reproducing apparatus for stealth type dot codes will be described next.

FIG. 67A shows a dot data seal 516 with a title on which an infrared emission paint dot code 514 as a stealth type dot code is printed. This dot data seal 516 is obtained by printing, for example, a title in ordinary color or monochrome print by a printing machine or a printer, and printing a dot code below the title by using an invisible paint. As is apparent, since the dot code 514 of the dot data seal 516 is invisible print, i.e., transparent print, the dot code 514 may be printed on the title as the visible information by using a transparent ink, as shown in FIG. 67B. If, for example, an ink-jet printer or the like is used, this print can be realized by using four inks, i.e., cyan, magenta, yellow, and black inks, and an infrared emission ink as the fifth ink, and printing and superposing them.

FIG. 67A shows a case wherein the title is printed on a marginal portion of the stealth dot code. As is apparent, a visible dot code may be printed on the dot data seal with the title, and a title may be printed on a marginal portion.

For example, as shown in FIG. 68, the pen type information reproducing apparatus for reproducing the infrared emission paint dot code 514 as such a stealth type dot code uses an infrared-emitting element 518 as a light source 198 because the dot code 514 is printed in an infrared emission paint, and has an infrared bandpass optical filter 520 arranged in front of an image pickup section 204.

More specifically, when light in the infrared region is irradiated from the infrared-emitting element 518 onto the dot code 514, light having a wavelength in the infrared region, i.e., a given narrow band, is reflected. In order to detect the intensity of the reflected light in the image pickup section 204, visible light information is separated through the infrared bandpass optical filter 520 and the reflected light is guided the image pickup section 204.

Note that a plurality of paints for different emission bands used to print the dot code 514 can be prepared. If, for example, an imaging operation is performed while the characteristics of the bandpass optical filter 520 are gradually changed, this transparent print can also be multiplexed.

Instead of incorporating all the functions of a reproducing system in a pen type information reproducing apparatus, ROM cards are generally used to add various optional functions to various devices, e.g., an electronic notebook, a PDA, a wordprocessor, a personal computer, a copying machine, a printer, and an electronic projector. A case will be described wherein the above functions are partly allocated to a card type adaptor which can be connected to a ROM card connector.

FIG. 69 shows a case wherein a pen type information reproducing apparatus incorporates up to an image processing section 460, and an output from the image processing section 460 is supplied to a card type adaptor 524 via an output connector 522. In this case, the card type adaptor 524 has a data processing section 462, a data output section 464, a signal processing section 526 including D/A conversion, and an audio connection terminal 528. Reproduced audio information can be output, as a sound, from a speech output device 268, and multimedia information such as reproduced image information can be supplied to an external device 532 such as an electronic notebook via an I/F 530.

More specifically, the card type adaptor 524 is connected to the ROM card connection terminal (not shown) of the external device 532 such as an electronic notebook which does not have a speech output mechanism such as a loudspeaker so as to receive multimedia, e.g., a dot coded image, from such a device which cannot perform a speech output operation. At the same time, the speech output device 268 such as an earphone is connected to the audio connection terminal 528 of the card type adaptor 524 to allow the user to listen to dot coded speech.

As the external device 532, a video game apparatus which has recently been popularized in the homes, may be assumed. FIGS. 70 and 71 show the arrangements of card type (cassette type in this case) adaptors 524 for such video game apparatuses. FIG. 70 shows a case wherein a pen type information reproducing apparatus incorporates up to a data processing section 462. FIG. 71 shows a case wherein a pen type information reproducing apparatus incorporates only a detection section 184. A ROM 534 serves to store control programs executed by a CPU (not shown) incorporated in a video game apparatus body. When the cassette is inserted, the control programs are loaded into the apparatus body. A RAM 536 is used to store a processing result obtained by the data processing section 462. A memory control section 538 controls the ROM 534 and the RAM 536 in accordance with instructions from the CPU in the video game apparatus body.

In general, a video game apparatus incorporates a high-performance CPU. Therefore, processing can be performed at a higher speed by causing the CPU in the video game apparatus body to perform part of the processing than by performing all the processing in the pen type information reproducing apparatus. In addition, since the operating section of the video game apparatus can be used as an input section for various control operations, a read start designating switch such as a touch sensor and the like need not be arranged on the pen type information reproducing apparatus. Therefore, a reduction in the size of the apparatus can be realized. In this case, a control program for processing assigned to the CPU in the video game apparatus body or a control program for allowing the CPU in the apparatus body and the operating section of the video game apparatus to control the pen type information reproducing apparatus and a user interface function for operation is stored in the ROM 534. In addition, since a loudspeaker, an audio output terminal, a monitor output terminal, and the like are arranged in the video game apparatus, these components can be omitted from the pen type information reproducing apparatus and the card type adaptor. Therefore, a reduction in cost can be realized.

An operation switch in the use of the card type adaptor 524 will be described next.

An electronic notebook as the external device 532 generally has a slit to allow a card called a ROM card or an IC card to be mounted therein. When a card type adaptor is inserted/mounted in the slit, characters or symbols written on a surface of the card type adaptor are seen through a transparent touch panel 560 of the electronic notebook. When a character or symbol written on the cad type adaptor is touched, a corresponding function is activated. For example, some card type adaptor allows a display operation on a display 562.

In the case of the card type adaptor 524 for such an electronic notebook, as shown in FIG. 72, instead of arranging switches for the control system of a pen type information reproducing apparatus 564, e.g., an operation switch for turning on/off the light source 198, characters or symbols representing these switches are written at predetermined positions on a surface of the adaptor.

In addition, since a keyboard is incorporated in the external device 532 such as a personal computer or a wordprocessor, when the pen type information reproducing apparatus is connected to such a device, control can be performed on the device side without arranging control system switches in the card type adaptor 524.

In the case of the external device 532 such as a printer, which has dedicated control switches for its own operation but has no other control system switches, control system switches must be arranged on the card type adaptor 524. For example, as shown in FIG. 73, the card type adaptor 524 is elongated to be longer than a general card, and necessary switches 566 are arranged on a portion, of the card type adaptor 524, which protrudes from the device 532 when the adaptor is inserted in the device. In this case, as the switches 566, tact switches, a touch panel, or the like can be used.

An apparatus for printing a dot code will be described next.

A reel seal printing machine 572 for printing on a reel seal a dot code converted by a multimedia information recording apparatus 570 from data edited by a personal computer, a wordprocessor, or the like 568, as shown in FIG. 74, will be described.

Figure 75:
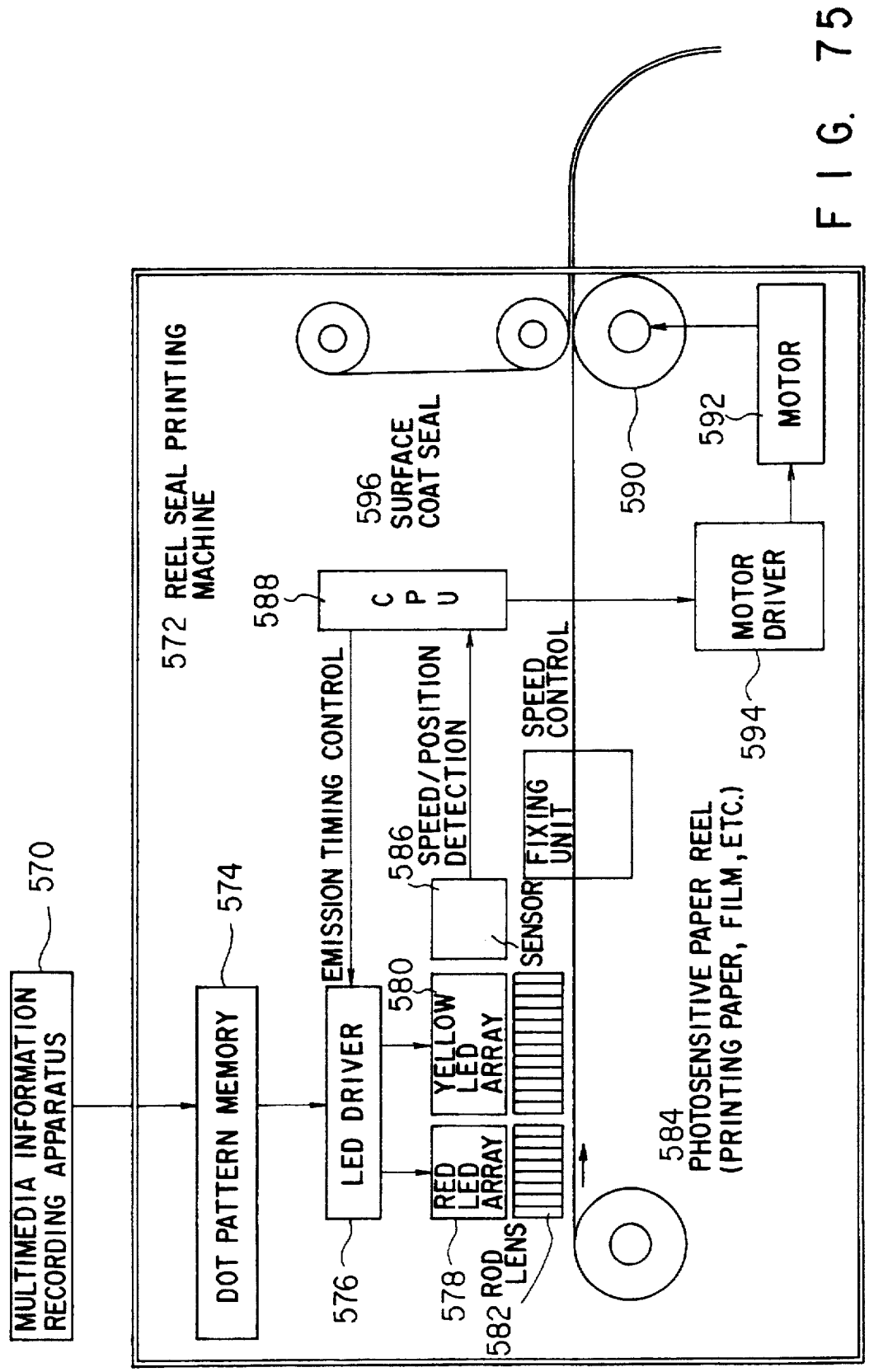
FIG. 75 is a view showing the internal arrangement of the reel seal printing machine.

FIG. 75 shows the internal arrangement of this reel seal printing machine.

A dot code from the multimedia information recording apparatus 570 is temporarily stored in a memory 574, and LED arrays 578 and 580 are turned on by an LED driver 576 in accordance with the dot pattern. Light from these LEDs is guided onto a photosensitive sheet extending from a photosensitive paper reel 584 via rod lenses 582 arranged in contact with the respective pixels. The timing of emission is managed by a CPU 588 in accordance with the speed and position of the photosensitive sheet which are detected by a sensor 586. Similarly, the feed speed of the photosensitive sheet is controlled by controlling a driver 594 for a motor for driving a roller 590 on the output stage.

In order to protect the printed dot code, a surface coat seal 596 is added by the output stage, so that the photosensitive sheet and the surface coat seal are simultaneously output in a bonded state. In this case, as a photosensitive sheet, printing paper, a film, or the like can be used. In this case, a photosensitive sheet is provided with its lower surface having adhesion properties.

If an ordinary film or the like is used as a photosensitive sheet, two types of dot codes may be multiplexed by using a red LED array as the LED array 578 and a yellow LED array as the LED 580, as shown in FIG. 75. In performing a multiplexing operation, a dot code having two colors may be formed by shifting the positions of two types of LEDs from each other. Alternatively, two types of LEDs may be turned on at the same position to form different colors so as to perform further multiplexing.

With the use of a photosensitive sheet, the reel seal printing machine 572 is characterized in that not only a high resolution but also a low cost can be realized. In addition, since the arrangement of the exposure portion uses compact LED arrays without requiring expensive processing such as scanning with a laser or the like, the cost of the apparatus can be greatly reduced. Furthermore, in this printing machine 572, since a contact type optical path is arranged, high positioning precisions for, e.g., the angles of mirrors are not required, and problems in the manufacture can be avoided, unlike an apparatus using a laser or the like.

For the sake of illustrative convenience, FIG. 75 shows the LED arrays 578 and 580 and the rod lenses 582 arranged along the traveling direction of a photosensitive sheet. In practice, however, these components are arranged along a direction perpendicular to the drawing surface, i.e., the widthwise direction of a photosensitive sheet. As is apparent, such components may be arranged in the widthwise direction as well to form a two-dimensional array so as to form a large number of dot codes at once.

In the above reel seal printing machine 572, a photosensitive sheet on which a dot code is printed is output from the roller 590 in the form shown in FIG. 74. In this case, a white blank portion is preferably set at the boundary between the current data and the next data to allow the user to visually recognize a portion for which a cutting process using a cutter or the like is to be performed. In addition, the length of a code which can be stuck varies depending on the size of a sheet on which a reel seal is to be stuck, i.e., whether the size of a sheet is A4 or B4. Accordingly, the printing machine may be designed to variably change the length of a dot code which can be printed. In such a case, for example, the following control method is employed. For example, in accordance with a manually set sheet size, the timing at which a dot pattern in the dot pattern memory 574 is read out is controlled to adaptively change the length of a dot code.

Figure 76:
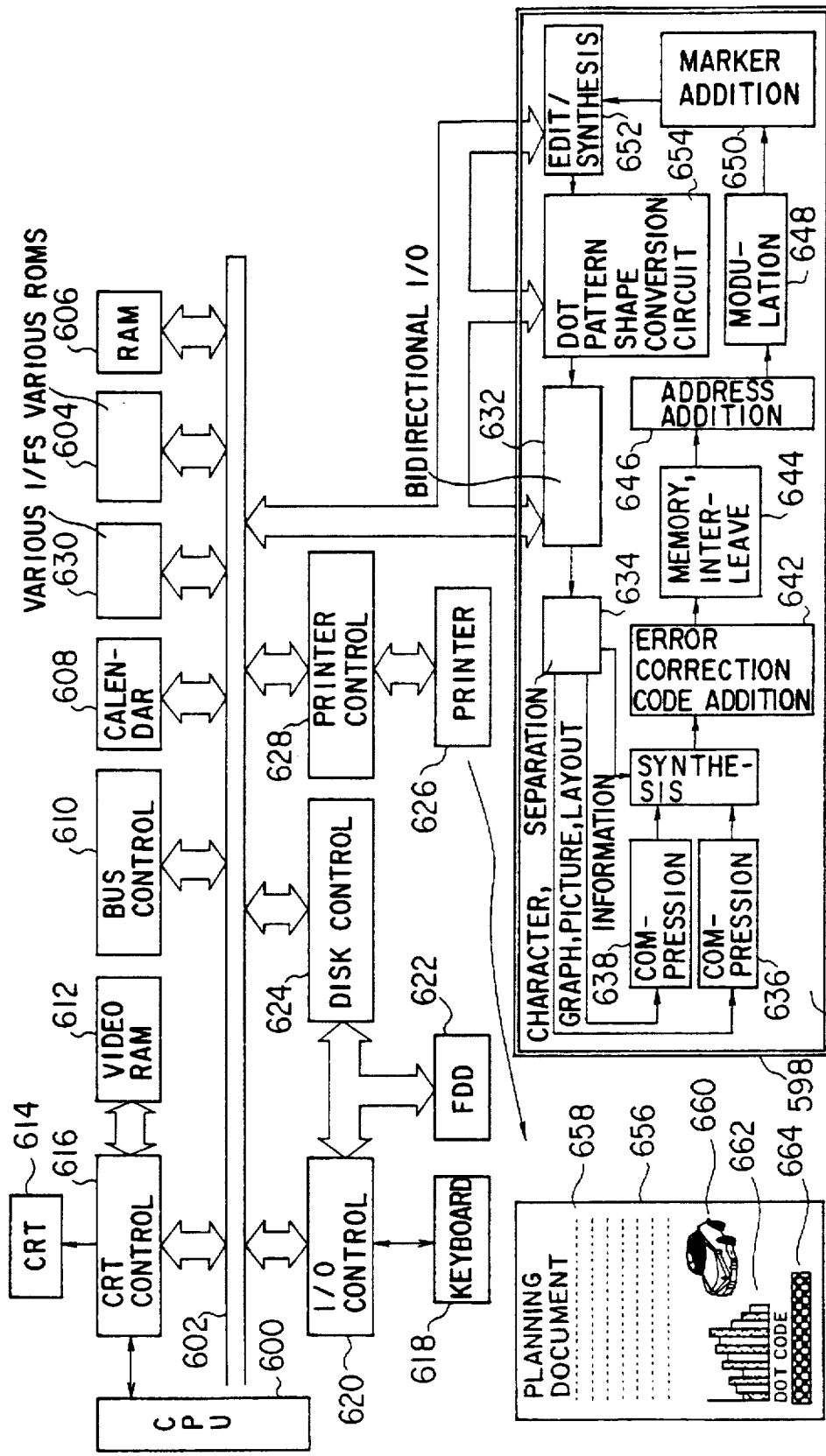
FIG. 76 is a view showing the arrangement of a word-processor incorporating a function of recording a multimedia dot code.

FIG. 76 shows the arrangement of a wordprocessor incorporating a function of recording a multimedia dot code.

This arrangement is the same as that of a general wordprocessor except for a multimedia information recording processing section 598 for generating a dot code with respect to data edited on sentences. More specifically, the following components are connected to a bus 602 extending from a CPU 600: various ROMs 604 for programs, a character generator, and the like; a RAM 606 as a work area; a calendar 608; a bus control 610; a CRT control 616 for displaying data, developed in a video RAM 612, on a CRT 614; an I/O control 620 for a keyboard 618; a disk control 624 for controlling an FDD 622; a printer control 628 for controlling a printer 626; various I/Fs 630; and the like.

The multimedia information recording processing section 598 is designed to exclusively access the bus 602. The contents of the multimedia information recording processing section 598 are basically the same as those of the multimedia information recording apparatus 570 shown in FIG. 74. That is, data supplied from the bus 602 via a bidirectional I/O 632 is separated into character, graph, and picture data by a separation circuit 634, and the respective data are properly compressed by compression circuits 636 and 638 and synthesized by a synthesis circuit 640. Meanwhile, character, picture, and graph layout information is directly input to the synthesis circuit 640. An error correction code is added to this synthetic data by an error correction code addition circuit 642, and processing such as interleave processing of the data is performed in a memory 644. Block addresses and the like are added to the data by an address addition circuit 646. The data is then modulated by a modulation circuit 648. Thereafter, markers are added to the data by a marker addition circuit 650, and a title and the like for the dot code are synthesized with the data by an edit/synthesis circuit 652. The size of the dot pattern is changed by a dot pattern shape conversion circuit 654. The resultant data is then returned to the bus 602 via the bidirectional I/O 632.

The printer control 628 controls the printer 626 in accordance with the data returned to the bus 602 to obtain a printout like the one denoted by reference numeral 656 in FIG. 76.

As shown in FIG. 76, the printout 656 is basically designed such that a picture 660 and a graph 662 are added to sentences 658 written (typed) at a wordprocessor, and the contents of the sentences 658, the picture 660, and the graph 662 are printed as a dot code 664 at a predetermined position, e.g., a lower position.

With this printout 656, the user who receives the printout 656 directly or in facsimile can load the document 658, the picture 660, and the graph 662 into the user's wordprocessor by reading the dot code 664 with the above pen type information reproducing apparatus, and can arbitrarily edit these data.

The multimedia information recording processing section 598 may be realized by software processing performed by the CPU 600.

In addition, the multimedia information recording processing section 598 may be incorporated in the printer 626 instead of being mounted in the wordprocessor. That is, the printer 626 may perform recording/modulation of input information such as font and graph information to perform a printing operation. In this case, the multimedia information recording processing section 598 may not be incorporated in the printer 626 but may be provided as a card type adaptor.

When the contents of a printout are to be transmitted in facsimile, since the resolution or definition of a facsimile is also specified as GII or GIII, the dot pattern shape conversion circuit 654 in the multimedia information recording processing section 598 may perform conversion in accordance with such a resolution, i.e., change the size of the data, as well as conversion in accordance with the resolution of the printer 626.

FIG. 77 shows an arrangement for a case wherein the function of a multimedia information recording processing section is incorporated in an optical copying machine 666, so that when a copying operation is performed, the contents of an original are copied onto a sheet, and at the same time a dot code corresponding to the contents is printed at a predetermined position on the sheet.

That is, similar to a general copying machine, the optical copying machine 666 includes an original table 668, a lamp 670, mirrors 672, a lens 674, a photosensitive drum 676, and the like and serves to copy an image on an original onto a sheet.

Furthermore, in the optical copying machine 666 of this embodiment, a half prism 678 is inserted in the optical path in front of the lens 674 to split light, and a split light beam is guided to an image pickup element 682 such as a line sensor via an optical part 680. A signal from the image pickup element 682 is amplified by an amplifier 684 and undergoes various analog processes. Thereafter, the resultant data is converted into digital data by an A/D converter 686 and recorded in a memory 688. Image area determination, data character recognition, and the like are performed with respect to the data recorded on the memory 688 by an image area determination and data character recognition circuit 690. In this case, image area determination can be performed by using the technique disclosed in Japanese Patent Application No. 5-163635 filed by the present applicant.

The data having undergone image area determination, data character recognition, and the like is compressed by a compression circuit 692. In this case, since character data, picture data, graph data, and the like require different compression schemes, the respective data are compressed according to the corresponding compression schemes. Thereafter, the resultant data and layout information are synthesized by a data synthesis circuit 694. After an error correction code is added to the synthetic data by an error correction code addition circuit 696, and the resultant data is stored in a memory 698, and processing such as interleave processing is performed again. Addresses are added to the data by an address addition circuit 700, and the resultant data is modulated by a modulation circuit 702. Markers are then added to the data by a marker addition circuit 704. The dot pattern form is converted by a dot pattern shape conversion circuit 706. A light-emitting element driver 708 causes a light-emitting element 710 to emit light in accordance with the dot pattern. At the same time, a mirror shutter 712 is raised to guide the light from the light-emitting element 710 to the lens 674 and the photosensitive drum 676.

In addition, as described above, when the data is to be transmitted in facsimile, a facsimile resolution is selected by a facsimile resolution selection section 714, and the shape of the dot code pattern is changed by the dot pattern shape conversion circuit 706 in accordance with the selected resolution.

In the image area determination and data character recognition circuit 690, a character may be handled as a binary image, and general binary image compression processing such as MR or MH may be performed. Alternatively, character recognition may be performed to convert a character into a code such as an ASCII code, which is used in a general wordprocessor, and the code may be compressed by a compression scheme such as Lempel-Ziv coding. If compression is performed in this manner after character recognition and ASCII code conversion, the compression ratio considerably increases, and a larger amount of data can be recorded with fewer dot codes accordingly.

Owing to the processing speed of the signal processing system, in printing a dot code, an original image is written/exposed first onto the photosensitive drum 676, and the mirror shutter 712 is then raised to cause the light-emitting element 710 to rewrite and print the dot code on the drum. Alternatively, a dot code may be generated by the first original scan as the pre-scan, and an original image and the dot code may be written on the photosensitive drum 676 by the second original scan. As the processing speed of the signal processing system increases in the future, processing need not be performed a plurality of number of times in this manner. If, however, an original is placed sideways on the original table 668 or placed upside down, processing must be performed a plurality of number of times to obtain a copying result having a dot code printed at a lower position on a sheet in the longitudinal direction, as indicated by reference numeral 656.

FIG. 78 shows an arrangement for a case wherein the present invention is applied to a digital copying machine 716. The same reference numerals in FIG. 78 denote parts having the same functions as those in FIG. 77. In this arrangement, an optical mirror is designed to be moved in the input section. However, a line sensor may be moved to read an original.

More specifically, in this digital copying machine 716, a dot code whose shape has been changed by a dot pattern shape conversion circuit 706 in the above manner is synthesized with original image data loaded in a memory 688 by an edit/synthesis circuit 718, and the resultant data is printed out by a printer 720. Since such a digital copying machine has the memory 688, a dot code can be printed at any position on a sheet by one scan operation instead of performing processing a plurality of number of times as described above.

The flow indicated by the broken lines in FIG. 78 will be described next. This flow indicates that only a dot code is read from an original on which the dot code is printed together with sentences and a picture, and a document as a combination form of the dot code and the sentences and the picture reproduced from the dot code is printed out, instead of generating a dot code by reading an original in the above manner.

More specifically, a dot code is read from an original by an image pickup element 682 and recorded in the memory 688 upon A/D conversion. The output from an A/D converter 686 is also input to a dot code reproducing unit 722. The dot code reproducing unit 722 includes, for example, the circuit arrangement after the scan conversion section 186 in FIG. 17, and can reproduce sentences, a picture, and a graph from a dot code. An image of the dot code stored in the memory 688 is supplied to the dot pattern shape conversion circuit 706 without any modification. After the size of the dot code is changed, the dot code is input to the edit/synthesis circuit 718. The edit/synthesis circuit 718 adds the dot code, supplied from the dot pattern shape conversion circuit 706, to the sentences, the picture, the graph, and the like reproduced by the dot code reproducing unit 722. The resultant data is input to a printer 720 to be printed out.

With this operation, since the time required to scan the original is the time required to read this code portion, the processing time can be shortened. In addition, when sentences, a picture, a graph, and the like are enlarged or reduced, a dot code can be printed without changing its size regardless of the enlargement/reduction processing.

Figure 79:
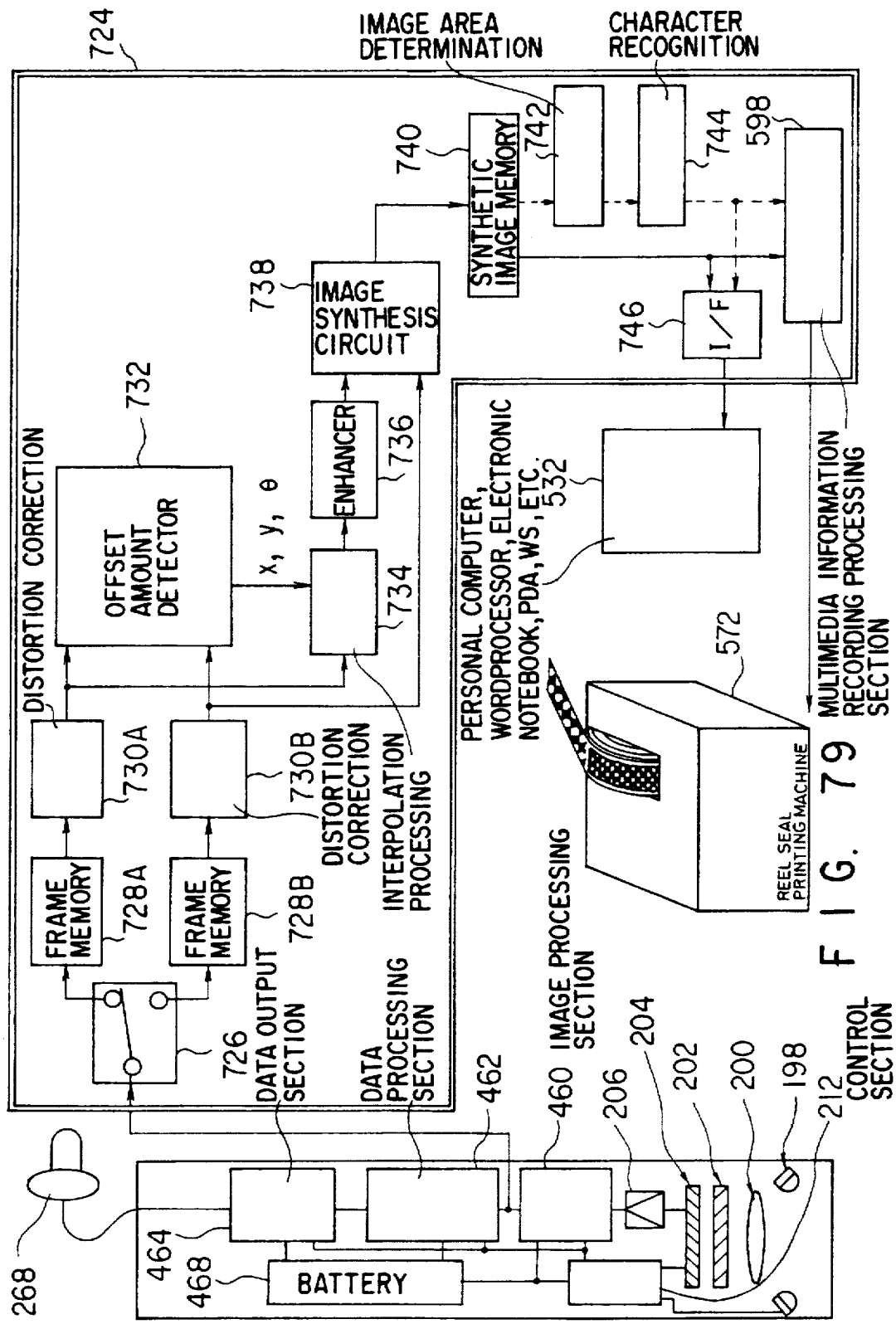
FIG. 79 is a view showing an arrangement designed to use a pen type information reproducing apparatus as an input section for character and picture data.

FIG. 79 shows a case wherein a pen type information reproducing apparatus is also used as an input section for data such as character and picture data.

More specifically, a signal from an image processing section 460 of the pen type information reproducing apparatus is input to a multimedia information recording apparatus 724. In the multimedia information recording apparatus 724, the input data, i.e., the imaged data, is input to a frame memory 728A or 728B via a selector 726. In this case, the selector 726 performs selection such that one frame is loaded in the frame memory 728A, and the next one frame is loaded in the frame memory 728B. The image data loaded in the frame memories 728A and 728B undergo removal of lens distortions such as aberrations at peripheral portions in distortion correction circuits 730A and 730B. Thereafter, the data are input to an offset amount detector 732. The offset amount detector 732 calculates a correlation between images respectively loaded in the frame memories 728A and 728B to calculate the direction and amount of an offset therebetween, thereby allowing overlapping portions of the two images to be superposed on each other as a picture when the two image are synthesized with each other. As this offset amount detector 732, the detector disclosed in, e.g., Japanese Patent Application No. 5-63978 or 5-42402 filed by the present applicant may be used. One image, i.e., the image loaded in the frame memory 728B, is interpolated by an interpolation processing circuit 734 in accordance with the detected offset amount and enhanced by an enhancer 736. Thereafter, the image is synthesized with the image loaded in the other frame memory 728B by an image synthesis circuit 738. The resultant data is stored in an image synthesis memory 740.

The next one frame is loaded in the frame memory 728A, and the same processing as described above is performed. The image loaded in the frame memory 728A is then interpolated.

Subsequently, these operations are alternately performed to obtain a large frame.

The pen type information reproducing apparatus is essentially designed to read a small code like a dot code. Therefore, the imaging area of the apparatus is very small. When the apparatus having such a small imaging area is to be used as a scanner for reading images of characters and a picture, the image must be loaded by a plurality of number of times, and the read images must be pasted to each other. For this reason, in this embodiment, a plurality of frame memories are arranged, and offset mounts are detected, and images are pasted to each other upon correction of the offsets.

The data recorded on the synthetic image memory 740 undergoes image area determination in an image area determination circuit 742. Of the data, character data is subjected first to character recognition in a character recognizing circuit 744 and then input to the multimedia information recording processing section 598, and image data is directly input thereto. The data undergoes processing such as compression in the multimedia information recording processing section 598 and is converted into a dot code. The dot code is introduced to the reel seal printing machine 572 described above. Alternatively, the data may be input to an external device 532 such as a personal computer or a wordprocessor via an I/F 746 instead of being input to the multimedia information recording processing section 598.

Note that the pen type information reproducing apparatus may have two terminals as output terminals, i.e., an earphone terminal and a terminal for outputting an image, or may be designed such that one connector is manually switched between a sound output system and an image output system.

Figure 80:
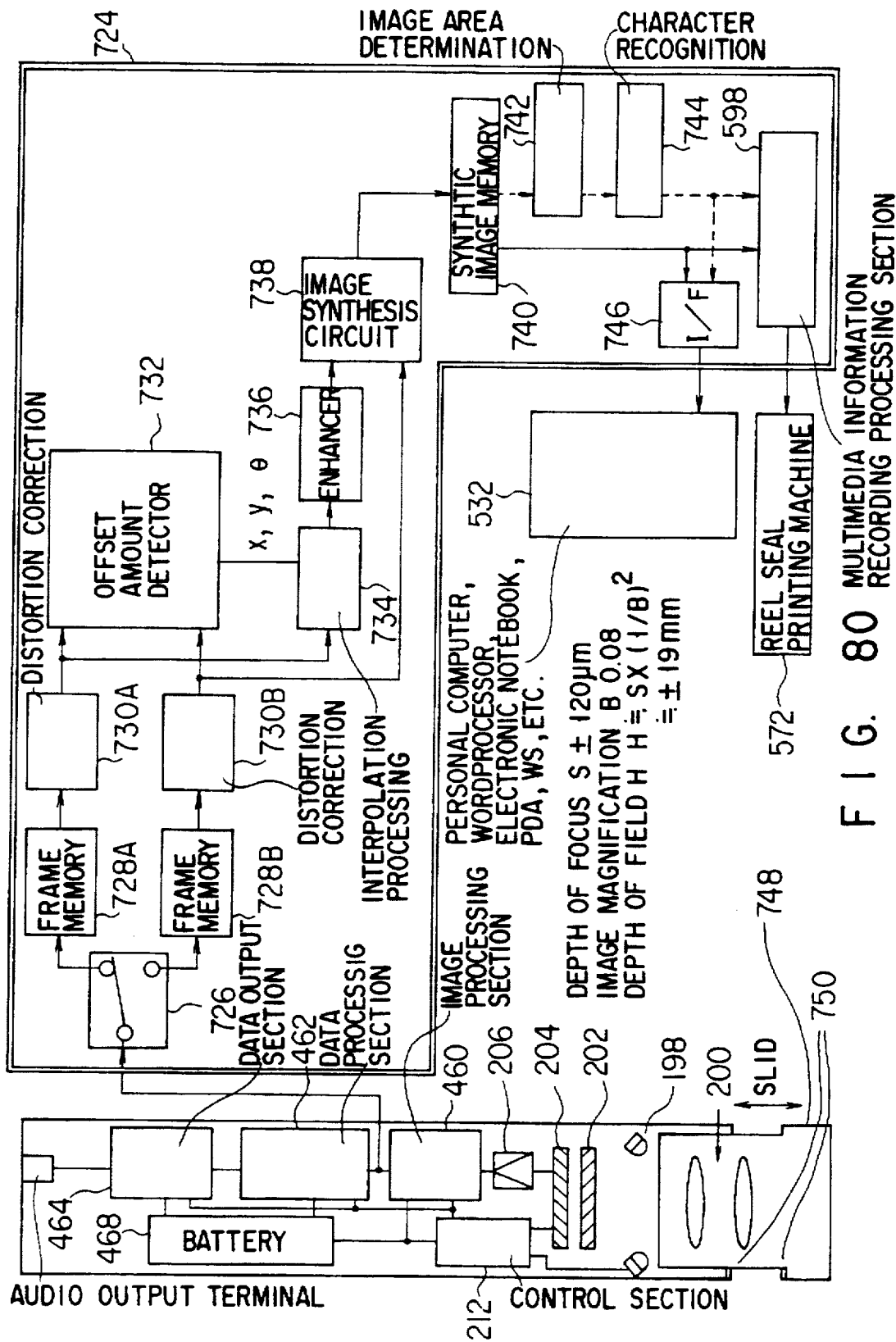
FIG. 80 is a view showing another arrangement designed to use the pen type information reproducing apparatus as an input section for character and picture data.

FIG. 80 shows a modification of the apparatus shown in FIG. 79. FIG. 79 shows the case wherein the area of the image pickup section 204 in a dot code read operation is the same as the imaging area of the image pickup section 204 when it is used as a scanner. In this embodiment, however, the image formation optical system 200 is changed such that a wide-angle mode is set when the image pickup section 204 is used as a scanner, while a macroscopic imaging operation is performed when a dot code is to be read.

More specifically, the image formation optical system 200 is constituted by a zoom or bifocal lens group used in a general camera, and designed to switch between the wide-angle mode and the macroscopic mode by sliding a lens barrel 748. The image formation optical system 200 has a scanner switch 750 which is turned on upon closing of a contact point when the lens barrel is contracted. While the scanner switch 750 is on, the control section 212 stops the operations of the data processing section 462 and the data output section 464 to allow the image pickup section 204 to be used as a scanner. While the scanner switch 750 is off, the control section 212 operates these components to allow the image pickup section 204 to perform a macroscopic operation.

When the image formation optical system 200 is set in the wide-angle mode, the imaging area is decompressed. If the focal depth is ±120 µm and the image magnification is 0.08 at this time, the depth of field is ±19 mm. Even if a shake of the apparatus occurs in the longitudinal direction, no problem is posed with this depth of field.

In addition to the scheme of sliding the lens barrel 748 to switch between the wide-angle mode and the macroscopic mode, this modification can be realized by using a scheme of interchanging lenses, i.e., mounting a lens for the macroscopic mode in place of a lens for the wide-angle mode.

Figure 81:
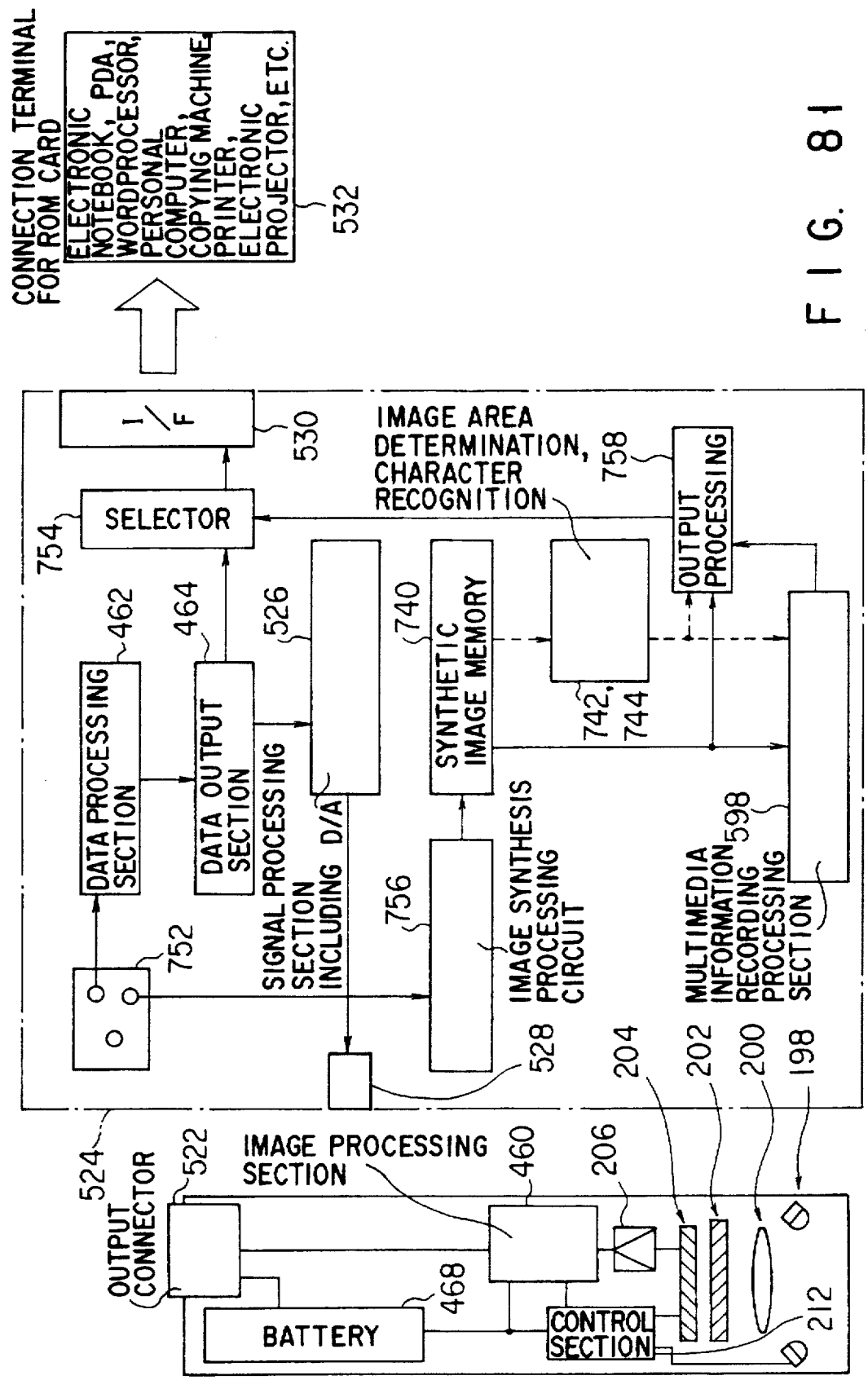
FIG. 81 is a view showing the arrangements of a scanner and a card type adaptor adapted for a data read operation.

FIG. 81 shows a case wherein a card type adaptor 524 incorporates two processing sections: a data processing section for output information corresponding to a dot code, read by the pen type information reproducing apparatus shown in FIG. 69, to an external device 532 such as a personal computer or a wordprocessor; and a data processing section for sticking images and generating a dot code when the pen type information reproducing apparatus shown in FIG. 79 is used as a scanner for sentences, pictures, and images. That is, FIG. 81 shows the card type adaptor 524 incorporating the data processing section for the scanner and the data processing section for a dot code read operation.

Referring to FIG. 81, selectors 752 and 754 serve to switch between the data processing section for the scanner and the data processing section for a dot code read operation. This switching/selecting operation may be manually performed, or may be interlocked with the ON/OFF operation of a scanner switch 750 like the one shown in FIG. 80. Alternatively, this operation may be directly performed from the external device 532 side.

An image synthesis processing circuit 756 has the functions of the selector 726, the frame memories 728A and 728B, the distortion correction circuits 730A and 730B, the offset amount detector 732, the interpolation processing circuit 734, the enhancer 736, and the image synthesis circuit 738 shown in FIG. 79. An output processing circuit 758 serves to match data (to be output) with the format of the external device 532.

Figure 82:
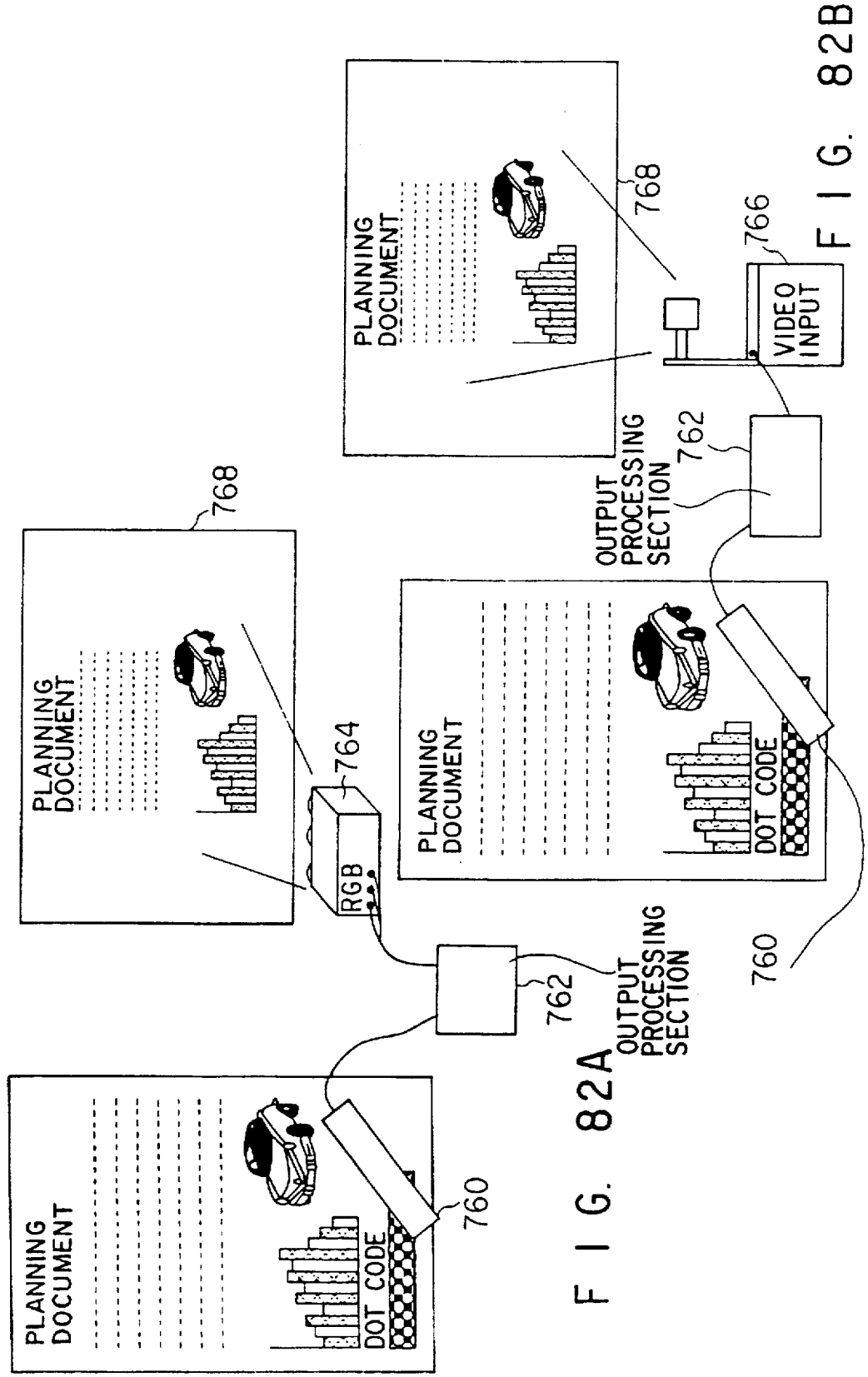
FIGS. 82A and 82B are views, each showing a system for scanning a dot code with a pen type information reproducing apparatus and projecting the dot code on a screen by using a projector.

An embodiment in which the information of a read dot code is output to an electronic projector will be described next. As shown in FIGS. 82A and 82B, a dot code is scanned by a pen type information reproducing apparatus 760, and the original information is restored by an output processing section 762. The information is then input to the RGB input terminal of a projector 764 or the video input terminal of an electronic OHP 766, thereby projecting the information on a screen 768.

In this case, the pen type information reproducing apparatus 760 incorporates the arrangement from the detection section 184 to the error correction section 194 in the arrangement of the reproducing system shown in FIG. 17 or 23. The output processing section 762 incorporates the arrangement after the data separation section 196 and other processing circuits.

Figure 83:
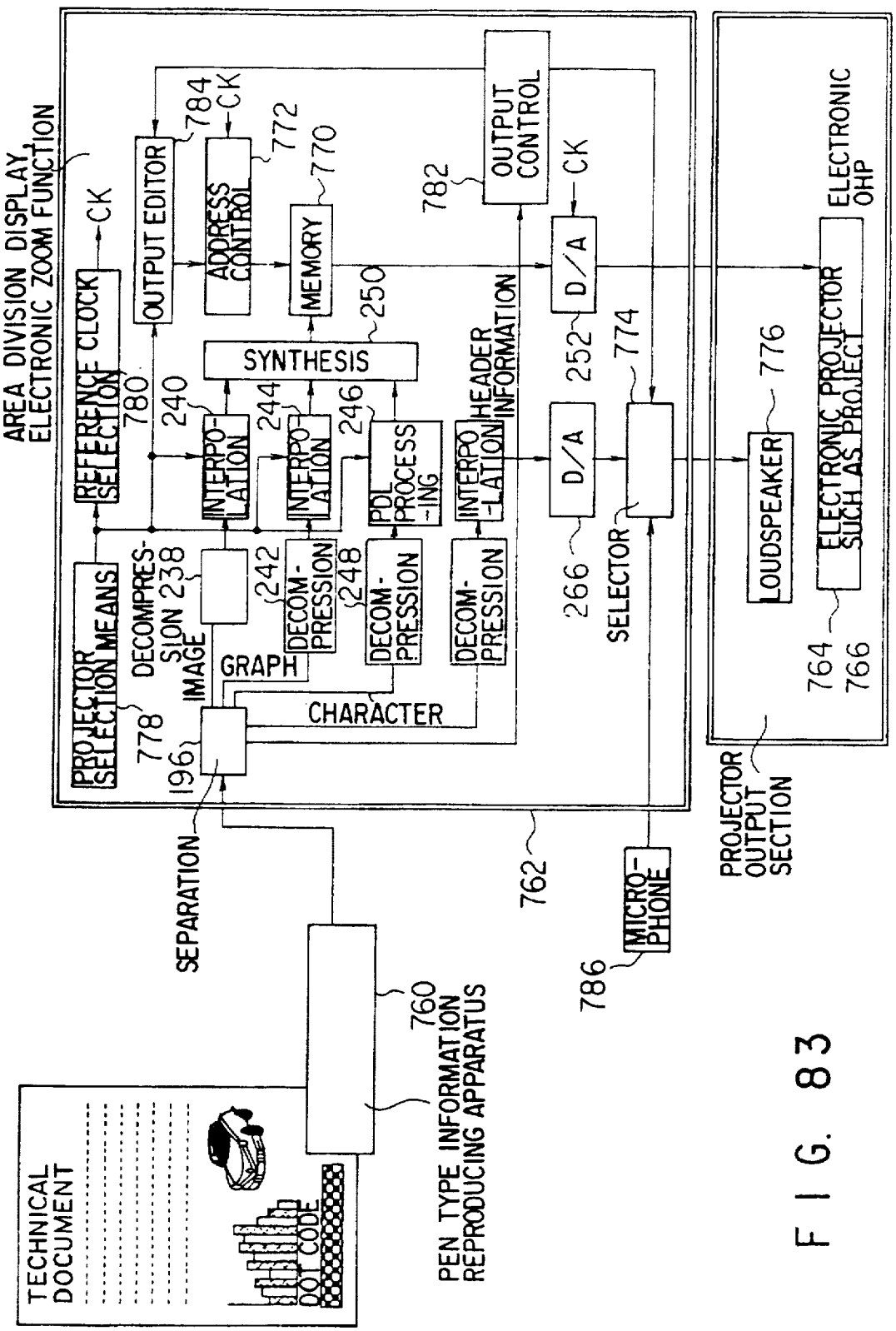
FIG. 83 is a view showing the detailed arrangement of an output processing section in FIGS. 82A and 82B.

FIG. 83 shows the actual arrangement of the output processing section 762. More specifically, multimedia information from the pen type information reproducing apparatus 760 is separated into image information, graph information, character information, speech information, and header information by the data separation section 196. The image information, graph information, and character information are decompressed by the decompression processing sections 238, 242, and 248. Thereafter, the image information and the graph information undergo interpolation processing in the data interpolation circuits 240 and 244. The character information undergoes PDL processing in the PDL processing section 246. The image information, the graph information, and the character information having undergone interpolation and PDL processing are synthesized by a synthesis circuit 250, and the resultant data is stored in a memory 770. The data stored in this memory 770 is data which can be projected on the screen 768. This data is D/A-converted by the D/A conversion section 252 and output to the projector 764 or the electronic OHP 766. In this case, the memory 770 is controlled by an address control section 772. Meanwhile, the speech information is directly decompressed by the decompression processing section 256 and interpolated by the data interpolation circuit 258. The resultant data is D/A-converted by the D/A conversion section 266 and output to a loudspeaker 776 incorporated in or provided out of the projector 764 or the electronic OHP 766 via a selector 774.

The data as a speech synthetic code is converted into speech by the speech synthesis section 260 and input to the D/A conversion section 266.

Assume that sentences are directly read during a presentation, as needed. In this case, sentences are recognized from a character code for display by a sentence recognition section 271, and the sentences are converted into speech by the speech synthesis section 260. Finally, the speech is output from the loudspeaker 776.

In this case, since any special speech synthetic code for recitation need not be recorded, a larger amount of information can be set in a dot code.

Furthermore, in this case, a projector selecting means 778 is arranged to select the projector 764 for the high-definition television scheme or only the NTSC scheme, thereby allowing connection of any type of electronic projector system. That is, the manner of assigning character sizes in the memory 770 and the like change depending on an electronic projector system as an output system. For this reason, the processing in the data interpolation circuits 240 and 244 and the PDL processing section 246 is changed, or a clock signal CK supplied to the address control section 772 or the D/A conversion section 252 is changed by a reference clock selection section 780 depending on selection by the selecting means 778.

In addition, in the operated state of an electronic projector such as the projector 764 or the electronic OHP 766, for example, as shown in FIG. 83, the user may want to perform a selective projecting operation, e.g., projecting only sentences, a picture, or a graph. In such a case, the user can select an operation through an output control section 782. Alternatively, information designating projection of only sentences, a picture, or a graph is written, as header information, in a dot code in advance, and the user can select a portion to be output in accordance with the header information through the output control section 782. An output editor section 784 performs a cutting operation of projecting a specific portion in accordance with selection by the output control section 782, and causes the address control section 772 to access the corresponding portion in the memory 770, thereby causing the memory 770 to output data for projection. In addition to such area division processing, the output editor section 784 can perform decompression processing of part of the sentences or only the picture, and edit processing of focusing some of the sentences or only the picture portion and decompressing the focused part. In order to perform such processing, an input section and a display section are preferably arranged in the output processing section 762 to perform processing such as graphical user interface, thereby allowing the user to actually designate a portion to be decompressed.

Speech is input as a dot code and output from the D/A conversion section 266. In addition, speech from an external microphone 786 can be selected by the selector 774.

Note that only the detection section 184 may be arranged in the pen type information reproducing apparatus 760, and the scan conversion section 186 and the subsequent components may be arranged in the output processing section 762. In contrast to this, the pen type information reproducing apparatus 760 may incorporate components up to the data separation section 196 so that separated data can be sent in some form to the output processing section 762. In practice, the size of the pen type information reproducing apparatus 760 is preferably minimized in consideration of the fact that the apparatus is held with a hand of the user. It is, therefore, preferable that only the detection section 184 be arranged in the apparatus, and subsequent processing be performed by the output processing section 762.

FIG. 84 shows a case wherein data is output to a copying machine 788, a magnetooptical disk drive (MO) 790, and a printer 792 instead of the above electronic projector. An output processing section is incorporated, as hardware or software, in a personal computer or the like 794. FIG. 84 shows a state wherein an output from the output processing section is supplied to the copying machine 788, the MO 790, and the printer 792 online or offline using a floppy disk 796 or the like. FIG. 85 shows a case wherein the output processing section is designed as a card type adaptor 800 to be mounted in the printer 792 or an electronic notebook 798.

Figure 86:
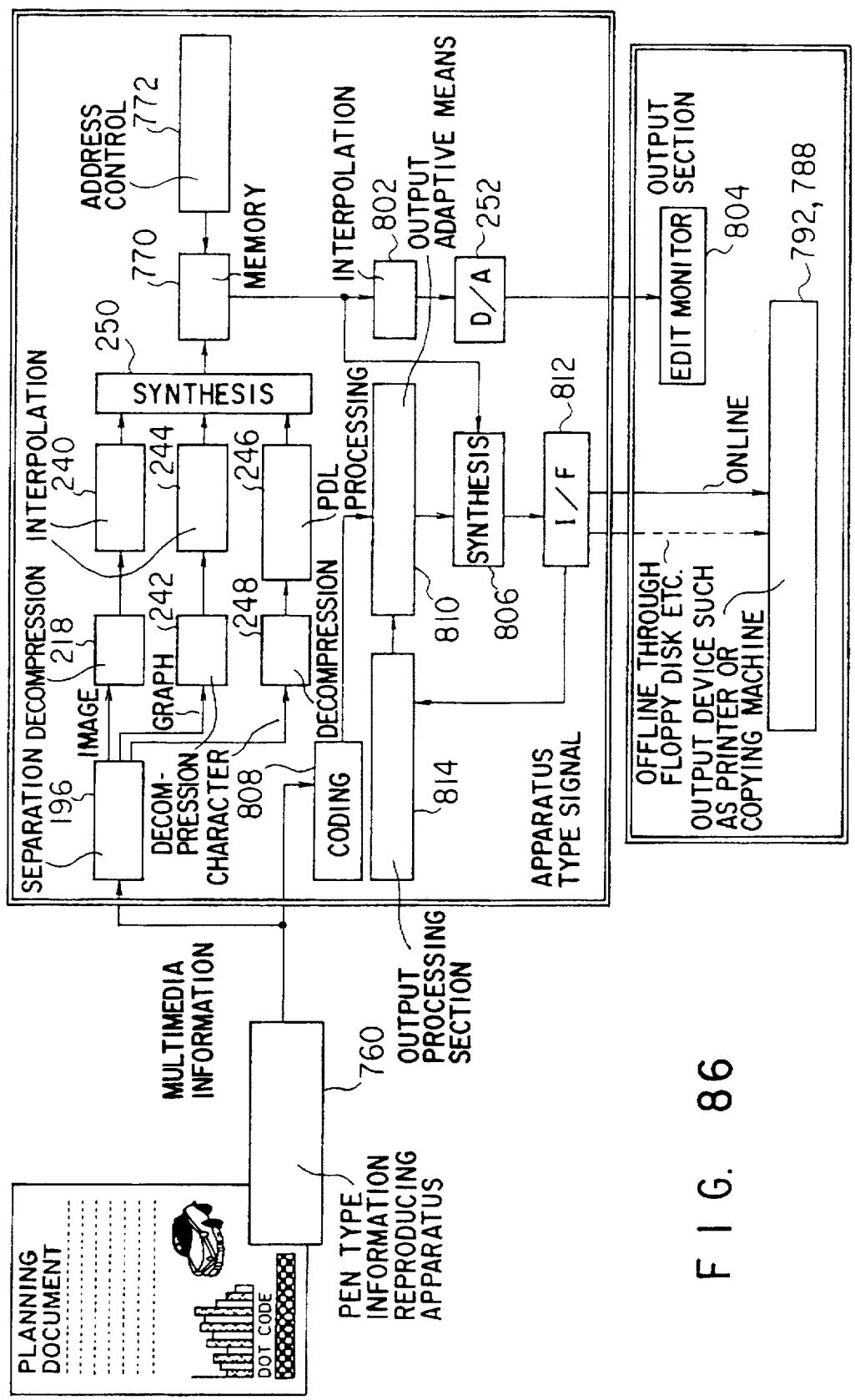
FIG. 86 is a view showing the detailed arrangement of the output processing section.

FIG. 86 shows the actual arrangement of the output processing section 762 in this case.

Similar to the embodiment of the projector described above, multimedia information is input and separated into image information, graph information, and character information by the separation section 196. These pieces of information are respectively decompressed by the decompression processing sections 238, 242, and 248. The image information and the graph information are interpolated by the data interpolation circuits 240 and 244. The character information is subjected to PDL processing in the PDL processing section 246. The pieces of information are then synthesized by the synthesis circuit 250 and stored in the memory 770. The memory 770 is controlled by the address control section 772. The readout data is output to an edit monitor 804 via an interpolation section 802 and the D/A conversion section 252 to check data to be actually output. Note that this edit monitor 804 may be omitted.

The data read out from the memory 770 is also input to a synthesis section 806. A coding section 808 converts the multimedia information from the pen type information reproducing apparatus 760 into a dot code again, an output adaptive interpolation section 810 performs output interpolation of the dot code in accordance with the resolution of the printer 792 or the like, to which the dot code is to be output, and this synthesis section 806 synthesizes the resultant data with the data from the memory 770. That is, the synthesis section 806 adds a dot code to sentences and a picture and outputs the resultant data to the printer 792 or the copying machine 788 via an I/F 812.

When information is to be output from the printer 792, an output selecting means 814 automatically set a resolution upon recognition of the type of the printer 792 connected to the output section 762. When information is to be transmitted offline using the floppy disk 796 or the like, since the type of a printer cannot be recognized, the resolution is set manually.

In this arrangement, sentences are directly copied or printed, whereas a dot code can be output in accordance with the resolution of a medium to which the dot code is to be output.

When the output section is to be connected to the electronic notebook 798, since no dot code input to the electronic notebook 798, no system for recording a dot code is required. The arrangement is almost the same as that shown in FIG. 69.

Figure 87:
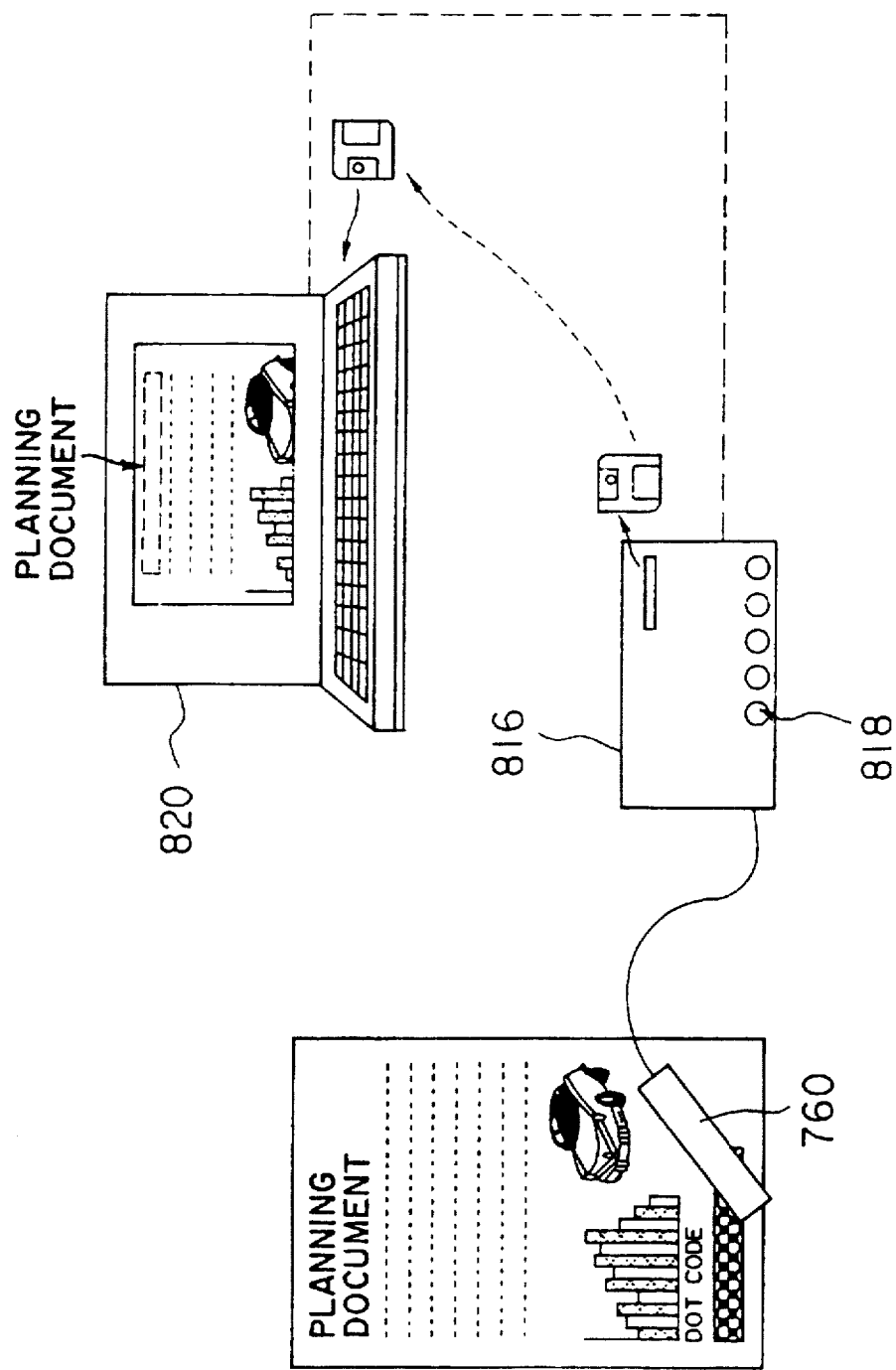
FIG. 87 is a view showing an arrangement including a format conversion section for converting the format of data for each type of wordprocessor.

FIG. 87 shows an embodiment including a format conversion section 816 for converting the format of data in accordance with each apparatus type so as to cope with the current situation that different types of wordprocessors employ different data formats. The format conversion section 816 has wordprocessor select switches as apparatus type selecting means 818. The format conversion section 816 reads a dot code through a pen type information reproducing apparatus 760, converts the data in accordance with selection by the apparatus type selecting means 818, and inputs the resultant data to a wordprocessor 820.

Figure 88:
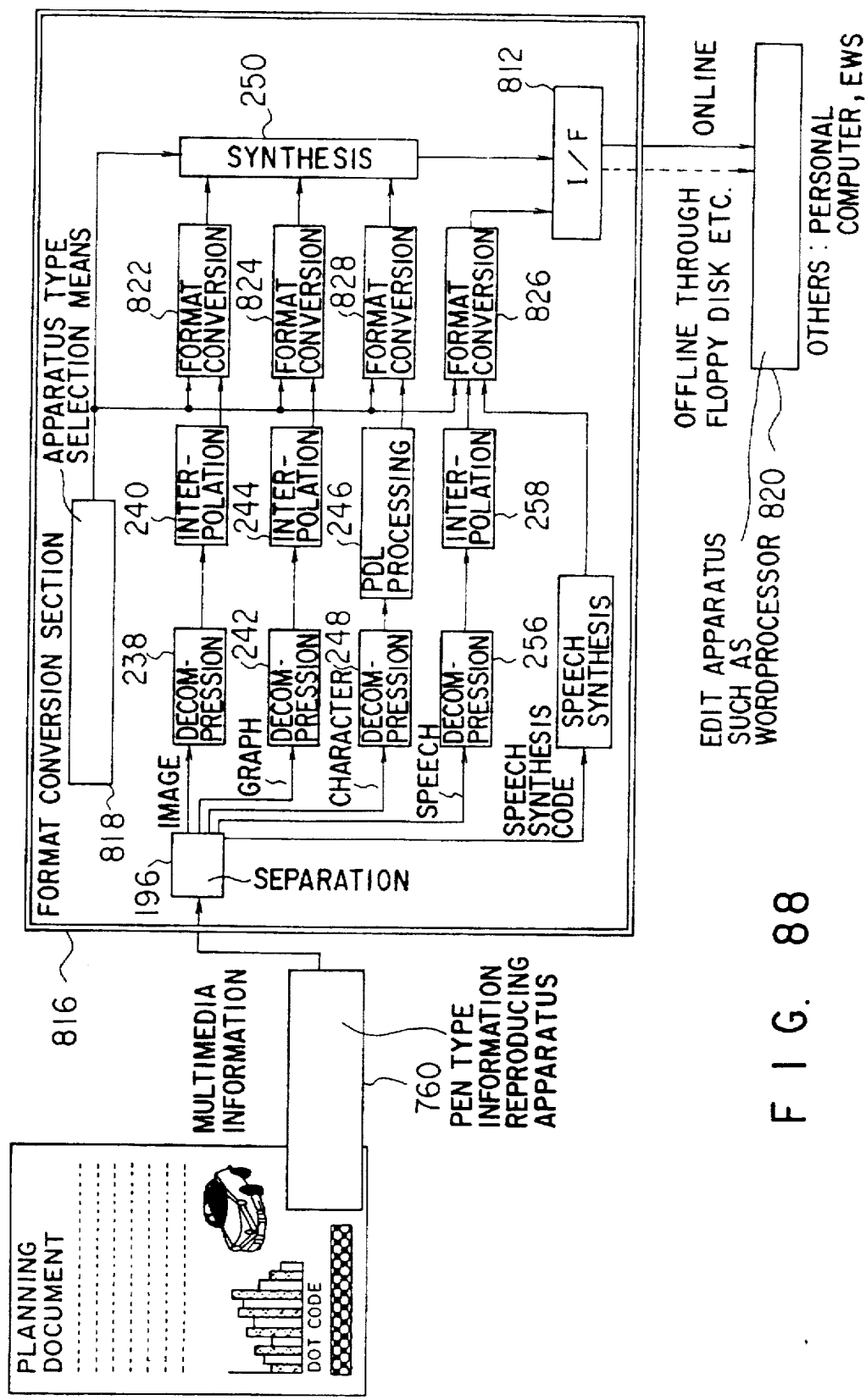
FIG. 88 is a view showing the actual arrangement of the format conversion section.

FIG. 88 shows the actual arrangement of the format conversion section 816. That is, after data are respectively processed by data interpolation circuits 240, 244, and 258, a PDL processing section 246, and a speech synthesis section 260, the formats of the respective data are converted by format conversion circuits 822, 824, 826, and 828 in accordance with selection by the apparatus type selecting means 818.

Figure 89:
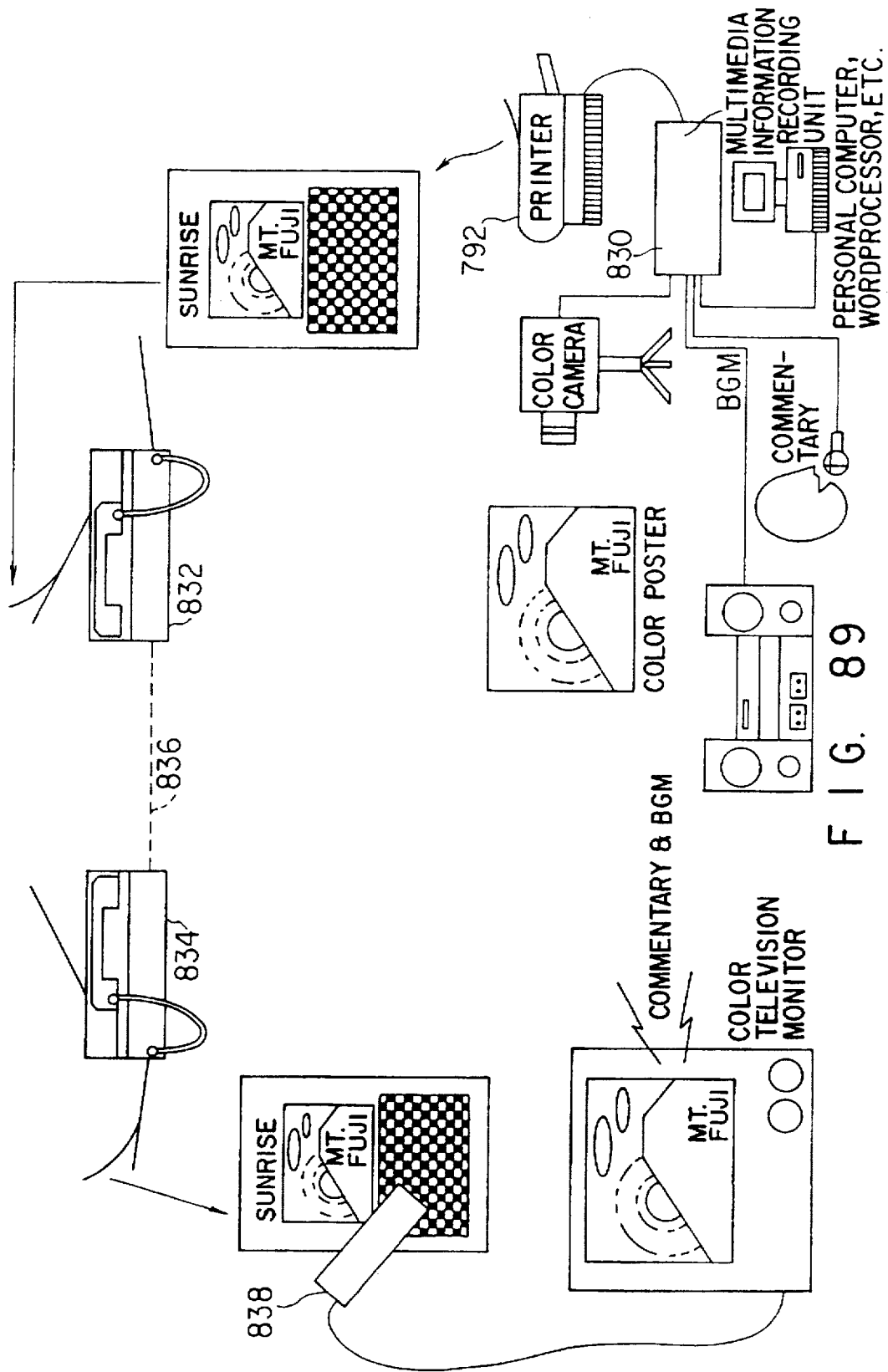
FIG. 89 is a view showing a case wherein a sheet on which a dot code is recorded is transmitted/received in facsimile.

FIG. 89 shows a system for transmitting/receiving a sheet (to be referred to as multimedia paper hereinafter), on which a dot code is recorded, in facsimile. In this system, a dot code generated by a multimedia information recording unit 830 for facsimile is printed out by a printer 792 and transmitted from a transmission-side facsimile 832 to a reception-side facsimile 834 via a telephone line 836. The reception-side facsimile 834 receives this information, restores it to the information on the sheet, and reproduces the dot code by using a pen type information reproducing apparatus 838.

Figure 90:
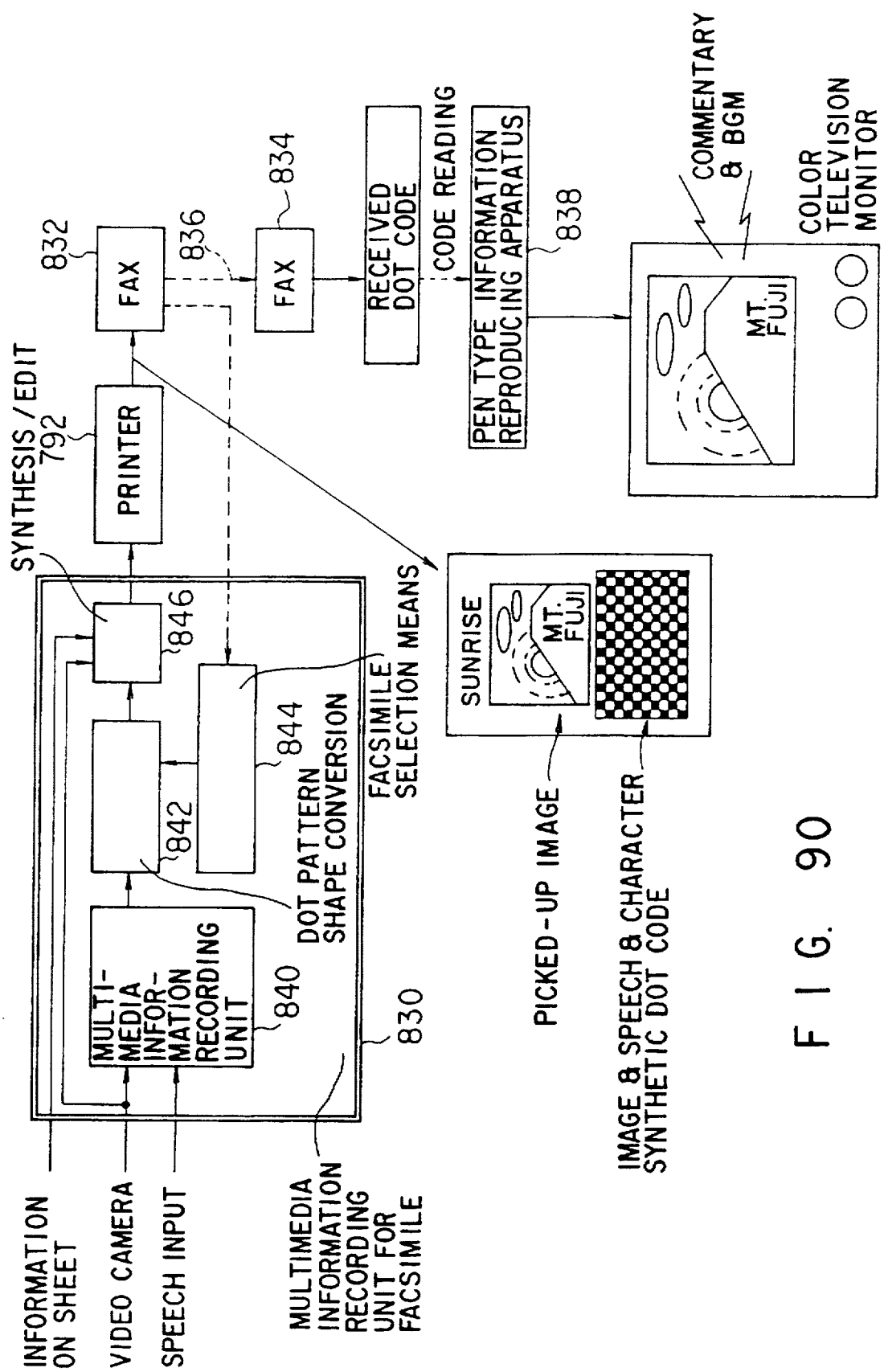
FIG. 90 is a view showing the arrangement of a multimedia information recording apparatus for a facsimile system.

As shown in FIG. 90, the multimedia information recording unit 830 for fascimile is constituted by a multimedia information recording unit 840, a dot pattern shape conversion circuit 842, a facsimile selecting means 844, and a synthesis/edit circuit 846. The multimedia information recording unit 840 includes components up to the marker addition section 162 in the arrangement of the recording system shown in FIG. 15. The synthesis/edit circuit 846 corresponds to the synthesis/edit processing section 164. The dot pattern shape conversion circuit 842 and the facsimile selecting means 844 correspond to the dot pattern shape conversion circuit 706 and the facsimile resolution selection section 714 in FIGS. 77 and 78.

In this case, when line connection is performed by the transmission-side facsimile 832 with respect to the reception-side facsimile 834 via the telephone line 836, data indicating a terminated state is sent from the reception-side facsimile 834 to the transmission-side facsimile 832. This data is supplied to the facsimile selecting means 844 manually or directly to select a facsimile resolution or resolving power. The dot pattern shape conversion circuit 842 then changes the shape of the pattern itself in accordance with the size of the dot code pattern or the amount of data which can be written on one line. The resultant data is synthesized with the information on the sheet by the synthesis/edit circuit 846, and the synthetic data is printed out by the printer 792, thereby printing multimedia paper to be transmitted in facsimile.

FIG. 91 shows a facsimile-incorporated multimedia information recording unit 848 in which all the above processing is automated, and even the facsimile transmission/reception means is incorporated.

In this case, resolving power information on a facsimile of the other party is checked upon line connection via a telephone line 836, the shape of a dot pattern is optimized by using the information, and the dot pattern is synthesized with information on the sheet to be transmitted.

FIG. 92 shows the arrangement of an overwrite type MMP card recording/reproducing apparatus for recording/reproducing cards (to be referred to as multimedia paper (MMP) cards hereinafter) on which dot codes are printed, as shown in FIGS. 93A and 93B.

In this recording/reproducing apparatus 850, an MMP card 852 inserted into a card insertion slit (not shown) is conveyed to a dot code detection section 856 by a card conveyance roller section 854; a dot code written on the lower surface of the MMP card 852 is read; the read information is converted into the original multimedia information by a data code reproducing section 858; and the resultant data is output to an I/F or a data separation section (not shown). That is, the dot code detection section 856 corresponds to the detection section 184 in the arrangement shown in FIG. 17 or 23, and the data code reproducing section 858 has the circuit arrangement including components from the scan conversion section 186 to the error correction section 194. Note that the dot code detection section 856 includes image pickup sections for the upper and lower surfaces of a card. Of these image pickup sections, the one corresponding to the lower surface of the card is used as the image pickup section 204 in the detection section 184. In addition, in this case, the MMP card 852 has a dot code recording area 852A on its lower surface, as shown in FIG. 93A. Images such as a title, a name, and a picture are recorded on the upper surface of the card.

This recording/reproducing apparatus 850 receives information other than the information already written on the card from, e.g., an external personal computer or memory unit via an I/F 860. Information to be written, as a dot code, on the lower surface of the card is supplied to a data synthesis/edit section 862 and synthesized with information reproduced by a data code reproducing section 862. If, for example, new information different from past information is input from the I/F 860, the address is updated to the next address to be newly added to the data. If data is to be partly changed, only the portion to be changed is replaced, thereby performing synthesis/edit processing of the data. The information having undergone synthesis/edit processing in this manner is input to a code pattern generation section 864 and converted into a dot code. The code pattern generation section 864 has an arrangement like the one shown in FIG. 15. The code pattern generation section 864 synthesizes and edits a generated dot code and data (to be printed) other than a code from the I/F 860, and supplies a printing section 866 with the data to be printed. This printing section 866 also receives picture pattern data on the upper surface of the MMP card 852 from the dot code detection section 856, and prints the data on the upper and lower surfaces of a card having no data printed thereon and fed from a paper feed cartridge 868. The new MMP card is then conveyed to a card discharge slot (not shown) by a card conveyance roller section 870 to be discharged. In printing data on the upper and lower surfaces of a card in the printing section 866, data may be printed on one surface first, and data is then printed on the other surface after the card is reversed. Alternatively, data may be printed on the upper and lower surfaces of a card at once.

On the other hand, an old card passes through the dot code detection section 856 and is coated with, e.g., a black paint-out ink by a paint-out roller 872. The card is then discharged with the recording area 852A being blacked out. As a result, the original card which has been painted out can be returned to the user. Therefore, there is no possibility that the old card is misused.

As described above, according to the overwrite type MMP card recording/reproducing apparatus 850 of this embodiment, when a card on which information has already been recorded to some extent is inserted in this recording/reproducing apparatus 850, the information is read and combined with newly added information to issue a new card. It seems to the user that an old card is discharged after data is added thereto. Since the old card is left, the card is returned to the user. Therefore, a card is replaced as if an overwrite operation were performed.

FIG. 94 shows another arrangement of the overwrite type MMP card recording/reproducing apparatus. This recording/reproducing apparatus 874 is basically the same as the recording/reproducing apparatus 850 shown in FIG. 92. The recording/reproducing apparatus 874, however, is an apparatus used when an old card need not be returned to the user. Therefore, in the recording/reproducing apparatus 874, a shredder 876 for shredding an old card is arranged after the dot code detection section 856.

FIG. 95A shows still another arrangement of the overwrite type MMP card recording/reproducing apparatus. In this recording/reproducing apparatus 878, the arrangement of an MMP card is different from that of the MMP card 852 described above. More specifically, data is directly printed on the base of the MMP card 852 itself. As shown in FIG. 96A, however, an MMP card 880 in this embodiment is designed such that a very thin sheet (film) 884 on which a dot code is recorded is stuck to a card base 882 consisting of thick paper, a plastic material, or the like. That is, a thin film-like sheet on which data is recorded as shown in FIG. 96B is stuck to the lower surface of the In the recording/reproducing apparatus 878 using this an MMP card 880, data read by a dot code detection section 856 is synthesized with data from a personal computer or the like in the same manner as described above, and the resultant data is input, as a code pattern, to a printing section 866. At this time, the printing section 866 does not print the dot pattern on the lower surface of the card but prints it on a code recording sheet 888 from a paper feed cartridge 886, and newly sticks the sheet to the card base 882. In this case, as shown in FIG. 95B, one of the surfaces of the code recording sheet 888, which is not a printing surface 890 of the code recording thin sheet 884 on which a code is actually printed, is an adhesive surface 892 on which a self-adhesive such as an adhesive is coated, and a protective sheet 894 is put on the adhesive surface 892. After a printing operation, the protective sheet 894 is peeled off by a peeling bar 896 and wound up by a protective sheet wind-up reel 898. The adhesive surface 892 of the code recording thin sheet 884, from which the protective sheet 894 has been peeled off, is exposed and pressed against the card base 882 by a pressing roller section 900 to be stuck thereto. The card is then discharged as a data-recorded card.

In this case, since the code recording thin sheet 884 is a very thin film-like member, the sheet may be stacked/stuck on the card base 882. However, if such thin sheets are stacked on each other, the thickness of the card increases to some extent, even though they are thin sheets. For this reason, an old code-pattern-recorded thin sheet peeling section 902 is arranged midway along a card conveyance path extending from the dot code detection section 856 to the pressing roller section 900 to peel off an old code-recorded sheet. This peeled old code-recorded sheet may be directly discharged or shredded by a shredder.

An additional information addition section 904 in FIG. 95 serves to add, for example, time information indicating a specific time at which data is recorded on an original card by this recording/reproducing apparatus 878, or information identifying a specific terminal when the recording/reproducing apparatus 878 is used as a terminal connected to a service center. With this information, the used recording/reproducing apparatus 878 can be identified, or the interval between recording operations can be known.

FIG. 97 shows still another arrangement of the overwrite type MMP card recording/reproducing apparatus. This recording/reproducing apparatus 906 is basically the same as the recording/reproducing apparatus 850 shown in FIG. 92. The recording/reproducing apparatus 906 paints out a recording surface in white instead of black to obtain a new printing surface. For this purpose, a white paint-out ink cartridge 908 and a white paint-out ink roller 910 are arranged after a dot code detection section 856.

With this arrangement, since the lower surface of an MMP card is painted in white, new data is printed on the surface by a printing section 866. Although a paper feed cartridge 868 is arranged to issue a new card, this component may be omitted.

A direct-read-after-write type MMP card recording/reproducing apparatus will be described next. The direct-read-after-write type apparatus is an apparatus for additionally writing new information without erasing old information as long as a non-recorded area exists. In this case, all reproduction processing of a dot code need not be performed except for a case wherein data reproduction from a card is to be performed, i.e., in a recording operation, unlike the above overwrite type apparatus.

FIG. 98A shows the arrangement of a direct-read-after-write type MMP card recording/reproducing apparatus 912. In a recording operation, a data code reproducing section 858 reproduces only the marker information and address information of two-dimensional blocks, and a code pattern generation section 864 generates block addresses corresponding to a portion to be subjected to direct-read-after-write processing. A data-recorded area detection section 914 detects a data-recorded area of the card. A printing section 866 prints a pattern from the code pattern generation section 864 on a non-recorded area (direct-read-after-write area) of the card on the basis of the information from the data-recorded area detection section 914.

As shown in FIG. 98B, the data-recorded area detection section 914 is constituted by a data-recorded area detection section 916, a marker detection section 918, a last portion marker coordinate calculation section 920, and a direct-read-after-write start coordinate output section 922. That is, since the sizes of a marker and a block are known, the range of a data-recorded area in the code recording area can be automatically detected by the data-recorded area detection section 916 and the marker detection section 918. Therefore, direct-read-after-write start coordinates are calculated by the last portion marker coordinate calculation section 920, and the resultant data is output from the direct-read-after-write start coordinate output section 922.

The data-recorded area detection section 914 may have an arrangement like the one shown in FIG. 99. In this case, however, as shown in FIG. 100, record markers 924 indicating the range of a data-recorded area must be recorded on a marginal portion of a card.

In the data-recorded area detection section 914 detects, these record markers are detected by a recorded marker detection section 926, the range of a data-recorded area is calculated by a last portion recorded marker coordinate calculation section 928, and direct-read-after-write start coordinates are output from the direct-read-after-write start coordinate output section 922. That is, a small dot code marker need not be detected, but the larger record markers 924 are detected to facilitate a detecting operation.

Note that these record markers 924 can be used to perform positioning in the printing section 866. More specifically, in the previous case, positioning in the printing section 866 demands a dot code read operation as well, but positioning can be performed by using only the record markers 924. That is, with detection of the record markers 924, data may be recorded with a space of about 1 mm being ensured between a data-recorded area and a direct-read-after-write portion, or may be recorded with an offset of about 1 mm in the vertical direction in FIG. 100. Therefore, a direct-read-after-write operation can be very easily performed. The block address of a data-recorded block may be read depending on the contents subjected to direct-read-after-write processing. With this operation, by adding a block address next to the last block address to a direct-read-after-write portion, the block address of the portion can be made to have continuity as one code.

FIG. 101 shows a name card read system as an application using the above overwrite type or direct-read-after-write type MMP card. In this system, a MMP name card 930 on which multimedia information is written as a dot code is read by a MMP name card reader 932, an image is displayed on a CRT 938 of a personal computer or the like 936, and speech is generated by a loudspeaker 938. The MMP name card reader 932 is the same as the above information reproducing apparatus especially in terms of arrangement. However, this apparatus is formed as a stationary type apparatus rather than a pen type apparatus because the apparatus is designed to read a name card. As is apparent, the MMP name card reader 932 may be provided in the form of a pen type information reproducing apparatus and a card type adaptor, as described above, and display and reproducing operations may be performed by an electronic notebook or the like.

As in the case of the above overwrite or direct-read-after-write type MMP card, a dot code may be printed on the lower surface of an MMP name card 930 having an upper surface on which a company name, a section to which the user belongs, a name, an address, and a telephone number are written, as shown in FIG. 102A. If English letters are written on the lower surface of a card as well, a dot code may be recorded by stealth printing 940 using an infrared luminescent ink or fluorescent ink, as shown in 102B.

An MMP card formed by a semiconductor wafer etching scheme will be described next. This card is obtained by recording a minute dot pattern on a semiconductor wafer by using a semiconductor etching technique. The reflectance of a wafer surface having undergone mirror finish is different from an etched pattern portion. With this contrast, the dot code can be read. In order to increase the contrast and the S/N ratio, a member such as aluminum which greatly differs in reflectance or color from the wafer surface may be embedded in the etched dot code pattern.

FIGS. 103A and 103B and FIGS. 104A to 104C show the arrangement of this card. A wafer 942 on which a dot code pattern is recorded is embedded in a base 946 of a card body 944. In this case, since the dot code pattern is recorded with a dot size at the several μm or sub-μm level, recording can be performed at a very high density. Therefore, a ROM card of a gigabyte level can be realized.

In addition, this card need not perform a normal operation electrically, unlike a ROM-IC. For this reason, even if part of a pattern is defective, error correction processing can be performed in a reproducing apparatus. Therefore, the yield of the card is much higher than that of the ROM-IC. In addition, the number of steps for the card is much smaller than that for the IC, the card can be supplied at a very low cost.

However, the dot code pattern is formed at a very small pitch, careful consideration must be given to dust, fingerprints, and the like. For example, in order to protect the dot code pattern, a plurality of slide type protective covers 948 are attached to the wafer 942 surface of the card body 944, as shown in FIGS. 103A and 103B, or a single protective shutter 950 is attached to the surface, as shown in FIGS. 104A to 104C.

In this case, the number of protective covers 948 is four. These covers can be selectively opened in several ways. For example, only a necessary cover may be opened, or the covers may be opened in the manner of opening sliding doors. When the card is to be inserted, all the covers may be slid to one side.

The protective shutter 950 is designed such that it is entirely opened when the card is inserted, and is closed when the card is removed. For example, as shown in FIGS. 104B and 104C, the wafer portion 942 is put on the base 946, and grooves 952 are formed in both sides of the base 946. The protective shutter 950 is fitted in the grooves. A stopper 956 is formed on the distal end of a pawl portion 954 on a side surface of the protective shutter 950. On the card base 946 side which receives the protective shutter 950, the depth of each groove 952 decreases to stop the stopper 956 to stop at a predetermined position, thereby preventing the protective shutter 950 from being opened beyond a predetermined position.

When a dot code is to be reproduced from such an MMP card formed by the semiconductor wafer etching scheme, a pen type information reproducing apparatus like the one described above may be used. In this case, however, an image formation optical system of the microscope level must be used. Alternatively, an image formation optical system may be mechanically moved in the form of a line sensor.

Figures 105, 106:
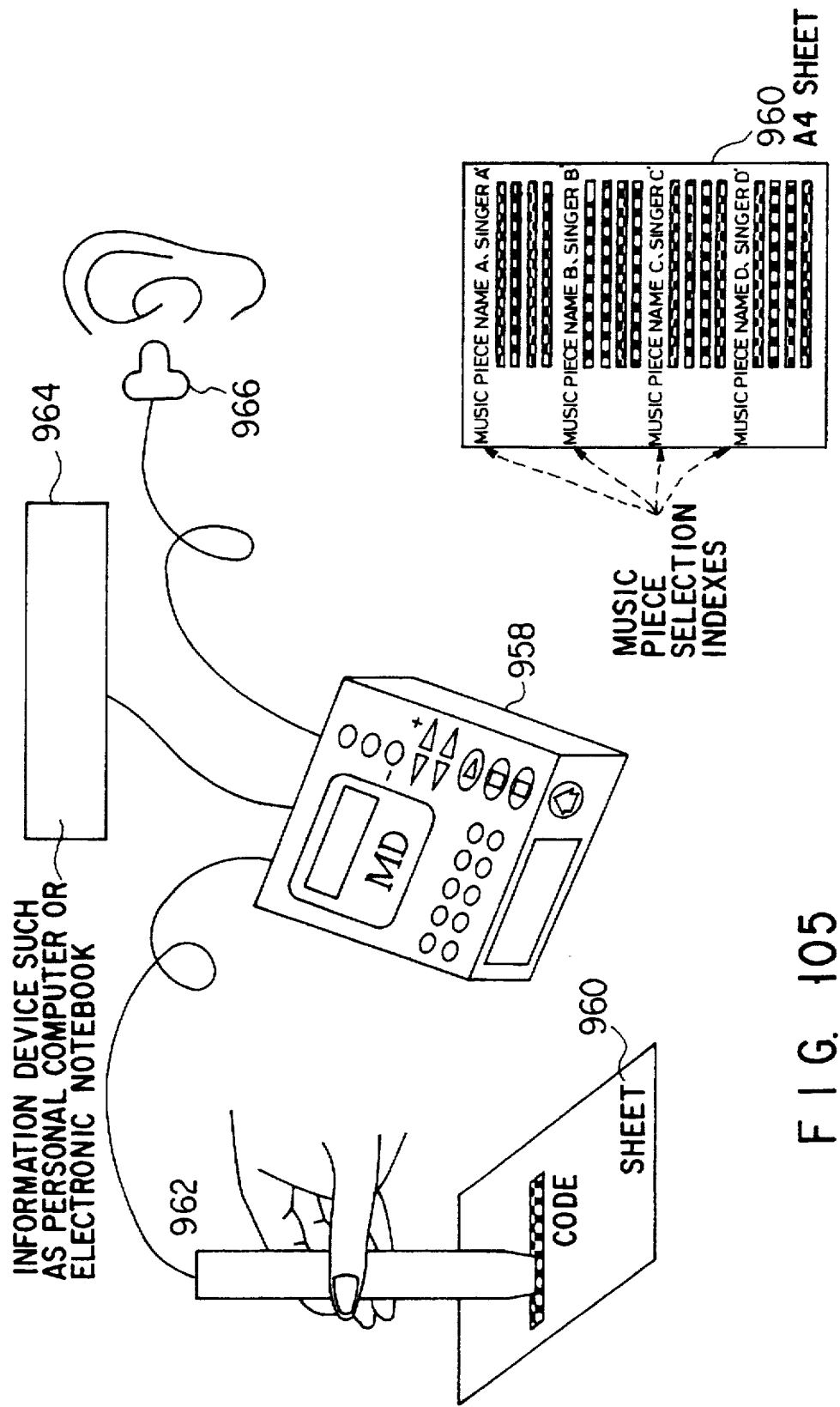
FIG. 105 is a view showing a disk apparatus with a dot code decoding function.
FIG. 106 is a view showing dot codes and indexes.

FIG. 105 shows a disk apparatus 958 with a dot code decoding function. More specifically, a dot code reproducing function and a recording function are newly added to a known disk apparatus for recording/reproducing audio information such as music information on a magnetooptical disk. In this apparatus, a dot code on a sheet 960 like the one shown in FIG. 106 is scanned by using an operating section 962 to reproduce a code, and the code is output to an information device 964 such as a personal computer or an electronic notebook or an earphone 966.

As shown in FIG. 107, according to a known arrangement, the disk apparatus 958 includes a spindle motor 968, an optical pickup 970, a grooves 972, a head driving circuit 974, an address decoder 976, an RF amplifier 978, a servo control circuit 980, an EFM (Eight to Fourteen Modulation)/ACIRC (Advanced Cross Interleave Read Solomon Code) circuit 982, a memory controller 984 for anti-vibration, a memory 986, a display section 988, a key operation panel 990, a system controller 992, a compression/decompression processing section 994, an A/D converter 996, an audio input terminal 998, a D/A converter 1000, and an audio output terminal 1002.

In this case, the EFM/ACIRC circuit 982 is a section for performing encoding and decoding operations in disk write and read operations. The memory controller 984 for anti-vibration interpolates data by using the memory 986 to prevent sound omission caused by vibrations. The compression/decompression processing section 994 performs compression/decompression processing by using an audio efficient coding scheme called ATRAC (Adaptive Transform Acoustic Coding) as one type of transform coding scheme of performing a coding operation by conversion from the time axis to the frequency axis.

The disk apparatus 958 with the dot code decoding function of this embodiment is obtained by adding an image processing section 1004 for receiving an image signal from the operating section 962 and performing processing like the one performed by the image processing section 460 in FIG. 55, a connection terminal 1006 and an I/F 1008 for the information device 964. In addition, since the compression/decompression processing section 994 is constituted by an ASIC-DSP and the like, the function of the data processing section 462 for performing demodulation and error correction for reproduction of the above dot code and processing for data compression/decompression for other information devices 1008 are incorporated in the compression/decompression processing section 994.

Note that the operating section 962 includes an optical system 1010, an image pickup element 1012, and an amplifier 1014 corresponding to, for example, the image formation optical system 200, the image pickup section 204, and the preamplifier 206 in FIG. 55, respectively.

In an information reproducing apparatus for reproducing a dot code, a large-capacity memory is generally required to reproduce large-capacity information such as music information. If, however, the apparatus has a recording/reproducing section for a disk 1016, such a large-capacity memory can be omitted. In addition, the sound reproducing section, i.e., the sound compression/decompression processing section 994, the D/A converter 1000, and the like in this case, can be commonly used. Furthermore, if the speech compression/decompression processing section 994 is formed to also serve as a data processing section for code reproduction processing, and is designed by using an ASIC-DSP, a low-cost, compact apparatus can be realized.

The disk apparatus 958 with the dot code decoding function, which has the above arrangement, can serve as a general disk apparatus for recording/reproducing sound, performing selection of music, and the like, and can also be used as a dot code reproducing apparatus. This function switching operation is performed by the operation of the key operation panel 990 under the control of the system controller 992.

When the disk apparatus 958 is to be used as a dot code reproducing apparatus, the following methods for use are assumed. As shown in FIG. 106, music piece selection indexes, each consisting of a music piece name and a singer name, are written in character, and dot codes corresponding to the respective music pieces are recorded. In this case, since each music piece is information on the order of, e.g., three or four minutes, each information is considerably long. For this reason, each dot code is divided and recorded on a plurality of lines, four in FIG. 106. That is, each music piece is divided into dot codes of a plurality of lines and recorded on a sheet while block addresses indicating the positions of blocks in the music piece are added to each dot code, assuming that a block whose X and Y addresses are "1" and "1", respectively, is regarded as a header block. In a reproducing operation, all the dot codes on the plurality of lines are scanned, and the resultant data is recorded on the disk 1016.

At this time, even if scanning is performed at random, the music piece can be written on the disk 1016 in consideration of recording positions based on addresses indicating the positions of blocks in the music piece, i.e., can be recorded in a correct order. Assume that one music piece is divided into dot codes on four lines, as shown in FIG. 106, and the dot code on the second line is scanned first by the operating section 962. Even in this case, since the ordinal number of the scanned dot code, i.e., that the dot code is the second dot code, is known from the address, the dot code can be recorded with a recording portion for the first dot code being ensured. Therefore, when audio information reproduced from dot codes is recorded on the simple printer system 106, the information can be reproduced in a correct order.

In addition, the user can form an original disk on which, for example, music pieces A and C are recorded first, and then a music piece D is recorded, without using another audio reproducing apparatus, e.g., a tape deck or a CD reproducing apparatus. Assume that the user scans the dot codes of a plurality of music pieces recorded on the sheet 960 in the order of reproduction to be performed in a reproducing operation while seeing the music selection indexes. In this case, for example, the music pieces can be recorded in the order of A, C, D, . . . . If the music pieces are reproduced in the normal mode, they are reproduced in the order named. That is, programming can be performed.

Note that as the information device 964, an image output apparatus can be used. For example, an FMD is used, and JPEG and MPEG like those disclosed in Japanese Patent Application No. 4-81673 are performed by the compression/decompression processing section 994, together with three-dimensional image decompression processing. The resultant data is converted into a video signal by the I/F 1008. With this operation, a three-dimensional image corresponding to the read dot code can be displayed. As described above, this embodiment is not limited to audio information either.

In addition, as is apparent, this embodiment can be applied to other digital recording/reproducing apparatus such as a DAT.

A case wherein a dot code recording function is incorporated in a silver chloride camera.

FIGS. 108A and 108B show the arrangement of a rear cover 1018 of a camera capable of recording a multimedia information dot code. In this arrangement, a two-dimensional LED array 1022 for recording a dot code is arranged beside a member like a conventional data back for recording date information such as year, month, and day information by using an LED array 1020. A circuit incorporating section 1024 is arranged behind the data back. A circuit for ON/OFF-controlling the LED array 1020 and the like are incorporated in this section. In addition, a circuit system for recording a multimedia information dot code is incorporated in the section to print data, as a dot code, on a silver chloride film (not shown) by using the LED array 1022. For example, a stickpin type microphone 1026 is connected to the circuit incorporating section 1024. Speech is picked up from the microphone 1026 and the corresponding information is exposed, as a dot code, on the film by using the LED array 1022.

In addition to the LED arrays 1020 and 1022, an electrical contact 1028 for the camera body side is prepared for the data back 1018 because control is performed by using a CPU and the like of the camera body. Furthermore, a pawl portion 1032 of a hinge portion 1030 can be slid so that the data back 1018 can be detached from the camera body by using a pawl portion slide lever portion 1034. That is, this data back 1018 can be replaced with the rear cover of the camera body.

This embodiment exemplifies the apparatus for recording a dot code at once by using the two-dimensional LED array 1022. In contrast to this, FIG. 109A shows an apparatus for recording a dot code two-dimensionally by moving a dot code recording LED unit 1036. As shown in FIG. 109B, this dot code recording LED unit 1036 is constituted by a linear LED array 1038 and a lens 1040 for focusing, e.g., reducing, light from the LED array 1038. Electrical signal electrodes 1042 for receiving signals for controlling the LED array 1038 extend from both sides thereof. The electrical signal electrodes 1042 are brought into slidable contact with a signal electrode plate 1044 on the data back 1018 side, which is shown in FIG. 109C, upon movement of the dot code recording LED unit 1036. The electrical signal electrodes 1042 receive data signals from the signal electrode plate 1044. Note that a scan window 1048 consisting of, e.g., a transparent glass or acrylic material is formed on a film press plate 1046 of the data back 1018, and only the dot code recording LED unit 1036 opposes a film (not shown).

When a two-dimensional LED array is to be used, necessary portions may be electrically turned on without physically moving the array. When, however, this one-dimensional LED array 1038 is to be used, the dot code recording LED unit 1036 must be moved. As a moving mechanism for this unit, a mechanism like the one shown in FIG. 109D is conceivable. More specifically, the arrangement of this mechanism is basically the same as that of a well known moving mechanism for the needle of a tuner. When pulleys 1052 are rotated by a motor 1050, the dot code recording LED unit 1036 having two end fixed to wire lines 1054 wound around the pulleys 1052 is moved laterally. Since the wire lines 1054 do not decompress/contract, the dot code recording LED unit 1036 can be moved with high precision. In addition, in order to accurately translate the dot code recording LED unit 1036, the pulleys 1052 and the wire lines 1054 are arranged on both sides of the dot code recording LED unit 1036.

In addition, as a moving mechanism for the dot code recording LED unit 1036, an ultrasonic motor 1056 can be used, as shown in FIG. 109E. The ultrasonic motor 1056 applies vibrations to a vibration plate 1058 for transferring ultrasonic wave motion as if waves were moved to right and left. A movable member 1060 is then moved to right and left as if to ride on the waves. Upon movement of the movable member 1060, the dot code recording LED unit 1036 connected thereto is also moved to right and left.

FIG. 110 shows the circuit arrangement of the data back 1018 shown in FIGS. 108A and 109A. Especially the portion enclosed with the broken line indicates the arrangement of the data back 1018.

A CPU (e.g., a one-chip microcomputer) 1062 arranged in the camera body controls the overall camera. An exposure control section 1064 performs exposure control on the basis of photometric data from a photometric section 1066. The exposure control section 1064 controls a shutter speed or an aperture or both through a shutter control section 1068 and an aperture control section 1070 depending on a purpose or a mode, thereby performing optimal exposure.

The CPU 1062 calculates a lens control amount by using lens information held on the lens or camera body side, and causes a lens control section 1074 to perform necessary lens control. This control includes focus control and zoom control. In addition, the CPU 1062 controls a shutter operation in accordance with the operations of a focus lock button 1076 and a release button 1078 (in general, one button mechanically serves as the two buttons, and signals are independently output therefrom). The CPU 1062 causes a motor control section 1080 to control a motor 1082 for winding up a film.

In addition, the CPU 1062 can exchange data with a multimedia information recording/reproducing section 1084, a multimedia information LED controller 1086, and a date LED controller 1088 via the electrical contact 1028 for the camera body side. The date LED controller 1088 controls emission of a date LED array 1020 to print a photography date and time on a film. The data back 1018 incorporates a date clock generator 1090 for generating a time pattern for this printing operation.

In the multimedia information recording/reproducing section 1084, the recording system includes, for example, components ranging from a component for inputting speech to a component immediately before a component for code synthesis/edit processing in the arrangement shown in FIG. 15, i.e., up to a component for generating a pattern, whereas the reproducing system includes, for example, components ranging from the scan conversion section 186 to the D/A conversion section 266 in FIG. 17. The multimedia information LED controller 1086 controls emission of the LED arrays 1022 or 1038 in accordance with a dot code pattern output from the multimedia information recording/reproducing section 1084. In the case shown in FIG. 108A, the LED array 1022 is used, the dot code pattern can be exposed with only this arrangement. In contrast to this, in the case shown in FIG. 109A, since the LED array 1038 must be moved, the motor 1050 is driven by the LED array moving motor controller 1092 to move the dot code recording LED unit 1036. The multimedia information LED controller 1086 sequentially supplies necessary code information to be recorded at a given position to the LED array 1038 and causes it to emit light in accordance with the timing of movement by the motor 1050.

Note that a various mode setting key 1094 is arranged on the camera body side. This key is constituted by several buttons. Alternatively, a mode switching button, a setting button, and the like may be separately arranged. In addition, the key may be arranged on the data back side. In this case, a key operation signal is supplied to the CPU 1062 via the electrical contact.

In the above arrangement, for example, a dot code is exposed onto a film in the following manner. When an operation signal from the focus lock 1076 button, which is an indicator of the start of a photographic operation, is activated, the CPU 1062 loads speech from the microphone 1026 into the multimedia information recording/reproducing section 1084, and causes a storage section (not shown) in the multimedia information recording/reproducing section 1084 to sequentially store speech data corresponding to a predetermined period of time. For example, this predetermined period of time is set to be, e.g., five or ten seconds in advance, and the maximum capacity of a memory (not shown) is set in accordance with the predetermined period of second. Speech data is then sequentially and cyclically stored in the memory, similar to a general voice recorder. When the release button 1078 is depressed, the CPU 1062 causes the multimedia information recording/reproducing section 1084 to convert speech some seconds (e.g., five seconds) before the depression of the button or before and after (e.g., one second after and three seconds before) the depression of the button into a dot code. This setting can be performed by the user through the mode setting key 1094. The speech stored in the multimedia information recording/ reproducing section 1084 is actually converted into a code. The code is printed on a film by the LED arrays 1022 or 1038. After this operation, the CPU 1062 performs a film wind-up operation. As is apparent, the LED array moving motor controller 1092 and the film wind-up motor control section 1080 may be properly synchronized with each other so that a recording operation can be performed while the film is wound up upon matching of the speed and timing of movement. In this case, the apparatus can properly cope with high-speed sequence shooting and the like. In addition, the dot code recording LED unit 1036 may be fixed, and a recording operation can be performed while a film wind-up operation is performed. In this case, one motor can be omitted.

As is apparent, in addition to recording of speech as dot code information on a film, various information on the camera side, which is supplied from the CPU 1062, e.g., information indicating the type of a lens currently used, a shutter speed, and an aperture, can be recorded. That is, for example, specific conditions in which a photographic operation is performed can be known after a photograph is completed. In general, such information is to be retained in user's memory. With the arrangement of this embodiment, by reproducing a dot code on a film or photographic paper on which the film is printed through the multimedia information dot code reproducing apparatus, the information can be selectively displayed, and the user can know conditions and the like set in the camera in a photographic operation. When, for example, the user wants to take a picture in the same conditions as those previously set, the same conditions can be easily set. Especially when pictures are to be routinely taken, e.g., changes in specific scenery are to be taken monthly, such a camera is very useful.

FIG. 111 shows a case wherein a film on which a dot code is printed is subjected to photoprinting. In this case, for example, a dot code 1096 and a date code 1098 written on a film are subjected, as pictures, to photoprinting, together with the other picture portion 1100. In this case, sound information or various camera information can be reproduced by scanning the dot code 1096 with the above multimedia information dot code reproducing apparatus. If, for example, only a dot code is extracted and printed on the lower surface of a photographic paper on the DPE side, only a photograph is printed on the upper surface of the card to obtain a photograph similar to a conventional photograph. In addition, if trimming information in the DPE such as zooming/panoramic mode switching information is recorded, as one piece of camera information, on a film, the DPE can perform photoprinting in the panoramic or zooming mode by scanning the dot code on the film and reading the information.

When a dot code is printed on a film, double exposure is performed together with an actual scene. In this case, if strong external light is incident, the dot code may not be properly printed. For this reason, for example, in some conventional camera capable of coping with the panoramic mode, when the panoramic mode is set, a light-shielding plate is inserted vertically to prevent a scene from being printed on the shielded portion. A similar function may be employed. More specifically, a light-shielding plate may be automatically inserted, or the light-shielding plate may be fitted in a portion in front of a film and behind the lens if the camera is designed to print a dot code. In addition, a code may be recorded on a marginal portion (portion free from exposure) of a film.

Referring to FIG. 110, a pen type information reproducing apparatus 1102 may be connected to the data back 1018 to display camera information, i.e., aperture information, shutter information, lens information, and the like on, e.g., an LCD mode display section 1104 incorporated in the rear side of the camera back or the camera body or an LED display section 1106 in the finder. In addition, a mode may be set in the same conditions as those read from the dot code 1096 by scanning it. That is, when the dot code on a film or a photograph is scanned, the respective conditions on the camera side are automatically set in accordance with the corresponding mode. As a result, the same shutter speed, the same aperture, and the same magnification of the lens as those read from the dot code are set.

As has been described in detail above, according to the present invention, there is provided a dot code which allows low-cost, large-capacity recording of multimedia information including audio information and digital code data and can be repeatedly reproduced, and an information recording/ reproducing system capable of recording/reproducing the dot code.

We claim:

1. An optically readable dot code comprising blocks arranged and sized so that a plurality of said blocks fits within a field of view of a reader for scanning the blocks to optically read the dot code, each of the blocks including:

a data dot pattern comprising a plurality of dots arranged in accordance with contents of information to be recorded, a marker by which the existence of the block is recognized, and a block address pattern representing an address of the block in the dot code, the data dot pattern, the marker, and the block address pattern being arranged in accordance with a predetermined positional relationship within each block;

wherein the address of each block is such that the blocks can be individually identified and the dot code correctly read irrespective of an order in which the blocks are scanned by the reader.

2. A dot code according to claim 1, wherein the blocks are arranged in lines in two directions different from each other so as to be adjacent to each other.

3. A dot code according to claim 2, wherein the data dot pattern in each of the blocks is constituted by a plurality of dots which are two-dimensionally arranged in accordance with a predetermined format.

4. A dot code according to claim 3, wherein the blocks are formed to have the same size.

5. A dot code according to claim 4, wherein an area of the dot code is set larger than the field of view of the reading means.

6. A dot code according to claim 4, wherein:

each of the blocks are formed to have a rectangular shape, the marker of each of the blocks is arranged such that a corner of each of the blocks is located on a center of the marker, and the data dot pattern is located in a region surrounded by the markers at the four corners of each of the blocks.

7. A dot code according to claim 3, wherein the blocks are formed to have the same size such that blocks on an imaging face of a reader for optically reading the dot codes have a size smaller than the imaging area.

8. A dot code according to claim 7, wherein an area of the dot code on the reading face is set larger than the imaging area of the reader.

9. A dot code according to claim 7, wherein:
each of the blocks are formed to have a rectangular shape,
the marker of each of the blocks is arranged such that a corner of each of the blocks is located on a center of the marker, and
the data dot pattern is located in a region surrounded by the markers at the four corners of each of the blocks.

10. A dot code according to claim 9, wherein the blocks adjacent to each other have a marker in common at the corner in contact with each other.

11. A dot code according to claim 9, wherein the blocks adjacent to each other have a marker in common at the corner in contact with each other, and the block address pattern is arranged in a region between a pair of markers located at positions corresponding to one side common to the adjacent blocks.

12. A dot code according to claim 11, wherein the markers are separated from the block address pattern by a predetermined distance.

13. A dot code according to claim 11, wherein the block address patterns are separated from the data dot patterns by a predetermined distance.

14. A dot code according to claim 11, wherein the markers are separated from the data dot pattern by a predetermined distance.

15. A dot code according to claim 11, wherein the block address pattern comprises a dot pattern for pattern-matching, which is directed in a predetermined direction.

16. A dot code according to claim 15, wherein the markers and the pattern-matching dot pattern are separated from each other by a predetermined distance.

17. A dot code according to claim 15, wherein pattern-matching dot patterns are separated from the data dot patterns by a predetermined distance.

18. A dot code according to claim 9, wherein the blocks adjacent to each other have a marker in common at the corner in contact with each other, and a dot pattern for pattern-matching is arranged in a region between a pair of markers located at positions corresponding to one side common to the adjacent blocks.

19. A dot code according to claim 18, wherein the markers are separated from the pattern-matching dot pattern by a predetermined distance.

20. A dot code according to claim 18, wherein pattern-matching dot patterns are separated from the data dot patterns by a predetermined distance.

21. A dot code according to claim 1, wherein the data dot pattern in each of the blocks is constituted by a plurality of dots which are two-dimensionally arranged in accordance with a predetermined format.

22. A dot code according to claim 21, wherein:
the blocks are formed to have a rectangular shape,
the marker is arranged such that a corner of each of the blocks is located on a center of the marker, and
the data dot pattern and the block address pattern are located in a region surrounded by the markers at the four corners of each of the blocks.

23. A dot code according to claim 22, wherein the block address pattern is arranged in a region between a pair of markers located at positions corresponding to one side of the rectangular shape.

24. A dot code according to claim 1, wherein each of the markers is constituted by a pattern which cannot be identical to the data dot pattern.

25. A dot code according to claim 1, wherein the markers are separated from the block address pattern by a predetermined distance.

26. A dot code according to claim 1, wherein the block address patterns are separated from the data dot patterns by a predetermined distance.

27. A dot code according to claim 1, wherein the markers are separated from the data dot pattern by a predetermined distance.

28. A dot code according to claim 1, wherein the markers are directed to correspond to that of an arrangement of the data dot pattern.

29. A dot code according to claim 28, wherein the marker includes a sub-mark representing that the marker is directed to correspond to a direction of an arrangement of the data dot pattern.

30. A dot code according to claim 1, wherein the marker is formed to be shaped irrelevant to the direction of an arrangement of the data dot pattern.

31. A dot code according to claim 1, wherein the block address pattern includes block address data and at least one of error correction code data and error detection code data of the block address data.

32. A dot code according to claim 31, wherein the block address pattern includes a dot pattern for pattern-matching, which is directed in a predetermined direction in a part of at least one of error correction code data and error detection code data of the block address data.

33. An information recording system for recording a dot code on a recording medium so as to be optically read, the dot code comprising blocks arranged and sized so that a plurality of said blocks fits within a field of view of a reader for scanning the blocks to optically read the dot code,
each of the blocks including:
a data dot pattern comprising a plurality of dots arranged in accordance with contents of information data to be recorded,
a marker by which the existence of the block is recognized, and
a block address pattern representing an address of the block in the dot code,
the data dot pattern, the marker, and the block address pattern being arranged in accordance with a predetermined positional relationship within each block;
wherein the address of each block is such that the blocks can be individually identified and the dot code correctly read irrespective of an order in which the blocks are scanned by the reader;
the information recording system comprising:
input means for inputting the information data to be recorded;
conversion means for converting the information data input by said input means into dot code data; and
recording means for recording on the recording medium the dot code data converted by said conversion means, as optically readable dot code.

34. An information recording system according to claim 33, wherein the blocks are arranged in lines in two directions different from each other so as to be adjacent to each other.

35. An information recording system according to claim 34, wherein the data dot pattern in each of the blocks is constituted by a plurality of dots which are two-dimensionally arranged in accordance with a predetermined format.

36. An information recording system according to claim 33, wherein said conversion means includes:

data arranging means for arranging information data input from said input means so as to be suitable to be recorded, and data addition means for generating address-added data comprising data of the block address and data output from said data arranging means in accordance with a predetermined format.

37. An information recording system according to claim 36, wherein said conversion means further includes:

modulating means for modulating the address-added data output from said data addition means in order to distinguish the address-added data from the marker, and marker addition means for adding at least one marker to the data modulated by said modulating means.

38. An information recording system according to claim 37, further comprising synthesizing means for synthesizing the data output from said marker addition means and the other data to be recorded on the recording medium, and wherein said recording means records on the recording medium in a form corresponding to the contents of the data synthesized by said synthesizing means.

39. An information recording system according to claim 33, wherein said conversion means includes:

data arranging means for arranging information data input from said input means so as to be suitable to be recorded, modulating means for modulating the data output from said data addition means in order to distinguish the data from the marker, and marker addition means for adding data of the marker to the data modulated by said modulating means.

40. An information recording system according to claim 33, wherein said conversion means includes:

data arranging means for arranging information data input from said input means so as to be suitable to be recorded, modulating means for modulating the data output from said data arranging means in order to distinguish the data from the marker, and data addition means for generating address-added data comprising data of the block address and data output from said modulating means in accordance with a predetermined format.

41. An information recording system according to claim 33, wherein said conversion means includes:

interleaving means for, when the information data input from said input means is arranged so as to be suitable to be recorded, changing the arrangement of data in accordance with a predetermined rule such that the data is two-dimensionally dispersed in the dot code to be recorded, and marker addition means for adding data of the marker to the data having the arrangement of which are changed by said interleaving means.

42. An information recording system according to claim 33, wherein said conversion means includes:

interleaving means for, when the information data input from said input means is arranged so as to be suitable to be recorded, changing the arrangement of data in accordance with a predetermined rule such that the data is two-dimensionally dispersed in the dot code to be recorded, and data addition means for generating address-added data comprising data of the block address and data having the arrangement of which are changed by said interleaving means in accordance with a predetermined format.

43. An optically readable dot code comprising blocks arranged and sized so that a plurality of said blocks fits on an imaging face of an imaging element of a reader for scanning the blocks to optically read the dot code, each of the blocks including:

a data dot pattern comprising a plurality of dots arranged in accordance with contents of information to be recorded, a marker by which the presence of the block is recognized, and a block address pattern representing an address of the block in the dot code, the data dot pattern, the marker, and the block address pattern being arranged in accordance with a predetermined positional relationship within each block;

wherein the address of each block is such that the blocks can be individually identified and the dot code correctly read irrespective of an order in which the blocks are scanned by the reader.

* * * * *